United States Patent
Yang et al.

(10) Patent No.: US 11,907,013 B2
(45) Date of Patent: Feb. 20, 2024

(54) CONTINUITY OF APPLICATIONS ACROSS DEVICES

(71) Applicant: Apple Inc., Cupertino, CA (US)

(72) Inventors: Lawrence Y. Yang, Bellevue, WA (US); Patrick L Coffman, San Francisco, CA (US); Craig M. Federighi, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/666,971

(22) Filed: Feb. 8, 2022

(65) Prior Publication Data
US 2022/0163996 A1 May 26, 2022

Related U.S. Application Data

(63) Continuation of application No. 14/641,298, filed on Mar. 6, 2015, now Pat. No. 11,256,294.
(Continued)

(51) Int. Cl.
*G06F 1/16* (2006.01)
*H04L 67/025* (2022.01)
(Continued)

(52) U.S. Cl.
CPC .............. *G06F 1/163* (2013.01); *G06F 3/041* (2013.01); *G06F 3/0414* (2013.01);
(Continued)

(58) Field of Classification Search
CPC ........ G06F 1/163; G06F 3/041; G06F 3/0414; G06F 3/04817; G06F 3/0482;
(Continued)

(56) References Cited

U.S. PATENT DOCUMENTS

| 4,761,642 A | 8/1988 | Huntzinger et al. |
| 4,885,704 A | 12/1989 | Takagi et al. |

(Continued)

FOREIGN PATENT DOCUMENTS

| AR | 060465 A1 | 6/2008 |
| AU | 2007100826 A4 | 9/2007 |

(Continued)

OTHER PUBLICATIONS

Non-Final Office Action received for U.S. Appl. No. 17/181,089, dated May 13, 2022, 12 pages.
(Continued)

*Primary Examiner* — Tadesse Hailu
*Assistant Examiner* — Darrin Hope
(74) *Attorney, Agent, or Firm* — DLA Piper LLP (US)

(57) ABSTRACT

At an electronic device, detecting a compatible external device, where the external device is executing or has executed a first application. The detection may be made wirelessly. The electronic device also receives usage information regarding the first application from the external device. Display an affordance for user selection based on the received information. When the affordance is selected, launch a second application on the electronic device, the second application corresponding to the first application. In some examples, the second application is a different version of the first application. Launching the second application may additionally include bringing the second application to the same state as the first application. For example, if e-mail is being drafted on the external device, the electronic device may launch an e-mail editor showing the draft. In this way, a user can seamlessly transition from the use of one electronic device to another electronic device.

54 Claims, 88 Drawing Sheets

Related U.S. Application Data

(60) Provisional application No. 62/035,348, filed on Aug. 8, 2014, provisional application No. 62/006,043, filed on May 30, 2014.

(51) Int. Cl.

| | |
|---|---|
| *G06F 3/04842* | (2022.01) |
| *G06F 3/0488* | (2022.01) |
| *G06F 3/04892* | (2022.01) |
| *G06F 3/04817* | (2022.01) |
| *G06F 3/0482* | (2013.01) |
| *G06F 3/16* | (2006.01) |
| *G06F 9/48* | (2006.01) |
| *G06F 21/31* | (2013.01) |
| *G06F 3/0484* | (2022.01) |
| *G06F 3/04883* | (2022.01) |
| *G06F 3/041* | (2006.01) |
| *G06F 3/14* | (2006.01) |

(52) U.S. Cl.
CPC .......... *G06F 3/0482* (2013.01); *G06F 3/0484* (2013.01); *G06F 3/0488* (2013.01); *G06F 3/04817* (2013.01); *G06F 3/04842* (2013.01); *G06F 3/04883* (2013.01); *G06F 3/04892* (2013.01); *G06F 3/1423* (2013.01); *G06F 3/167* (2013.01); *G06F 9/4856* (2013.01); *G06F 21/31* (2013.01); *H04L 67/025* (2013.01); *G06F 2203/04108* (2013.01)

(58) Field of Classification Search
CPC .. G06F 3/0484; G06F 3/04842; G06F 3/0488; G06F 3/04883; G06F 3/04892; G06F 3/1423; G06F 3/167; G06F 9/4856; G06F 21/31; G06F 2203/04108; H04L 67/02
See application file for complete search history.

(56) References Cited

U.S. PATENT DOCUMENTS

| | | |
|---|---|---|
| 4,896,291 A | 1/1990 | Gest et al. |
| 5,140,678 A | 8/1992 | Torres |
| 5,146,556 A | 9/1992 | Hullot et al. |
| 5,202,961 A | 4/1993 | Mills et al. |
| 5,227,771 A | 7/1993 | Kerr et al. |
| 5,229,852 A | 7/1993 | Maietta et al. |
| 5,237,653 A | 8/1993 | Noguchi et al. |
| 5,287,447 A | 2/1994 | Miller et al. |
| 5,333,256 A | 7/1994 | Green et al. |
| 5,345,552 A | 9/1994 | Brown |
| 5,347,295 A | 9/1994 | Agulnick et al. |
| 5,384,911 A | 1/1995 | Bloomfield |
| 5,412,776 A | 5/1995 | Bloomfield et al. |
| 5,416,895 A | 5/1995 | Anderson et al. |
| 5,428,730 A | 6/1995 | Baker et al. |
| 5,463,725 A | 10/1995 | Henckel et al. |
| 5,487,143 A | 1/1996 | Southgate |
| 5,499,334 A | 3/1996 | Staab |
| 5,500,936 A | 3/1996 | Allen et al. |
| 5,557,724 A | 9/1996 | Sampat et al. |
| 5,560,022 A | 9/1996 | Dunstan et al. |
| 5,561,811 A | 10/1996 | Bier |
| 5,581,670 A | 12/1996 | Bier et al. |
| 5,583,984 A | 12/1996 | Conrad et al. |
| 5,657,049 A | 8/1997 | Ludolph et al. |
| 5,659,693 A | 8/1997 | Hansen et al. |
| 5,721,850 A | 2/1998 | Farry et al. |
| 5,793,365 A | 8/1998 | Tang et al. |
| 5,825,357 A | 10/1998 | Malamud et al. |
| 6,145,083 A | 11/2000 | Shaffer et al. |
| 6,166,736 A | 12/2000 | Hugh |
| 6,215,490 B1 | 4/2001 | Kaply |
| 6,230,170 B1 | 5/2001 | Zellweger et al. |
| 6,288,715 B1 | 9/2001 | Bain et al. |
| 6,300,951 B1 | 10/2001 | Filetto et al. |
| 6,323,846 B1 | 11/2001 | Westerman et al. |
| 6,393,462 B1 | 5/2002 | Mullen-Schultz |
| 6,486,895 B1 | 11/2002 | Robertson et al. |
| 6,493,002 B1 | 12/2002 | Christensen |
| 6,504,934 B1 | 1/2003 | Kasai et al. |
| 6,515,988 B1 | 2/2003 | Eldridge et al. |
| 6,570,557 B1 | 5/2003 | Westerman et al. |
| 6,633,318 B1 | 10/2003 | Kim et al. |
| 6,661,437 B1 | 12/2003 | Miller et al. |
| 6,677,932 B1 | 1/2004 | Westerman |
| 6,768,497 B2 | 7/2004 | Baar et al. |
| 6,922,147 B1 | 7/2005 | Viksnins et al. |
| 7,007,241 B2 | 2/2006 | Boeuf |
| 7,017,119 B1 | 3/2006 | Johnston et al. |
| 7,081,905 B1 | 7/2006 | Raghunath |
| 7,370,244 B2 | 5/2008 | Breitling et al. |
| 7,415,720 B2 | 8/2008 | Jung |
| 7,444,645 B1 | 10/2008 | St-Michel et al. |
| 7,454,192 B1 | 11/2008 | Zhu |
| 7,458,014 B1 | 11/2008 | Rubin et al. |
| 7,506,260 B2 | 3/2009 | Wada et al. |
| 7,526,728 B2 | 4/2009 | Apparao et al. |
| 7,546,470 B2 | 6/2009 | Schultz |
| 7,571,014 B1 | 8/2009 | Lambourne et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,676,767 B2 | 3/2010 | Hofmeister et al. |
| 7,689,939 B1 | 3/2010 | Becker |
| 7,707,514 B2 | 4/2010 | Forstall et al. |
| 7,739,622 B2 | 6/2010 | Deline et al. |
| 7,814,112 B2 | 10/2010 | Gupta et al. |
| 7,840,907 B2 | 11/2010 | Kikuchi et al. |
| 7,844,914 B2 | 11/2010 | Andre et al. |
| 7,860,936 B1 | 12/2010 | Newstadt et al. |
| 7,954,056 B2 | 5/2011 | Graham |
| 7,957,762 B2 | 6/2011 | Herz et al. |
| 7,996,045 B1 | 8/2011 | Bauer et al. |
| 8,006,002 B2 | 8/2011 | Kalayjian et al. |
| 8,028,323 B2 | 9/2011 | Weel |
| 8,042,157 B2 | 10/2011 | Bennett et al. |
| 8,060,571 B2 | 11/2011 | Rao |
| 8,077,157 B2 | 12/2011 | Sengupta et al. |
| 8,171,137 B1 | 5/2012 | Parks et al. |
| 8,181,119 B1 | 5/2012 | Ording |
| 8,196,061 B1 | 6/2012 | Bhojan |
| 8,224,894 B1 | 7/2012 | Parks et al. |
| 8,225,191 B1 | 7/2012 | Kalman |
| 8,239,784 B2 | 8/2012 | Hotelling et al. |
| 8,250,071 B1 | 8/2012 | Killalea et al. |
| 8,259,153 B1 | 9/2012 | Campbell et al. |
| 8,260,879 B2 | 9/2012 | Chan |
| 8,269,739 B2 | 9/2012 | Hillis et al. |
| 8,279,180 B2 | 10/2012 | Hotelling et al. |
| 8,290,603 B1 | 10/2012 | Lambourne |
| 8,290,777 B1 | 10/2012 | Nguyen et al. |
| 8,291,341 B2 | 10/2012 | Tseng et al. |
| 8,294,105 B2 | 10/2012 | Alameh et al. |
| 8,370,448 B2 | 2/2013 | Galchev |
| 8,381,135 B2 | 2/2013 | Hotelling et al. |
| 8,386,563 B2 | 2/2013 | Parks et al. |
| 8,392,259 B2 | 3/2013 | Macgillivray et al. |
| 8,392,617 B1 | 3/2013 | Weber et al. |
| 8,434,133 B2 | 4/2013 | Kulkarni et al. |
| 8,438,504 B2 | 5/2013 | Cranfill et al. |
| 8,443,280 B2 | 5/2013 | Noyes |
| 8,458,780 B1 | 6/2013 | Takkallapally et al. |
| 8,467,766 B2 | 6/2013 | Rackley, III et al. |
| 8,478,363 B2 | 7/2013 | Levien et al. |
| 8,478,816 B2 | 7/2013 | Parks et al. |
| 8,479,122 B2 | 7/2013 | Hotelling et al. |
| 8,499,236 B1 | 7/2013 | Keljo |
| 8,504,114 B1 | 8/2013 | Tseng |
| 8,566,700 B2 | 10/2013 | Ueda |
| 8,613,070 B1 | 12/2013 | Borzycki et al. |

(56) References Cited

U.S. PATENT DOCUMENTS

| | | |
|---|---|---|
| 8,624,836 B1 | 1/2014 | Miller et al. |
| 8,656,040 B1 | 2/2014 | Bajaj et al. |
| 8,718,556 B2 | 5/2014 | Lee et al. |
| 8,762,844 B2 | 6/2014 | Kim et al. |
| 8,769,624 B2 | 7/2014 | Cotterill |
| 8,782,513 B2 | 7/2014 | Migos et al. |
| 8,806,369 B2 | 8/2014 | Khoe et al. |
| 8,812,601 B2 | 8/2014 | Hsieh et al. |
| 8,826,415 B2 | 9/2014 | Last |
| 8,839,122 B2 | 9/2014 | Anzures et al. |
| 8,884,874 B1 | 11/2014 | Kim et al. |
| 8,886,710 B2 | 11/2014 | Evans et al. |
| 8,914,840 B2 | 12/2014 | Reisman |
| 8,949,250 B1 | 2/2015 | Garg et al. |
| 9,002,322 B2 | 4/2015 | Cotterill |
| 9,042,556 B2 | 5/2015 | Kallai et al. |
| 9,049,302 B2 | 6/2015 | Forstall et al. |
| 9,084,003 B1 | 7/2015 | Sanio et al. |
| 9,095,779 B2 | 8/2015 | Chan et al. |
| 9,112,849 B1 | 8/2015 | Werkelin Ahlin et al. |
| 9,134,902 B2 | 9/2015 | Kang et al. |
| 9,202,509 B2 | 12/2015 | Kallai et al. |
| 9,247,363 B2 | 1/2016 | Triplett et al. |
| 9,251,787 B1 | 2/2016 | Hart et al. |
| 9,253,531 B2 | 2/2016 | Relyea et al. |
| 9,269,083 B1 | 2/2016 | Jarajapu et al. |
| 9,292,310 B2 | 3/2016 | Chaudhri et al. |
| 9,294,476 B1 | 3/2016 | Lurey et al. |
| 9,294,853 B1 | 3/2016 | Dhaundiyal |
| 9,319,782 B1 | 4/2016 | Crump et al. |
| 9,374,607 B2 | 6/2016 | Bates et al. |
| 9,417,781 B2 | 8/2016 | Lee et al. |
| 9,431,021 B1 | 8/2016 | Scalise et al. |
| 9,442,516 B2 | 9/2016 | Migos et al. |
| 9,450,812 B2 | 9/2016 | Lee et al. |
| 9,462,017 B1 | 10/2016 | Siracusano, Jr. |
| 9,483,175 B2 | 11/2016 | Wagner |
| 9,507,608 B2 | 11/2016 | Block et al. |
| 9,519,413 B2 | 12/2016 | Bates |
| 9,549,323 B2 | 1/2017 | Lee et al. |
| 9,552,015 B2 | 1/2017 | Capela et al. |
| 9,628,414 B1 | 4/2017 | Umapathy et al. |
| 9,639,252 B2 | 5/2017 | Jin et al. |
| 9,680,927 B2 | 6/2017 | Miller et al. |
| 9,710,639 B1 | 7/2017 | Saini |
| 9,727,749 B2 | 8/2017 | Tzeng et al. |
| 9,781,540 B2 | 10/2017 | Jagannathan et al. |
| 9,794,720 B1 | 10/2017 | Kadri |
| 9,820,323 B1 | 11/2017 | Young et al. |
| 9,830,056 B1 | 11/2017 | Keely et al. |
| 9,846,685 B2 | 12/2017 | Li |
| 9,847,999 B2 | 12/2017 | Van Os et al. |
| 9,898,250 B1 | 2/2018 | Williams et al. |
| 9,922,317 B2 | 3/2018 | Bak et al. |
| 9,948,728 B2 | 4/2018 | Linn et al. |
| 9,954,989 B2 | 4/2018 | Zhou |
| 9,967,401 B2 | 5/2018 | Coffman et al. |
| 10,025,496 B2 | 7/2018 | Park et al. |
| 10,089,607 B2 | 10/2018 | Ziat et al. |
| 10,096,015 B2 | 10/2018 | Bak et al. |
| 10,104,089 B2 | 10/2018 | Kim et al. |
| 10,129,044 B2 | 11/2018 | Kangshang et al. |
| 10,178,234 B2 | 1/2019 | Coffman et al. |
| 10,198,144 B2 | 2/2019 | Munoz et al. |
| 10,198,563 B2 | 2/2019 | Wang et al. |
| 10,225,711 B2 | 3/2019 | Parks et al. |
| 10,248,779 B2 | 4/2019 | Song et al. |
| 10,284,812 B1 | 5/2019 | Van Os et al. |
| 10,284,980 B1 | 5/2019 | Woo et al. |
| 10,334,054 B2 | 6/2019 | Van Os et al. |
| 10,374,804 B2 | 8/2019 | Lee et al. |
| 10,417,037 B2 | 9/2019 | Gruber et al. |
| 10,534,535 B2 | 1/2020 | Lee et al. |
| 10,701,067 B1 | 6/2020 | Ziraknejad et al. |
| 10,713,699 B1 | 7/2020 | Lien et al. |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,749,967 B2 | 8/2020 | Van Os et al. |
| 10,824,299 B2 | 11/2020 | Bai |
| 10,833,887 B2 | 11/2020 | Wu |
| 10,909,586 B2 | 2/2021 | Avedissian et al. |
| 11,258,619 B2 | 2/2022 | Libin |
| 11,343,370 B1 | 5/2022 | Gordon et al. |
| 11,360,634 B1 | 6/2022 | Chang et al. |
| 11,431,834 B1 | 8/2022 | Gordon et al. |
| 11,449,188 B1 | 9/2022 | Chang et al. |
| 11,463,576 B1 | 10/2022 | Gordon et al. |
| 2001/0031622 A1 | 10/2001 | Kivela et al. |
| 2001/0039497 A1 | 11/2001 | Hubbard |
| 2001/0049627 A1 | 12/2001 | Simpson |
| 2002/0002039 A1 | 1/2002 | Qureshey et al. |
| 2002/0010707 A1 | 1/2002 | Chang et al. |
| 2002/0015024 A1 | 2/2002 | Westerman et al. |
| 2002/0059295 A1 | 5/2002 | Ludtke et al. |
| 2002/0068600 A1 | 6/2002 | Chihara et al. |
| 2002/0075334 A1 | 6/2002 | Yfantis |
| 2002/0083101 A1 | 6/2002 | Card et al. |
| 2002/0105537 A1 | 8/2002 | Orbanes et al. |
| 2002/0113802 A1 | 8/2002 | Card et al. |
| 2002/0116276 A1 | 8/2002 | Ottley |
| 2002/0118230 A1 | 8/2002 | Card et al. |
| 2002/0120651 A1 | 8/2002 | Pustejovsky et al. |
| 2002/0142734 A1 | 10/2002 | Wickstead |
| 2002/0168938 A1 | 11/2002 | Chang |
| 2002/0198906 A1 | 12/2002 | Press |
| 2003/0013493 A1 | 1/2003 | Irimajiri et al. |
| 2003/0028639 A1 | 2/2003 | Yamamoto et al. |
| 2003/0030673 A1 | 2/2003 | Ho |
| 2003/0055977 A1 | 3/2003 | Miller |
| 2003/0076352 A1 | 4/2003 | Uhlig et al. |
| 2003/0079057 A1 | 4/2003 | Ruskin et al. |
| 2003/0097413 A1 | 5/2003 | Vishik et al. |
| 2003/0098884 A1 | 5/2003 | Christensen |
| 2003/0100295 A1 | 5/2003 | Sakai et al. |
| 2003/0160861 A1 | 8/2003 | Barlow et al. |
| 2003/0184598 A1 | 10/2003 | Graham |
| 2003/0188183 A1 | 10/2003 | Lee et al. |
| 2003/0218619 A1 | 11/2003 | Ben-tovim |
| 2003/0225836 A1 | 12/2003 | Lee et al. |
| 2003/0229900 A1 | 12/2003 | Reisman |
| 2004/0017404 A1 | 1/2004 | Schileru-Key |
| 2004/0032955 A1 | 2/2004 | Hashimoto et al. |
| 2004/0041849 A1 | 3/2004 | Mock et al. |
| 2004/0046638 A1 | 3/2004 | Kawasaki |
| 2004/0051700 A1 | 3/2004 | Pensjo |
| 2004/0073432 A1 | 4/2004 | Stone |
| 2004/0075701 A1 | 4/2004 | Ng |
| 2004/0080531 A1 | 4/2004 | Berstis |
| 2004/0085351 A1 | 5/2004 | Tokkonen |
| 2004/0125081 A1 | 7/2004 | Hayakawa |
| 2004/0135824 A1 | 7/2004 | Fitzmaurice |
| 2004/0141016 A1 | 7/2004 | Fukatsu et al. |
| 2004/0174398 A1 | 9/2004 | Luke et al. |
| 2004/0181695 A1 | 9/2004 | Walker et al. |
| 2004/0205514 A1 | 10/2004 | Sommerer et al. |
| 2004/0225892 A1 | 11/2004 | Bear et al. |
| 2004/0225901 A1 | 11/2004 | Bear et al. |
| 2004/0242200 A1 | 12/2004 | Maeoka et al. |
| 2004/0261010 A1 | 12/2004 | Matsuishi |
| 2004/0264916 A1 | 12/2004 | Van et al. |
| 2005/0070276 A1 | 3/2005 | Mcgarry |
| 2005/0071188 A1 | 3/2005 | Thuerk |
| 2005/0079896 A1 | 4/2005 | Kokko et al. |
| 2005/0085215 A1 | 4/2005 | Kokko et al. |
| 2005/0093868 A1 | 5/2005 | Hinckley |
| 2005/0096009 A1 | 5/2005 | Ackley |
| 2005/0117752 A1 | 6/2005 | Iima et al. |
| 2005/0132281 A1 | 6/2005 | Pan et al. |
| 2005/0136949 A1 | 6/2005 | Barnes |
| 2005/0144452 A1 | 6/2005 | Lynch et al. |
| 2005/0190059 A1 | 9/2005 | Wehrenberg |
| 2005/0193144 A1 | 9/2005 | Hassan et al. |
| 2005/0220304 A1 | 10/2005 | Lenoir et al. |

(56) References Cited

U.S. PATENT DOCUMENTS

| | | |
|---|---|---|
| 2005/0223068 A1 | 10/2005 | Shohfi et al. |
| 2005/0233733 A1 | 10/2005 | Roundtree et al. |
| 2005/0233780 A1 | 10/2005 | Jani et al. |
| 2005/0278587 A1 | 12/2005 | Breitling et al. |
| 2005/0289482 A1 | 12/2005 | Anthony et al. |
| 2006/0002315 A1 | 1/2006 | Theurer et al. |
| 2006/0017692 A1 | 1/2006 | Wehrenberg et al. |
| 2006/0020904 A1 | 1/2006 | Aaltonen et al. |
| 2006/0026536 A1 | 2/2006 | Hotelling et al. |
| 2006/0031776 A1 | 2/2006 | Glein et al. |
| 2006/0033724 A1 | 2/2006 | Chaudhri et al. |
| 2006/0055789 A1 | 3/2006 | Jin et al. |
| 2006/0071947 A1 | 4/2006 | Ubillos et al. |
| 2006/0101122 A1 | 5/2006 | Ishii |
| 2006/0101350 A1 | 5/2006 | Scott et al. |
| 2006/0107226 A1 | 5/2006 | Matthews et al. |
| 2006/0132456 A1 | 6/2006 | Anson |
| 2006/0150215 A1 | 7/2006 | Wroblewski et al. |
| 2006/0160090 A1 | 7/2006 | Macina et al. |
| 2006/0161621 A1 | 7/2006 | Rosenberg |
| 2006/0184894 A1 | 8/2006 | Daniels et al. |
| 2006/0185005 A1 | 8/2006 | Graves et al. |
| 2006/0197753 A1 | 9/2006 | Hotelling |
| 2006/0206709 A1 | 9/2006 | Labrou et al. |
| 2006/0217104 A1 | 9/2006 | Cho |
| 2006/0224882 A1 | 10/2006 | Chin |
| 2006/0224985 A1 | 10/2006 | Baek et al. |
| 2006/0227500 A1 | 10/2006 | Brandenberg et al. |
| 2006/0230346 A1 | 10/2006 | Bhogal et al. |
| 2006/0250578 A1 | 11/2006 | Pohl et al. |
| 2006/0258289 A1 | 11/2006 | Dua |
| 2006/0288226 A1 | 12/2006 | Kowal |
| 2007/0027682 A1 | 2/2007 | Bennett |
| 2007/0067738 A1 | 3/2007 | Flynt et al. |
| 2007/0072564 A1 | 3/2007 | Adams |
| 2007/0073649 A1 | 3/2007 | Kikkoji et al. |
| 2007/0083828 A1 | 4/2007 | Toriyama et al. |
| 2007/0113294 A1 | 5/2007 | Field et al. |
| 2007/0115933 A1 | 5/2007 | Muhamed et al. |
| 2007/0143495 A1 | 6/2007 | Porat |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0157103 A1 | 7/2007 | Arneson et al. |
| 2007/0160345 A1 | 7/2007 | Sakai et al. |
| 2007/0162582 A1 | 7/2007 | Belali et al. |
| 2007/0162963 A1 | 7/2007 | Penet et al. |
| 2007/0174761 A1 | 7/2007 | Lin et al. |
| 2007/0177804 A1 | 8/2007 | Elias et al. |
| 2007/0180492 A1 | 8/2007 | Hassan et al. |
| 2007/0186106 A1 | 8/2007 | Ting et al. |
| 2007/0226778 A1 | 9/2007 | Pietruszka |
| 2007/0229221 A1 | 10/2007 | Saotome |
| 2007/0233736 A1 | 10/2007 | Xiong et al. |
| 2007/0234208 A1 | 10/2007 | Scott |
| 2007/0236476 A1 | 10/2007 | Suzuki |
| 2007/0239831 A1 | 10/2007 | Basu |
| 2007/0260547 A1 | 11/2007 | Little |
| 2007/0271527 A1 | 11/2007 | Paas et al. |
| 2007/0277121 A1 | 11/2007 | Beckman |
| 2007/0283011 A1 | 12/2007 | Rakowski et al. |
| 2007/0294182 A1 | 12/2007 | Hammad |
| 2008/0011827 A1 | 1/2008 | Little et al. |
| 2008/0016368 A1 | 1/2008 | Adams |
| 2008/0016537 A1 | 1/2008 | Little et al. |
| 2008/0017721 A1 | 1/2008 | Zehnacker |
| 2008/0027947 A1 | 1/2008 | Pritchett et al. |
| 2008/0034307 A1 | 2/2008 | Cisler et al. |
| 2008/0040786 A1 | 2/2008 | Chang et al. |
| 2008/0042866 A1 | 2/2008 | Morse et al. |
| 2008/0043958 A1 | 2/2008 | May et al. |
| 2008/0074049 A1 | 3/2008 | Kitai et al. |
| 2008/0081558 A1 | 4/2008 | Dunko et al. |
| 2008/0091717 A1 | 4/2008 | Garbow et al. |
| 2008/0094368 A1 | 4/2008 | Ording et al. |
| 2008/0094371 A1 | 4/2008 | Forstall et al. |
| 2008/0114678 A1 | 5/2008 | Bennett et al. |
| 2008/0114980 A1 | 5/2008 | Sridhar |
| 2008/0122796 A1 | 5/2008 | Jobs et al. |
| 2008/0126490 A1 | 5/2008 | Ahlenius et al. |
| 2008/0134033 A1 | 6/2008 | Burns et al. |
| 2008/0141182 A1 | 6/2008 | Barsness et al. |
| 2008/0153464 A1 | 6/2008 | Morris |
| 2008/0160974 A1 | 7/2008 | Vartiainen et al. |
| 2008/0168073 A1 | 7/2008 | Siegel et al. |
| 2008/0174570 A1 | 7/2008 | Jobs et al. |
| 2008/0201454 A1 | 8/2008 | Soffer |
| 2008/0208762 A1 | 8/2008 | Arthur et al. |
| 2008/0220752 A1 | 9/2008 | Forstall et al. |
| 2008/0229409 A1 | 9/2008 | Miller et al. |
| 2008/0259829 A1 | 10/2008 | Rosenblatt |
| 2008/0273712 A1 | 11/2008 | Eichfeld et al. |
| 2008/0273713 A1 | 11/2008 | Hartung et al. |
| 2008/0282202 A1 | 11/2008 | Sunday |
| 2008/0285772 A1 | 11/2008 | Haulick et al. |
| 2008/0292074 A1 | 11/2008 | Boni et al. |
| 2008/0301580 A1 | 12/2008 | Hjelmeland et al. |
| 2008/0305742 A1 | 12/2008 | Basir |
| 2008/0307345 A1 | 12/2008 | Hart et al. |
| 2008/0313257 A1 | 12/2008 | Allen et al. |
| 2008/0319856 A1 | 12/2008 | Zito et al. |
| 2008/0319944 A1 | 12/2008 | Venolia et al. |
| 2008/0320391 A1 | 12/2008 | Lemay et al. |
| 2009/0005011 A1 | 1/2009 | Christie et al. |
| 2009/0006846 A1 | 1/2009 | Rosenblatt |
| 2009/0007017 A1 | 1/2009 | Anzures et al. |
| 2009/0031375 A1 | 1/2009 | Sullivan et al. |
| 2009/0037093 A1 | 2/2009 | Kurihara et al. |
| 2009/0054044 A1 | 2/2009 | Ikemori et al. |
| 2009/0055377 A1 | 2/2009 | Hedge et al. |
| 2009/0060170 A1 | 3/2009 | Coughlan et al. |
| 2009/0063851 A1 | 3/2009 | Nijdam |
| 2009/0089712 A1 | 4/2009 | Sato |
| 2009/0094681 A1 | 4/2009 | Sadler et al. |
| 2009/0100383 A1 | 4/2009 | Sunday et al. |
| 2009/0103780 A1 | 4/2009 | Nishihara et al. |
| 2009/0106687 A1 | 4/2009 | De et al. |
| 2009/0113347 A1 | 4/2009 | Hess et al. |
| 2009/0119754 A1 | 5/2009 | Schubert |
| 2009/0122149 A1 | 5/2009 | Ishii |
| 2009/0125571 A1 | 5/2009 | Kiilerich et al. |
| 2009/0135678 A1 | 5/2009 | Godat |
| 2009/0140960 A1 | 6/2009 | Mahowald et al. |
| 2009/0144451 A1 | 6/2009 | Cabezas et al. |
| 2009/0153466 A1 | 6/2009 | Tilley |
| 2009/0158217 A1 | 6/2009 | Stuart |
| 2009/0158390 A1 | 6/2009 | Guan |
| 2009/0164581 A1 | 6/2009 | Bove et al. |
| 2009/0165107 A1 | 6/2009 | Tojo et al. |
| 2009/0174763 A1 | 7/2009 | Bengtsson et al. |
| 2009/0179867 A1 | 7/2009 | Shim et al. |
| 2009/0187423 A1 | 7/2009 | Kim |
| 2009/0187825 A1 | 7/2009 | Sandquist et al. |
| 2009/0193514 A1 | 7/2009 | Adams et al. |
| 2009/0195497 A1 | 8/2009 | Fitzgerald et al. |
| 2009/0199188 A1 | 8/2009 | Fujimaki |
| 2009/0213086 A1 | 8/2009 | Chae et al. |
| 2009/0228126 A1 | 9/2009 | Spielberg et al. |
| 2009/0228938 A1 | 9/2009 | White et al. |
| 2009/0231960 A1 | 9/2009 | Hutcheson |
| 2009/0235155 A1 | 9/2009 | Ueda |
| 2009/0235162 A1 | 9/2009 | Nuccio et al. |
| 2009/0241054 A1 | 9/2009 | Hendricks |
| 2009/0241169 A1 | 9/2009 | Dhand et al. |
| 2009/0244015 A1 | 10/2009 | Sengupta et al. |
| 2009/0248737 A1 | 10/2009 | Shukla et al. |
| 2009/0249244 A1 | 10/2009 | Robinson et al. |
| 2009/0249247 A1 | 10/2009 | Tseng et al. |
| 2009/0254867 A1 | 10/2009 | Farouki et al. |
| 2009/0259939 A1 | 10/2009 | Lockett et al. |
| 2009/0271381 A1 | 10/2009 | Beezer et al. |
| 2009/0271744 A1 | 10/2009 | Anders |
| 2009/0304205 A1 | 12/2009 | Hardacker et al. |
| 2009/0307633 A1 | 12/2009 | Haughay et al. |

(56) References Cited

U.S. PATENT DOCUMENTS

| | | |
|---|---|---|
| 2009/0311993 A1 | 12/2009 | Horodezky |
| 2009/0315841 A1 | 12/2009 | Cheng et al. |
| 2009/0319888 A1 | 12/2009 | Oygard |
| 2009/0327151 A1 | 12/2009 | Carlson et al. |
| 2010/0004031 A1 | 1/2010 | Kim |
| 2010/0011065 A1 | 1/2010 | Scherpa et al. |
| 2010/0020035 A1 | 1/2010 | Ryu et al. |
| 2010/0023449 A1 | 1/2010 | Skowronek et al. |
| 2010/0023878 A1 | 1/2010 | Douris et al. |
| 2010/0023883 A1 | 1/2010 | Khazaka et al. |
| 2010/0029255 A1 | 2/2010 | Kim et al. |
| 2010/0042835 A1 | 2/2010 | Lee et al. |
| 2010/0044121 A1 | 2/2010 | Simon et al. |
| 2010/0045616 A1 | 2/2010 | Li et al. |
| 2010/0066763 A1 | 3/2010 | Macdougall et al. |
| 2010/0070490 A1 | 3/2010 | Amidon et al. |
| 2010/0075656 A1 | 3/2010 | Howarter et al. |
| 2010/0082481 A1 | 4/2010 | Lin et al. |
| 2010/0088692 A1 | 4/2010 | Rathi et al. |
| 2010/0095240 A1 | 4/2010 | Shiplacoff et al. |
| 2010/0103125 A1 | 4/2010 | Kim et al. |
| 2010/0106647 A1 | 4/2010 | Raman |
| 2010/0107078 A1 | 4/2010 | Hayashi |
| 2010/0107229 A1 | 4/2010 | Najafi et al. |
| 2010/0115388 A1 | 5/2010 | Nguyen |
| 2010/0123724 A1 | 5/2010 | Moore et al. |
| 2010/0125785 A1 | 5/2010 | Moore et al. |
| 2010/0125807 A1 | 5/2010 | Easterday et al. |
| 2010/0138780 A1 | 6/2010 | Marano et al. |
| 2010/0146384 A1 | 6/2010 | Peev et al. |
| 2010/0146437 A1 | 6/2010 | Woodcock et al. |
| 2010/0159995 A1 | 6/2010 | Stallings et al. |
| 2010/0162108 A1 | 6/2010 | Stallings et al. |
| 2010/0162169 A1 | 6/2010 | Skarp |
| 2010/0174606 A1 | 7/2010 | Hoyle |
| 2010/0174644 A1 | 7/2010 | Rosano et al. |
| 2010/0175018 A1 | 7/2010 | Petschnigg et al. |
| 2010/0178873 A1 | 7/2010 | Lee et al. |
| 2010/0199359 A1 | 8/2010 | Miki |
| 2010/0205563 A1 | 8/2010 | Haapsaari et al. |
| 2010/0211872 A1 | 8/2010 | Rolston et al. |
| 2010/0223542 A1 | 9/2010 | Vuong et al. |
| 2010/0227600 A1 | 9/2010 | Vander et al. |
| 2010/0241699 A1 | 9/2010 | Muthukumarasamy et al. |
| 2010/0242066 A1 | 9/2010 | Tseng et al. |
| 2010/0247077 A1 | 9/2010 | Yamamoto et al. |
| 2010/0248823 A1 | 9/2010 | Smith |
| 2010/0250376 A1 | 9/2010 | Nandiraju |
| 2010/0257490 A1 | 10/2010 | Lyon et al. |
| 2010/0269039 A1 | 10/2010 | Pahlavan et al. |
| 2010/0269040 A1 | 10/2010 | Lee |
| 2010/0269156 A1 | 10/2010 | Hohlfeld et al. |
| 2010/0272250 A1 | 10/2010 | Yap et al. |
| 2010/0281399 A1 | 11/2010 | Banker |
| 2010/0284389 A1 | 11/2010 | Ramsay et al. |
| 2010/0293598 A1 | 11/2010 | Collart et al. |
| 2010/0295789 A1 | 11/2010 | Shin et al. |
| 2010/0295803 A1 | 11/2010 | Kim et al. |
| 2010/0296678 A1 | 11/2010 | Kuhn-rahloff et al. |
| 2010/0299436 A1 | 11/2010 | Khalid et al. |
| 2010/0299639 A1 | 11/2010 | Ramsay et al. |
| 2010/0306705 A1 | 12/2010 | Nilsson |
| 2010/0321201 A1 | 12/2010 | Huang et al. |
| 2010/0333045 A1 | 12/2010 | Guéziec et al. |
| 2011/0004845 A1 | 1/2011 | Ciabarra |
| 2011/0007029 A1 | 1/2011 | Ben-David |
| 2011/0010470 A1 | 1/2011 | Hulbert et al. |
| 2011/0010667 A1 | 1/2011 | Sakai et al. |
| 2011/0029750 A1 | 2/2011 | Jang et al. |
| 2011/0029864 A1 | 2/2011 | Stewart et al. |
| 2011/0029891 A1 | 2/2011 | Kim et al. |
| 2011/0035799 A1 | 2/2011 | Handler |
| 2011/0041056 A1 | 2/2011 | Griffin et al. |
| 2011/0041096 A1 | 2/2011 | Larco et al. |
| 2011/0041102 A1 | 2/2011 | Kim |
| 2011/0045813 A1 | 2/2011 | Choi |
| 2011/0047368 A1 | 2/2011 | Sundaramurthy et al. |
| 2011/0054268 A1 | 3/2011 | Fidacaro et al. |
| 2011/0059769 A1 | 3/2011 | Brunolli |
| 2011/0065384 A1 | 3/2011 | Cader et al. |
| 2011/0074824 A1 | 3/2011 | Srinivasan et al. |
| 2011/0081923 A1 | 4/2011 | Bednar et al. |
| 2011/0087431 A1 | 4/2011 | Gupta et al. |
| 2011/0087955 A1 | 4/2011 | Ho et al. |
| 2011/0088003 A1 | 4/2011 | Swink et al. |
| 2011/0088086 A1 | 4/2011 | Swink et al. |
| 2011/0091182 A1 | 4/2011 | Look et al. |
| 2011/0103598 A1 | 5/2011 | Fukui et al. |
| 2011/0106671 A1 | 5/2011 | Minnis et al. |
| 2011/0107241 A1 | 5/2011 | Moore |
| 2011/0130168 A1 | 6/2011 | Vendrow et al. |
| 2011/0138166 A1 | 6/2011 | Peszek et al. |
| 2011/0138295 A1* | 6/2011 | Momchilov .......... G06F 3/0484 715/740 |
| 2011/0142234 A1 | 6/2011 | Rogers |
| 2011/0145691 A1 | 6/2011 | Noyes |
| 2011/0145692 A1 | 6/2011 | Noyes et al. |
| 2011/0149874 A1 | 6/2011 | Reif |
| 2011/0164269 A1 | 7/2011 | Kamishiro |
| 2011/0167383 A1 | 7/2011 | Schuller et al. |
| 2011/0179386 A1 | 7/2011 | Shaffer et al. |
| 2011/0187497 A1 | 8/2011 | Chin |
| 2011/0191695 A1 | 8/2011 | Dinka et al. |
| 2011/0191710 A1 | 8/2011 | Jang et al. |
| 2011/0209099 A1 | 8/2011 | Hinckley et al. |
| 2011/0209104 A1 | 8/2011 | Hinckley et al. |
| 2011/0214158 A1 | 9/2011 | Pasquero et al. |
| 2011/0215921 A1 | 9/2011 | Ben et al. |
| 2011/0225426 A1 | 9/2011 | Agarwal et al. |
| 2011/0227810 A1 | 9/2011 | Mckinney et al. |
| 2011/0231914 A1 | 9/2011 | Hung |
| 2011/0246944 A1 | 10/2011 | Byrne et al. |
| 2011/0250895 A1 | 10/2011 | Wohlert et al. |
| 2011/0252062 A1 | 10/2011 | Hanatani et al. |
| 2011/0252364 A1 | 10/2011 | Anzures et al. |
| 2011/0252368 A1 | 10/2011 | Anzures et al. |
| 2011/0252369 A1 | 10/2011 | Chaudhri |
| 2011/0252376 A1 | 10/2011 | Chaudhri et al. |
| 2011/0252377 A1 | 10/2011 | Anzures et al. |
| 2011/0254683 A1 | 10/2011 | Soldan et al. |
| 2011/0260964 A1 | 10/2011 | Mujkic |
| 2011/0261030 A1 | 10/2011 | Bullock |
| 2011/0273526 A1 | 11/2011 | Mehin et al. |
| 2011/0275358 A1 | 11/2011 | Faenger |
| 2011/0279852 A1 | 11/2011 | Oda et al. |
| 2011/0281568 A1 | 11/2011 | Le |
| 2011/0291945 A1 | 12/2011 | Ewing et al. |
| 2011/0291971 A1 | 12/2011 | Masaki et al. |
| 2011/0295879 A1 | 12/2011 | Logis et al. |
| 2011/0296333 A1 | 12/2011 | Bateman et al. |
| 2011/0296344 A1 | 12/2011 | Habib et al. |
| 2011/0296351 A1 | 12/2011 | Ewing et al. |
| 2011/0314398 A1 | 12/2011 | Yano et al. |
| 2011/0319056 A1 | 12/2011 | Toy et al. |
| 2011/0320450 A1 | 12/2011 | Liu et al. |
| 2012/0004920 A1 | 1/2012 | Kelly et al. |
| 2012/0016678 A1 | 1/2012 | Gruber et al. |
| 2012/0023438 A1 | 1/2012 | Xia et al. |
| 2012/0023462 A1 | 1/2012 | Rosing et al. |
| 2012/0024947 A1 | 2/2012 | Naelon et al. |
| 2012/0033028 A1 | 2/2012 | Murphy et al. |
| 2012/0036556 A1 | 2/2012 | Lebeau et al. |
| 2012/0040719 A1 | 2/2012 | Lee et al. |
| 2012/0044062 A1 | 2/2012 | Jersa et al. |
| 2012/0059813 A1 | 3/2012 | Sejnoha et al. |
| 2012/0066731 A1 | 3/2012 | Vasquez et al. |
| 2012/0079126 A1 | 3/2012 | Evans et al. |
| 2012/0084644 A1 | 4/2012 | Robert et al. |
| 2012/0084691 A1 | 4/2012 | Yun |
| 2012/0096069 A1 | 4/2012 | Chan |
| 2012/0096076 A1 | 4/2012 | Chan et al. |
| 2012/0096344 A1 | 4/2012 | Ho et al. |
| 2012/0096386 A1 | 4/2012 | Baumann et al. |
| 2012/0102387 A1 | 4/2012 | Badoiu et al. |

(56) References Cited

U.S. PATENT DOCUMENTS

| | | |
|---|---|---|
| 2012/0105225 A1 | 5/2012 | Valtonen |
| 2012/0105358 A1 | 5/2012 | Momeyer et al. |
| 2012/0121185 A1 | 5/2012 | Zavesky |
| 2012/0129496 A1 | 5/2012 | Park et al. |
| 2012/0131470 A1 | 5/2012 | Wessling et al. |
| 2012/0136998 A1 | 5/2012 | Hough et al. |
| 2012/0143694 A1 | 6/2012 | Zargahi et al. |
| 2012/0149342 A1 | 6/2012 | Cohen et al. |
| 2012/0159364 A1 | 6/2012 | Hyun |
| 2012/0159373 A1 | 6/2012 | Archer et al. |
| 2012/0166950 A1 | 6/2012 | Frumar et al. |
| 2012/0173383 A1 | 7/2012 | Badawiyeh et al. |
| 2012/0178431 A1 | 7/2012 | Gold |
| 2012/0179970 A1 | 7/2012 | Hayes |
| 2012/0185355 A1 | 7/2012 | Kilroy |
| 2012/0185467 A1 | 7/2012 | Prager et al. |
| 2012/0192068 A1 | 7/2012 | Migos et al. |
| 2012/0192102 A1 | 7/2012 | Migos et al. |
| 2012/0192118 A1 | 7/2012 | Migos et al. |
| 2012/0204191 A1 | 8/2012 | Shia et al. |
| 2012/0210226 A1 | 8/2012 | Mccoy et al. |
| 2012/0214458 A1 | 8/2012 | Levien et al. |
| 2012/0214552 A1 | 8/2012 | Sirpal et al. |
| 2012/0222092 A1 | 8/2012 | Rabii |
| 2012/0223890 A1 | 9/2012 | Borovsky et al. |
| 2012/0240085 A1 | 9/2012 | Sim et al. |
| 2012/0260169 A1 | 10/2012 | Schwartz et al. |
| 2012/0266098 A1 | 10/2012 | Webber |
| 2012/0272230 A1 | 10/2012 | Lee |
| 2012/0274550 A1 | 11/2012 | Campbell et al. |
| 2012/0284185 A1 | 11/2012 | Mettler et al. |
| 2012/0284297 A1 | 11/2012 | Aguera-Arcas et al. |
| 2012/0284673 A1 | 11/2012 | Lamb et al. |
| 2012/0290657 A1 | 11/2012 | Parks et al. |
| 2012/0290943 A1 | 11/2012 | Toney et al. |
| 2012/0293605 A1 | 11/2012 | Seferian et al. |
| 2012/0294118 A1 | 11/2012 | Haulick et al. |
| 2012/0297017 A1 | 11/2012 | Livshits et al. |
| 2012/0304111 A1 | 11/2012 | Queru |
| 2013/0005487 A1 | 1/2013 | Frazzini et al. |
| 2013/0007203 A1 | 1/2013 | Szu |
| 2013/0014040 A1 | 1/2013 | Jagannathan et al. |
| 2013/0017846 A1 | 1/2013 | Schoppe |
| 2013/0022221 A1 | 1/2013 | Kallai et al. |
| 2013/0024932 A1 | 1/2013 | Toebes et al. |
| 2013/0027289 A1 | 1/2013 | Choi et al. |
| 2013/0027341 A1 | 1/2013 | Mastandrea |
| 2013/0031217 A1 | 1/2013 | Rajapakse |
| 2013/0041790 A1 | 2/2013 | Murugesan et al. |
| 2013/0046893 A1 | 2/2013 | Hauser et al. |
| 2013/0047084 A1 | 2/2013 | Sanders et al. |
| 2013/0047233 A1 | 2/2013 | Fisk et al. |
| 2013/0050263 A1 | 2/2013 | Khoe et al. |
| 2013/0051755 A1 | 2/2013 | Brown et al. |
| 2013/0053107 A1 | 2/2013 | Kang et al. |
| 2013/0054697 A1 | 2/2013 | Cha et al. |
| 2013/0055113 A1 | 2/2013 | Chazin et al. |
| 2013/0060687 A1 | 3/2013 | Bak et al. |
| 2013/0061155 A1 | 3/2013 | Hon |
| 2013/0061175 A1 | 3/2013 | Matas et al. |
| 2013/0063364 A1 | 3/2013 | Moore |
| 2013/0073286 A1 | 3/2013 | Bastea-Forte et al. |
| 2013/0073584 A1 | 3/2013 | Kuper et al. |
| 2013/0074194 A1 | 3/2013 | White et al. |
| 2013/0080177 A1 | 3/2013 | Chen |
| 2013/0080516 A1 | 3/2013 | Bologh |
| 2013/0080525 A1 | 3/2013 | Aoki et al. |
| 2013/0080955 A1 | 3/2013 | Reimann et al. |
| 2013/0082819 A1 | 4/2013 | Cotterill |
| 2013/0086637 A1 | 4/2013 | Cotterill et al. |
| 2013/0091205 A1 | 4/2013 | Kotler et al. |
| 2013/0094666 A1 | 4/2013 | Haaff et al. |
| 2013/0094770 A1 | 4/2013 | Lee et al. |
| 2013/0102281 A1 | 4/2013 | Kanda et al. |
| 2013/0102298 A1 | 4/2013 | Goodman et al. |
| 2013/0103797 A1 | 4/2013 | Park et al. |
| 2013/0111342 A1 | 5/2013 | Alameh et al. |
| 2013/0115932 A1 | 5/2013 | Williams et al. |
| 2013/0120254 A1 | 5/2013 | Mun et al. |
| 2013/0124207 A1 | 5/2013 | Sarin et al. |
| 2013/0141514 A1 | 6/2013 | Chao et al. |
| 2013/0145303 A1 | 6/2013 | Prakash et al. |
| 2013/0151959 A1 | 6/2013 | Flynn et al. |
| 2013/0159858 A1 | 6/2013 | Joffray et al. |
| 2013/0166332 A1 | 6/2013 | Hammad |
| 2013/0166580 A1 | 6/2013 | Maharajh et al. |
| 2013/0173699 A1 | 7/2013 | Parks et al. |
| 2013/0173794 A1 | 7/2013 | Agerbak et al. |
| 2013/0174044 A1 | 7/2013 | Hill |
| 2013/0185642 A1 | 7/2013 | Gammons |
| 2013/0189963 A1 | 7/2013 | Epp et al. |
| 2013/0191454 A1 | 7/2013 | Oliver et al. |
| 2013/0191911 A1 | 7/2013 | Dellinger et al. |
| 2013/0194476 A1 | 8/2013 | Shimosato |
| 2013/0205375 A1 | 8/2013 | Woxblom et al. |
| 2013/0212212 A1 | 8/2013 | Addepalli et al. |
| 2013/0222270 A1 | 8/2013 | Winkler et al. |
| 2013/0231127 A1 | 9/2013 | Kildal et al. |
| 2013/0239202 A1 | 9/2013 | Adams et al. |
| 2013/0244615 A1 | 9/2013 | Miller |
| 2013/0246522 A1 | 9/2013 | Bilinski et al. |
| 2013/0246916 A1 | 9/2013 | Reimann et al. |
| 2013/0254574 A1 | 9/2013 | Zacchio et al. |
| 2013/0256403 A1 | 10/2013 | Mackinnon |
| 2013/0262857 A1 | 10/2013 | Neuman et al. |
| 2013/0283199 A1 | 10/2013 | Selig et al. |
| 2013/0298024 A1 | 11/2013 | Rhee et al. |
| 2013/0304758 A1 | 11/2013 | Gruber et al. |
| 2013/0305354 A1 | 11/2013 | King et al. |
| 2013/0311597 A1 | 11/2013 | Arrouye et al. |
| 2013/0311986 A1 | 11/2013 | Arrouye et al. |
| 2013/0311997 A1 | 11/2013 | Gruber et al. |
| 2013/0314302 A1 | 11/2013 | Jeung et al. |
| 2013/0318158 A1 | 11/2013 | Teng et al. |
| 2013/0318249 A1 | 11/2013 | Mcdonough et al. |
| 2013/0321340 A1 | 12/2013 | Seo et al. |
| 2013/0322634 A1 | 12/2013 | Bennett et al. |
| 2013/0324081 A1 | 12/2013 | Gargi et al. |
| 2013/0325967 A1 | 12/2013 | Parks et al. |
| 2013/0329924 A1 | 12/2013 | Fleizach et al. |
| 2013/0332162 A1 | 12/2013 | Keen |
| 2013/0332560 A1 | 12/2013 | Knight et al. |
| 2013/0333006 A1 | 12/2013 | Tapling et al. |
| 2013/0346068 A1 | 12/2013 | Solem et al. |
| 2013/0346859 A1 | 12/2013 | Bates et al. |
| 2013/0347022 A1 | 12/2013 | Bates et al. |
| 2014/0003597 A1 | 1/2014 | Lazaridis et al. |
| 2014/0006562 A1 | 1/2014 | Handa et al. |
| 2014/0013271 A1 | 1/2014 | Moore et al. |
| 2014/0018053 A1 | 1/2014 | Cho et al. |
| 2014/0026188 A1 | 1/2014 | Gubler |
| 2014/0032706 A1 | 1/2014 | Kuscher et al. |
| 2014/0037107 A1 | 2/2014 | Marino et al. |
| 2014/0043424 A1 | 2/2014 | Gava et al. |
| 2014/0047020 A1 | 2/2014 | Matus et al. |
| 2014/0047382 A1 | 2/2014 | Kim et al. |
| 2014/0049447 A1 | 2/2014 | Choi |
| 2014/0058860 A1 | 2/2014 | Roh et al. |
| 2014/0058941 A1 | 2/2014 | Moon et al. |
| 2014/0064155 A1 | 3/2014 | Evans et al. |
| 2014/0068477 A1 | 3/2014 | Roh |
| 2014/0068751 A1 | 3/2014 | Last |
| 2014/0075130 A1 | 3/2014 | Bansal et al. |
| 2014/0080416 A1 | 3/2014 | Seo et al. |
| 2014/0082136 A1 | 3/2014 | Garcia Puga et al. |
| 2014/0082715 A1 | 3/2014 | Grajek et al. |
| 2014/0089196 A1 | 3/2014 | Paya et al. |
| 2014/0095965 A1 | 4/2014 | Li |
| 2014/0101597 A1 | 4/2014 | Bamford et al. |
| 2014/0104178 A1 | 4/2014 | Jo |
| 2014/0105372 A1 | 4/2014 | Nowack et al. |
| 2014/0108084 A1 | 4/2014 | Bargetzi et al. |
| 2014/0114966 A1 | 4/2014 | Bilinski et al. |
| 2014/0122730 A1 | 5/2014 | Burch et al. |

(56) References Cited

U.S. PATENT DOCUMENTS

| | | |
|---|---|---|
| 2014/0136481 A1 | 5/2014 | Quan et al. |
| 2014/0136986 A1 | 5/2014 | Martin et al. |
| 2014/0149884 A1 | 5/2014 | Flynn et al. |
| 2014/0155031 A1 | 6/2014 | Lee et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0173447 A1 | 6/2014 | Das et al. |
| 2014/0176298 A1 | 6/2014 | Kumar et al. |
| 2014/0181202 A1 | 6/2014 | Gossain |
| 2014/0181654 A1 | 6/2014 | Kumar et al. |
| 2014/0189589 A1 | 7/2014 | Kim et al. |
| 2014/0201126 A1 | 7/2014 | Zadeh et al. |
| 2014/0207707 A1 | 7/2014 | Na et al. |
| 2014/0215356 A1 | 7/2014 | Brander et al. |
| 2014/0223490 A1 | 8/2014 | Pan et al. |
| 2014/0237361 A1 | 8/2014 | Martin et al. |
| 2014/0247229 A1 | 9/2014 | Cho et al. |
| 2014/0258292 A1 | 9/2014 | Thramann et al. |
| 2014/0267002 A1 | 9/2014 | Luna |
| 2014/0267911 A1 | 9/2014 | Grant et al. |
| 2014/0270183 A1 | 9/2014 | Luna |
| 2014/0280812 A1 | 9/2014 | Bealkowski et al. |
| 2014/0282103 A1 | 9/2014 | Jerry |
| 2014/0282208 A1 | 9/2014 | Chaudhri |
| 2014/0282240 A1 | 9/2014 | Flynn et al. |
| 2014/0283018 A1 | 9/2014 | Dadu et al. |
| 2014/0298253 A1 | 10/2014 | Jin et al. |
| 2014/0298432 A1 | 10/2014 | Brown |
| 2014/0310348 A1 | 10/2014 | Keskitalo et al. |
| 2014/0320387 A1 | 10/2014 | Eriksson et al. |
| 2014/0320425 A1* | 10/2014 | Jeong .............. G06F 3/04886 345/173 |
| 2014/0325447 A1 | 10/2014 | Jin et al. |
| 2014/0334644 A1 | 11/2014 | Selig et al. |
| 2014/0335789 A1 | 11/2014 | Cohen et al. |
| 2014/0337791 A1 | 11/2014 | Agnetta et al. |
| 2014/0337931 A1 | 11/2014 | Cotterill |
| 2014/0344904 A1 | 11/2014 | Venkataramani et al. |
| 2014/0351722 A1 | 11/2014 | Frederickson et al. |
| 2014/0354759 A1 | 12/2014 | Cranfill et al. |
| 2014/0359140 A1 | 12/2014 | Shankarraman |
| 2014/0359454 A1 | 12/2014 | Lee et al. |
| 2014/0359637 A1 | 12/2014 | Yan |
| 2014/0359709 A1 | 12/2014 | Nassar et al. |
| 2014/0362293 A1 | 12/2014 | Bakar et al. |
| 2014/0363024 A1 | 12/2014 | Apodaca |
| 2014/0364056 A1 | 12/2014 | Belk et al. |
| 2014/0365904 A1 | 12/2014 | Kim et al. |
| 2014/0365929 A1 | 12/2014 | Ding |
| 2014/0372309 A1 | 12/2014 | Bullard et al. |
| 2014/0375577 A1 | 12/2014 | Yeh et al. |
| 2014/0380187 A1 | 12/2014 | Gardenfors et al. |
| 2015/0012435 A1 | 1/2015 | Wright et al. |
| 2015/0019944 A1 | 1/2015 | Kalgi |
| 2015/0020081 A1 | 1/2015 | Cho et al. |
| 2015/0032812 A1 | 1/2015 | Dudley |
| 2015/0033149 A1 | 1/2015 | Kuchoor |
| 2015/0033361 A1 | 1/2015 | Choi et al. |
| 2015/0039494 A1 | 2/2015 | Sinton et al. |
| 2015/0046828 A1 | 2/2015 | Desai et al. |
| 2015/0049591 A1 | 2/2015 | Adams et al. |
| 2015/0051913 A1 | 2/2015 | Choi |
| 2015/0052222 A1 | 2/2015 | Farrell et al. |
| 2015/0067803 A1 | 3/2015 | Alduaiji |
| 2015/0085057 A1 | 3/2015 | Ouyang et al. |
| 2015/0089359 A1 | 3/2015 | Brisebois |
| 2015/0095175 A1 | 4/2015 | Dua |
| 2015/0098309 A1 | 4/2015 | Adams et al. |
| 2015/0100623 A1 | 4/2015 | Gudell et al. |
| 2015/0111559 A1 | 4/2015 | Leaver et al. |
| 2015/0113407 A1 | 4/2015 | Hoffert et al. |
| 2015/0120545 A1 | 4/2015 | Fiore et al. |
| 2015/0128042 A1 | 5/2015 | Churchill et al. |
| 2015/0130737 A1 | 5/2015 | Im et al. |
| 2015/0135282 A1 | 5/2015 | Kong et al. |
| 2015/0138101 A1 | 5/2015 | Park et al. |
| 2015/0143419 A1 | 5/2015 | Bhagwat et al. |
| 2015/0149599 A1 | 5/2015 | Caunter et al. |
| 2015/0154589 A1 | 6/2015 | Li |
| 2015/0154676 A1 | 6/2015 | Matousek et al. |
| 2015/0163188 A1 | 6/2015 | Faaborg et al. |
| 2015/0169146 A1 | 6/2015 | Lalwani |
| 2015/0169182 A1 | 6/2015 | Khoe et al. |
| 2015/0179008 A1 | 6/2015 | Sung et al. |
| 2015/0186892 A1 | 7/2015 | Zhang et al. |
| 2015/0189426 A1 | 7/2015 | Pang |
| 2015/0193069 A1 | 7/2015 | Di Censo et al. |
| 2015/0193392 A1 | 7/2015 | Greenblatt et al. |
| 2015/0195133 A1 | 7/2015 | Sheets et al. |
| 2015/0199082 A1 | 7/2015 | Scholler et al. |
| 2015/0199967 A1 | 7/2015 | Reddy et al. |
| 2015/0200715 A1 | 7/2015 | Oiwa et al. |
| 2015/0205353 A1 | 7/2015 | Feng et al. |
| 2015/0205488 A1 | 7/2015 | Yi et al. |
| 2015/0205971 A1 | 7/2015 | Sanio et al. |
| 2015/0208158 A1 | 7/2015 | Sanders |
| 2015/0212681 A1 | 7/2015 | Shinozaki et al. |
| 2015/0213542 A1 | 7/2015 | Wallaja |
| 2015/0215128 A1 | 7/2015 | Pal |
| 2015/0215382 A1 | 7/2015 | Arora et al. |
| 2015/0215398 A1 | 7/2015 | Murphy et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229750 A1 | 8/2015 | Zhou et al. |
| 2015/0229782 A1 | 8/2015 | Zuidema et al. |
| 2015/0242073 A1 | 8/2015 | Munoz et al. |
| 2015/0242097 A1 | 8/2015 | Forstall et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0248200 A1 | 9/2015 | Cho et al. |
| 2015/0248268 A1 | 9/2015 | Kumar et al. |
| 2015/0249540 A1 | 9/2015 | Khalil et al. |
| 2015/0253960 A1 | 9/2015 | Lin et al. |
| 2015/0254661 A1 | 9/2015 | Lanc |
| 2015/0261493 A1 | 9/2015 | Lemmon et al. |
| 2015/0262183 A1 | 9/2015 | Gervais et al. |
| 2015/0271120 A1 | 9/2015 | Langholz |
| 2015/0278799 A1 | 10/2015 | Palanisamy |
| 2015/0286360 A1 | 10/2015 | Wachter |
| 2015/0286694 A1 | 10/2015 | Kaplinger et al. |
| 2015/0286813 A1 | 10/2015 | Jakobsson |
| 2015/0295921 A1 | 10/2015 | Cao |
| 2015/0302856 A1 | 10/2015 | Kim et al. |
| 2015/0304330 A1 | 10/2015 | Soamboonsrup et al. |
| 2015/0304413 A1 | 10/2015 | Park |
| 2015/0309689 A1 | 10/2015 | Jin et al. |
| 2015/0309768 A1 | 10/2015 | Van Der Heide |
| 2015/0312299 A1 | 10/2015 | Chen |
| 2015/0319144 A1 | 11/2015 | Barton et al. |
| 2015/0324067 A1 | 11/2015 | Cabral |
| 2015/0324552 A1 | 11/2015 | Beckhardt |
| 2015/0332031 A1 | 11/2015 | Mistry et al. |
| 2015/0339007 A1 | 11/2015 | Yoshizawa et al. |
| 2015/0339466 A1 | 11/2015 | Gao et al. |
| 2015/0347010 A1 | 12/2015 | Yang et al. |
| 2015/0347738 A1 | 12/2015 | Ulrich et al. |
| 2015/0348002 A1 | 12/2015 | Van et al. |
| 2015/0350296 A1 | 12/2015 | Yang et al. |
| 2015/0350297 A1 | 12/2015 | Yang et al. |
| 2015/0350448 A1 | 12/2015 | Coffman et al. |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358304 A1 | 12/2015 | Beckhardt et al. |
| 2015/0358484 A1 | 12/2015 | Permude |
| 2015/0365400 A1 | 12/2015 | Cox |
| 2015/0370529 A1 | 12/2015 | Zambetti et al. |
| 2015/0373065 A1 | 12/2015 | Holmquist et al. |

(56) References Cited

U.S. PATENT DOCUMENTS

| | | |
|---|---|---|
| 2015/0378522 A1 | 12/2015 | Butts |
| 2016/0004417 A1 | 1/2016 | Bates |
| 2016/0005024 A1 | 1/2016 | Harrell |
| 2016/0006745 A1 | 1/2016 | Furuichi et al. |
| 2016/0011850 A1 | 1/2016 | Sheen et al. |
| 2016/0012417 A1 | 1/2016 | Mizon |
| 2016/0014266 A1 | 1/2016 | Bhatt |
| 2016/0026429 A1 | 1/2016 | Triplett |
| 2016/0026779 A1 | 1/2016 | Grigg et al. |
| 2016/0028869 A1 | 1/2016 | Bhatt |
| 2016/0034887 A1 | 2/2016 | Lee |
| 2016/0037345 A1 | 2/2016 | Margadoudakis |
| 2016/0048296 A1 | 2/2016 | Gan et al. |
| 2016/0048705 A1 | 2/2016 | Yang |
| 2016/0050199 A1 | 2/2016 | Ganesan |
| 2016/0059864 A1 | 3/2016 | Feit et al. |
| 2016/0062487 A1 | 3/2016 | Foss et al. |
| 2016/0062567 A1 | 3/2016 | Yang et al. |
| 2016/0062589 A1 | 3/2016 | Wan et al. |
| 2016/0062606 A1 | 3/2016 | Vega et al. |
| 2016/0065708 A1 | 3/2016 | Yang et al. |
| 2016/0072861 A1 | 3/2016 | Woolsey et al. |
| 2016/0077734 A1 | 3/2016 | Buxton et al. |
| 2016/0086176 A1 | 3/2016 | Henrique et al. |
| 2016/0088039 A1 | 3/2016 | Millington et al. |
| 2016/0092072 A1 | 3/2016 | So et al. |
| 2016/0092665 A1 | 3/2016 | Cowan et al. |
| 2016/0097651 A1 | 4/2016 | Jung et al. |
| 2016/0127799 A1 | 5/2016 | Alsina et al. |
| 2016/0132132 A1 | 5/2016 | Li |
| 2016/0132864 A1 | 5/2016 | Shah et al. |
| 2016/0134488 A1 | 5/2016 | Straub et al. |
| 2016/0134942 A1 | 5/2016 | Lo |
| 2016/0139785 A1 | 5/2016 | Griffin et al. |
| 2016/0142450 A1 | 5/2016 | Paul et al. |
| 2016/0150624 A1 | 5/2016 | Meerbeek et al. |
| 2016/0154549 A1 | 6/2016 | Chaudhri |
| 2016/0156687 A1 | 6/2016 | Leung |
| 2016/0156992 A1 | 6/2016 | Kuper |
| 2016/0162252 A1 | 6/2016 | Di Censo et al. |
| 2016/0170608 A1 | 6/2016 | Zambetti et al. |
| 2016/0171482 A1 | 6/2016 | Muncey et al. |
| 2016/0173617 A1 | 6/2016 | Allinson |
| 2016/0180259 A1 | 6/2016 | Marianko et al. |
| 2016/0183046 A1 | 6/2016 | Kwon |
| 2016/0189451 A1 | 6/2016 | Yoo et al. |
| 2016/0196042 A1 | 7/2016 | Laute et al. |
| 2016/0196106 A1 | 7/2016 | Hammer et al. |
| 2016/0210602 A1 | 7/2016 | Siddique et al. |
| 2016/0210983 A1 | 7/2016 | Amada et al. |
| 2016/0224966 A1 | 8/2016 | Van Os et al. |
| 2016/0239167 A1 | 8/2016 | Reimann et al. |
| 2016/0241543 A1 | 8/2016 | Jung et al. |
| 2016/0241983 A1 | 8/2016 | Lambourne et al. |
| 2016/0246566 A1 | 8/2016 | Fullerton et al. |
| 2016/0253145 A1 | 9/2016 | Lee et al. |
| 2016/0259656 A1 | 9/2016 | Sumner et al. |
| 2016/0259936 A1 | 9/2016 | Mukherjee et al. |
| 2016/0267319 A1 | 9/2016 | Murillo et al. |
| 2016/0267779 A1 | 9/2016 | Kuang |
| 2016/0277708 A1 | 9/2016 | Rintel et al. |
| 2016/0291924 A1 | 10/2016 | Bierbower et al. |
| 2016/0295340 A1 | 10/2016 | Baker et al. |
| 2016/0299669 A1 | 10/2016 | Bates |
| 2016/0299679 A1 | 10/2016 | Park et al. |
| 2016/0299736 A1 | 10/2016 | Bates et al. |
| 2016/0306328 A1 | 10/2016 | Ko et al. |
| 2016/0308920 A1 | 10/2016 | Brunsch et al. |
| 2016/0314451 A1 | 10/2016 | Martin |
| 2016/0316038 A1 | 10/2016 | Jolfaei |
| 2016/0327911 A1 | 11/2016 | Eim et al. |
| 2016/0336531 A1 | 11/2016 | Yokoyama |
| 2016/0342386 A1 | 11/2016 | Kallai et al. |
| 2016/0345039 A1 | 11/2016 | Billmeyer |
| 2016/0345172 A1 | 11/2016 | Cotterill |
| 2016/0351191 A1 | 12/2016 | Vilermo et al. |
| 2016/0352661 A1 | 12/2016 | Yang et al. |
| 2016/0360344 A1 | 12/2016 | Shim et al. |
| 2016/0364106 A1 | 12/2016 | Koum et al. |
| 2016/0364600 A1 | 12/2016 | Shah et al. |
| 2016/0366531 A1 | 12/2016 | Popova |
| 2016/0372113 A1 | 12/2016 | David et al. |
| 2016/0373884 A1 | 12/2016 | Peterson et al. |
| 2016/0378961 A1 | 12/2016 | Park |
| 2016/0379205 A1 | 12/2016 | Margadoudakis |
| 2016/0381476 A1 | 12/2016 | Gossain et al. |
| 2017/0003931 A1 | 1/2017 | Dvortsov et al. |
| 2017/0006162 A1 | 1/2017 | Bargetzi et al. |
| 2017/0010794 A1 | 1/2017 | Cho et al. |
| 2017/0013562 A1 | 1/2017 | Lim et al. |
| 2017/0024100 A1 | 1/2017 | Pieper et al. |
| 2017/0024226 A1 | 1/2017 | Yan |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0034583 A1 | 2/2017 | Long et al. |
| 2017/0041727 A1 | 2/2017 | Reimann |
| 2017/0054731 A1 | 2/2017 | Cotterill |
| 2017/0060359 A1 | 3/2017 | Chaudhri et al. |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083285 A1 | 3/2017 | Meyers et al. |
| 2017/0083494 A1 | 3/2017 | Kim et al. |
| 2017/0092085 A1 | 3/2017 | Agarwal |
| 2017/0092270 A1 | 3/2017 | Newendorp et al. |
| 2017/0093846 A1 | 3/2017 | Lopez Lecube et al. |
| 2017/0099270 A1 | 4/2017 | Anson |
| 2017/0115940 A1 | 4/2017 | Byeon |
| 2017/0126592 A1 | 5/2017 | El |
| 2017/0127145 A1 | 5/2017 | Rajapakse |
| 2017/0134567 A1 | 5/2017 | Jeon et al. |
| 2017/0142087 A1 | 5/2017 | Maninder et al. |
| 2017/0142584 A1 | 5/2017 | Oh et al. |
| 2017/0148010 A1 | 5/2017 | Bak et al. |
| 2017/0192730 A1 | 7/2017 | Yang et al. |
| 2017/0193813 A1 | 7/2017 | Carroll et al. |
| 2017/0195772 A1 | 7/2017 | Han et al. |
| 2017/0227935 A1 | 8/2017 | Su et al. |
| 2017/0235545 A1 | 8/2017 | Millington et al. |
| 2017/0235926 A1 | 8/2017 | Fyke et al. |
| 2017/0242653 A1 | 8/2017 | Lang et al. |
| 2017/0269556 A1 | 9/2017 | Zhou |
| 2017/0289249 A1 | 10/2017 | Knight et al. |
| 2017/0339151 A1 | 11/2017 | Van Os et al. |
| 2017/0357420 A1 | 12/2017 | Dye et al. |
| 2017/0357439 A1 | 12/2017 | Lemay et al. |
| 2017/0357477 A1 | 12/2017 | Im et al. |
| 2017/0357917 A1 | 12/2017 | Holmes et al. |
| 2017/0357973 A1 | 12/2017 | Van Os et al. |
| 2017/0359285 A1 | 12/2017 | Weinig et al. |
| 2017/0359461 A1 | 12/2017 | De Vries et al. |
| 2017/0373868 A1 | 12/2017 | Deets, Jr. |
| 2018/0039916 A1 | 2/2018 | Ravindra |
| 2018/0040324 A1 | 2/2018 | Wilberding |
| 2018/0067712 A1 | 3/2018 | Behzadi et al. |
| 2018/0067904 A1 | 3/2018 | Li |
| 2018/0070187 A1 | 3/2018 | Drinkwater et al. |
| 2018/0075439 A1 | 3/2018 | Bak et al. |
| 2018/0081522 A1 | 3/2018 | Greenberg et al. |
| 2018/0081538 A1 | 3/2018 | Kim |
| 2018/0095616 A1 | 4/2018 | Valdivia et al. |
| 2018/0109629 A1 | 4/2018 | Van Os et al. |
| 2018/0124128 A1 | 5/2018 | Faulkner et al. |
| 2018/0131732 A1 | 5/2018 | Aronoff et al. |
| 2018/0139292 A1 | 5/2018 | Koren et al. |
| 2018/0190279 A1 | 7/2018 | Anderson et al. |
| 2018/0191965 A1 | 7/2018 | Faulkner et al. |
| 2018/0204111 A1 | 7/2018 | Zadeh et al. |
| 2018/0205797 A1 | 7/2018 | Faulkner |
| 2018/0234549 A1 | 8/2018 | Coffman et al. |
| 2018/0302790 A1 | 10/2018 | Cotterill |
| 2018/0309801 A1 | 10/2018 | Rathod |

(56) References Cited

U.S. PATENT DOCUMENTS

| | | |
|---|---|---|
| 2018/0321842 A1 | 11/2018 | Lee et al. |
| 2018/0329586 A1 | 11/2018 | Sundstrom et al. |
| 2018/0335903 A1 | 11/2018 | Coffman et al. |
| 2018/0337924 A1 | 11/2018 | Graham et al. |
| 2018/0341448 A1 | 11/2018 | Behzadi et al. |
| 2018/0351762 A1 | 12/2018 | Iyengar et al. |
| 2018/0357631 A1 | 12/2018 | Bak et al. |
| 2018/0359293 A1 | 12/2018 | Faulkner et al. |
| 2018/0367484 A1 | 12/2018 | Rodriguez et al. |
| 2018/0375676 A1 | 12/2018 | Bader-Natal et al. |
| 2019/0012069 A1 | 1/2019 | Bates |
| 2019/0012073 A1 | 1/2019 | Hwang |
| 2019/0012966 A1 | 1/2019 | Shi |
| 2019/0034849 A1 | 1/2019 | Romaine et al. |
| 2019/0102049 A1 | 4/2019 | Anzures et al. |
| 2019/0102145 A1 | 4/2019 | Wilberding et al. |
| 2019/0124203 A1 | 4/2019 | Coffman et al. |
| 2019/0124510 A1 | 4/2019 | Cotterill |
| 2019/0149972 A1 | 5/2019 | Parks et al. |
| 2019/0199963 A1 | 6/2019 | Ahn et al. |
| 2019/0222775 A1 | 7/2019 | Ahn |
| 2019/0236142 A1 | 8/2019 | Balakrishnan et al. |
| 2019/0278900 A1 | 9/2019 | Yang et al. |
| 2019/0289079 A1 | 9/2019 | Van Os et al. |
| 2019/0294406 A1 | 9/2019 | Bierbower et al. |
| 2019/0297039 A1 | 9/2019 | Rodriguez et al. |
| 2019/0332229 A1 | 10/2019 | Chaudhri et al. |
| 2019/0342519 A1 | 11/2019 | Van Os et al. |
| 2019/0347181 A1 | 11/2019 | Cranfill et al. |
| 2019/0361694 A1 | 11/2019 | Gordon et al. |
| 2019/0361729 A1 | 11/2019 | Gruber et al. |
| 2019/0370805 A1 | 12/2019 | Van Os et al. |
| 2020/0050426 A1 | 2/2020 | Jung et al. |
| 2020/0104018 A1 | 4/2020 | Coffman et al. |
| 2020/0120503 A1 | 4/2020 | Cotterill |
| 2020/0154583 A1 | 5/2020 | Lee et al. |
| 2020/0183548 A1 | 6/2020 | Anzures et al. |
| 2020/0192627 A1 | 6/2020 | Jang et al. |
| 2020/0201491 A1 | 6/2020 | Coffman et al. |
| 2020/0201495 A1 | 6/2020 | Coffman et al. |
| 2020/0213437 A1 | 7/2020 | Bhatt |
| 2020/0213530 A1 | 7/2020 | Ahn |
| 2020/0225817 A1 | 7/2020 | Coffman et al. |
| 2020/0274726 A1 | 8/2020 | Setteboun et al. |
| 2020/0296329 A1 | 9/2020 | Tang et al. |
| 2020/0322479 A1 | 10/2020 | De Vries et al. |
| 2020/0366742 A1 | 11/2020 | Van Os et al. |
| 2020/0367816 A1 | 11/2020 | Panneer Selvam |
| 2020/0379711 A1 | 12/2020 | Graham et al. |
| 2020/0379714 A1 | 12/2020 | Graham et al. |
| 2020/0379729 A1 | 12/2020 | Graham et al. |
| 2020/0379730 A1 | 12/2020 | Graham et al. |
| 2020/0383157 A1 | 12/2020 | Lee et al. |
| 2021/0011586 A1 | 1/2021 | Chaudhri et al. |
| 2021/0011587 A1 | 1/2021 | Chaudhri et al. |
| 2021/0011588 A1 | 1/2021 | Coffman et al. |
| 2021/0014610 A1 | 1/2021 | Carrigan et al. |
| 2021/0136129 A1 | 5/2021 | Ponnusamy et al. |
| 2021/0152503 A1 | 5/2021 | Rodriguez et al. |
| 2021/0173431 A1 | 6/2021 | Yang et al. |
| 2021/0182169 A1 | 6/2021 | Mardente et al. |
| 2021/0217106 A1 | 7/2021 | Hauser et al. |
| 2021/0255816 A1 | 8/2021 | Behzadi et al. |
| 2021/0255819 A1 | 8/2021 | Graham et al. |
| 2021/0272118 A1 | 9/2021 | Van Os et al. |
| 2021/0392223 A1 | 12/2021 | Coffman et al. |
| 2021/0409359 A1 | 12/2021 | Eirinberg et al. |
| 2022/0050578 A1 | 2/2022 | Waldman et al. |
| 2022/0058257 A1 | 2/2022 | Cotterill |
| 2022/0100367 A1 | 3/2022 | Carrigan et al. |
| 2022/0100812 A1 | 3/2022 | Anvaripour et al. |
| 2022/0100841 A1 | 3/2022 | Yang et al. |
| 2022/0122089 A1 | 4/2022 | Bonilla Kuhlmann et al. |
| 2022/0207840 A1 | 6/2022 | Cansizoglu et al. |
| 2022/0263940 A1 | 8/2022 | De Vries et al. |
| 2022/0278992 A1 | 9/2022 | Baker et al. |
| 2022/0279063 A1 | 9/2022 | Coffman et al. |
| 2022/0286549 A1 | 9/2022 | Coffman et al. |
| 2022/0303383 A1 | 9/2022 | Coffman et al. |
| 2022/0350482 A1 | 11/2022 | Carrigan et al. |
| 2022/0365739 A1 | 11/2022 | Chang et al. |
| 2022/0365740 A1 | 11/2022 | Chang et al. |
| 2022/0368548 A1 | 11/2022 | Chang et al. |
| 2022/0368659 A1 | 11/2022 | Chang et al. |
| 2022/0368742 A1 | 11/2022 | Chang et al. |
| 2022/0374136 A1 | 11/2022 | Chang et al. |
| 2022/0391166 A1 | 12/2022 | Sanders |
| 2023/0043078 A1 | 2/2023 | Chaudhri et al. |
| 2023/0073844 A1 | 3/2023 | Coffman et al. |
| 2023/0084551 A1 | 3/2023 | Coffman et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |
| 2023/0179700 A1 | 6/2023 | Bhatt |
| 2023/0319413 A1 | 10/2023 | Manzari et al. |
| 2023/0370507 A1 | 11/2023 | Chang et al. |

FOREIGN PATENT DOCUMENTS

| | | |
|---|---|---|
| AU | 2008100011 A4 | 2/2008 |
| CA | 2876587 A1 | 2/2014 |
| CN | 1452739 A | 10/2003 |
| CN | 1525723 A | 9/2004 |
| CN | 1663174 A | 8/2005 |
| CN | 1741104 A | 3/2006 |
| CN | 1846221 A | 10/2006 |
| CN | 1848988 A | 10/2006 |
| CN | 1863281 A | 11/2006 |
| CN | 1908981 A | 2/2007 |
| CN | 1918533 A | 2/2007 |
| CN | 101226444 A | 7/2008 |
| CN | 101268470 A | 9/2008 |
| CN | 101299694 A | 11/2008 |
| CN | 101321156 A | 12/2008 |
| CN | 101341718 A | 1/2009 |
| CN | 101341727 A | 1/2009 |
| CN | 101356493 A | 1/2009 |
| CN | 101409743 A | 4/2009 |
| CN | 101485128 A | 7/2009 |
| CN | 101535938 A | 9/2009 |
| CN | 101610155 A | 12/2009 |
| CN | 101625620 A | 1/2010 |
| CN | 101828166 A | 9/2010 |
| CN | 101835026 A | 9/2010 |
| CN | 101877748 A | 11/2010 |
| CN | 101981987 A | 2/2011 |
| CN | 101997972 A | 3/2011 |
| CN | 102065148 A | 5/2011 |
| CN | 102075619 A | 5/2011 |
| CN | 102164213 A | 8/2011 |
| CN | 102202192 A | 9/2011 |
| CN | 102209321 A | 10/2011 |
| CN | 102262506 A | 11/2011 |
| CN | 102281294 A | 12/2011 |
| CN | 102301323 A | 12/2011 |
| CN | 102396205 A | 3/2012 |
| CN | 102439558 A | 5/2012 |
| CN | 102707994 A | 10/2012 |
| CN | 102737313 A | 10/2012 |
| CN | 102740146 A | 10/2012 |
| CN | 102750086 A | 10/2012 |
| CN | 102754071 A | 10/2012 |
| CN | 102859480 A | 1/2013 |
| CN | 102866828 A | 1/2013 |
| CN | 102982401 A | 3/2013 |
| CN | 103067625 A | 4/2013 |
| CN | 103139370 A | 6/2013 |
| CN | 103250138 A | 8/2013 |
| CN | 103260079 A | 8/2013 |
| CN | 103336651 A | 10/2013 |
| CN | 103425451 A | 12/2013 |
| CN | 103458215 A | 12/2013 |
| CN | 103558916 A | 2/2014 |
| CN | 103582873 A | 2/2014 |

(56) References Cited

FOREIGN PATENT DOCUMENTS

| | | |
|---|---|---|
| CN | 103593154 A | 2/2014 |
| CN | 103765385 A | 4/2014 |
| CN | 103853328 A | 6/2014 |
| CN | 104106036 A | 10/2014 |
| CN | 104182123 A | 12/2014 |
| CN | 104335234 A | 2/2015 |
| CN | 104834439 A | 8/2015 |
| CN | 105094551 A | 11/2015 |
| CN | 105549947 A | 5/2016 |
| CN | 105637451 A | 6/2016 |
| CN | 105794231 A | 7/2016 |
| CN | 105940678 A | 9/2016 |
| CN | 106030700 A | 10/2016 |
| CN | 106062810 A | 10/2016 |
| CN | 106383645 A | 2/2017 |
| CN | 104012150 B | 5/2018 |
| CN | 108683798 A | 10/2018 |
| CN | 109314795 A | 2/2019 |
| CN | 109688442 A | 4/2019 |
| CN | 108683798 B | 4/2021 |
| EP | 0483777 A2 | 5/1992 |
| EP | 0584392 A1 | 3/1994 |
| EP | 1079371 A1 | 2/2001 |
| EP | 1133119 A2 | 9/2001 |
| EP | 1215575 A2 | 6/2002 |
| EP | 1357458 A2 | 10/2003 |
| EP | 1517228 A2 | 3/2005 |
| EP | 1662760 A1 | 5/2006 |
| EP | 1705883 A1 | 9/2006 |
| EP | 1708464 A2 | 10/2006 |
| EP | 1760584 A1 | 3/2007 |
| EP | 2018032 A1 | 1/2009 |
| EP | 2151745 A2 | 2/2010 |
| EP | 2180665 A1 | 4/2010 |
| EP | 2219105 A1 | 8/2010 |
| EP | 2247087 A1 | 11/2010 |
| EP | 2306262 A1 | 4/2011 |
| EP | 2523109 A1 | 11/2012 |
| EP | 2568693 A2 | 3/2013 |
| EP | 2600584 A1 | 6/2013 |
| EP | 2632193 A2 | 8/2013 |
| EP | 2674889 A2 | 12/2013 |
| EP | 2682850 A1 | 1/2014 |
| EP | 2703974 A1 | 3/2014 |
| EP | 2725473 A1 | 4/2014 |
| EP | 2750062 A2 | 7/2014 |
| EP | 2770673 A1 | 8/2014 |
| EP | 2770708 A1 | 8/2014 |
| EP | 2891049 A1 | 7/2015 |
| EP | 2446619 B1 | 10/2015 |
| EP | 2891049 A4 | 3/2016 |
| EP | 2993909 A1 | 3/2016 |
| EP | 2568693 A3 | 7/2016 |
| EP | 3091421 A2 | 11/2016 |
| EP | 3138300 A1 | 3/2017 |
| EP | 3163495 A1 | 5/2017 |
| EP | 2632193 B1 | 10/2018 |
| EP | 2568693 B1 | 12/2019 |
| EP | 3663963 A1 | 4/2020 |
| EP | 3163866 B1 | 5/2020 |
| GB | 2466038 A | 6/2010 |
| GB | 2505476 A | 3/2014 |
| JP | 6-110881 A | 4/1994 |
| JP | 6-202842 A | 7/1994 |
| JP | 7-325700 A | 12/1995 |
| JP | 8-76926 A | 3/1996 |
| JP | 10-240488 A | 9/1998 |
| JP | 2000-40158 A | 2/2000 |
| JP | 2000-122957 A | 4/2000 |
| JP | 2000-200092 A | 7/2000 |
| JP | 2000-242390 A | 9/2000 |
| JP | 2000-259477 A | 9/2000 |
| JP | 2000-283772 A | 10/2000 |
| JP | 2001-101202 A | 4/2001 |
| JP | 2001-331758 A | 11/2001 |
| JP | 2002-288125 A | 10/2002 |
| JP | 2002-342356 A | 11/2002 |
| JP | 2002-351768 A | 12/2002 |
| JP | 2003-30245 A | 1/2003 |
| JP | 2003-169372 A | 6/2003 |
| JP | 2003-195998 A | 7/2003 |
| JP | 2003-526820 A | 9/2003 |
| JP | 2004-104813 A | 4/2004 |
| JP | 2004-356816 A | 12/2004 |
| JP | 2005-45744 A | 2/2005 |
| JP | 2005-332368 A | 12/2005 |
| JP | 2006-172464 A | 6/2006 |
| JP | 2006-185154 A | 7/2006 |
| JP | 2006-235957 A | 9/2006 |
| JP | 2007-3293 A | 1/2007 |
| JP | 2007-41976 A | 2/2007 |
| JP | 2007-304854 A | 11/2007 |
| JP | 2007-304983 A | 11/2007 |
| JP | 2008-522262 A | 6/2008 |
| JP | 2008-276801 A | 11/2008 |
| JP | 2009-80710 A | 4/2009 |
| JP | 2009-521753 A | 6/2009 |
| JP | 2009-239867 A | 10/2009 |
| JP | 2009-296577 A | 12/2009 |
| JP | 2009-543166 A | 12/2009 |
| JP | 2010-503082 A | 1/2010 |
| JP | 2010-503127 A | 1/2010 |
| JP | 2010-97353 A | 4/2010 |
| JP | 2010-511939 A | 4/2010 |
| JP | 2010-109789 A | 5/2010 |
| JP | 2010-522935 A | 7/2010 |
| JP | 2010-245940 A | 10/2010 |
| JP | 2010-271779 A | 12/2010 |
| JP | 2011-43401 A | 3/2011 |
| JP | 2011-60281 A | 3/2011 |
| JP | 2011-65590 A | 3/2011 |
| JP | 2011-101097 A | 5/2011 |
| JP | 2011-516936 A | 5/2011 |
| JP | 2011-118662 A | 6/2011 |
| JP | 2011-209786 A | 10/2011 |
| JP | 2011-237857 A | 11/2011 |
| JP | 2012-511282 A | 5/2012 |
| JP | 2012-168966 A | 9/2012 |
| JP | 2012-215938 A | 11/2012 |
| JP | 2012-248090 A | 12/2012 |
| JP | 2013-25357 A | 2/2013 |
| JP | 2013-506225 A | 2/2013 |
| JP | 2013-74499 A | 4/2013 |
| JP | 2013-93699 A | 5/2013 |
| JP | 2013-105468 A | 5/2013 |
| JP | 2013-530433 A | 7/2013 |
| JP | 2013-530458 A | 7/2013 |
| JP | 2013-175188 A | 9/2013 |
| JP | 2013-191065 A | 9/2013 |
| JP | 2014-503861 A | 2/2014 |
| JP | 2014-44724 A | 3/2014 |
| JP | 2014-512044 A | 5/2014 |
| JP | 2014-110638 A | 6/2014 |
| JP | 2014-131359 A | 7/2014 |
| JP | 2015-8001 A | 1/2015 |
| JP | 2015-14923 A | 1/2015 |
| JP | 2015-501022 A | 1/2015 |
| JP | 2015-520456 A | 7/2015 |
| JP | 2015-524974 A | 8/2015 |
| JP | 2015-171114 A | 9/2015 |
| JP | 2015-526776 A | 9/2015 |
| JP | 2015-533441 A | 11/2015 |
| JP | 2016-40716 A | 3/2016 |
| JP | 6023162 B2 | 11/2016 |
| KR | 10-2006-0105441 A | 10/2006 |
| KR | 10-2007-0120125 A | 12/2007 |
| KR | 10-0805341 B1 | 2/2008 |
| KR | 10-2008-0057326 A | 6/2008 |
| KR | 10-2009-0089472 A | 8/2009 |
| KR | 10-2010-0036351 A | 4/2010 |
| KR | 10-2012-0003323 A | 1/2012 |
| KR | 10-2012-0088746 A | 8/2012 |
| KR | 10-2012-0100433 A | 9/2012 |
| KR | 10-1253392 B1 | 4/2013 |

(56) References Cited

FOREIGN PATENT DOCUMENTS

| | | |
|---|---|---|
| KR | 10-2013-0063019 A | 6/2013 |
| KR | 10-2013-0075783 A | 7/2013 |
| KR | 10-2013-0082190 A | 7/2013 |
| KR | 10-2013-0108563 A | 10/2013 |
| KR | 10-2013-0141688 A | 12/2013 |
| KR | 10-1342208 B1 | 12/2013 |
| KR | 10-2014-0016244 A | 2/2014 |
| KR | 10-2014-0026263 | 3/2014 |
| KR | 10-2014-0031283 A | 3/2014 |
| KR | 10-2014-0043370 A | 4/2014 |
| KR | 10-2014-0137400 A | 12/2014 |
| KR | 10-2015-0031010 A | 3/2015 |
| KR | 10-2015-0121177 A | 10/2015 |
| KR | 10-2016-0012008 A | 2/2016 |
| KR | 10-2016-0045633 A | 4/2016 |
| KR | 10-2016-0141847 A | 12/2016 |
| KR | 10-2017-0027999 A | 3/2017 |
| KR | 10-1820573 B1 | 1/2018 |
| KR | 10-2011177 B1 | 8/2019 |
| TW | 201131471 A | 9/2011 |
| TW | 201137722 A | 11/2011 |
| TW | 201316247 A | 4/2013 |
| TW | 201324310 A | 6/2013 |
| TW | 201409345 A | 3/2014 |
| TW | 201415345 A | 4/2014 |
| TW | 201416959 A | 5/2014 |
| WO | 99/44114 A1 | 9/1999 |
| WO | 02/01864 A1 | 1/2002 |
| WO | 2004/095414 A1 | 11/2004 |
| WO | 2004/104813 A1 | 12/2004 |
| WO | 2005/053225 A1 | 6/2005 |
| WO | 2005/109829 A1 | 11/2005 |
| WO | 2006/048028 A1 | 5/2006 |
| WO | 2006/113834 A2 | 10/2006 |
| WO | 2007/002621 A2 | 1/2007 |
| WO | 2007/073422 A1 | 6/2007 |
| WO | 2007/076210 A1 | 7/2007 |
| WO | 2007/102110 A2 | 9/2007 |
| WO | 2007/142703 A1 | 12/2007 |
| WO | 2007/149731 A1 | 12/2007 |
| WO | 2008/027924 A2 | 3/2008 |
| WO | 2008/030779 A2 | 3/2008 |
| WO | 2008/030879 A2 | 3/2008 |
| WO | 2008/030976 A2 | 3/2008 |
| WO | 2008/067498 A2 | 6/2008 |
| WO | 2008/090902 A1 | 7/2008 |
| WO | 2008/151229 A1 | 12/2008 |
| WO | 2009/005563 A1 | 1/2009 |
| WO | 2009/067670 A1 | 5/2009 |
| WO | 2009/086599 A1 | 7/2009 |
| WO | 2009/097555 A2 | 8/2009 |
| WO | 2009/143076 A2 | 11/2009 |
| WO | 2010/065752 A2 | 6/2010 |
| WO | 2010/087988 A1 | 8/2010 |
| WO | 2010/120972 A1 | 10/2010 |
| WO | 2010/128442 A2 | 11/2010 |
| WO | 2010/134729 A2 | 11/2010 |
| WO | 2011/041427 A2 | 4/2011 |
| WO | 2011/084857 A1 | 7/2011 |
| WO | 2011/126502 A1 | 10/2011 |
| WO | 2011/149231 A2 | 12/2011 |
| WO | 2012/004288 A1 | 1/2012 |
| WO | 2012/028773 A1 | 3/2012 |
| WO | 2012/051052 A1 | 4/2012 |
| WO | 2012/087939 A1 | 6/2012 |
| WO | 2012/103117 A1 | 8/2012 |
| WO | 2012/104288 | 8/2012 |
| WO | 2012/126078 A1 | 9/2012 |
| WO | 2012/154748 A1 | 11/2012 |
| WO | 2012/170446 A2 | 12/2012 |
| WO | 2013/000150 A1 | 1/2013 |
| WO | 2013/048880 A1 | 4/2013 |
| WO | 2013/049346 A1 | 4/2013 |
| WO | 2013/097882 A1 | 7/2013 |
| WO | 2013/097895 A1 | 7/2013 |
| WO | 2013/097896 A1 | 7/2013 |
| WO | 2013/111239 A1 | 8/2013 |
| WO | 2013/132144 A1 | 9/2013 |
| WO | 2013/135270 A1 | 9/2013 |
| WO | 2013/137503 A1 | 9/2013 |
| WO | 2013/153405 A2 | 10/2013 |
| WO | 2013/169842 A2 | 11/2013 |
| WO | 2013/169849 A2 | 11/2013 |
| WO | 2013/173504 A1 | 11/2013 |
| WO | 2013/173838 A2 | 11/2013 |
| WO | 2013/176847 A1 | 11/2013 |
| WO | 2014/021967 A1 | 2/2014 |
| WO | 2014/030320 A1 | 2/2014 |
| WO | 2014/032461 A1 | 3/2014 |
| WO | 2014/057795 A1 | 4/2014 |
| WO | 2014/078965 A1 | 5/2014 |
| WO | 2014/105274 A1 | 7/2014 |
| WO | 2014/105276 A1 | 7/2014 |
| WO | 2014/107469 A2 | 7/2014 |
| WO | 2014/115605 A1 | 7/2014 |
| WO | 2014/147297 A1 | 9/2014 |
| WO | 2014/151089 A1 | 9/2014 |
| WO | 2013/173504 A8 | 12/2014 |
| WO | 2014/197279 A1 | 12/2014 |
| WO | 2015/062410 A1 | 5/2015 |
| WO | 2015/076930 A1 | 5/2015 |
| WO | 2015/124831 A1 | 8/2015 |
| WO | 2015/134692 A1 | 9/2015 |
| WO | 20151/92085 A2 | 12/2015 |
| WO | 2016/022204 A1 | 2/2016 |
| WO | 2016/033400 A1 | 3/2016 |
| WO | 2016/057117 A1 | 4/2016 |
| WO | 2017/058442 A1 | 4/2017 |
| WO | 2017/218199 A1 | 12/2017 |
| WO | 2018/213401 A1 | 11/2018 |
| WO | 2018/213415 A1 | 11/2018 |
| WO | 2021/010993 A1 | 1/2021 |
| WO | 2021/112983 A1 | 6/2021 |

OTHER PUBLICATIONS

Notice of Allowance received for U.S. Appl. No. 16/803,849, dated May 17, 2022, 12 pages.
Result of Consultation received for European Patent Application No. 20158824.1, dated May 17, 2022, 7 pages.
Applicant-Initiated Interview Summary received for U.S. Appl. No. 17/484,899, dated Sep. 1, 2022, 5 pages.
Brief Communication Regarding Oral Proceedings received for European Patent Application No. 19150528.8, dated Sep. 5, 2022, 2 pages.
Office Action received for European Patent Application No. 21197457.1, dated Sep. 2, 2022, 8 pages.
Board Decision received for Chinese Patent Application No. 201810338826.7, mailed on May 30, 2022, 20 pages (2 pages of English Translation and 18 pages of Official Copy).
Notice of Allowance received for Japanese Patent Application No. 2021-074395, dated Jun. 27, 2022, 4 pages (1 page of English Translation and 3 pages of Official Copy).
Summons to Attend Oral Proceedings received for European Patent Application No. 18208881.5, mailed on Jun. 29, 2022, 9 pages.
Advisory Action received for U.S. Appl. No. 17/483,679, dated Sep. 20, 2022, 8 pages.
Brief Communication Regarding Oral Proceedings received for European Patent Application No. 17799904.2, dated Sep. 13, 2022, 1 page.
Brief Communication Regarding Oral Proceedings received for European Patent Application No. 17813737.8, dated Sep. 19, 2022, 1 page.
Decision to Refuse received for European Patent Application No. 17799904.2, dated Sep. 19, 2022, 4 pages.
Decision to Refuse received for European Patent Application No. 19150528.8, dated Sep. 9, 2022, 4 pages.
Invitation to Pay Additional Fees and Partial International Search Report received for PCT Patent Application No. PCT/US2022/029261, dated Aug. 29, 2022, 16 pages.

(56) References Cited

OTHER PUBLICATIONS

Non-Final Office Action received for U.S. Appl. No. 17/483,542, dated Sep. 22, 2022, 18 pages.
Applicant-Initiated Interview Summary received for U.S. Appl. No. 16/803,849, dated Feb. 28, 2022, 9 pages.
Computeradv, "Sonos App Navigation & Menu on iPhone", Available online at: https://www.youtube.com/watch?v=Jhz9XVWQ204, Aug. 4, 2015, 1 page.
Corrected Notice of Allowance received for U.S. Appl. No. 16/922,675, dated Mar. 4, 2022, 6 pages.
Extended European Search Report received for European Patent Application No. 21207736.6, dated Feb. 22, 2022, 11 pages.
Notice of Acceptance received for Australian Patent Application No. 2021204454, dated Feb. 25, 2022, 3 pages.
Notice of Allowance received for Chinese Patent Application No. 201910055588.3, dated Mar. 2, 2022, 2 pages (1 page of English Translation and 1 page of Official Copy).
Office Action received for Australian Patent Application No. 2021201243, dated Feb. 17, 2022, 4 pages.
Office Action received for Korean Patent Application No. 10-2021-7032984, dated Feb. 22, 2022, 8 pages (4 pages of English Translation and 4 pages of Official Copy).
Supplemental Notice of Allowance received for U.S. Appl. No. 16/859,101, dated Feb. 25, 2022, 2 pages.
Applicant-Initiated Interview Summary received for U.S. Appl. No. 17/168,069, dated Nov. 17, 2021, 2 pages.
Corrected Notice of Allowance received for U.S. Appl. No. 16/836,571, dated Mar. 25, 2022, 2 pages.
Corrected Notice of Allowance received for U.S. Appl. No. 16/859,101, dated Mar. 25, 2022, 2 pages.
Corrected Notice of Allowance received for U.S. Appl. No. 17/168,069, dated Feb. 9, 2022, 2 pages.
International Search Report and Written Opinion received for PCT Patent Application No. PCT/US2021/048358, dated Feb. 24, 2022, 21 pages.
Invitation to Pay Additional Fees received for PCT Patent Application No. PCT/US2021/048358, dated Dec. 23, 2021, 14 pages.
Non-Final Office Action received for U.S. Appl. No. 17/168,069, dated Jul. 21, 2021, 17 pages.
Notice of Allowance received for Chinese Patent Application No. 201810338040.5, dated Mar. 30, 2022, 6 pages (2 pages of English Translation and 4 pages of Official Copy).
Notice of Allowance received for Japanese Patent Application No. 2019-234184, dated Mar. 22, 2022, 4 pages (1 page of English Translation and 3 pages of Official Copy).
Notice of Allowance received for U.S. Appl. No. 17/168,069, dated Jan. 19, 2022, 12 pages.
Notice of Allowance received for U.S. Appl. No. 17/168,069, dated Mar. 22, 2022, 5 pages.
Office Action received for Australian Patent Application No. 2018271366, dated May 17, 2021, 5 pages.
Supplemental Notice of Allowance received for U.S. Appl. No. 17/168,069, dated Feb. 2, 2022, 2 pages.
Qiye Wang, "Design and Implementation of SAN Device Access Control in Unified Storage Platform", Master's Theses, Huazhong University of Science & Technology, Wuhan, Jun. 2008, 63 pages (Official Copy only) (See Communication under 37 CFR § 1.98(a)(3)).
Applicant-Initiated Interview Summary received for U.S. Appl. No. 17/483,564, dated Mar. 14, 2022, 2 pages.
Applicant-Initiated Interview Summary received for U.S. Appl. No. 17/483,679, dated Apr. 29, 2022, 2 pages.
Applicant-Initiated Interview Summary received for U.S. Appl. No. 17/484,899, dated Apr. 27, 2022, 5 pages.
Corrected Notice of Allowance received for U.S. Appl. No. 16/803,849, dated Jun. 8, 2022, 3 pages.
Corrected Notice of Allowance received for U.S. Appl. No. 17/483,582, dated Feb. 15, 2022, 2 pages.
Final Office Action received for U.S. Appl. No. 17/483,564, dated Apr. 18, 2022, 23 pages.
Final Office Action received for U.S. Appl. No. 17/483,679, dated May 24, 2022, 21 pages.
Final Office Action received for U.S. Appl. No. 17/484,899, dated May 12, 2022, 29 pages.
Non-Final Office Action received for U.S. Appl. No. 16/922,675, dated Jun. 8, 2022, 21 pages.
Non-Final Office Action received for U.S. Appl. No. 17/483,549, dated Jan. 11, 2022, 5 pages.
Non-Final Office Action received for U.S. Appl. No. 17/483,564, dated Jan. 6, 2022, 23 pages.
Non-Final Office Action received for U.S. Appl. No. 17/483,679, dated Feb. 1, 2022, 19 pages.
Non-Final Office Action received for U.S. Appl. No. 17/484,899, dated Jan. 24, 2022, 24 pages.
Notice of Allowance received for U.S. Appl. No. 16/679,967, dated Jun. 15, 2022, 7 pages.
Notice of Allowance received for U.S. Appl. No. 17/461,103, dated Jun. 20, 2022, 6 pages.
Notice of Allowance received for U.S. Appl. No. 17/483,549, dated Apr. 15, 2022, 10 pages.
Notice of Allowance received for U.S. Appl. No. 17/483,582, dated Apr. 19, 2022, 5 pages.
Notice of Allowance received for U.S. Appl. No. 17/483,582, dated Jan. 20, 2022, 10 pages.
Office Action received for European Patent Application No. 20158824.1, dated Jun. 13, 2022, 5 pages.
Office Action received for Korean Patent Application No. 10-2022-7006175, dated May 27, 2022, 7 pages (3 pages of English Translation and 4 pages of Official Copy).
Corrected Notice of Allowance received for U.S. Appl. No. 17/461,103, dated Apr. 14, 2022, 2 pages.
Non-Final Office Action received for U.S. Appl. No. 16/679,967, dated Apr. 19, 2022, 13 pages.
Office Action received for Australian Patent Application No. 2021203669, dated Apr. 5, 2022, 3 pages.
Supplemental Notice of Allowance received for U.S. Appl. No. 17/168,069, dated Apr. 20, 2022, 2 pages.
Corrected Notice of Allowance received for U.S. Appl. No. 16/803,849, dated Jul. 7, 2022, 3 pages.
Notice of Allowance received for Korean Patent Application No. 10-2021-7032984, dated Jun. 29, 2022, 5 pages (2 pages of English Translation and 3 pages of Official Copy).
Notice of Allowance received for U.S. Appl. No. 17/031,702, dated Jul. 11, 2022, 12 pages.
Applicant-Initiated Interview Summaty received for U.S. Appl. No. 16/679,967, dated Jun. 1, 2022, 2 pages.
Applicant-Initiated Interview Summary received for U.S. Appl. No. 17/031,702, dated Jun. 1, 2022, 4 pages.
Brief Communication Regarding Oral Proceedings received for European Patent Application No. 20158824.1, dated May 30, 2022, 1 page.
Decision to Grant received for European Patent Application No. 19207753.5, dated Jun. 2, 2022, 3 pages.
Notice of Acceptance received for Australian Patent Application No. 2021203669, dated May 25, 2022, 3 pages.
Notice of Acceptance received for Australian Patent Application No. 2022202458, dated May 6, 2022, 3 pages.
Office Action received for Australian Patent Application No. 2021201243, dated Jun. 2, 2022, 5 pages.
Summons to Attend Oral Proceedings received for European Patent Application No. 18728002.9, mailed on Jun. 3, 2022, 15 pages.
Applicant-Initiated Interview Summary received for U.S. Appl. No. 17/483,679, dated Aug. 23, 2022, 3 pages.
Corrected Notice of Allowance received for U.S. Appl. No. 17/031,700, dated Aug. 18, 2022, 7 pages.
Corrected Notice of Allowance received for U.S. Appl. No. 17/483,549, dated Aug. 24, 2022, 3 pages.
Intention to Grant received for European Patent Application No. 20158824.1, dated Aug. 11, 2022, 10 pages.
Notice of Allowance received for Chinese Patent Application No. 202110409273.1, dated Aug. 2, 2022, 4 pages (1 page of English Translation and 3 pages of Official Copy).

(56) References Cited

OTHER PUBLICATIONS

Applicant-Initiated Interview Summary received for U.S. Appl. No. 15/784,806, dated Nov. 3, 2022, 5 pages.
Applicant-Initiated Interview Summary received for U.S. Appl. No. 16/922,675, dated Nov. 15, 2022, 2 pages.
Office Action received for Australian Patent Application No. 2022200515, dated Nov. 2, 2022, 2 pages.
Applicant-Initiated Interview Summary received for U.S. Appl. No. 17/483,564, dated Jul. 21, 2022, 5 pages.
Corrected Notice of Allowance received for U.S. Appl. No. 17/461,103, dated Aug. 3, 2022, 2 pages.
Intention to Grant received for Danish Patent Application No. PA202170320, dated Jul. 27, 2022, 2 pages.
Notice of Allowance received for Japanese Patent Application No. 2022-079682, dated Jul. 15, 2022, 4 pages (1 page of English Translation and 3 pages of Official Copy).
"13 questions and answers about using Apple Pay online", Online available at: http://www.it528.com/apple/1356.html, Feb. 18, 2016, 5 pages (Official Copy Only). See communication under 37 CFR § 1.98(a) (3).
"Review: Samsung Radiant R3 Wireless Speakers", Available Online at: <https://www.youtube.com/watch?v=ZBICVE1WdKE>, Jan. 19, 2016, 3 pages.
"Customize Notifications and Content on Your Galaxy Phone's Lock Screen", Online Available at: https://www.samsung.com/us/support/answer/ANS00062636, Oct. 4, 2017, 5 pages.
"Dell Streak Softbank001DL Manual, Softbank Corp.", vol. 2, Mar. 2011, 28 pages (Official Copy Only). See communication under 37 CFR § 1.98(a) (3).
"Firefox Sync—Take Your Bookmarks, Tabs and Personal Information with You", available online at: https://web.archive.org/web/20120601020556/http://supportmozilla.org/en-US/kb/firefox-sync-take-your-bookmarks-and-tabs-with-you?redirectlocale=en-US&redirectslug=what-firefox-sync, Jun. 1, 2012, 3 pages.
"Microsoft Windows 3.1", available at: http://www.guidebookgallery.org/screenshots/win31, 1992, pp. 1-31.
"PartyShare—turn your Xperia into a jukebox", Available at: https://forum.xda-developers.com/crossdevice-dev/sony/app-partyshare-xperia-jukebox-t2877807, Sep. 15, 2014, 5 pages.
"Smart Home App-What is the Widget", Online Available at: https://support.vivint.com/s/article/Vivint-Smart-Home-App-What-is-the-Widget, Jan. 26, 2019, 4 pages.
Advisory Action received for U.S. Appl. No. 10/179,775, dated Oct. 13, 2015, 4 pages.
Advisory Action received for U.S. Appl. No. 10/179,775, dated Oct. 14, 2010, 2 pages.
Advisory Action received for U.S. Appl. No. 10/179,775, dated Sep. 15, 2009, 2 pages.
Advisory Action received for U.S. Appl. No. 12/890,499, dated Jan. 11, 2016, 3 pages.
Advisory Action received for U.S. Appl. No. 13/077,850, dated Apr. 24, 2014, 3 pages.
Advisory Action received for U.S. Appl. No. 13/077,855, dated Jun. 15, 2016, 4 pages.
Advisory Action received for U.S. Appl. No. 13/077,862, dated Apr. 7, 2016, 3 pages.
Advisory Action received for U.S. Appl. No. 13/077,874, dated Aug. 19, 2016, 3 pages.
Advisory Action received for U.S. Appl. No. 14/863,099, dated Sep. 8, 2016, 3 pages.
Advisory Action received for U.S. Appl. No. 15/348,204, dated Feb. 4, 2019, 4 pages.
Advisory Action received for U.S. Appl. No. 16/422,736, dated Mar. 12, 2021, 3 pages.
Advisory Action received for U.S. Appl. No. 16/583,989, dated Sep. 22, 2020, 5 pages.
Advisory Action received for U.S. Appl. No. 17/031,702, dated Jan. 10, 2022, 3 pages.
Advisory Action received for U.S. Appl. No. 15/250,152, dated Mar. 25, 2019, 5 pages.

Akhgari Ehsan, "Don't Leave a Trace: Private Browsing in Firefox", available online at "http://ehsanakhgari.org/blog/2008-11-04/dont-leave-trace-private-browsing-firefox", Nov. 4, 2008, 71 pages.
Akshay, "Control your SmartThings compatible devices on the Gear S2 and S3 with the Smarter Things app", Online available at: https://iotgadgets.com/2017/09/control-smartthings-compatible-devices-gear-52-53-smarter-things-app/, Sep. 7, 2017, 4 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Anonymous, "Chapter 13: Menus", Apple Human Interface Guidelines, available at <https://developer.apple.com/library/mac/documentation/UserExperience/Conceptual/OSXHIGuidelines/index.html>, retrieved on Aug. 20, 2009, pp. 165-190.
Appeal Decision received for U.S. Appl. No. 13/077,862, mailed on Mar. 22, 2019, 10 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Applicant Initiated Interview Summary received for U.S. Appl. No. 15/433,320, dated Feb. 11, 2020, 5 pages.
Applicant Initiated Interview Summary received for U.S. Appl. No. 15/784,806, dated Aug. 2, 2021, 5 pages.
Applicant Initiated Interview Summary received for U.S. Appl. No. 16/507,664, dated Aug. 26, 2020, 5 pages.
Applicant Initiated Interview Summary received for U.S. Appl. No. 16/583,989, dated Aug. 3, 2020, 6 pages.
Applicant Initiated Interview Summary received for U.S. Appl. No. 16/583,989, dated Mar. 25, 2020, 4 pages.
Applicant Initiated Interview Summary received for U.S. Appl. No. 16/584,490, dated Jul. 28, 2020, 4 pages.
Applicant Initiated Interview Summary received for U.S. Appl. No. 16/702,968, dated Jul. 1, 2020, 5 pages.
Applicant Initiated Interview Summary received for U.S. Appl. No. 16/859,101, dated Nov. 30, 2021, 2 pages.
Applicant-Initiated Interview Summary received for U.S. Appl. No. 15/433,320, dated Nov. 25, 2020, 4 pages.
Applicant-Initiated Interview Summary received for U.S. Appl. No. 15/784,806, dated Dec. 21, 2020, 5 pages.
Applicant-Initiated Interview Summary received for U.S. Appl. No. 15/784,806, dated Jan. 24, 2022, 3 pages.
Applicant-Initiated Interview Summary received for U.S. Appl. No. 15/784,806, dated Jun. 2, 2020, 5 pages.
Applicant-Initiated Interview Summary received for U.S. Appl. No. 15/910,263, dated Nov. 18, 2020, 6 pages.
Applicant-Initiated Interview Summary received for U.S. Appl. No. 16/422,736, dated Feb. 24, 2021, 3 pages.
Applicant-Initiated Interview Summary received for U.S. Appl. No. 16/422,736, dated Sep. 28, 2020, 3 pages.
Applicant-Initiated Interview Summary received for U.S. Appl. No. 16/584,490, dated Jan. 31, 2020, 4 pages.
Applicant-Initiated Interview Summary received for U.S. Appl. No. 16/670,949, dated Apr. 6, 2021, 2 pages.
Applicant-Initiated Interview Summary received for U.S. Appl. No. 16/679,967, dated Feb. 10, 2022, 2 pages.
Applicant-Initiated Interview Summary received for U.S. Appl. No. 16/679,967, dated Oct. 25, 2021, 2 pages.
Applicant-Initiated Interview Summary received for U.S. Appl. No. 16/702,968, dated Sep. 28, 2020, 6 pages.
Applicant-Initiated Interview Summary received for U.S. Appl. No. 16/803,849, dated Aug. 21, 2020, 5 pages.
Applicant-Initiated Interview Summary received for U.S. Appl. No. 16/803,849, dated Dec. 21, 2020, 5 pages.
Applicant-Initiated Interview Summary received for U.S. Appl. No. 16/803,849, dated Oct. 12, 2021, 6 pages.
Applicant-Initiated Interview Summary received for U.S. Appl. No. 16/807,604, dated Dec. 21, 2020, 7 pages.
Applicant-Initiated Interview Summary received for U.S. Appl. No. 16/807,604, dated Jul. 24, 2020, 5 pages.
Applicant-Initiated Interview Summary received for U.S. Appl. No. 16/836,571, dated Jul. 7, 2021, 6 pages.

(56) References Cited

OTHER PUBLICATIONS

Applicant-Initiated Interview Summary received for U.S. Appl. No. 16/922,675, dated Dec. 16, 2020, 3 pages.
Applicant-Initiated Interview Summary received for U.S. Appl. No. 16/922,675, dated Nov. 2, 2020, 3 pages.
Applicant-Initiated Interview Summary received for U.S. Appl. No. 16/922,675, dated Sep. 3, 2021, 2 pages.
Applicant-Initiated Interview Summary received for U.S. Appl. No. 17/031,702, dated Dec. 29, 2021, 5 pages.
Applicant-Initiated Interview Summary received for U.S. Appl. No. 17/031,833, dated Dec. 21, 2020, 5 pages.
Applicant-Initiated Interview Summary received for U.S. Appl. No. 17/031,833, dated May 24, 2021, 6 pages.
Applicant-Initiated Interview Summary received for U.S. Appl. No. 17/461,103, dated Jan. 26, 2022, 6 pages.
Baig Ed, "Palm Pre: the Missing Manual", Safari Books Online, Available at <http://my.safaribooksonline.com/book/operating-systems/0596528264>, Aug. 27, 2009, 16 pages.
Beard Chris, "Mozilla Labs Introducing Weave", available online at <https://blog.mozilla.org/labs/2007/12/introducing-weave/>, Dec. 21, 2007, 57 pages.
Bell Killian, "Twitter Notifications, iCloud Tabs & Location-Based Reminders Appear in Latest OS X 10.8 Beta", available online at "http://www.cultofmac.com/154522/twitter-notifications-icloud-tabs-location-based-reminders-appear-in-latest-os-x-10-8-beta/", Mar. 19, 2012, 10 pages.
Benge et al., "Designing Custom Controls", IBM OS/2 Developer, The Magazine for Advanced Software Development, vol. 5, No. 2, 1993, pp. 72-85.
Board Decision received for Chinese Patent Application No. 201580043701.6, mailed on Aug. 19, 2021, 2 pages (1 page of English Translation and 1 page of Official Copy).
Board Opinion received for Chinese Patent Application No. 201810338826.7, dated Jan. 19, 2022, 18 pages (6 pages of English Translation and 12 pages of Official Copy).
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Brief Communication Regarding Oral Proceedings received for European Patent Application No. 18197583.0, dated Feb. 18, 2021, 2 pages.
Brumberg et al., "The Unlock Project: A Python-based framework for practical brain-computer interface communication "app" development", Conf Proc IEEE Eng Med Biol Soc. 2012, doi:10.1109/EMBC.2012.6346473, Institute of Electrical and Electronics Engineers, 2012, 11 pages.
Call Me, "Samsung R3 speaker gives you a delicious 360 degree sound experience—with WiFi and Bluetooth | Call me", 0:24 / 3:22, Available Online at: <https://www.youtube.com/watch?v=4Uv_sOhrlro>, Sep. 22, 2016, 3 pages.
Certificate of Examination received for Australian Patent Application No. 2017100553, dated Jan. 17, 2018, 2 pages.
Certificate of Examination received for Australian Patent Application No. 2018101014, dated Mar. 20, 2019, 2 pages.
Corrected Notice of Allowance received for U.S. Appl. No. 13/077,874, dated Dec. 9, 2016, 2 pages.
Corrected Notice of Allowance received for U.S. Appl. No. 14/719,217, dated Apr. 22, 2019, 2 pages.
Corrected Notice of Allowance received for U.S. Appl. No. 14/719,217, dated Mar. 20, 2019, 2 pages.
Corrected Notice of Allowance received for U.S. Appl. No. 15/005,945, dated Oct. 18, 2016, 6 pages.
Corrected Notice of Allowance received for U.S. Appl. No. 15/269,801, dated Oct. 3, 2017, 4 pages.
Corrected Notice of Allowance received for U.S. Appl. No. 15/348,204, dated Apr. 11, 2019, 8 pages.
Corrected Notice of Allowance received for U.S. Appl. No. 15/348,204, dated May 31, 2019, 8 pages.
Corrected Notice of Allowance received for U.S. Appl. No. 15/845,794, dated Feb. 25, 2019, 2 pages.
Corrected Notice of Allowance received for U.S. Appl. No. 15/910,263, dated Feb. 10, 2021, 3 pages.
Corrected Notice of Allowance received for U.S. Appl. No. 15/910,263, dated Mar. 17, 2021, 3 pages.
Corrected Notice of Allowance received for U.S. Appl. No. 15/910,263, dated Mar. 18, 2021, 3 pages.
Corrected Notice of Allowance received for U.S. Appl. No. 15/952,736, dated Nov. 19, 2018, 2 pages.
Corrected Notice of Allowance received for U.S. Appl. No. 16/229,959, dated Mar. 3, 2020, 3 pages.
Corrected Notice of Allowance received for U.S. Appl. No. 16/422,736, dated Jul. 9, 2021, 2 pages.
Corrected Notice of Allowance received for U.S. Appl. No. 16/434,865, dated Apr. 28, 2020, 2 pages.
Corrected Notice of Allowance received for U.S. Appl. No. 16/434,865, dated Jun. 4, 2020, 2 pages.
Corrected Notice of Allowance received for U.S. Appl. No. 16/507,664, dated Nov. 27, 2020, 7 pages.
Corrected Notice of Allowance received for U.S. Appl. No. 16/670,949, dated Sep. 8, 2021, 2 pages.
Corrected Notice of Allowance received for U.S. Appl. No. 16/702,968, dated Jun. 8, 2021, 3 pages.
Corrected Notice of Allowance received for U.S. Appl. No. 16/702,968, dated Jun. 16, 2021, 4 pages.
Corrected Notice of Allowance received for U.S. Appl. No. 16/702,968, dated Jun. 28, 2021, 4 pages.
Corrected Notice of Allowance received for U.S. Appl. No. 16/702,968, dated May 26, 2021, 4 pages.
Corrected Notice of Allowance received for U.S. Appl. No. 16/702,968, dated May 28, 2021, 4 pages.
Corrected Notice of Allowance received for U.S. Appl. No. 16/807,604, dated Jul. 26, 2021, 3 pages.
Corrected Notice of Allowance received for U.S. Appl. No. 16/807,604, dated Jun. 28, 2021, 3 pages.
Corrected Notice of Allowance received for U.S. Appl. No. 16/807,604, dated May 28, 2021, 3 pages.
Corrected Notice of Allowance received for U.S. Appl. No. 16/807,604, dated Oct. 4, 2021, 5 pages.
Corrected Notice of Allowance received for U.S. Appl. No. 16/807,604, dated Oct. 14, 2021, 3 pages.
Corrected Notice of Allowance received for U.S. Appl. No. 16/807,604, dated Oct. 22, 2021, 3 pages.
Corrected Notice of Allowance received for U.S. Appl. No. 16/836,571, dated Dec. 6, 2021, 5 pages.
Corrected Notice of Allowance received for U.S. Appl. No. 16/836,571, dated Nov. 4, 2021, 4 pages.
Corrected Notice of Allowance received for U.S. Appl. No. 16/836,571, dated Nov. 18, 2021, 3 pages.
Corrected Notice of Allowance received for U.S. Appl. No. 16/836,571, dated Oct. 12, 2021, 4 pages.
Corrected Notice of Allowance received for U.S. Appl. No. 16/987,003, dated Sep. 1, 2021, 3 pages.
Corrected Notice of Allowance received for U.S. Appl. No. 17/031,833, dated Aug. 2, 2021, 3 pages.
Crutnacker, "Amazon Echo Tips and Tricks: Playing Music Demonstration", Available Online at: https://www.youtube.com/watch?v=W_bqq2ynUll, Nov. 4, 2015, page.
Cuyamaca LRC Computer Labs, "Topics in CommonSpace Application", Available at <http://www.cuyamaca.net/librarylab/Technical%20Help/cmspace.asp>, Retrieved on May 19, 2014, 16 pages.
Decision on Appeal received for U.S. Appl. No. 14/774,664, dated Sep. 12, 2019, 8 pages.
Decision on Appeal received for U.S. Appl. No. 14/863,099, dated Aug. 22, 2019, 9 pages.
Decision to Grant received for Danish Patent Application No. PA201670628, dated Nov. 20, 2017, 2 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.

(56) References Cited

OTHER PUBLICATIONS

Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for Danish Patent Application No. PA201770406, dated May 15, 2020, 2 pages.
Decision to Grant received for Danish Patent Application No. PA201770782, dated Oct. 25, 2019, 2 pages.
Decision to Grant received for Danish Patent Application No. PA202070560, dated Oct. 21, 2021, 2 pages.
Decision to Grant received for European Patent Application No. 10799259.6, dated Aug. 31, 2017, 2 pages.
Decision to Grant received for European Patent Application No. 12704175.4, dated Jul. 19, 2018, 2 pages.
Decision to Grant received for European Patent Application No. 12727053.6, dated Aug. 27, 2020, 2 pages.
Decision to Grant received for European Patent Application No. 12773460.6, dated Jun. 27, 2019, 2 pages.
Decision to Grant received for European Patent Application No. 13171047.7, dated Jun. 27, 2019, 2 pages.
Decision to Grant received for European Patent Application No. 15719347.5, dated Jun. 24, 2021, 2 pages.
Decision to Grant received for European Patent Application No. 15724160.5, dated Jun. 14, 2018, 2 pages.
Decision to Grant received for European Patent Application No. 17810737.1, dated Nov. 11, 2021, 2 pages.
Decision to Grant received for European Patent Application No. 18197583.0, dated Feb. 3, 2022, 3 pages.
Decision to Grant received for European Patent Application No. 18197589.7, dated Jun. 10, 2021, 2 pages.
Decision to Grant received for Japanese Patent Application No. 2014-513804, dated Jul. 31, 2015, 6 pages (3 pages of English Translation and 3 pages of Official Copy).
Decision to Grant received for Japanese Patent Application No. 2017-075031, dated Jul. 1, 2019, 3 pages (1 page of English Translation and 2 pages of Official Copy).
Decision to Refuse received for European Patent Application No. 12770400.5, dated Nov. 8, 2018, 12 pages.
Dharmasena Anusha, "iMessage-send as text message Option", YouTube, Available online at: <https://www.youtube.com/watch?v=hXG-MdIW6FA>, Feb. 18, 2013, 1 page.
Dybwad Barb, "Google Chrome Gets Bookmark Syncing", available online at "http://mashable.com/2009/11/02/chrome-bookmark-sync/", Nov. 3, 2009, 6 pages.
Esther, "Instructions for Kobo Books: How to change to scrolling mode and do table of contents navigation—Google Groups", XP055513050, Retrieved from the Internet: URL: https://groups.google.com/forum/print/msg/viphone/-dkqODh_31N8acJK2dGPe8J?ctz=4607561_48_52_123900_48_436380 [retrieved on Oct. 5, 2018], Aug. 28, 2010, 3 pages.
Examiner-Initiated Interview Summary received for U.S. Appl. No. 16/859,101, dated Dec. 1, 2021, 2 pages.
Examiner's Answer to Appeal Brief received for U.S. Appl. No. 14/774,664, dated May 31, 2018, 28 pages.
Examiner's Answer to Appeal Brief received for U.S. Appl. No. 14/863,099, dated Jul. 28, 2017, 31 pages.
Extended European Search Report for European Application No. 17813737.8, dated Nov. 22, 2019, 9 pages.
Extended European Search Report received for European Patent Application No. 13171047.7, dated Oct. 29, 2014, 8 pages.
Extended European Search Report received for European Patent Application No. 17799904.2, dated Jul. 30, 2018, 7 pages.
Extended European Search Report received for European Patent Application No. 17810737.1, dated Oct. 28, 2019, 11 pages.
Extended European Search Report received for European Patent Application No. 18178147.7, dated Oct. 4, 2018, 8 pages.
Extended European Search Report received for European Patent Application No. 18185408.4, dated Oct. 17, 2018, 10 pages.
Extended European Search Report received for European Patent Application No. 18197583.0, dated Jun. 4, 2019, 20 pages.
Extended European Search Report received for European Patent Application No. 18197589.7, dated Jan. 7, 2019, 9 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19186538.5, dated Oct. 9, 2019, 10 pages.
Extended European Search Report received for European Patent Application No. 19207753.5, dated Dec. 18, 2019, 9 pages.
Extended European Search Report received for European Patent Application No. 20158824.1, dated Aug. 10, 2020, 13 pages.
Extended European Search Report received for European Patent Application No. 20195339.5, dated Dec. 11, 2020, 7 pages.
Extended European Search Report received for European Patent Application No. 21166718.3, dated Jul. 6, 2021, 11 pages.
Extended European Search Report received for European Patent Application No. 21197457.1, dated Nov. 15, 2021, 8 pages.
Extended European Search Report received for European Patent Application No. 21206800.1, dated Jan. 24, 2022, 8 pages.
Fahey M., "The iPad Blows Up iPhone Apps Real Good", Available at <www.kotaku.com.au/2010/01/the-ipad-blows-up-iphone-apps-real-good/>, Jan. 28, 2010, 3 pages.
Fehily C., "Visual QuickStart Guide: Microsoft Windows 7", Peachpit Press, Sep 8, 2009, pp. x,34-37, 40, 71, 76, and 267.
Final Office Action Received for U.S. Appl. No. 15/608,866, dated Mar. 8, 2019, 36 pages.
Final Office Action received for U.S. Appl. No. 10/179,775, dated Apr. 5, 2006, 14 pages.
Final Office Action received for U.S. Appl. No. 10/179,775, dated Aug. 16, 2013, 12 pages.
Final Office Action received for U.S. Appl. No. 10/179,775, dated Jul. 8, 2009, 11 pages.
Final Office Action received for U.S. Appl. No. 10/179,775, dated Jun. 22, 2010, 13 pages.
Final Office Action received for U.S. Appl. No. 10/179,775, dated May 22, 2015, 15 pages.
Final Office Action received for U.S. Appl. No. 10/179,775, dated Oct. 8, 2008, 12 pages.
Final Office Action received for U.S. Appl. No. 11/770,718, dated May 12, 2011, 15 pages.
Final Office Action received for U.S. Appl. No. 11/770,718, dated Oct. 14, 2014, 11 pages.
Final Office Action received for U.S. Appl. No. 12/843,814, dated Apr. 23, 2015, 28 pages.
Final Office Action received for U.S. Appl. No. 12/843,814, dated Jan. 31, 2014, 20 pages.
Final Office Action received for U.S. Appl. No. 12/843,814, dated Nov. 14, 2012, 13 pages.
Final Office Action received for U.S. Appl. No. 12/890,472, dated Feb. 6, 2013, 10 pages.
Final Office Action received for U.S. Appl. No. 12/890,482, dated Sep. 12, 2013, 10 pages.
Final Office Action received for U.S. Appl. No. 12/890,489, dated Aug. 14, 2013, 9 pages.
Final Office Action received for U.S. Appl. No. 12/890,499, dated Jul. 8, 2013, dated Jul. 8, 2013, 17 pages.
Final Office Action received for U.S. Appl. No. 12/890,499, dated May 22, 2017, 17 pages.
Final Office Action received for U.S. Appl. No. 12/890,499, dated Oct. 19, 2015, 14 pages.
Final Office Action received for U.S. Appl. No. 13/077,850, dated Nov. 7, 2013, 14 pages.
Final Office Action received for U.S. Appl. No. 13/077,855, dated Mar. 17, 2014, 11 pages.
Final Office Action received for U.S. Appl. No. 13/077,855, dated Nov. 7, 2013, 14 pages.
Final Office Action received for U.S. Appl. No. 13/077,862, dated Nov. 8, 2013, 15 pages.
Final Office Action received for U.S. Appl. No. 13/077,862, dated Oct. 22, 2015, 16 pages.

(56) References Cited

OTHER PUBLICATIONS

Final Office Action received for U.S. Appl. No. 13/077,867, dated May 23, 2013, 10 pages.
Final Office Action received for U.S. Appl. No. 13/077,874, dated Dec. 3, 2014, 23 pages.
Final Office Action received for U.S. Appl. No. 13/077,874, dated May 5, 2016, 26 pages.
Final Office Action received for U.S. Appl. No. 13/248,882, dated Dec. 4, 2013, 22 pages.
Final Office Action received for U.S. Appl. No. 13/333,909, dated Dec. 5, 2013, 24 pages.
Final Office Action received for U.S. Appl. No. 13/489,415, datedf Jun. 11, 2014, 34 pages.
Final Office Action received for U.S. Appl. No. 13/492,057, dated Apr. 8, 2016, 29 pages.
Final Office Action received for U.S. Appl. No. 13/492,057, dated Mar. 30, 2015, 18 pages.
Final Office Action received for U.S. Appl. No. 14/285,378, dated Jul. 23, 2015, 19 pages.
Final Office Action received for U.S. Appl. No. 14/503,327, dated May 18, 2017, 10 pages.
Final Office Action received for U.S. Appl. No. 14/719,217, dated Feb. 23, 2017, 37 pages.
Final Office Action received for U.S. Appl. No. 14/774,664, dated Aug. 25, 2017, 23 pages.
Final Office Action received for U.S. Appl. No. 14/863,099, dated Apr. 21, 2016, 20 pages.
Final Office Action received for U.S. Appl. No. 15/348,204, dated Oct. 13, 2017, 26 pages.
Final Office Action received for U.S. Appl. No. 15/348,204, dated Sep. 13, 2018, 29 pages.
Final Office Action received for U.S. Appl. No. 15/433,320, dated Dec. 31, 2019, 30 pages.
Final Office Action received for U.S. Appl. No. 15/784,806, dated Aug. 3, 2020, 33 pages.
Final Office Action received for U.S. Appl. No. 15/784,806, dated May 22, 2019, 38 pages.
Final Office Action received for U.S. Appl. No. 15/784,806, dated Nov. 9, 2021, 42 pages.
Final Office Action received for U.S. Appl. No. 15/910,263, dated Aug. 28, 2019, 32 pages.
Final Office Action received for U.S. Appl. No. 16/422,736, dated Jan. 11, 2021, 39 pages.
Final Office Action received for U.S. Appl. No. 16/583,989, dated Jul. 10, 2020, 23 pages.
Final Office Action received for U.S. Appl. No. 16/584,490, dated May 1, 2020, 48 pages.
Final Office Action received for U.S. Appl. No. 16/679,967, ated Nov. 10, 2021, 14 pages.
Final Office Action received for U.S. Appl. No. 16/702,968, dated Jul. 27, 2020, 21 pages.
Final Office Action received for U.S. Appl. No. 16/803,849, dated Nov. 2, 2021, 37 pages.
Final Office Action received for U.S. Appl. No. 16/803,849, dated Sep. 24, 2020, 29 pages.
Final Office Action received for U.S. Appl. No. 16/807,604, dated Aug. 19, 2020, 35 pages.
Final Office Action received for U.S. Appl. No. 16/922,675, dated Dec. 3, 2020, 21 pages.
Final Office Action received for U.S. Appl. No. 16/922,675, dated Nov. 30, 2020, 12 pages.
Final Office Action received for U.S. Appl. No. 17/031,702, dated Oct. 21, 2021, 16 pages.
Final Office Action received for U.S. Appl. No. 17/031,833, dated Jan. 26, 2021, 17 pages.
Final Office Action received for U.S. Appl. No. 13/077,855, dated Mar. 24, 2016, 19 pages.
Final Office Action received for U.S. Appl. No. 15/250,152, dated Aug. 23,2017, 24 pages.
Final Office Action received for U.S. Appl. No. 15/250,152, dated Nov. 16, 2018, 30 pages.
Google Labs, "Google Browser Sync", available online at "https://web.archive.org/web/20120518050142/http://www.google.com/tools/firefox/browse rsync/faq.html", May 18, 2012, 5 pages.
Google, "Google Home Help, Listen to music", Datasheet [online], Available Online at: <https://web.archive.org/web/20170326051235/https:/supportgoogle.com/googlehome/answer/7030379?hl=en&ref_topic=7030084>, Mar. 26, 2017, 3 pages.
Gookin Dan, "Lock Screen Settings on Your Android Phone", Online Available at: https://www.dummies.com/consumer-electronics/smartphones/droid/lock-screen-settingson-your-android-phone/, Sep. 23, 2015, 6 pages.
Han Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only). See communication under 37 CFR § 1.98(a) (3).
Harris et al., "Inside WordPerfect 6 for Windows", New Riders Publishing, 1994, pp. 1104-1108.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Intention to Grant received for Danish Patent Application No. PA201670628, dated Aug. 28, 2017, 2 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018, 2 pages.
Intention to Grant received for Danish Patent Application No. PA201770401, dated Sep. 17, 2018, 2 pages.
Intention to Grant received for Danish Patent Application No. PA201770403, dated May 7, 2018, 2 pages.
Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770406, dated Feb. 6, 2020, 3 pages.
Intention to Grant received for Danish Patent Application No. PA201770408, dated Nov. 30, 2018, 3 pages.
Intention to Grant received for Danish Patent Application No. PA201770782, dated Aug. 8, 2019, 2 pages.
Intention to Grant received for Danish Patent Application No. PA202070560, dated Apr. 26, 2021, 2 pages.
Intention to Grant received for European Patent Application No. 10799259.6, dated Apr. 20, 2017, 8 pages.
Intention to Grant received for European Patent Application No. 12704175.4, dated Mar. 22, 2018, 8 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
Intention to Grant received for European Patent Application No. 13171047.7, dated Jan. 23, 2019, 8 pages.
Intention to Grant received for European Patent Application No. 15719347.5, dated Dec. 8, 2020, 7 pages.
Intention to Grant received for European Patent Application No. 15719347.5, dated Jun. 8, 2021, 7 pages.
Intention to Grant received for European Patent Application No. 15719347.5, dated May 11, 2021, 8 pages.
Intention to Grant received for European Patent Application No. 15724160.5, dated Mar. 7, 2018, 8 pages.
Intention to Grant received for European Patent Application No. 17810737.1, dated Jul. 5, 2021, 8 pages.
Intention to Grant received for European Patent Application No. 18197583.0, dated Jan. 17, 2022, 9 pages.
Intention to Grant received for European Patent Application No. 18197583.0, dated Jul. 23, 2021, 9 pages.

(56) References Cited

OTHER PUBLICATIONS

Intention to Grant received for European Patent Application No. 18197589.7, dated Jan. 21, 2021, 8 pages.
Intention to Grant received for European Patent Application No. 19207753.5, dated Jan. 28, 2022, 8 pages.
Intention to Grant received for European Patent Application No. 19207753.5, dated Sep. 3, 2021, 8 pages.
Intention to Grant received for European Patent Application no. 12727053.6, dated Aug. 4, 2020, 8 pages.
Intention to Grant Received for European Patent Application no. 12727053.6, dated Mar. 6, 2020, 8 pages.
International Preliminary Report on Patentability received for PCT Patent Application No. PCT/US2018/032396, dated Nov. 28, 2019, 9 pages.
International Preliminary Report on Patentability received for PCT Patent Application No. PCT/US2010/062314, dated Jul. 10, 2012, 14 pages.
International Preliminary Report on Patentability received for PCT Patent Application No. PCT/US2012/022401, dated Aug. 8, 2013, 12 pages.
International Preliminary Report on Patentability received for PCT Patent Application No. PCT/US2012/040962, dated Dec. 10, 2013, 11 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2013/044710, dated Dec. 18, 2014, 11 pages.
International Preliminary Report on Patentability received for PCT Patent Application No. PCT/US2014/027882, dated Sep. 24, 2015, 8 pages.
International Preliminary Report on Patentability received for PCT Patent Application No. PCT/US2015/025188, dated Mar. 2, 2017, 8 pages.
International Preliminary Report on Patentability received for PCT Patent Application No. PCT/US2015/030199, dated Dec. 15, 2016, 7 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/032240, dated Nov. 29, 2018, 29 pages.
International Preliminary Report on Patentability received for PCT Patent Application No. PCT/US2017/035326, dated Dec. 20, 2018, 19 pages.
International Preliminary Report on Patentability received for PCT Patent Application No. PCT/US2018/032904, dated Nov. 28, 2019, 14 pages.
International Preliminary Report on Patentability received for PCT Patent Application No. PCT/US2020/035488, dated Dec. 9, 2021, 16 pages.
International Search Report and Written Opinion received for PCT Patent Application No. PCT/US17/31086, dated Sep. 8, 2017, 15 pages.
International Search Report and Written Opinion received for PCT Patent Application No. PCT/US2010/062314, dated Jun. 22, 2011, 17 pages.
International Search Report and Written Opinion received for PCT Patent Application No. PCT/US2012/022401, dated Jul. 6, 2012, 16 pages.
International Search Report and Written Opinion received for PCT Patent Application No. PCT/US2012/040962, dated Jan. 3, 2013, 15 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2013/044710, dated Aug. 15, 2013, 11 pages.
International Search Report and Written Opinion received for PCT Patent Application No. PCT/US2014/027882, dated Oct. 10, 2014, 11 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/030199, dated Aug. 14, 2015, 11 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2017/035326, dated Oct. 5, 2017, 22 pages.
International Search Report and Written Opinion received for PCT Patent Application No. PCT/US2018/032396, dated Jul. 30, 2018, 13 pages.
International Search Report and Written Opinion received for PCT Patent Application No. PCT/US2018/032904, dated Oct. 1, 2018, 21 pages.
International Search Report and Written Opinion received for PCT Patent Application No. PCT/US2020/035488, dated Nov. 17, 2020, 21 pages.
International Search Report received for PCT Patent Application No. PCT/US95/11025, dated Jan. 3, 1996, 3 pages.
Invitation to Pay Addition Fees and Partial International Search Report received for PCT Patent Application No. PCT/US2018/032904, dated Jul. 31, 2018, 18 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fee received for PCT Patent Application No. PCT/US2017/035326, dated Aug. 7, 2017, 2 pages.
Invitation to Pay Additional Fees received for PCT Patent Application No. PCT/US2012/022401, dated May 4, 2012, 8 pages.
Invitation to Pay Additional Fees received for PCT Patent Application No. PCT/US2014/027882, dated Aug. 5, 2014, 2 pages.
Invitation to Pay Additional Fees received for PCT Patent Application No. PCT/US2020/035488, dated Sep. 23, 2020, 15 pages.
Invitation to Pay Search Fees received for European Patent Application No. 18728002.9, dated Sep. 2, 2020, 8 pages.
Jarvie, "Alexa plays me music", Available online at: https://www.youtube.com/watch?v=bR2ZC8Sy8YQ, Feb. 23, 2015, 1 page.
King Adrian, "Inside Windows 95", Microsoft Press., Aug. 1994, pp. 176-182.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Mackie Simon, "Emulate Safari's Reader Mode in Other Browsers with Readability", available online at "https://gigaom.com/2010/06/21/emulate-safaris-reader-mode-in-other-browsers-with-readability/", Jun. 21, 2010, 5 pages.
Minutes of the Oral Proceedings received for European Application No. 12770400.5, mailed on Nov. 6, 2018, 7 pages.

(56) References Cited

OTHER PUBLICATIONS

Minutes of the Oral Proceedings received for European Patent Application No. 18197583.0, mailed on Mar. 9, 2021, 6 pages.
Mozilla Services, "Firefox Sync Terms of Service (for versions prior to Firefox 29)", available online at <https://services.mozilla.com/tos/>, Aug. 19, 2010, 4 pages.
MR Analytical, "Samsung Gear S3 App Launcher Widget—App Review", Available Online at <https://www.youtube.com/watch?v=HEfTv17peik>, Dec. 26, 2016, 5 pages.
NBC News, "NBC News—YouTube Democratic Debate (full)", Online available at: https://www.youtube.com/watch?v=ti2Nokoq1J4, Jan. 17, 2016, 1 page.
Non-Final Action received for U.S. Appl. No. 15/952,736, dated Jun. 1, 2018, 12 pages.
Non-Final Office Action received for U.S. Appl. No. 13/492,057, dated Dec. 17, 2015, 25 pages.
Non-Final Office Action received for U.S. Appl. No. 14/503,327, dated Sep. 12, 2016, 10 pages.
Non-Final Office Action received for U.S. Appl. No. 16/679,967, dated Sep. 2, 2021, 12 pages.
Non-Final Office Action received for U.S. Appl. No. 16/507,664, dated May 11, 2020, 16 pages.
Non-Final Office Action received for U.S. Appl. No. 10/179,775, dated Aug. 14, 2014, 13 pages.
Non-Final Office Action received for U.S. Appl. No. 10/179,775, dated Dec. 23, 2009, 13 pages.
Non-Final Office Action received for U.S. Appl. No. 10/179,775, dated Dec. 23, 2015, 14 pages.
Non-Final Office Action received for U.S. Appl. No. 10/179,775, dated Jan. 22, 2009, 11 pages.
Non-Final Office Action received for U.S. Appl. No. 10/179,775, dated Jul. 2, 2007, 12 pages.
Non-Final Office Action received for U.S. Appl. No. 10/179,775, dated Mar. 14, 2008, 11 pages.
Non-Final Office Action received for U.S. Appl. No. 10/179,775, dated Mar. 28, 2013, 11 pages.
Non-Final Office Action received for U.S. Appl. No. 10/179,775, dated Oct. 12, 2005, 16 pages.
Non-Final Office Action received for U.S. Appl. No. 11/770,718, dated Dec. 3, 2010, 19 pages.
Non-Final Office Action received for U.S. Appl. No. 11/770,718, dated May 5, 2014, 9 pages.
Non-Final Office Action received for U.S. Appl. No. 12/789,436, dated Jun. 25, 2012, 23 pages.
Non-Final Office Action received for U.S. Appl. No. 12/843,814, dated Apr. 27, 2012, 26 pages.
Non-Final Office Action received for U.S. Appl. No. 12/843,814, dated May 28, 2013, 17 pages.
Non-Final Office Action received for U.S. Appl. No. 12/843,814, dated Oct. 8, 2014, 14 pages.
Non-Final Office Action received for U.S. Appl. No. 12/890,472, dated Jul. 5, 2012, 9 pages.
Non-Final Office Action received for U.S. Appl. No. 12/890,482, dated Sep. 27, 2012, 11 pages.
Non-Final Office Action received for U.S. Appl. No. 12/890,489, dated Nov. 6, 2014, 22 pages.
Non-Final Office Action received for U.S. Appl. No. 12/890,489, dated Nov. 30, 2012, 8 pages.
Non-Final Office Action received for U.S. Appl. No. 12/890,499, dated Apr. 6, 2015, 14 pages.
Non-Final Office Action received for U.S. Appl. No. 12/890,499, dated Nov. 1, 2016, 16 pages.
Non-Final Office Action received for U.S. Appl. No. 12/890,499, dated Nov. 26, 2012, 12 pages.
Non-Final Office Action received for U.S. Appl. No. 12/890,499, dated Sep. 11, 2014, 11 pages.
Non-Final Office Action received for U.S. Appl. No. 13/077,850, dated Mar. 28, 2013, 15 pages.
Non-Final Office Action received for U.S. Appl. No. 13/077,850, dated Sep. 10, 2015, 14 pages.
Non-Final Office Action received for U.S. Appl. No. 13/077,855, dated Aug. 13, 2015, 13 pages.
Non-Final Office Action received for U.S. Appl. No. 13/077,855, dated Mar. 28, 2013, 15 pages.
Non-Final Office Action received for U.S. Appl. No. 13/077,862, dated Dec. 29, 2014, 11 pages.
Non-Final Office Action received for U.S. Appl. No. 13/077,862, dated Jul. 17, 2020, 20 pages.
Non-Final Office Action received for U.S. Appl. No. 13/077,862, dated Mar. 15, 2013, 10 pages.
Non-Final Office Action received for U.S. Appl. No. 13/077,862, dated Nov. 21, 2019, 18 pages.
Non-Final Office Action received for U.S. Appl. No. 13/077,867, dated Dec. 21, 2012, 9 pages.
Non-Final Office Action received for U.S. Appl. No. 13/077,867, dated Jul. 20, 2012, 10 pages.
Non-Final Office Action received for U.S. Appl. No. 13/077,874, dated Jun. 19, 2014, 15 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 13/333,909, dated Mar. 19, 2013, 18 pages.
Non-Final Office Action received for U.S. Appl. No. 13/489,415, dated Dec. 5, 2013, 25 pages.
Non-Final Office Action received for U.S. Appl. No. 13/489,415, dated Feb. 11, 2015, 30 pages.
Non-Final Office Action received for U.S. Appl. No. 13/492,057, dated Jul. 8, 2014, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/456,852, dated Jul. 1, 2015, 19 pages.
Non-Final Office Action received for U.S. Appl. No. 14/642,366, dated Aug. 24, 2015, 7 pages.
Non-Final Office Action received for U.S. Appl. No. 14/699,177, dated Feb. 9, 2017, 11 pages.
Non-Final Office Action received for U.S. Appl. No. 14/719,217, dated Jul. 26, 2018, 40 pages.
Non-Final Office Action received for U.S. Appl. No. 14/719,217, dated Jul. 28, 2016, 28 pages.
Non-Final Office Action received for U.S. Appl. No. 14/774,664, dated Mar. 7, 2017, 23 pages.
Non-Final Office Action received for U.S. Appl. No. 14/863,099, dated Dec. 2, 2015, 12 pages.
Non-Final Office Action received for U.S. Appl. No. 15/005,945, dated May 17, 2016, 9 pages.
Non-Final Office Action received for U.S. Appl. No. 15/134,638, dated Sep. 20, 2016, 6 pages.
Non-Final Office Action received for U.S. Appl. No. 15/269,801, dated Dec. 30, 2016, 17 pages.
Non-Final Office Action received for U.S. Appl. No. 15/348,204, dated Apr. 28, 2017, 22 pages.
Non-Final Office Action received for U.S. Appl. No. 15/348,204, dated Feb. 20, 2018, 28 pages.
Non-Final Office Action received for U.S. Appl. No. 15/433,320, dated Jul. 31, 2020, 13 pages.
Non-Final Office Action received for U.S. Appl. No. 15/608,866, dated Nov. 2, 2018, 46 pages.
Non-Final Office Action received for U.S. Appl. No. 15/620,666, dated Mar. 28, 2018, 14 pages.
Non-Final Office Action received for U.S. Appl. No. 15/784,806, dated Apr. 30, 2021, 42 pages.
Non-Final Office Action received for U.S. Appl. No. 15/784,806, dated Jan. 4, 2019, 27 pages.
Non-Final Office Action received for U.S. Appl. No. 15/784,806, dated Mar. 13, 2020, 36 pages.
Non-Final Office Action received for U.S. Appl. No. 15/845,794, dated Oct. 15, 2018, 8 pages.

(56) References Cited

OTHER PUBLICATIONS

Non-Final Office Action received for U.S. Appl. No. 15/910,263, dated Jun. 15, 2020, 38 pages.
Non-Final Office Action received for U.S. Appl. No. 15/910,263, dated Mar. 4, 2019, 26 pages.
Non-Final Office Action received for U.S. Appl. No. 16/229,959, dated Oct. 31, 2019, 10 pages.
Non-Final Office Action received for U.S. Appl. No. 16/422,736, dated Jun. 23, 2020, 24 pages.
Non-Final Office Action received for U.S. Appl. No. 16/434,865, dated Jan. 16, 2020, 9 pages.
Non-Final Office Action received for U.S. Appl. No. 16/583,989, dated Jan. 24, 2020, 20 pages.
Non-Final Office Action received for U.S. Appl. No. 16/584,490, dated Dec. 10, 2019, 27 pages.
Non-Final Office Action received for U.S. Appl. No. 16/670,949, dated Dec. 9, 2020, 11 pages.
Non-Final Office Action received for U.S. Appl. No. 16/702,968, dated Apr. 8, 2020, 20 pages.
Non-Final Office Action received for U.S. Appl. No. 16/803,849, dated Jul. 13, 2020, 23 pages.
Non-Final Office Action received for U.S. Appl. No. 16/803,849, dated May 14, 2021, 34 pages.
Non-Final Office Action received for U.S. Appl. No. 16/807,604, dated Jun. 2, 2020, 28 pages.
Non-Final Office Action received for U.S. Appl. No. 16/836,571, dated Mar. 25, 2021, 28 pages.
Non-Final Office Action received for U.S. Appl. No. 16/859,101, dated Aug. 5, 2021, 19 pages.
Non-Final Office Action received for U.S. Appl. No. 16/922,675, dated Aug. 13, 2020, 17 pages.
Non-Final Office Action received for U.S. Appl. No. 16/922,675, dated May 4, 2021, 23 pages.
Non-Final Office Action received for U.S. Appl. No. 16/987,003, dated May 10, 2021, 20 pages.
Non-Final Office Action received for U.S. Appl. No. 17/031,700, dated May 11, 2021, 10 pages.
Non-Final Office Action received for U.S. Appl. No. 17/031,702, dated Apr. 26, 2021, 13 pages.
Non-Final Office Action received for U.S. Appl. No. 17/031,702, dated Jan. 26, 2022, 19 pages.
Non-Final Office Action received for U.S. Appl. No. 17/031,833, dated Dec. 7, 2020, 13 pages.
Non-Final Office Action received for U.S. Appl. No. 13/077,874, dated Dec. 3, 2015, 23 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/433,320, dated May 2, 2019, 27 pages.
Non-Final Office Action received for U.S. Appl. No. 15/945,610, dated Sep. 20, 2018, 9 pages.
Non-Final received for U.S. Appl. No. 17/461,103, Nov. 22, 2021, 15 pages.
Notice of Acceptance received for Australian Patent Application No. 2010339636, dated Jul. 3, 2014, 2 pages.
Notice of Acceptance received for Australian Patent Application No. 2012209199, dated Jan. 27, 2016, 3 pages.
Notice of Acceptance received for Australian Patent Application No. 2012268312, dated Feb. 3, 2016, 2 pages.
Notice of Acceptance received for Australian Patent Application No. 2016203250, dated Mar. 15, 2018, 3 pages.
Notice of Acceptance received for Australian Patent Application No. 2017266867, dated Mar. 6, 2019, 3 pages.
Notice of Acceptance received for Australian Patent Application No. 2017284013, dated Aug. 26, 2020, 3 pages.
Notice of Acceptance received for Australian Patent Application No. 2018204028, dated Jun. 12, 2019, 3 pages.
Notice of Acceptance received for Australian Patent Application No. 2018223051, dated Oct. 30, 2018, 3 pages.
Notice of Acceptance received for Australian Patent Application No. 2018229544, dated May 4, 2020, 3 pages.
Notice of Acceptance received for Australian Patent Application No. 2018236872, dated Jul. 9, 2019, 3 pages.
Notice of Acceptance received for Australian Patent Application No. 2019203473, dated Nov. 7, 2019, 3 pages.
Notice of Acceptance received for Australian Patent Application No. 2019268111, dated Feb. 18, 2021, 3 pages.
Notice of Acceptance received for Australian Patent Application No. 2020273355, dated Jan. 17, 2022, 3 pages.
Notice of Acceptance received for Australian Patent Application No. 2020282362, dated Jan. 4, 2022, 3 pages.
Notice of Allowance received for Australian Patent Application No. 2016202837, dated Apr. 21, 2017, 3 pages.
Notice of Allowance received for Chinese Patent Application No. 201080064125.0, datead Sep. 8, 2015, 3 pages (1 page of English Translation and 2 pages of Official Copy).
Notice of Allowance received for Chinese Patent Application No. 201280006317.5, dated Feb. 17, 2017, 2 pages (1 page of English Translation and 1 page of Official Copy).
Notice of Allowance received for Chinese Patent Application No. 2012800272819, dated Jun. 13, 2017, 4 pages (2 pages of English Translation and 2 pages of Official Copy).
Notice of Allowance received for Chinese Patent Application No. 201280047459.6, dated Jan. 31, 2018, 2 pages (1 page of English Translation and 1 page of Official Copy).
Notice of Allowance received for Chinese Patent Application No. 201580028491.3, dated Mar. 29, 2019, 2 pages (1 page of English Translation and 1 page of Official Copy).
Notice of Allowance received for Chinese Patent Application No. 201580043701.6, dated Jan. 26, 2022, 2 pages (1 page of English Translation and 1 page of Official Copy).
Notice of Allowance received for Chinese Patent Application No. 201710240907.9, dated Nov. 25, 2019, 2 pages (1 page of English Translation and 1 page of Official Copy).
Notice of Allowance received for Chinese Patent Application No. 201710734839.1, dated Dec. 4, 2020, 3 pages (1 page of English Translation and 2 pages of Official Copy).
Notice of Allowance received for Chinese Patent Application No. 201780002398.4, dated Jun. 17, 2019, 2 pages (1 page of English Translation and 1 page of Official Copy).
Notice of Allowance received for Chinese Patent Application No. 201780033771.2, dated Feb. 3, 2021, 2 pages (1 page of English Translation and 1 page of Official Copy).
Notice of Allowance received for Chinese Patent Application No. 201780033899.9, dated Feb. 8, 2022, 2 pages (1 page of English Translation and 1 page of Official Copy).
Notice of Allowance received for Chinese Patent Application No. 201810338038.8, dated Jun. 30, 2020, 2 pages (1 page of English Translation and 1 page of Official Copy).
Notice of Allowance received for Chinese Patent Application No. 201811460172.1, dated Jan. 11, 2021, 2 pages (1 page of English Translation and 1 page of Official Copy).
Notice of Allowance received for Chinese Patent Application No. 201811539260.0, dated Mar. 15, 2021, 2 pages (1 page of English Translation and 1 page of Official Copy).
Notice of Allowance received for Chinese Patent Application No. 201880001436.9, dated May 8, 2020, 3 pages (2 pages of English Translation and 1 page of Official Copy).
Notice of Allowance received for Chinese Patent Application No. 201910475434.X, dated Mar. 10, 2021, 2 pages (1 page of English Translation and 1 page of Official Copy).
Notice of Allowance received for Chinese Patent Application No. 202010125114.4, dated Nov. 24, 2021, 2 pages (1 page of English Translation and 1 page of Official Copy).
Notice of Allowance received for Danish Patent Application No. PA201770408, dated Feb. 8, 2019, 2 pages.
Notice of Allowance received for Japanese Patent Application No. 2015-171114, dated Mar. 1, 2019, 3 pages (1 page of English Translation and 2 pages of Official Copy).

(56) References Cited

OTHER PUBLICATIONS

Notice of Allowance received for Japanese Patent Application No. 2016-130565, dated Aug. 28, 2017, 3 pages (Official Copy Only). See communication under 37 CFR § 1.98(a) (3).
Notice of Allowance received for Japanese Patent Application No. 2017-507413, dated Jul. 22, 2019, 4 pages (1 page of English Translation and 3 pages of Official Copy).
Notice of Allowance received for Japanese Patent Application No. 2018-071908, dated Nov. 25, 2019, 8 pages (5 pages of English Translation and 3 pages of Official Copy).
Notice of Allowance received for Japanese Patent Application No. 2018-560107, dated Dec. 6, 2019, 4 pages (1 page of English Translation and 3 pages of Official Copy).
Notice of Allowance received for Japanese Patent Application No. 2019-116580, dated Oct. 2, 2020, 4 pages (1 page of English Translation and 3 pages of Official Copy).
Notice of Allowance received for Japanese Patent Application No. 2019-238894, dated Oct. 5, 2020, 4 pages (1 page of English Translation and 3 pages of Official Copy).
Notice of Allowance received for Japanese Patent Application No. 2020-183773, dated Dec. 23, 2021, 4 pages (1 page of English Translation and 3 pages of Official Copy).
Notice of Allowance received for Korean Patent Application No. 10-2013-7022057, dated Apr. 27, 2015, 2 pages (Official Copy only). See communication under 37 CFR § 1.98(a) (3).
Notice of Allowance received for Korean Patent Application No. 10-2013-7034852, dated Aug. 24, 2016, 3 pages (1 page of English Translation and 2 pages of Official Copy).
Notice of Allowance received for Korean Patent Application No. 10-2014-7033660, dated Sep. 25, 2015, 3 pages (1 page of English Translation and 2 pages of Official Copy).
Notice of Allowance received for Korean Patent Application No. 10-2015-7007065, dated Aug. 28, 2019, 4 pages (2 pages of English Translation and 2 pages of Official Copy).
Notice of Allowance received for Korean Patent Application No. 10-2015-7013849, dated Mar. 28, 2016, 3 pages (1 page of English Translation and 2 pages of Official Copy).
Notice of Allowance received for Korean Patent Application No. 10-2015-7037047, dated Oct. 30, 2017, 3 pages (Official Copy Only). See communication under 37 CFR § 1.98(a) (3).
Notice of Allowance received for Korean Patent Application No. 10-2016-7017508, dated Apr. 27, 2017, 3 pages (1 page of English translation and 2 pages of Official Copy).
Notice of Allowance received for Korean Patent Application No. 10-2016-7035555, dated Sep. 23, 2019, 3 pages (1 page of English Translation and 2 pages of Official Copy).
Notice of Allowance received for Korean Patent Application No. 10-2017-7012145, dated Oct. 30, 2019, 3 pages (1 page of English Translation and 2 pages of Official Copy).
Notice of Allowance received for Korean Patent Application No. 10-2018-7033301, dated Feb. 20, 2019, 5 pages (2 Pages of English Translation and 3 Pages of Official Copy).
Notice of Allowance received for Korean Patent Application No. 10-2019-7014494, dated Mar. 19, 2020, 4 pages (1 page of English Translation and 3 pages of Official Copy).
Notice of Allowance received for Korean Patent Application No. 10-2020-7002929, dated Nov. 26, 2020, 3 pages (1 page of English Translation and 2 pages of Official Copy).
Notice of Allowance received for Korean Patent Application No. 10-2020-7017803, dated Nov. 5, 2020, 6 pages (2 pages of English Translation and 4 pages of Official Copy).
Notice of Allowance received for Korean Patent Application No. 10-2021-0143923, dated Jan. 27, 2022, 4 pages (1 page of English Translation and 3 pages of Official Copy).
Notice of Allowance received for Korean Patent Application No. 10-2021-7005691, dated Mar. 29, 2021, 3 pages (1 page of English Translation and 2 pages of Official Copy).
Notice of Allowance received for Korean Patent Application No. 10-2021-7020549, dated Jul. 13, 2021, 3 pages (1 page of English Translation and 2 pages of Official Copy).
Notice of Allowance received for Korean Patent Application No. 10-2021-7035472, dated Nov. 23, 2021, 4 pages (2 pages of English Translation and 2 pages of Official Copy).
Notice of Allowance received for Korean Patent Application No. 10-2014-7008348, dated Feb. 21, 2019, 5 pages (2 Pages of English Translation and 3 Pages of Official Copy).
Notice of Allowance received for Taiwanese Patent Application No. 102120412, dated Oct. 28, 2015, 5 pages (2 pages of English Translation and 3 pages of Official copy).
Notice of Allowance received for Taiwanese Patent Application No. 104114953, dated Oct. 17, 2017, 3 pages (Official Copy only). See communication under 37 CFR § 1.98(a) (3).
Notice of Allowance received for U.S. Appl. No. 16/702,968, dated Apr. 21, 2021, 20 pages.
Notice of Allowance received for U.S. Appl. No. 10/179,775, dated Aug. 24, 2017, 3 pages.
Notice of Allowance received for U.S. Appl. No. 10/179,775, dated Jul. 13, 2017, 11 pages.
Notice of Allowance received for U.S. Patent Application No. 11/770,718, dated Jan. 27, 2015, 10 pages, 10 pages.
Notice of Allowance received for U.S. Patent Application No. 12/789,436, dated Jan. 7, 2013, 9 pages.
Notice of Allowance received for U.S. Patent Application No. 12/843,814, dated Jun. 22, 2016, 13 pages.
Notice of Allowance received for U.S. Patent Application No. 12/890,482, dated May 8, 2014, 5 pages.
Notice of Allowance received for U.S. Patent Application No. 12/890,489, dated Jul. 27, 2015, 8 pages.
Notice of Allowance received for U.S. Patent Application No. 13/077,850, dated May 5, 2016, 15 pages.
Notice of Allowance received for U.S. Patent Application No. 13/077,855, dated Jan. 30, 2017, 7 pages.
Notice of Allowance received for U.S. Patent Application No. 13/077,862, dated Jun. 20, 2019, 9 pages.
Notice of Allowance received for U.S. Patent Application No. 13/077,862, dated Sep. 20, 2019, 2 pages.
Notice of Allowance received for U.S. Patent Application No. 13/077,867, dated Mar. 12, 2014, 7 pages.
Notice of Allowance received for U.S. Patent Application No. 13/077,867, dated Sep. 18, 2013, 8 pages.
Notice of Allowance received for U.S. Patent Application No. 13/077,874, dated Nov. 22, 2016, 13 pages.
Notice of Allowance received for U.S. Patent Application No. 13/248,872, dated Dec. 4, 2014, 7 pages.
Notice of Allowance received for U.S. Patent Application No. 13/248,882, dated Mar. 13, 2014, 16 pages.
Notice of Allowance received for U.S. Patent Application No. 13/333,909, dated Mar. 31, 2014, 20 pages.
Notice of Allowance received for U.S. Patent Application No. 13/489,415, dated Nov. 17, 2015, 12 pages.
Notice of Allowance received for U.S. Patent Application No. 13/489,415, dated Oct. 22, 2015, 15 pages.
Notice of Allowance received for U.S. Patent Application No. 13/492,057, dated Jan. 3, 2017, 5 pages.
Notice of Allowance received for U.S. Appl. No. 13/492,057, dated May 18, 2017, 3 pages.
Notice of Allowance received for U.S. Appl. No. 14/285,378, dated May 19, 2016, 10 pages.
Notice of Allowance received for U.S. Appl. No. 14/456,852, dated Jul. 31, 2015, 8 pages.
Notice of Allowance received for U.S. Appl. No. 14/503,327, dated Mar. 22, 2018, 5 pages.
Notice of Allowance received for U.S. Appl. No. 14/503,327, dated Nov. 30, 2017, 5 pages.
Notice of Allowance received for U.S. Appl. No. 14/642,366, dated Jan. 14, 2016, 8 pages.
Notice of Allowance received for U.S. Appl. No. 14/719,217, dated Feb. 13, 2019, 13 pages.
Notice of Allowance received for U.S. Appl. No. 15/005,945, dated Aug. 12, 2016, 9 pages.
Notice of Allowance received for U.S. Appl. No. 15/134,638, dated Apr. 10, 2018, 7 pages.

(56) References Cited

OTHER PUBLICATIONS

Notice of Allowance received for U.S. Appl. No. 15/134,638, dated Jul. 27, 2018, 7 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/348,204, dated Mar. 14, 2019, 11 pages.
Notice of Allowance received for U.S. Appl. No. 15/433,320, dated Apr. 1, 2021, 19 pages.
Notice of Allowance received for U.S. Appl. No. 15/608,866, dated Feb. 28, 2020, 2 pages.
Notice of Allowance received for U.S. Appl. No. 15/845,794, dated Feb. 14, 2019, 6 pages.
Notice of Allowance received for U.S. Appl. No. 15/910,263, dated Feb. 18, 2021, 3 pages.
Notice of Allowance received for U.S. Appl. No. 15/910,263, dated Jan. 22, 2021, 33 pages.
Notice of Allowance received for U.S. Appl. No. 15/945,610, dated May 20, 2019, 7 pages.
Notice of Allowance received for U.S. Appl. No. 15/952,736, dated Sep. 11, 2018, 16 pages.
Notice of Allowance received for U.S. Appl. No. 16/131,767, dated Sep. 6, 2019, 7 pages.
Notice of Allowance received for U.S. Appl. No. 16/229,959, dated Dec. 4, 2019, 6 pages.
Notice of Allowance received for U.S. Appl. No. 16/422,736, dated Apr. 20, 2021, 12 pages.
Notice of Allowance received for U.S. Appl. No. 16/422,736, dated Jun. 15, 2021, 13 pages.
Notice of Allowance received for U.S. Appl. No. 16/434,865, dated Apr. 7, 2020, 5 pages.
Notice of Allowance received for U.S. Appl. No. 16/507,664, dated Oct. 15, 2020, 11 pages.
Notice of Allowance received for U.S. Appl. No. 16/583,989, dated Apr. 1, 2021, 5 pages.
Notice of Allowance received for U.S. Appl. No. 16/583,989, dated Dec. 24, 2020, 7 pages.
Notice of Allowance received for U.S. Appl. No. 16/584,490, dated Aug. 27, 2020, 13 pages.
Notice of Allowance received for U.S. Appl. No. 16/584,490, dated Mar. 2021, 13 pages.
Notice of Allowance received for U.S. Appl. No. 16/670,949, dated May 2021, 7 pages.
Notice of Allowance received for U.S. Appl. No. 16/670,949, dated Sep. 14, 2021, 7 pages.
Notice of Allowance received for U.S. Appl. No. 16/807,604, dated Apr. 30, 2021, 25 pages.
Notice of Allowance received for U.S. Appl. No. 16/836,571, dated Feb. 14, 2022, 31 pages.
Notice of Allowance received for U.S. Appl. No. 16/836,571, dated Sep. 8, 2021, 25 pages.
Notice of Allowance received for U.S. Appl. No. 16/859,101, dated Jan. 18, 2022, 10 pages.
Notice of Allowance received for U.S. Appl. No. 16/888,775, dated Jan. 12, 2022, 5 pages.
Notice of Allowance received for U.S. Appl. No. 16/888,775, dated Jul. 26, 2021, 5 pages.
Notice of Allowance received for U.S. Appl. No. 16/888,775, dated Jun. 3, 2021, 11 pages.
Notice of Allowance received for U.S. Appl. No. 16/922,675, dated Feb. 10, 2022, 8 pages.
Notice of Allowance received for U.S. Appl. No. 16/922,675, dated Jan. 21, 2021, 7 pages.
Notice of Allowance received for U.S. Appl. No. 16/922,675, dated Sep. 27, 2021, 10 pages.
Notice of Allowance received for U.S. Appl. No. 16/987,003, dated Aug. 18, 2021, 9 pages.
Notice of Allowance received for U.S. Appl. No. 17/031,700, dated Oct. 14, 2021, 11 pages.
Notice of Allowance received for U.S. Appl. No. 17/031,833, dated Jun. 25, 2021, 15 pages.
Notice of Allowance received for U.S. Appl. No. 17/031,833, dated Sep. 20, 2021, 6 pages.
Notice of Allowance received for U.S. Appl. No. 15/608,866, dated Dec. 18, 2019, 9 pages.
Office Action received for Australian Patent Application No. 2010339636, dated Jun. 19, 2013, 3 pages.
Office Action received for Australian Patent Application No. 2012209199, dated Jan. 15, 2015, 3 pages.
Office Action received for Australian Patent Application No. 2012268312, dated Feb. 16, 2015, 3 pages.
Office Action received for Australian Patent Application No. 2015302298, dated Apr. 4, 2018, 3 pages.
Office Action received for Australian Patent Application No. 2015302298, dated Jul. 20, 2018, 3 pages.
Office Action received for Australian Patent Application No. 2015302298, dated Sep. 14, 2017, 3 pages.
Office Action received for Australian Patent Application No. 2015302298, dated Sep. 4, 2018, 5 pages.
Office Action received for Australian Patent Application No. 2016202837, dated Jan. 10, 2017, 2 pages.
Office Action received for Australian Patent Application No. 2016203250, dated May 26, 2017, 2 pages.
Office Action received for Australian Patent Application No. 2017100553, dated Aug. 4, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017266867, dated Dec. 6, 2018, 3 pages.
Office Action received for Australian Patent Application No. 2017284013, dated Mar. 19, 2020, 3 pages.
Office Action received for Australian Patent Application No. 2018101014, dated Jan. 18, 2019, 5 pages.
Office Action received for Australian Patent Application No. 2018101014, dated Sep. 19, 2018, 4 pages.
Office Action received for Australian Patent Application No. 2018204028, dated Apr. 17, 2019, 2 pages.
Office Action received for Australian Patent Application No. 2018229544, dated Nov. 15, 2019, 4 pages.
Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action received for Australian Patent Application No. 2019203473, dated Oct. 25, 2019, 2 pages.
Office Action received for Australian Patent Application No. 2019268111, dated Oct. 27, 2020, 7 pages.
Office Action received for Australian Patent Application No. 2020207785, dated Dec. 14, 2021, 5 pages.
Office Action received for Australian Patent Application No. 2020207785, dated Jul. 13, 2021, 3 pages.
Office Action received for Australian Patent Application No. 2020273355, dated Jul. 6, 2021, 3 pages.
Office Action received for Australian Patent Application No. 2020273355, dated Nov. 23, 2021, 6 pages.
Office Action received for Australian Patent Application No. 2020282362, dated Nov. 25, 2021, 3 pages.
Office Action received for Australian Patent Application No. 2021204454, dated Aug. 9, 2021, 7 pages.
Office Action received for Chinese Patent Application No. 201080064125.0, dated Jun. 10, 2014, 8 pages (Official Copy only). See communication under 37 CFR § 1.98(a) (3).

(56) References Cited

OTHER PUBLICATIONS

Office Action received for Chinese Patent Application No. 201080064125.0, dated Mar. 11, 2015, 7 pages (2 pages of English Translation and 5 pages of Official Copy).
Office Action Received for Chinese Patent Application No. 201280006317.5, dated Jan. 11, 2016, 10 pages (5 pages of English Translation and 5 pages of official Copy).
Office Action received for Chinese Patent Application No. 201280006317.5, dated Jul. 11, 2016, 6 pages (1 page of English Translation and 5 pages of Official Copy).
Office Action received for Chinese Patent Application No. 2012800272819, dated Jan. 4, 2016, 9 pages (English Translation only).
Office Action received for Chinese Patent Application No. 2012800272819, dated Sep. 21, 2016, 12 pages (4 pages of English Translation and 8 pages of Official Copy).
Office Action received for Chinese Patent Application No. 201580028491.3, dated Oct. 8, 2018, 9 pages (3 pages of English Translation and 6 pages of Official Copy).
Office Action received for Chinese Patent Application No. 201580043701.6, dated Dec. 24, 2018, 20 pages (5 pages of English Translation and 15 pages of Official copy).
Office Action received for Chinese Patent Application No. 201580043701.6, dated May 8, 2021, 10 pages (1 page of English Translation and 9 pages of Official Copy).
Office Action received for Chinese Patent Application No. 201580043701.6, dated Nov. 4, 2019, 20 pages (6 pages of English Translation and 14 pages of Official Copy).
Office Action received for Chinese Patent Application No. 201580043701.6, dated Oct. 12, 2020, 22 pages (5 pages of English Translation and 17 pages of Official Copy).
Office Action received for Chinese Patent Application No. 201580043701.6, dated Sep. 10, 2021, 10 pages (5 pages of English Translation and 5 pages of Official Copy).
Office Action received for Chinese Patent Application No. 201710240907.9, dated Jun. 5, 2019, 10 pages (5 pages of English Translation and 5 pages of Official Copy).
Office Action received for Chinese Patent Application No. 201710734839.1, dated Apr. 14, 2020, 20 pages (11 pages of English Translation and 9 pages of Official Copy).
Office Action received for Chinese Patent Application No. 201710734839.1, dated Aug. 24, 2020, 6 pages (3 pages of English Translation and 3 pages of Official Copy).
Office Action received for Chinese Patent Application No. 201711292804.3, dated Aug. 5, 2020, 26 pages (16 pages of English Translation and 10 pages of Official Copy).
Office Action received for Chinese Patent Application No. 201711292804.3, dated Feb. 23, 2021, 17 pages (8 pages of English Translation and 9 pages of Official Copy).
Office Action received for Chinese Patent Application No. 201711292804.3, dated Sep. 10, 2021, 19 pages (8 pages of English Translation and 11 pages of Official Copy).
Office Action received for Chinese Patent Application No. 201780002398.4, dated Feb. 27, 2019, 6 pages (3 pages of English Translation and 3 pages of Official Copy).
Office Action received for Chinese Patent Application No. 201780002398.4, dated Sep. 12, 2018, 17 pages (5 pages of English Translation and 12 pages of Official Copy).
Office Action received for Chinese Patent Application No. 201780033771.2, dated Jul. 15, 2020, 18 pages (9 pages of English Translation and 9 pages of Official Copy).
Office Action received for Chinese Patent Application No. 201780033899.9, dated Sep. 3, 2021, 12 pages (6 pages of English Translation and 6 pages of Official Copy).
Office Action received for Chinese Patent Application No. 201810338038.8, dated Jan. 21, 2020, 26 pages (13 pages of English Translation and 13 pages of Official Copy).
Office Action received for Chinese Patent Application No. 201810338038.8, dated May 14, 2019, 26 pages (13 pages of English Translation and 13 pages of Official Copy).
Office Action received for Chinese Patent Application No. 201810338040.5, dated Jun. 3, 2021, 25 pages (15 pages of English Translation and 10 pages of Official Copy).
Office Action received for Chinese Patent Application No. 201810338040.5, dated Oct. 25, 2021, 22 pages (13 pages of English Translation and 9 pages of Official Copy).
Office Action received for Chinese Patent Application No. 201810338826.7, dated Apr. 3, 2019, 21 pages (13 pages of English Translation and 8 pages of Official Copy).
Office Action received for Chinese Patent Application No. 201810338826.7, dated Jan. 16, 2020, 16 pages (10 pages of English Translation and 6 pages of Official Copy).
Office Action received for Chinese Patent Application No. 201810338826.7, dated Oct. 21, 2019, 19 pages (12 pages of English Translation and 7 pages of Official Copy).
Office Action received for Chinese Patent Application No. 201810339290.0, dated Jun. 4, 2021, 20 pages (11 pages of English Translation and 9 pages of Official Copy).
Office Action received for Chinese Patent Application No. 201810339290.0, dated Oct. 18, 2021, 20 pages (11 pages of English Translation and 9 pages of Official Copy).
Office Action received for Chinese Patent Application No. 201811460172.1, dated Jan. 21, 2020, 17 pages (8 pages of English Translation and 9 pages of Official Copy).
Office Action received for Chinese Patent Application No. 201811460172.1, dated Oct. 14, 2020, 7 pages (4 pages of English Translation and 3 pages of Official Copy).
Office Action received for Chinese Patent Application No. 201811539259.8, dated Apr. 3, 2020, 10 pages (6 pages of English Translation and 4 pages of Official Copy).
Office Action received for Chinese Patent Application No. 201811539259.8, dated Sep. 3, 2020, 10 pages (6 pages of English Translation and 4 pages of Official Copy).
Office Action received for Chinese Patent Application No. 201811539259.8, dated Sep. 18, 2019, 12 pages (6 pages of English Translation and 6 pages of Official Copy).
Office Action received for Chinese Patent Application No. 201811539260.0, dated Jun. 3, 2020, 8 pages (5 pages of English Translation and 3 pages of Official Copy).
Office Action received for Chinese Patent Application No. 201811539260.0, dated Nov. 4, 2020, 9 pages (5 pages of English Translation and 4 pages of Official Copy).
Office Action received for Chinese Patent Application No. 201811539260.0, dated Oct. 8, 2019, 14 pages (7 pages of English Translation and 7 pages of Official Copy).
Office Action received for Chinese Patent Application No. 201880001436.9, dated Apr. 28, 2019, 19 pages (11 pages of English Translation and 8 pages of Official copy).
Office Action received for Chinese Patent Application No. 201880001436.9, dated Nov. 6, 2019, 24 pages (15 pages of English Translation and 9 pages of Official Copy).
Office Action received for Chinese Patent Application No. 201910055588.3, dated Nov. 24, 2021, 24 pages (14 pages of English Translation and 10 pages of Official Copy).
Office Action received for Chinese Patent Application No. 201910475434.X, dated Dec. 4, 2019, 14 pages (8 pages of English Translation and 6 pages of Official Copy).
Office Action received for Chinese Patent Application No. 201910475434.X, dated Jun. 3, 2020, 9 pages (5 pages of English Translation and 4 pages of Official Copy).
Office Action received for Chinese Patent Application No. 201910475434.X, dated Oct. 30, 2020, 9 pages (5 pages of English Translation and 4 pages of Official Copy).
Office Action received for Chinese Patent Application No. 201911128105.4, dated Apr. 8, 2021, 10 pages (5 pages of English Translation and 5 pages of Official Copy).
Office Action received for Chinese Patent Application No. 201911128105.4, dated Jan. 4, 2021, 14 pages (7 pages of English Translation and 7 pages of Official Copy).
Office Action received for Chinese Patent Application No. 201911128105.4, dated Jul. 3, 2020, 18 pages (9 pages of English Translation and 9 pages of Official Copy).

(56) References Cited

OTHER PUBLICATIONS

Office Action received for Chinese Patent Application No. 202010125114.4, dated Aug. 21, 2020, 16 pages (8 pages of English Translation and 8 pages of Official Copy).
Office Action received for Chinese Patent Application No. 202010125114.4, dated Jun. 7, 2021, 7 pages (4 pages of English Translation and 3 pages of Official Copy).
Office Action received for Chinese Patent Application No. 202010125114.4, dated Mar. 1, 2021, 15 pages (9 pages of English Translation and 6 pages of Official Copy).
Office Action received for Chinese Patent Application No. 202110409273.1, dated Jan. 11, 2022, 11 pages (6 pages of English Translation and 5 pages of Official Copy).
Office Action received for Chinese Patent Application No. 201280027281.9, dated Mar. 2, 2017, 5 pages (2 pages of English Translation and 3 pages of Official Copy).
Office Action Received for Danish Patent Application No. PA201670622, dated Aug. 17, 2018, 4 pages.
Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770392, dated Apr. 17, 2018, 2 pages.
Office Action received for Danish Patent Application No. PA201770392, dated Dec. 8, 2017, 4 pages.
Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770406, dated Feb. 27, 2018, 7 pages.
Office Action received for Danish Patent Application No. PA201770406, dated Jan. 25, 2019, 8 pages.
Office Action received for Danish Patent Application No. PA201770406, dated Jun. 22, 2017, 11 pages.
Office Action received for Danish Patent Application No. PA201770406, dated Mar. 26, 2019, 3 pages.
Office Action received for Danish Patent Application No. PA201770406, dated Nov. 11, 2019, 4 pages.
Office Action received for Danish Patent Application No. PA201770408, dated Dec. 21, 2017, 6 pages.
Office Action received for Danish Patent Application No. PA201770408, dated Jun. 20, 2017, 9 pages.
Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for Danish Patent Application No. PA202070560, dated Dec. 11, 2020, 7 pages.
Office Action received for Danish Patent Application No. PA202070560, dated Mar. 10, 2021, 7 pages.
Office Action received for European Patent Application No. 10799259.6, dated Jun. 1, 2015, 9 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action received for European Patent Application No. 13171047.7, dated May 24, 2017, 7 pages.
Office Action received for European Patent Application No. 15719347.5, dated Apr. 9, 2020, 4 pages.
Office Action received for European Patent Application No. 15719347.5, dated Jun. 17, 2019, 4 pages.
Office Action received for European Patent Application No. 17799904.2, dated Oct. 21, 2020, 6 pages.
Office Action received for European Patent Application No. 17810737.1, dated Jan. 20, 2021, 6 pages.
Office Action received for European Patent Application No. 17813737.8, dated Apr. 16, 2021, 7 pages.
Office Action received for European Patent Application No. 18178147.7, dated Mar. 20, 2020, 4 pages.
Office Action received for European Patent Application No. 18197583.0, dated Feb. 28, 2020, 8 pages.
Office Action received for European Patent Application No. 18197589.7, dated Oct. 1, 2019, 5 pages.
Office Action received for European Patent Application No. 18208881.5, dated Jun. 11, 2019, 5 pages.
Office Action received for European Patent Application No. 18208881.5, dated May 7, 2021, 6 pages.
Office Action received for European Patent Application No. 18728002.9, dated Dec. 14, 2020, 15 pages.
Office Action received for European Patent Application No. 19150528.8, dated Jul. 1, 2020, 6 pages.
Office Action received for European Patent Application No. 19186538.5, dated Oct. 12, 2020, 7 pages.
Office Action received for European Patent Application No. 19186538.5, dated Oct. 22, 2021, 7 pages.
Office Action received for European Patent Application No. 19207753.5, dated May 10, 2021, 4 pages.
Office Action received for European Patent Application No. 19207753.5, dated Nov. 12, 2020, 5 pages.
Office Action received for European Patent Application No. 20158824.1, dated May 18, 2021, 10 pages.
Office Action received for European Patent Application No. 20195339.5, dated Jan. 20, 2022, 5 pages.

(56) References Cited

OTHER PUBLICATIONS

Office Action received for European Patent Application No. 12727053.6, dated Jul. 4, 2018, 5 pages.
Office Action Received for European Patent Application No. 127270536, dated Mar. 21, 2016, 6 pages.
Office Action received for Japanese Patent Application No. 2013-550664, dated Jun. 10, 2016, 3 pages (Official Copy only). See communication under 37 CFR § 1.98(a) (3).
Office Action received for Japanese Patent Application No. 2013-550664, dated Aug. 24, 2015, 9 pages (4 pages of English Translation and 5 pages of Official Copy).
Office Action received for Japanese Patent Application No. 2013-550664, dated Sep. 12, 2014, 10 pages (6 pages of English Translation and 4 pages of Official Copy).
Office Action received for Japanese Patent Application No. 2014-513804, dated Nov. 28, 2014, 7 pages (4 pages of English Translation and 3 pages of Official Copy).
Office Action received for Japanese Patent Application No. 2015-171114, dated Dec. 22, 2017, 16 pages (8 pages of English Translation and 8 pages of Official copy).
Office Action received for Japanese Patent Application No. 2015171114, dated May 19, 2017, 11 pages (6 pages of English Translation and 5 pages of Official Copy).
Office Action received for Japanese Patent Application No. 2015-171114, dated May 22, 2018, 11 pages (6 pages of English Translation and 5 pages of Official Copy).
Office Action received for Japanese Patent Application No. 2015171114, dated Sep. 5, 2016, 6 pages (3 pages of English Translation and 3 pages of Official Copy).
Office Action received for Japanese Patent Application No. 2017-075031, dated Jul. 30, 2018, 16 pages (8 pages of English Translation and 8 pages of Official Copy).
Office Action received for Japanese Patent Application No. 2017-507413, dated Feb. 22, 2019, 11 pages (5 pages of English Translation and 6 pages of Official Copy).
Office Action received for Japanese Patent Application No. 2017-507413, dated May 25, 2018, 14 pages (7 pages of English Translation and 7 pages of Official Copy).
Office Action received for Japanese Patent Application No. 2018-071908, dated Jan. 28, 2019, 11 pages (5 pages of English Translation and 6 pages of Official Copy).
Office Action received for Japanese Patent Application No. 2018-560107, dated Jun. 14, 2019, 26 pages (13 pages of English Translation and 13 pages of Official Copy).
Office Action received for Japanese Patent Application No. 2019-234184, dated Jan. 29, 2021, 6 pages (3 pages of English Translation and 3 pages of Official Copy).
Office Action received for Japanese Patent Application No. 2019-234184, dated Oct. 15, 2021, 8 pages (4 pages of English Translation and 4 pages of Official Copy).
Office Action received for Japanese Patent Application No. 2019-238894, dated Mar. 6, 2020, 7 pages (3 pages of English Translation and 4 pages of Official Copy).
Office Action received for Japanese Patent Application No. 2020-184605, dated Feb. 14, 2022, 24 pages (11 pages of English Translation and 13 pages of Official Copy).
Office Action received for Korean Patent Application No. 10-2012-7020548, dated Oct. 10, 2013, 5 pages (Official Copy only). See communication under 37 CFR § 1.98(a) (3).
Office Action received for Korean Patent Application No. 10-2013-7022057, dated May 28, 2014, 7 pages (3 pages of English Translation and 4 pages of Official Copy).
Office Action received for Korean Patent Application No. 10-2013-7034852, dated Apr. 26, 2016, 6 pages (3 pages of English Translation and 3 pages of Official copy).
Office Action received for Korean Patent Application No. 10-2013-7034852, dated Jul. 30, 2015, 6 pages (3 pages English Translation and 3 pages of Official Copy).

Office Action received for Korean Patent Application No. 10-2013-7034852, dated Nov. 19, 2014, 7 pages (3 pages of English Translation and 4 pages of Official copy).
Office Action received for Korean Patent Application No. 10-2014-7008348, dated Jan. 22, 2019, 16 pages (1 page of English Translation and 15 pages of Official Copy).
Office Action received for Korean Patent Application No. 10-2014-7033660, dateda Feb. 23, 2015, 3 pages (Official Copy only). See communication under 37 CFR § 1.98(a) (3).
Office Action received for Korean Patent Application No. 10-2015-7007065, dated Aug. 21, 2017, 5 pages (2 pages of English Translation and 3 pages of Official Copy).
Office Action received for Korean Patent Application No. 10-2015-7007065, dated Dec. 24, 2018, 9 pages (4 pages of English translation and 5 pages of Official Copy).
Office Action received for Korean Patent Application No. 10-2015-7007065, dated Feb. 28, 2018, 8 pages (4 page of English Translation and 4 pages of Official Copy).
Office Action received for Korean Patent Application No. 10-2015-7013849, dated Aug. 20, 2015, 5 pages (2 pages of English Translation and 3 pages of Official Copy).
Office Action received for Korean Patent Application No. 10-2015-7037047, dated Mar. 15, 2016, 11 pages (5 pages of English Translation and 6 pages of Official Copy).
Office Action received for Korean Patent Application No. 1020157037047, dated Nov. 29, 2016, 10 pages (5 pages of English translation and 5 pages of Official Copy).
Office Action received for Korean Patent Application No. 10-2016-7017508, dated Oct. 20, 2016, 5 pages (2 pages of English Translation and 3 pages of Official Copy).
Office Action received for Korean Patent Application No. 10-2016-7035555, dated Dec. 26, 2017, 5 pages (2 pages of English Translation and 3 pages of Official Copy).
Office Action received for Korean Patent Application No. 10-2016-7035555, dated Jul. 18, 2019, 9 pages (4 pages of English Translation and 5 pages of Official Copy).
Office Action received for Korean Patent Application No. 10-2016-7035555, dated Sep. 18, 2018, 9 pages (4 pages of English Translation and 5 pages of Official Copy).
Office Action received for Korean Patent Application No. 10-2017-7012145, dated Jul. 18, 2019, 5 pages (2 pages of English Translation and 3 Pages of Official Copy).
Office Action received for Korean Patent Application No. 10-2017-7012145, dated Sep. 13, 2018, 6 pages (3 pages of English Translation and 3 pages of Official Copy).
Office Action received for Korean Patent Application No. 10-2018-7033301, dated Dec. 14, 2018, 6 pages (2 pages of English Translation and 4 pages of Official Copy).
Office Action received for Korean Patent Application No. 10-2019-7014494, dated Jun. 14, 2019, 11 pages (5 pages of English Translation and 6 pages of Official Copy).
Office Action received for Korean Patent Application No. 10-2020-7002929, dated Mar. 22, 2020, 5 pages (2 pages of English Translation and 3 pages of Official Copy).
Office Action received for Taiwanese Patent Application No. 102120412, dated Feb. 25, 2015, 15 pages (6 pages of English Translation and 9 pages of Official Copy).
Office Action received for Taiwanese Patent Application No. 104114953, dated Feb. 18, 2017, 9 pages (4 pages of English Translation and 5 pages of Official copy).
Office Action received for Taiwanese Patent Application No. 104114953, dated Jun. 8, 2016, 11 pages (5 pages of English Translation and 6 pages of Official copy).
Office Action Report received for Australian Patent Application No. 2012209199, dated Dec. 17, 2015, 3 pages.
Partial European Search Report received for European Patent Application No. 20158824.1, dated May 8, 2020, 14 pages.
Partial European Search Report received for European Patent Application No. 18197583.0, dated Jan. 14, 2019, 18 pages
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.

(56) References Cited

OTHER PUBLICATIONS

Pogue David, "Windows Vista for Starters: The Missing Manual", available at <http://academic.safaribooksonline.com/book/operating-systems/0596528264>, Jan. 25, 2007, 18 pages.
Pu Fang, "Research on Location-aware Service in Pervasive Computing", Issue No. 7, Information Technology Series, China Doctoral Dissertations, Jul. 15, 2008, 140 pages (Official Copy only). See communication under 37 CFR § 1.98(a) (3).
Punchkick Interactive,"Punchkick hands-on review: Fitbit Surge", URL: https://www.youtube.com/watch?v=K2G7aebUYcA, Mar. 25, 2015, 3 pages.
Result of Consultation received for European Patent Application No. 18197583.0, dated Feb. 24, 2021, 3 pages.
Result of Consultation received for European Patent Application No. 18197589.7, dated Dec. 1, 2020, 9 pages.
Result of Consultation received for European Patent Application No. 18197589.7, dated Dec. 17, 2020, 6 pages.
Saitou Kazuo, "Web Site expert", vol. 32, Oct. 25, 2010, 8 pages (Official Copy Only). See communication under 37 CFR § 1.98(a) (3).
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870419, dated Aug. 27, 2018, 7 pages.
Search Report and Opinion received for Danish Patent Application No. PA201870419, dated Sep. 10, 2018, 9 pages.
Search Report and Opinion received for Danish Patent Application No. PA201870598, dated Dec. 5, 2018, 8 pages.
Search Report and Opinion received for Danish Patent Application No. PA202170320, dated Oct. 6, 2021, 9 pages.
Search Report received for Danish Patent Application No. PA201770404, dated Jun. 20, 2017, 8 pages.
Search Report received for Danish Patent Application No. PA201770409, dated Jun. 20, 2017, 9 pages.
Seifert Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.
Smarttricks, "Top 3 Music Player for Android", Available online at: <https://www.youtube.com/watch?v=He7RTn4CL34>, Feb. 22, 2017, 4 pages.
Smith Eddie, "The expert's guide to Instapaper", available online at "http://www.macworld.com/article/1166898/the_experts_guide_to_instapaper.html", May 23, 2012, 8 pages.
Sonos, "Sonos Controller App for iPad Product Guide", Available online at: https://www.sonos.com/documents/productguides/en/iPadGuide_EN.pdf, Nov. 2014, 47 pages.
Stroud Forrest, "Screen Lock Meaning & Definition", Online Available at: https://www.webopedia.com/definitions/screen-lock, Jan. 30, 2014, 3 pages.
Summons to Attend oral proceedings received for European Application No. 10799259.6, mailed on Aug. 2, 2016, 16 pages.
Summons to Attend Oral Proceedings received for European Patent Application 20158824.1, mailed on Dec. 7, 2021, 6 pages.
Summons to Attend Oral Proceedings received for European Patent Application No. 12770400.5, mailed on Mar. 19, 2018, 10 pages.
Summons to Attend Oral Proceedings received for European Patent Application No. 13171047.7, mailed on Jul. 9, 2018, 12 pages.
Summons to Attend Oral Proceedings received for European Patent Application No. 17799904.2, mailed on Dec. 20, 2021, 8 pages.
Summons to Attend Oral Proceedings received for European Patent Application No. 17813737.8, mailed on Jan. 4, 2022, 12 pages.
Summons to Attend Oral Proceedings received for European Patent Application No. 18178147.7, mailed on Jun. 28, 2021, 8 pages.
Summons to Attend Oral Proceedings received for European Patent Application No. 18197583.0, mailed on Aug. 14, 2020, 12 pages.
Summons to attend Oral proceedings received for European Patent Application No. 18197589.7, mailed on Apr. 9, 2020, 7 pages.
Supplemental Notice of Allowance received for U.S. Appl. No. 15/608,866, dated Feb. 20, 2020, 2 pages.
Supplemental Notice of Allowance received for U.S. Appl. No. 16/584,490, dated Apr. 13, 2021, 2 pages.
Supplemental Notice of Allowance received for U.S. Appl. No. 16/859,101, dated Feb. 7, 2022, 2 pages.
Trish's World, "Samsung Gear S3 Apps Launcher", Available Online at <https://www.youtube.com/watch?v=zlamYA-4XSQ>, Feb. 5, 2017, 1 page.
Wikipedia,"QR code", Available online at: https://en.wikipedia.org/w/index.php?title=QR_code&oldid=452939488, Sep. 28, 2011, pp. 1-9.
Wolfe Joanna, "Annotation Technologies: A Software and Research Review", Computers and Composition, vol. 19, No. 4, 2002, pp. 471-497.
Woolsey Amanda, "Apple Watch Tips—How to Add and Play Music", Available online at: <https://www.youtube.com/watch?v=E0QEugMaoi8>, Apr. 26, 2015, 3 pages.
Written Opinion received for PCT Patent Application No. PCT/US95/11025, dated Oct. 4, 1996, 6 pages.
Ziegler Chris, "Palm® Pre.TM. for Dummies®", For Dummies, Oct. 19, 2009, 9 pages.
Corrected Notice of Allowance received for U.S. Appl. No. 17/461,103, dated May 10, 2022, 2 pages.
Notice of Acceptance received for Australian Patent Application No. 2020207785, dated May 4, 2022, 3 pages.
Office Action received for Danish Patent Application No. PA202170320, dated May 3, 2022, 3 pages.
Notice of Allowance received for Chinese Patent Application No. 201810339290.0, dated Mar. 9, 2022, 2 pages (1 page of English Translation and 1 page of Official Copy).
Notice of Allowance received for Japanese Patent Application No. 2021-563716, dated Mar. 14, 2022, 4 pages (1 page of English Translation and 3 pages of Official Copy).
Notice of Allowance received for U.S. Appl. No. 17/461,103, dated Mar. 17, 2022, 10 pages.
Summons to Attend Oral Proceedings received for European Patent Application No. 19150528.8, dated Mar. 15, 2022, 7 pages.
Applicant Initiated Interview Summary received for U.S. Appl. No. 14/641,304, dated Dec. 2, 2019, 5 pages.
Applicant Initiated Interview Summary received for U.S. Appl. No. 14/641,304, dated Jul. 28, 2020, 5 pages.
Board Decision received for Chinese Patent Application No. 201510288981.9, mailed on May 6, 2021, 31 pages.
Board Opinion received for Chinese Patent Application No. 201510288981.9, dated Jan. 4, 2021, 21 pages.
Chan Christine, "Handoff Your Browser to Your 'Phone or iPad! Plus a Chance to Win a Copy!", Apr. 12, 2011, 2 pages.
Conn et al., "U.S. Appl. No. 62/005,751, filed May 30, 2014 titled "Predefined Wireless Pairing"", 38 pages.
Corrected Notice of Allowance received for U.S. Appl. No. 14/641,298, dated Dec. 9, 2021, 5 pages.
Decision on Appeal received for U.S. Appl. No. 14/641,298, mailed on Nov. 1, 2021, 9 pages.
Decision on Appeal received for U.S. Appl. No. 15/128,952, mailed on Dec. 28, 2020, 23 pages.
Decision to Grant received for European Patent Application No. 15711969.4, dated Sep. 26, 2019, 2 pages.

(56) References Cited

OTHER PUBLICATIONS

Decision to Grant received for European Patent Application No. 15713062.6, dated Apr. 11, 2019, 2 pages.
Decision to Grant received for European Patent Application No. 16710590.7, dated Oct. 28, 2021, 2 pages.
Decision to Grant received for German Patent Application No. 102015208532.5, dated Sep. 22, 2020, 10 pages.
Decision to Grant received for Japanese Patent Application No. 2019-124728, dated Apr. 2, 2021, 4 pages.
Dooley et al., "U.S. Appl. No. 62/005,755, filed May 30, 2014 titled "Operating-Mode Transitions Based on Advertising Information"", 29 pages.
Evaluation Report for Utility Model Patent received for Chinese Patent Application No. 201620051290.7, completed on Sep. 19, 2016, 11 pages.
Examiner's Answer to Appeal Brief received for U.S. Appl. No. 14/641,298, dated Mar. 22, 2021, 19 pages.
Examiner's Answer to Appeal Brief received for U.S. Appl. No. 15/128,952, dated Jan. 8, 2020, 9 pages.
Examiner's Initiated Interview Summary received for U.S. Appl. No. 14/641,298, dated Mar. 10, 2020, 4 pages.
Examiner's Pre-Review Report received for Japanese Patent Application No. 2018- 080122, dated Feb. 25, 2020, 6 pages.
Extended European Search Report received for European Patent Application No. 19203942.8, dated Apr. 1, 2020, 10 pages.
Final Office Action received for U.S. Appl. No. 14/641,289, dated Jul. 1, 2016, 32 pages.
Final Office Action received for U.S. Appl. No. 14/641,298, dated Jun. 26, 2020, 50 pages.
Final Office Action received for U.S. Appl. No. 14/641,298, dated May 16, 2019, 50 pages.
Final Office Action received for U.S. Appl. No. 14/641,298, dated Oct. 4, 2017, 30 pages.
Final Office Action received for U.S. Appl. No. 14/641,304, dated Jul. 24, 2018, 19 pages.
Final Office Action received for U.S. Appl. No. 14/641,304, datead Oct. 15, 2019, 21 pages.
Final Office Action received for U.S. Appl. No. 14/841,455, dated Nov. 6, 2018, 14 pages.
Final Office Action received for U.S. Appl. No. 15/128,952, dated Jul. 18, 2018, 19 pages.
Frakes Dan, "How to Get Started with Airplay", Available at: https://www.macworld.com/article/2039770/how-to-get-started-with-airplay.html, Macworld, May 27, 2013, 8 pages.
"G Pad, LG's latest Uls that shine even more on the G-Pad", Online available at: http://bungq.com/1014., Nov. 19, 2013, 49 pages.
Groom Gyeong-A, "LG G pad 8.3 reviews-Q pair connecting smartphone and tablet PC", Online Available at: https://m.blog.naver.com/PostView.nhn?blogId=feena74&logNo=140203710954&proxyReferer=https:%2F%2Fwww.google.com%2F, Dec. 30, 2013, 56 pages.
Intention to Grant received for European Patent Application No. 15711969.4, dated May 29, 2019, 11 pages.
Intention to Grant received for European Patent Application No. 15713062.6, dated Mar. 25, 2019, 7 pages.
Intention to Grant received for European Patent Application No. 15713062.6, dated Oct. 8, 2018, 8 pages.
Intention to Grant received for European Patent Application No. 16710590.7, dated Jun. 14, 2021, 8 pages.
International Preliminary Report on Patentability Received for PCT Patent Application No. PCT/US2015/019306, dated Dec. 15, 2016, 10 pages.
International Preliminary Report on Patentability Received for PCT Patent Application No. PCT/US2015/019309, dated Dec. 15, 2016, 10 pages.
International Preliminary Report on Patentability received for PCT Patent Application No. PCT/US2015/019317, dated Dec. 15, 2016, 18 pages.
International Preliminary Report on Patentability received for PCT Patent Application No. PCT/US2016/021012, dated Sep. 21, 2017, 11 pages.
International Search Report and Written Opinion received for PCT Application No. PCT/US2015/019309, dated Jun. 25, 2015, 15 pages.
International Search Report and Written Opinion received for PCT Patent Application No. PCT/US2015/019306, dated Jun. 17, 2015, 15 pages.
International Search Report and Written Opinion received for PCT Patent Application No. PCT/US2015/019317, dated Aug. 25, 2015, 24 pages.
International Search Report and Written Opinion received for PCT Patent Application No. PCT/US2016/021012, dated Jun. 2, 2016, 15 pages.
Invitation to Pay Additional Fees received for PCT Patent Application No. PCT/US2015/019317, dated May 22, 2015, 7 pages.
Kimura Ryoji, "Keynote presentation practice guide for iPad & iPhone", K.K. Rutles, first edition, Feb. 29, 2012, 4 pages.
"Kinect Gesture Commands—Kinect Voice Commands, Xbox Wire", Available Online at: <https://hwcdn.libsyn.com/p/4/4/c/44c89c7f273167b4/Xbox_One_Kinect_Voice_Gesture.pdf?c_id=6458139&cs_id=6458139&expiration=1555411736&hwt=fe78eb09654ea677c9fbf836ad2ed82b >, 2013, 2 pages.
Krochmal et al., "U.S. Appl. No. 62/005,793, filed May 30, 2014 titled "Companion Application for Activity Cooperation"", 88 pages.
lazion.com,"G Pad 8.3, Q Pair to become one with your smartphone", Online available at: https://lazion.com/2512682, Dec. 30, 2013, 24 pages.
"LG G Pad 8.3 Tablet Q Remote User", Available at: <https://mushroomprincess.tistory.com/1320>, Dec. 26, 2013, 37 pages.
Linn et al., "U.S. Appl. No. 62/005,781, filed May 30, 2014 titled "Activity Continuation between Electronic Devices"", 76 pages.
Minutes of Oral Hearing received for German Patent Application No. 102015208532.5, mailed on Dec. 13, 2019, 21 pages.
Minutes of the Oral Proceedings received for European Application No. 15711969.4, mailed on May 16, 2019, 7 pages.
Non-Final Office Action received for U.S. Appl. No. 14/641,289, dated Jul. 16, 2015, 31 page.
Non-Final Office Action received for U.S. Appl. No. 14/641,289, dated Mar. 11, 2016, 26 pages.
Non-Final Office Action received for U.S. Appl. No. 14/841,455, dated Apr. 25, 2018, 13 pages.
Non-Final Office Action received for U.S. Appl. No. 14/641,298, dated Mar. 6, 2017, 26 pages.
Non-Final Office Action received for U.S. Appl. No. 14/641,298, dated Nov. 29, 2019, 47 pages.
Non-Final Office Action received for U.S. Appl. No. 14/641,298, dated Sep. 19, 2018, 41 pages.
Non-Final Office Action received for U.S. Appl. No. 14/641,304, dated Feb. 27, 2019, 18 pages.
Non-Final Office Action received for U.S. Appl. No. 14/641,304, dated Mar. 4, 2020, 21 pages.
Non-Final Office Action received for U.S. Appl. No. 14/641,304, dated Sep. 11, 2017, 18 pages.
Non-Final Office Action received for U.S. Appl. No. 15/128,952, dated Apr. 1, 2019, 20 pages.
Non-Final Office Action received for U.S. Appl. No. 15/128,952, dated Dec. 29, 2017, 13 pages.
Non-Final Office Action received for U.S. Appl. No. 14/841,455, dated Apr. 11, 2019, 13 pages.
Notice of Acceptance received for Australian Patent Application No. 2015201884, dated Oct. 4, 2016, 3 pages.
Notice of Acceptance received for Australian Patent Application No. 2015267671, dated Apr. 4, 2018, 3 pages.
Notice of Acceptance received for Australian Patent Application No. 2016230001, dated May 25, 2018, 3 pages.
Notice of Acceptance received for Australian Patent Application No. 2018202751, dated Sep. 4, 2019, 3 pages.
Notice of Acceptance received for Australian Patent Application No. 2018220115, dated Jun. 29, 2020, 3 pages.
Notice of Allowance received for Chinese Patent Application No. 201580028505.1, dated Sep. 19, 2019, 2 pages.

(56) References Cited

OTHER PUBLICATIONS

Notice of Allowance received for Chinese Patent Application No. 201620051290.7, dated Jun. 22, 2016, 2 pages.
Notice of Allowance received for Chinese Patent Application No. 201680011682.3, dated Aug. 5, 2020, 2 pages.
Notice of Allowance received for Chinese Patent Application no. 201520364847.8, dated Nov. 5, 2015, 9 pages.
Notice of Allowance received for Japanese Patent Application No. 2015-095183, dated Apr. 21, 2017, 3 pages.
Notice of Allowance received for Japanese Patent Application No. 2016-569669, dated Mar. 19, 2018, 4 pages.
Notice of Allowance received for Japanese Patent Application No. 2017-101107, dated Jun. 3, 2019, 5 pages.
Notice of Allowance received for Japanese Patent Application No. 2017-543762, dated Mar. 30, 2020, 4 pages.
Notice of Allowance received for Japanese Patent Application No. 2018-080122, dated May 7, 2021, 28 pages.
Notice of Allowance received for Korean Patent Application No. 10-2015-0072162, dated Dec. 27, 2017, 4 pages.
Notice of Allowance received for Korean Patent Application No. 10-2016-7032902, dated Sep. 7, 2018, 3 pages.
Notice of Allowance received for Korean Patent Application No. 10-2017-7022905, dated Jul. 31, 2019, 4 pages.
Notice of Allowance received for Korean Patent Application No. 10-2018-0035949, dated Nov. 28, 2019, 3 pages.
Notice of Allowance received for Korean Patent Application No. 10-2018-7035747, dated Dec. 9, 2020, 5 pages.
Notice of Allowance received for Korean Patent Application No. 10-2020-0024632, dated Jul. 26, 2021, 3 pages.
Notice of Allowance received for Taiwanese Patent Application No. 104108223, dated Jan. 10, 2017, 3 pages.
Notice of Allowance Received for Taiwanese Patent Application No. 104117041, dated Feb. 24, 2017, 3 pages.
Notice of Allowance received for Taiwanese Patent Application No. 106144804, dated Jun. 27, 2018, 6 pages.
Notice of Allowance received for Taiwanese Patent Application No. 104117041, dated Nov. 17, 2017, 5 pages.
Notice of Allowance received for U.S. Appl. No. 14/641,289, dated Aug. 24, 2017, 6 pages.
Notice of Allowance received for U.S. Appl. No. 14/641,289, dated Dec. 12, 2017, 5 pages.
Notice of Allowance received for U.S. Appl. No. 14/641,298, dated Nov. 29, 2021, 8 pages.
Notice of Allowance received for U.S. Appl. No. 14/641,304, dated Sep. 9, 2020, 15 pages.
Notice of Allowance received for U.S. Appl. No. 14/841,455, dated Oct. 22, 2019, 10 pages.
Office Action received for Australian Patent Application No. 2016230001, dated Feb. 7, 2018, 3 pages.
Office Action received for European Patent Application No. 15711969.4, dated Nov. 17, 2017, 9 pages.
Office Action received for Australian Patent Application No. 2015201884, dated Oct. 12, 2015, 4 pages.
Office Action received for Australian Patent Application No. 2015100490, dated Jun. 9, 2015, 6 pages.
Office Action received for Australian Patent Application No. 2015100490, dated Dec. 15, 2016, 2 pages.
Office Action received for Australian Patent Application No. 2015267671, dated Apr. 5, 2017, 2 pages.
Office Action received for Australian Patent Application No. 2016266010, dated Aug. 23, 2018, 4 pages.
Office Action received for Australian Patent Application No. 2016266010, dated May 4, 2018, 4 pages.
Office Action received for Australian Patent Application No. 2016266010, dated Nov. 28, 2018, 5 pages.
Office Action received for Australian Patent Application No. 2016266010, dated Nov. 30, 2017, 5 pages.
Office Action received for Australian Patent Application No. 2018202751, dated Apr. 2, 2019, 4 pages.
Office Action received for Australian Patent Application No. 2018220115, dated Apr. 21, 2020, 3 pages.
Office Action received for Australian Patent Application No. 2018220115, dated Oct. 4, 2019, 3 pages.
Office Action received for Australian Patent Application No. 2018271366, dated Feb. 25, 2020, 5 pages.
Office Action received for Australian Patent Application No. 2018271366, dated Jan. 19, 2021, 5 pages.
Office Action received for Australian Patent Application No. 2018271366, dated Oct. 26, 2020, 5 pages.
Office Action received for Chinese Patent Application No. 201510288981.9, dated Jul. 1, 2019, 16 pages.
Office Action received for Chinese Patent Application No. 201510288981.9, dated Jul. 3, 2018, 19 pages.
Office Action received for Chinese Patent Application No. 201510288981.9, dated Mar. 6, 2019, 20 pages.
Office Action received for Chinese Patent Application No. 201580028505.1, dated Jan. 16, 2019, 15 pages.
Office Action received for Chinese Patent Application No. 201580028505.1, dated Jun. 20, 2019, 7 pages.
Office Action received for Chinese Patent Application No. 201680011682.3, dated Dec. 2, 2019, 14 pages.
Office Action received for Danish Patent Application No. PA201570256, dated Jul. 7, 2015, 2 pages.
Office Action received for Danish Patent Application No. PA201570256, dated Mar. 17, 2016, 5 pages.
Office Action received for Danish Patent Application No. PA201570256, dated May 23, 2017, 3 pages.
Office Action received for Danish Patent Application No. PA201570256, dated Oct. 10, 2016, 3 pages.
Office Action received for European Patent Application No. 15713062.6, dated Dec. 6, 2017, 7 pages.
Office Action received for European Patent Application No. 15714698.6, dated Oct. 13, 2021, 2 pages.
Office Action received for European Patent Application No. 16710590.7, dated Mar. 15, 2019, 10 pages.
Office Action received for European Patent Application No. 19203942.8, dated Oct. 29, 2021, 6 pages.
Office Action received for German Patent Application No. 102015208532.5, dated Apr. 1, 2019, 20 pages.
Office Action received for German Patent Application No. 102015208532.5, dated Apr. 21, 2020, 3 pages.
Office Action received for German Patent Application No. 102015208532.5, dated Aug. 21, 2019, 15 pages.
Office Action received for Hong Kong Patent Application No. 151051633, dated Jun. 5, 2015, 11 pages.
Office Action received for Japanese Patent Application No. 2015095183, dated Jun. 3, 2016, 13 pages.
Office Action received for Japanese Patent Application No. 2017-101107, dated Sep. 7, 2018, 14 pages.
Office Action received for Japanese Patent Application No. 2017-543762, dated Apr. 2019, 5 pages.
Office Action received for Japanese Patent Application No. 2017-543762, dated Jul. 2018, 8 pages.
Office Action received for Japanese Patent Application No. 2018-080122, dated Aug. 9, 2019, 5 pages.
Office Action received for Japanese Patent Application No. 2018-080122, dated Jan. 28, 2019, 11 pages.
Office Action received for Japanese Patent Application No. 2018-080122, dated Nov. 27, 2020, 16 pages.
Office Action received for Japanese Patent Application No. 2019-124728, dated Dec. 14, 2020, 4 pages.
Office Action received for Japanese Patent Application No. 2019-124728, dated Sep. 18, 2020, 6 pages.
Office Action received for Korean Patent Application No. 10-2015-0072162, dated Apr. 20, 2016, 11 pages.
Office Action received for Korean Patent Application No. 10-2015-0072162, dated Feb. 27, 2017, 12 pages.
Office Action received for Korean Patent Application No. 10-2017-7022905, dated Oct. 22, 2018, 9 pages.
Office Action received for Korean Patent Application No. 10-2018-0035949, dated Apr. 24, 2019, 9 pages.

(56) References Cited

OTHER PUBLICATIONS

Office Action received for Korean Patent Application No. 10-2018-0035949, dated Dec. 24, 2018, 7 pages.
Office Action received for Korean Patent Application No. 10-2018-0035949, dated Jun. 20, 2018, 9 pages.
Office Action received for Korean Patent Application No. 10-2018-7035747, dated Apr. 9, 2020, 11 pages.
Office Action received for Korean Patent Application No. 10-2018-7035747, dated Oct. 14, 2020, 6 pages.
Office Action received for Korean Patent Application No. 10-2020-0024632, dated Dec. 29, 2020, 11 pages.
Office Action received for Korean Patent Application No. 10-2020-0024632, dated May 18, 2020, 11 pages.
Office Action received for Taiwanese Patent Application No. 104108223, dated Apr. 25, 2016, 10 pages.
Office Action Received for Taiwanese Patent Application No. 104117041, dated Aug. 22, 2016, 6 pages.
Office Action received for Taiwanese Patent Application No. 104117042, dated Apr. 20, 2017, 18 pages.
"Q Pair, When I connected to LG G Pad 8.3 Q pair G Flex-G Pad 8.3 review, Posting of a blog", Online Available at: <http://www.leaderyou.co.kr/2595>, Dec. 7, 2013, 28 pages.
"Q Pair", Online available at: http://mongri.net/entry/G-Pad-83-Qpair, Retrieved on Mar. 6, 2017, Dec. 20, 2013, 22 pages.
Record of Oral Hearing received for U.S. Appl. No. 14/641,298, mailed on Oct. 8, 2021, 17 pages.
Result of Consultation received for European Patent Application No. 16710590.7, dated Dec. 7, 2020, 4 pages.
Search Report received for Netherlands Patent Application No. 2014737, dated Oct. 29, 2015, 9 pages.
Shankland Stephen, "Chrome OS Gets 'OK Google' Voice Search Control", available online at <http://www.cnet.com/news/chrome-os-gets-ok-google-voice-search-control/>, May 21, 2014, 4 pages.
Summons to Attend Oral Proceedings received for European Patent Application No. 15711969.4, dated Oct. 22, 2018, 12 pages.
Vanhemert Kyle, "Why Siri Could Be the Killer App for Smartwatches", XP002798416, Retrieved from the Internet: URL: https://www.wired.com/2013/12/what-can-a-smartwatch-really-do/, Dec. 19, 2013, 14 pages.
Yang et al., "U.S. Appl. No. 62/004,886, filed May 29, 2014, titled "User Interface for Payments"", 198 pages.
Applicant-Initiated Interview Summary received for U.S. Appl. No. 17/181,089, dated Oct. 7, 2022, 4 pages.
Decision to Refuse received for European Patent Application No. 17813737.8, dated Sep. 30, 2022, 5 pages.
Non-Final Office Action received for U.S. Appl. No. 15/784,806, dated Oct. 5, 2022, 41 pages.
Notice of Allowance received for U.S. Appl. No. 16/888,775, dated Oct. 19, 2022, 6 pages.
Brief Communication Regarding Oral Proceedings received for European Patent Application No. 18728002.9, dated Dec. 7, 2022, 1 page.
Brief Communication Regarding Oral Proceedings received for European Patent Application No. 18728002.9, dated Nov. 28, 2022, 7 pages.
Extended European Search Report received for European Patent Application No. 22198071.7, dated Dec. 5, 2022, 8 pages.
International Search Report and Written Opinion received for PCT Patent Application No. PCT/US2022/031252, dated Oct. 7, 2022, 18 pages.
Non-Final Office Action received for U.S. Appl. No. 17/483,679, dated Dec. 9, 2022, 31 pages.
Notice of Allowance received for U.S. Appl. No. 16/922,675, dated Dec. 8, 2022, 9 pages.
Office Action received for Australian Patent Application No. 2021201243, dated Dec. 12, 2022, 3 pages.
Result of Consultation received for European Patent Application No. 18208881.5, dated Dec. 6, 2022, 10 pages.
Cohn Emily, "Sonos Just Fixed the Most Annoying Thing About Its iPhone App", online available at: https://www.businessinsider.com/sonos-mobile-app-works-on-lock-screen-2016-6,, Jun. 27, 2016, 2 pages.
Fingas Jon, "Sonos Puts Speaker Controls on Your iPhone's Lock Screen", online available at https://www.engadget.com/2016-06-21-sonos-ios-lock-screen-controls.html, Jun. 21, 2016, 3 pages.
Kazmucha Allyson, "Sonos Controller App for iPhone and i Pad Review", online available at https://www.imore.com/sonos-controller-app-iphone-and-ipad-review, Mar. 1, 2018, 4 pages.
Corrected Notice of Allowance received for U.S. Appl. No. 16/922,675, dated Jan. 20, 2023, 3 pages.
Non-Final Office Action received for U.S. Appl. No. 17/483,542, dated Jan. 31, 2023, 14 pages.
Notice of Allowance received for Korean Patent Application No. 10-2022-7006175, dated Jan. 12, 2023, 7 pages (2 pages of English Translation and 5 pages of Official Copy).
Advisory Action received for U.S. Appl. No. 17/181,089, dated Dec. 20, 2022, 4 pages.
Decision to Grant received for European Patent Application No. 20158824.1, dated Dec. 15, 2022, 3 pages.
Decision to Refuse received for European Patent Application No. 18208881.5, dated Dec. 23, 2022, 12 pages.
Invitation to Pay Search Fees received for European Patent Application No. 15714698.6, dated Dec. 16, 2022, 4 pages.
Minutes of Oral Proceedings received for European Patent Application No. 18208881.5, mailed on Dec. 22, 2022, 4 pages.
Minutes of Oral Proceedings received for European Patent Application No. 18728002.9, mailed on Dec. 22, 2022, 7 pages.
Non-Final Office Action received for U.S. Appl. No. 17/320,900, dated Dec. 22, 2022, 30 pages.
Notice of Acceptance received for Australian Patent Application No. 2022200515, dated Dec. 21, 2022, 3 pages.
Office Action received for Australian Patent Application No. 2022200901, dated Dec. 19, 2022, 4 pages.
Office Action received for Danish Patent Application No. PA202270464, dated Dec. 20, 2022, 3 pages.
Office Action received for Japanese Patent Application No. 2020-184605, dated Dec. 12, 2022. 9 pages (4 pages of English Translation and 5 pages of Official Copy).
Office Action received for Korean Patent Application No. 10-2022-0053111, dated Dec. 12, 2022, 9 pages (4 pages of English Translation and 5 pages of Official Copy).
Applicant-Initiated Interview Summary received for U.S. Appl. No. 17/181,089, dated Nov. 22, 2022, 3 pages.
Applicant-Initiated Interview Summary received for U.S. Appl. No. 17/483,542, dated Nov. 23, 2022, 4 pages.
Decision to Grant received for Danish Patent Application No. PA202170320, dated Nov. 10, 2022, 2 pages.
Final Office Action received for U.S. Appl. No. 15/784,806, dated Nov. 25, 2022, 52 pages.
International Search Report and Written Opinion received for PCT Patent Application No. PCT/US2022/029580, dated Nov. 7, 2022, 20 pages.
Invitation to Pay Additional Fees and Partial International Search Report received for PCT Patent Application No. PCT/US2022/029580, dated Sep. 5, 2022, 13 pages.
Non-Final Office Action received for U.S. Appl. No. 17/483,564, dated Nov. 28, 2022, 24 pages.
Office Action received for Australian Patent Application No. 2022241590, dated Nov. 18, 2022, 8 pages.
Decision on Opposition received for Australian Patent Application No. 2018271366, dated Mar. 3, 2023, 3 pages.
Intention to Grant received for Danish Patent Application No. PA202270464, dated Feb. 20, 2023, 2 pages.
Non-Final Office Action received for U.S. Appl. No. 17/181,089, dated Feb. 17, 2023, 14 pages.
Non-Final Office Action received for U.S. Appl. No. 17/479,974, dated Feb. 22, 2023, 30 pages.
Non-Final Office Action received for U.S. Appl. No. 17/747,804, dated Mar. 1, 2023, 14 pages.
Non-Final Office Action received for U.S. Appl. No. 17/752,582, dated Mar. 6, 2023, 17 pages.

(56) References Cited

OTHER PUBLICATIONS

Non-Final Office Action received for U.S. Appl. No. 17/867,317, dated Feb. 28, 2023, 18 pages.
Notice of Acceptance received for Australian Patent Application No. 2021201243, dated Feb. 23, 2023, 3 pages.
Notice of Acceptance received for Australian Patent Application No. 2022200901, dated Mar. 9, 2023, 3 pages.
Notice of Allowance received for U.S. Appl. No. 16/888,775, dated Feb. 21, 2023, 5 pages.
Notice of Allowance received for U.S. Appl. No. 17/519,025, dated Mar. 2, 2023, 8 pages.
Office Action received for European Patent Application No. 20760624.5, dated Mar. 7, 2023, 13 pages.
Office Action received for European Patent Application No. 21166718.3, dated Feb. 20, 2023, 7 pages.
Supplemental Notice of Allowance received for U.S. Appl. No. 16/888,775, dated Mar. 1, 2023, 2 pages.
Philips Support Website, "How to switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.
Extended European Search Report received for European Patent Application No. 22188377.0, dated Oct. 27, 2022, 8 pages.
Final Office Action received for U.S. Appl. No. 17/181,089, dated Oct. 21, 2022, 15 pages.
International Search Report and Written Opinion received for PCT Patent Application No. PCT/US2022/029261, dated Oct. 20, 2022, 18 pages.
Notice of Allowance received for U.S. Appl. No. 16/679,967, dated Nov. 2, 2022, 7 pages.
Office Action received for Danish Patent Application No. PA202270464, dated Oct. 25, 2022, 9 pages.
Applicant-Initiated Interview Summary received for U.S. Appl. No. 17/479,974, dated Apr. 4, 2023, 2 pages.
Applicant-Initiated Interview Summary received for U.S. Appl. No. 17/747,804, dated Mar. 17, 2023, 4 pages.
Non-Final Office Action received for U.S. Appl. No. 17/835,110, dated Apr. 3, 2023, 28 pages.
Non-Final Office Action received for U.S. Appl. No. 18/077,971, dated Apr. 3, 2023, 24 pages.
Notice of Allowance received for U.S. Appl. No. 16/922,675, dated Mar. 22, 2023, 8 pages.
Notice of Allowance received for U.S. Appl. No. 18/077,905, dated Mar. 24, 2023, 18 pages.
Office Action received for Australian Patent Application No. 2022241590, dated Mar. 17, 2023, 5 pages.
Office Action received for Chinese Patent Application No. 201811539259.8, dated Mar. 13, 2023, 16 pages (8 pages of English Translation and 8 pages of Official Copy).
Applicant-Initiated Interview Summary received for U.S. Appl. No. 17/181,089, dated Apr. 7, 2023, 5 pages.
Applicant-Initiated Interview Summary received for U.S. Appl. No. 17/320,900, dated Apr. 17, 2023, 4 pages.
Applicant-Initiated Interview Summary received for U.S. Appl. No. 17/752,582, dated Apr. 17, 2023, 3 pages.
Corrected Notice of Allowance received for U.S. Appl. No. 16/922,675, dated Apr. 14, 2023, 6 pages.
Corrected Notice of Allowance received for U.S. Appl. No. 18/077,905, dated Apr. 10, 2023, 2 pages.
Corrected Notice of Allowance received for U.S. Appl. No. 18/077,905, dated Apr. 19, 2023, 2 pages.
Extended European Search Report received for European Patent Application No. 23157906.1, dated Apr. 6, 2023, 10 pages.
Final Office Action received for U.S. Appl. No. 17/181,089, dated Apr. 19, 2023, 13 pages.
Intention to Grant received for European Patent Application No. 18728002.9, dated Apr. 12, 2023, 9 pages.
International Preliminary Report on Patentability received for PCT Patent Application No. PCT/US2021/048358, dated Apr. 6, 2023, 15 pages.
Notice of Acceptance received for Australian Patent Application No. 2018271366, dated Mar. 31, 2023, 3 pages.
Notice of Allowance received for Japanese Patent Application No. 2022-007217, dated Apr. 10, 2023, 4 pages (1 page of English Translation and 3 pages of Official Copy).
Corrected Notice of Allowance received for U.S. Appl. No. 16/922,675, dated Jan. 9, 2023, 3 pages.
Extended European Search Report received for European Patent Application No. 22195584.2, dated Jan. 5, 2023, 13 pages.
Extended European Search Report received for European Patent Application No. 22201007.6, dated Jan. 12, 2023, 7 pages.
Invitation to Pay Search Fees received for European Patent Application No. 20760624.5, dated Jan. 2, 2023, 3 pages.
Office Action received for European Patent Application No. 15714698.6, dated Apr. 18, 2023, 14 pages.
Office Action received for Korean Patent Application No. 10-2022-0053111, dated Jun. 29, 2023, 7 pages (3 pages of English Translation and 4 pages of Official Copy).
Office Action received for Japanese Patent Application No. 2022-116534, dated Aug. 28, 2023, 10 pages (5 pages of English Translation and 5 pages of Official Copy).
Applicant-Initiated Interview Summary received for U.S. Appl. No. 17/479,974, dated Nov. 1, 2023, 2 pages.
Final Office Action received for U.S. Appl. No. 17/484,899, dated Nov. 6, 2023, 39 pages.
Final Office Action received for U.S. Appl. No. 17/732,355, dated Nov. 3, 2023, 21 pages.
Notice of Allowance received for U.S. Appl. No. 17/320,900, dated Nov. 6, 2023, 9 pages.
Office Action received for Korean Patent Application No. 10-2022-0053111, dated Oct. 23, 2023, 10 pages (5 pages of English Translation and 5 pages of Official Copy).
Advisory Action received for U.S. Appl. No. 17/747,804, dated Jun. 23, 2023, 6 pages.
Applicant Initiated Interview Summary received for U.S. Appl. No. 17/824,510, dated Jun. 16, 2023, 4 pages.
Applicant-Initiated Interview Summary received for U.S. Appl. No. 17/181,089, dated May 16, 2023, 4 pages.
Applicant-Initiated Interview Summary received for U.S. Appl. No. 17/181,089, dated Sep. 18, 2023, 3 pages.
Applicant-Initiated Interview Summary received for U.S. Appl. No. 17/306,354, dated Jun. 28, 2023, 3 pages.
Applicant-Initiated Interview Summary received for U.S. Appl. No. 17/479,974, dated Jul. 21, 2023, 2 pages.
Applicant-Initiated Interview Summary received for U.S. Appl. No. 17/483,542, dated May 22, 2023, 3 pages.
Applicant-Initiated Interview Summary received for U.S. Appl. No. 17/483,564, dated Apr. 21, 2023, 5 pages.
Applicant-Initiated Interview Summary received for U.S. Appl. No. 17/483,564, dated Jun. 21, 2023, 4 pages.
Applicant-Initiated Interview Summary received for U.S. Appl. No. 17/483,679, dated Aug. 18, 2023, 2 pages.
Applicant-Initiated Interview Summary received for U.S. Appl. No. 17/483,679, dated May 19, 2023, 3 pages.
Applicant-Initiated Interview Summary received for U.S. Appl. No. 17/484,899, dated Sep. 12, 2023, 6 pages.
Applicant-Initiated Interview Summary received for U.S. Appl. No. 17/732,355, dated Sep. 20, 2023, 2 pages.
Applicant-Initiated Interview Summary received for U.S. Appl. No. 17/747,804, dated May 31, 2023, 4 pages.
Applicant-Initiated Interview Summary received for U.S. Appl. No. 17/867,317, dated May 30, 2023, 4 pages.
Applicant-Initiated Interview Summary received for U.S. Appl. No. 17/952,171, dated Sep. 18, 2023, 4 pages.
Applicant-Initiated Interview Summary received for U.S. Appl. No. 18/088,309, dated Oct. 27, 2023, 2 pages.
Corrected Notice of Allowance received for U.S. Appl. No. 17/320,900, dated Sep. 18, 2023, 5 pages.
Corrected Notice of Allowance received for U.S. Appl. No. 17/483,542, dated Aug. 25, 2023, 3 pages.

(56) References Cited

OTHER PUBLICATIONS

Corrected Notice of Allowance received for U.S. Appl. No. 17/752,582, dated Jul. 17, 2023, 3 pages.
Corrected Notice of Allowance received for U.S. Appl. No. 18/077,905, dated Apr. 26, 2023, 3 pages.
Corrected Notice of Allowance received for U.S. Appl. No. 18/077,905, dated May 4, 2023, 2 pages.
Decision to Grant received for Danish Patent Application No. PA202270464, dated May 9, 2023, 1 page.
Decision to Grant received for European Patent Application No. 18728002.9, dated Aug. 31, 2023, 4 pages.
Extended European Search Report received for European Patent Application No. 23168537.1, dated Jul. 25, 2023, 13 pages.
Extended European Search Report received for European patent Application No. 23191379.9, dated Sep. 18, 2023, 8 pages.
Final Office Action received for U.S. Appl. No. 17/181,089, dated Oct. 13, 2023, 15 pages.
Final Office Action received for U.S. Appl. No. 17/479,974, dated Jun. 28, 2023, 32 pages.
Final Office Action received for U.S. Appl. No. 17/483,564, dated May 25, 2023, 26 pages.
Final Office Action received for U.S. Appl. No. 17/483,679, dated Jun. 13, 2023, 33 pages.
Final Office Action received for U.S. Appl. No. 17/747,804, dated Apr. 28, 2023, 17 pages.
Intention to Grant received for European Patent Application No. 19203942.8, dated Aug. 1, 2023, 8 pages.
Intention to Grant received for European Patent Application No. 20195339.5, dated May 2, 2023, 8 pages.
Intention to Grant received for European Patent Application No. 20195339.5, dated Oct. 20, 2023, 9 pages.
International Search Report and Written Opinion received for PCT Patent Application No. PCT/US2023/017280, dated Jun. 26, 2023, 20 pages.
Office Action received for U.S. Appl. No. 17/181,089, dated Aug. 4, 2023, 15 pages.
Office Action received for U.S. Appl. No. 17/306,354, dated Jun. 2, 2023, 21 pages.
Office Action received for U.S. Appl. No. 17/479,974, dated Oct. 10, 2023, 20 pages.
Office Action received for U.S. Appl. No. 17/483,679, dated Sep. 13, 2023, 32 pages.
Office Action received for U.S. Appl. No. 17/484,899, dated Jun. 14, 2023, 41 pages.
Office Action received for U.S. Appl. No. 17/732,204, dated Aug. 4, 2023, 18 pages.
Office Action received for U.S. Appl. No. 17/732,355, dated Aug. 4, 2023, 19 pages.
Office Action received for U.S. Appl. No. 17/824,510, dated May 22, 2023, 15 pages.
Office Action received for U.S. Appl. No. 17/952,171, dated Aug. 2, 2023, 14 pages.
Office Action received for U.S. Appl. No. 18/088,309, dated Sep. 21, 2023, 11 pages.
Notice of Acceptance received for Australian Patent Application No. 2022218540, dated Oct. 16, 2023, 3 pages.
Notice of Allowance received for Chinese Patent Application No. 201911099970.0, dated Jun. 25, 2023, 4 pages (1 page of English Translation and 3 pages of Official Copy).
Notice of Allowance received for Chinese Patent Application No. 202111483033.2, dated Oct. 7, 2023, 4 pages (1 page of English Translation and 3 pages of Official Copy).
Notice of Allowance received for Japanese Patent Application No. 2020-184605, dated Oct. 10, 2023, 4 pages (1 page of English Translation and 3 pages of Official Copy).
Notice of Allowance received for Japanese Patent Application No. 2022-070241, dated Oct. 23, 2023, 4 pages (1 page of English Translation and 3 pages of Official Copy).
Notice of Allowance received for U.S. Appl. No. 16/922,675, dated Jul. 19, 2023, 13 pages.
Notice of Allowance received for U.S. Appl. No. 17/306,354, dated Jul. 24, 2023, 7 pages.
Notice of Allowance received for U.S. Appl. No. 17/320,900, dated Aug. 29, 2023, 14 pages.
Notice of Allowance received for U.S. Appl. No. 17/483,542, dated Aug. 11, 2023, 9 pages.
Notice of Allowance received for U.S. Appl. No. 17/483,564, dated Jul. 17, 2023, 46 pages.
Notice of Allowance received for U.S. Appl. No. 17/519,205, dated Jun. 22, 2023, 7 pages.
Notice of Allowance received for U.S. Appl. No. 17/732,204, dated Oct. 12, 2023, 8 pages.
Notice of Allowance received for U.S. Appl. No. 17/752,582, dated Jun. 13, 2023, 18 pages.
Notice of Allowance received for U.S. Appl. No. 17/824,510, dated Jul. 19, 2023, 9 pages.
Notice of Allowance received for U.S. Appl. No. 17/867,317, dated Aug. 30, 2023, 6 pages.
Notice of Allowance received for U.S. Appl. No. 17/867317, dated Jul. 6, 2023, 11 pages.
Notice of Allowance received for U.S. Appl. No. 17/952,171, dated Oct. 23, 2023, 10 pages.
Notice of Allowance received for U.S. Appl. No. 18/077,891, dated Oct. 19, 2023, 18 pages.
Office Action received for Australian Patent Application No. 2022218517, dated Apr. 27, 2023, 7 pages.
Office Action received for Australian Patent Application No. 2022218517, dated Jul. 24, 2023, 6 pages.
Office Action received for Australian Patent Application No. 2022218540, dated Aug. 3, 2023, 5 pages.
Office Action received for Australian Patent Application No. 2022241590, dated Aug. 15, 2023, 6 pages.
Office Action received for Australian Patent Application No. 2022241590, dated Jun. 7, 2023, 7 pages.
Office Action received for Chinese Patent Application No. 201811539259.8, dated May 24, 2023, 25 pages (5 pages of English Translation and 20 pages of Official Copy).
Office Action received for Chinese Patent Application No. 201911099970.0, dated Feb. 23, 2023, 15 pages (5 pages of English Translation and 10 pages of Official Copy).
Office Action received for European Patent Application No. 21197457.1, dated May 30, 2023, 8 pages.
Office Action received for European Patent Application No. 21206800.1, dated Jun. 30, 2023, 6 pages.
Office Action received for European Patent Application No. 22201007.6, dated Oct. 9, 2023, 5 pages.
Office Action received for Japanese Patent Application No. 2020-184605, dated Jul. 3, 2023, 6 pages (3 pages of English Translation and 3 pages of Official Copy).
Office Action received for Japanese Patent Application No. 2022-070241, dated May 22, 2023, 8 pages (4 pages of English Translation and 4 pages of Official Copy).
Office Action received for Korean Patent Application No. 10-2022-7033655, dated Jul. 27, 2023, 5 pages (2 pages of English Translation and 3 pages of Official Copy).
Applicant-Initiated Interview Summary received for U.S. Appl. No. 17/181,089, dated Nov. 28, 2023, 3 pages.
Applicant-Initiated Interview Summary received for U.S. Appl. No. 18/067,350, dated Sep. 11, 2023, 4 pages.
Corrected Notice of Allowance received for U.S. Appl. No. 17/732,204, dated Nov. 16, 2023, 6 pages.
Decision to Grant received for European Patent Application No. 19203942.8, dated Nov. 16, 2023, 2 pages.
Extended European Search Report received for European Patent Application No. 23172038.4, dated Oct. 11, 2023, 10 pages.
Extended European Search Report received for European Patent Application No. 23190753.6, dated Nov. 22, 2023, 13 pages.
Invitation to Pay Additional Fees and Partial International Search Report received for PCT Patent Application No. PCT/US2023/020569, dated Sep. 21, 2023, 14 pages.
Non-Final Office Action received for U.S. Appl. No. 18/067,350, dated Aug. 3, 2023, 41 pages.

(56) References Cited

OTHER PUBLICATIONS

Notice of Acceptance received for Australian Patent Application No. 2022241590, dated Nov. 14, 2023, 3 pages.
Office Action received for Japanese Patent Application No. 2022-129377, dated Nov. 10, 2023, 6 pages (3 pages of English Translation and 3 pages of Official Copy).
Result of Consultation received for European Patent Application No. 21207736.6, dated Nov. 23, 2023, 5 pages.
Summons to Attend Oral Proceedings received for European Patent Application No. 21197457.1, mailed on Nov. 23, 2023, 12 pages.

* cited by examiner

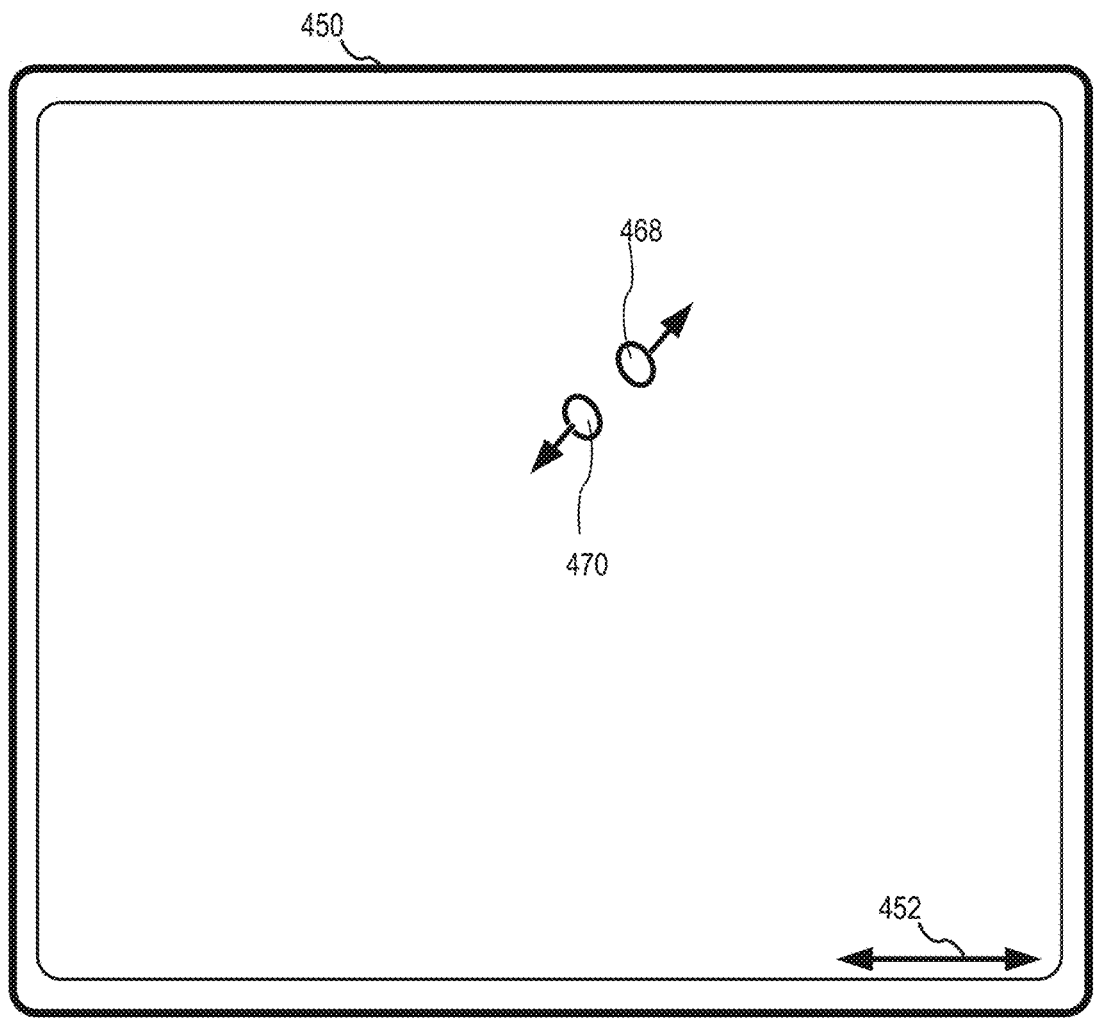
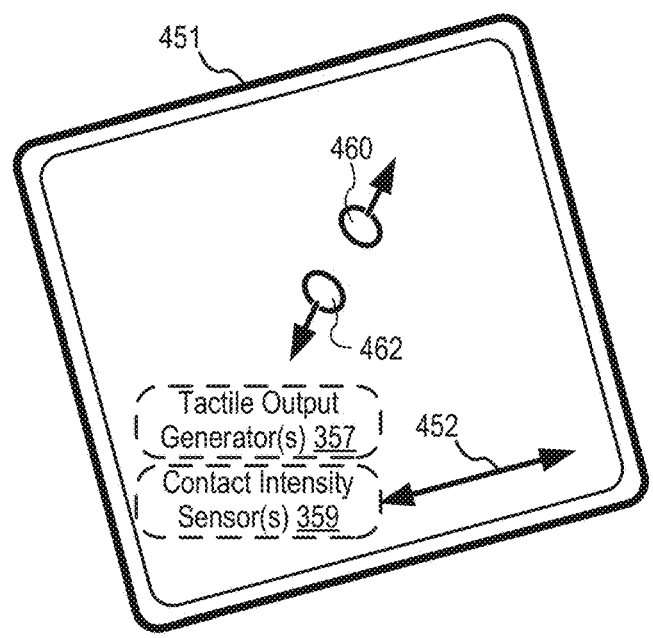
*FIG. 4B*

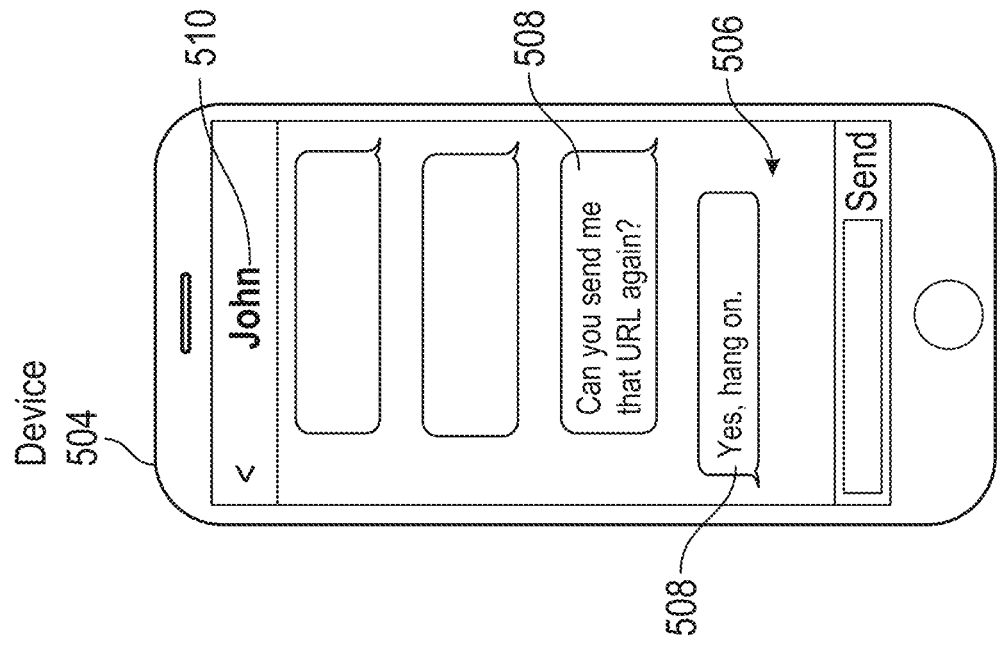
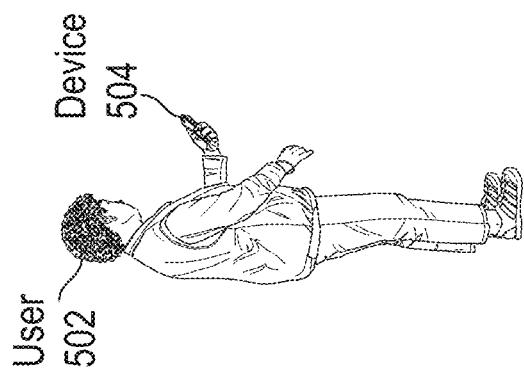
FIG. 5A

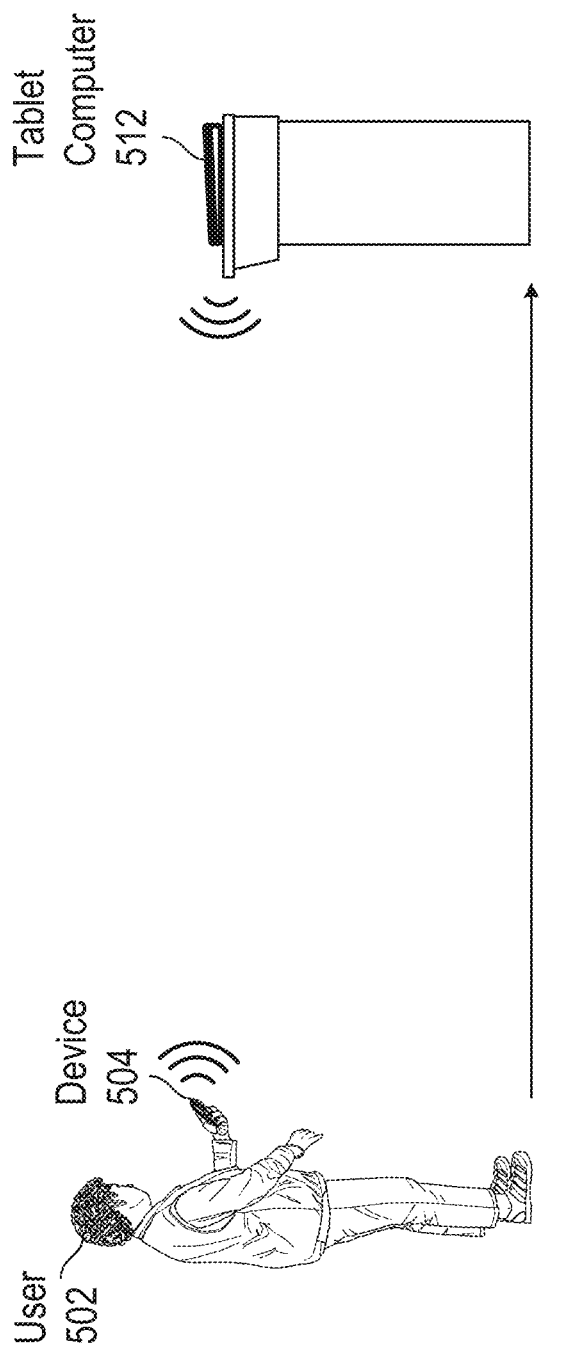

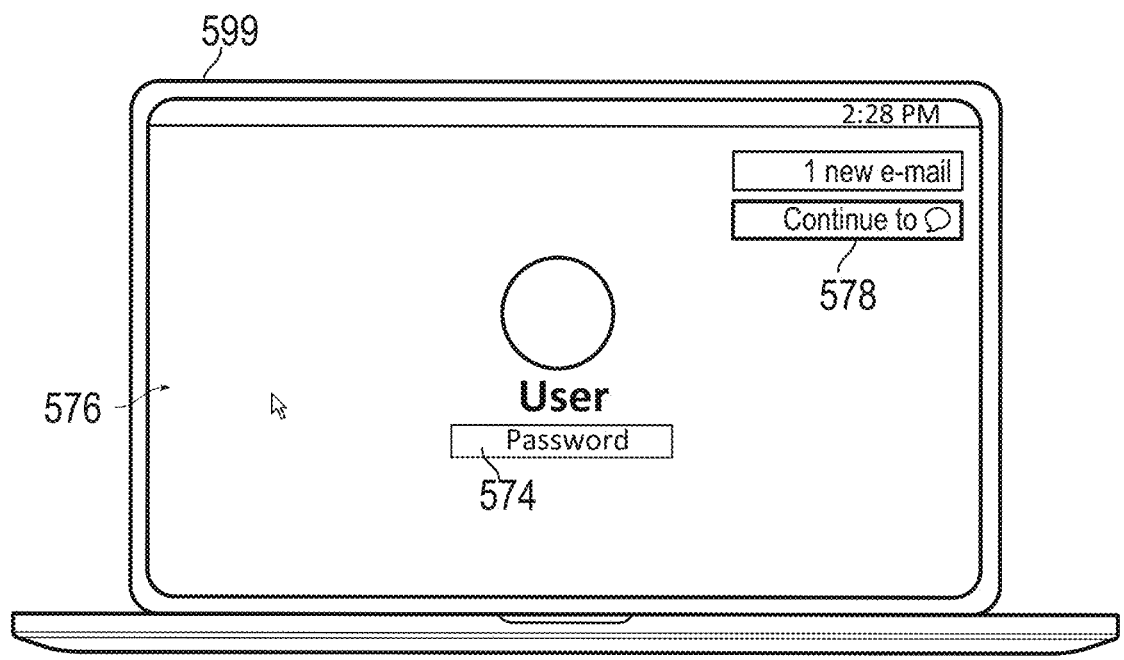
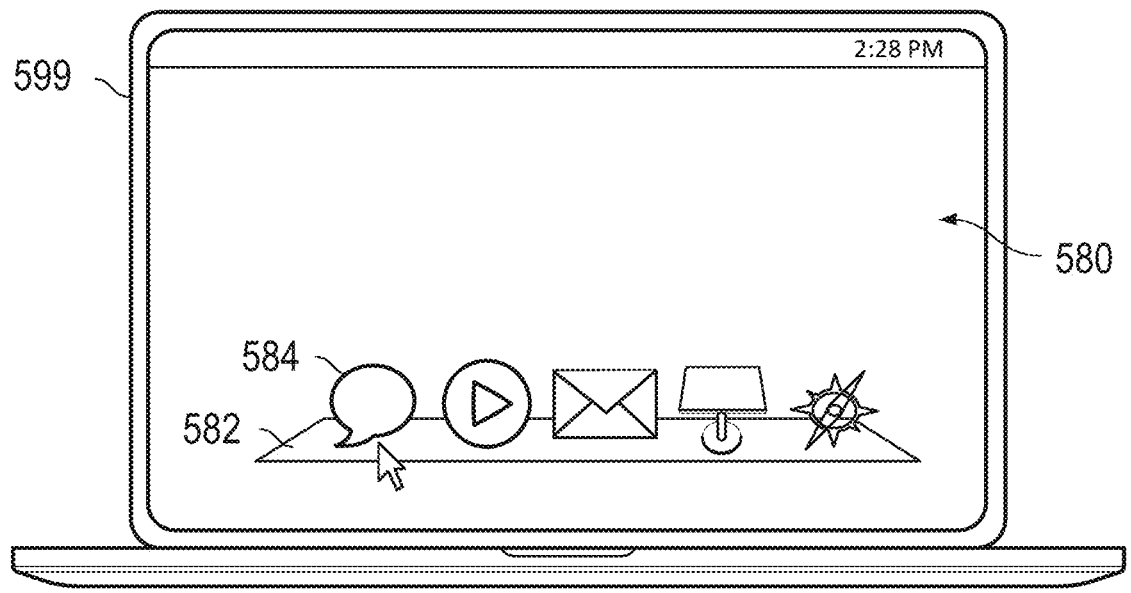
FIG. 5J

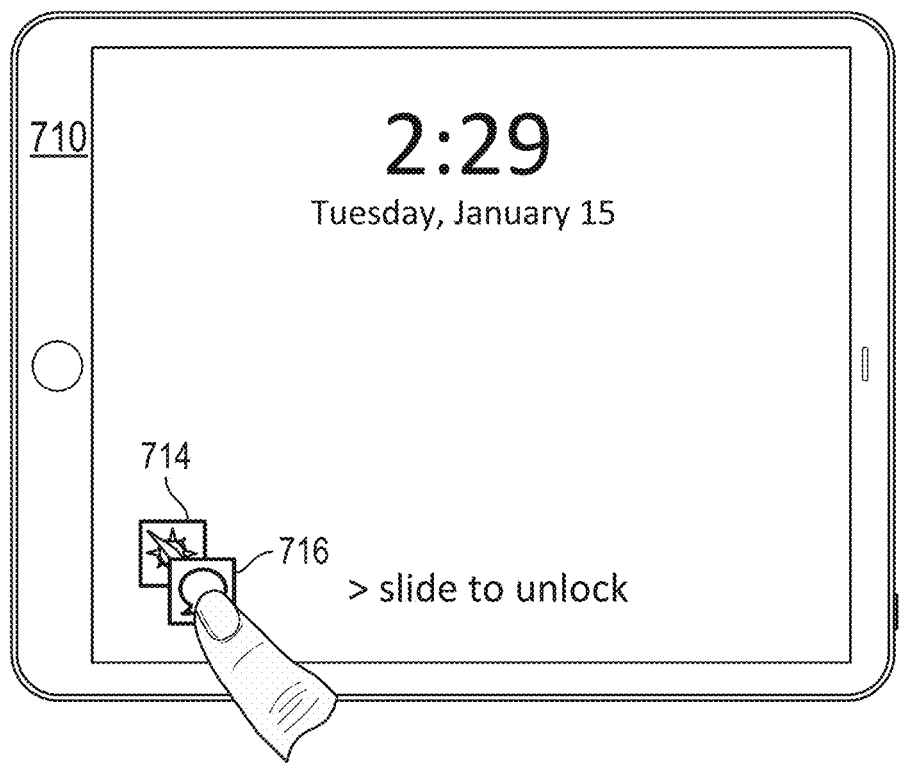
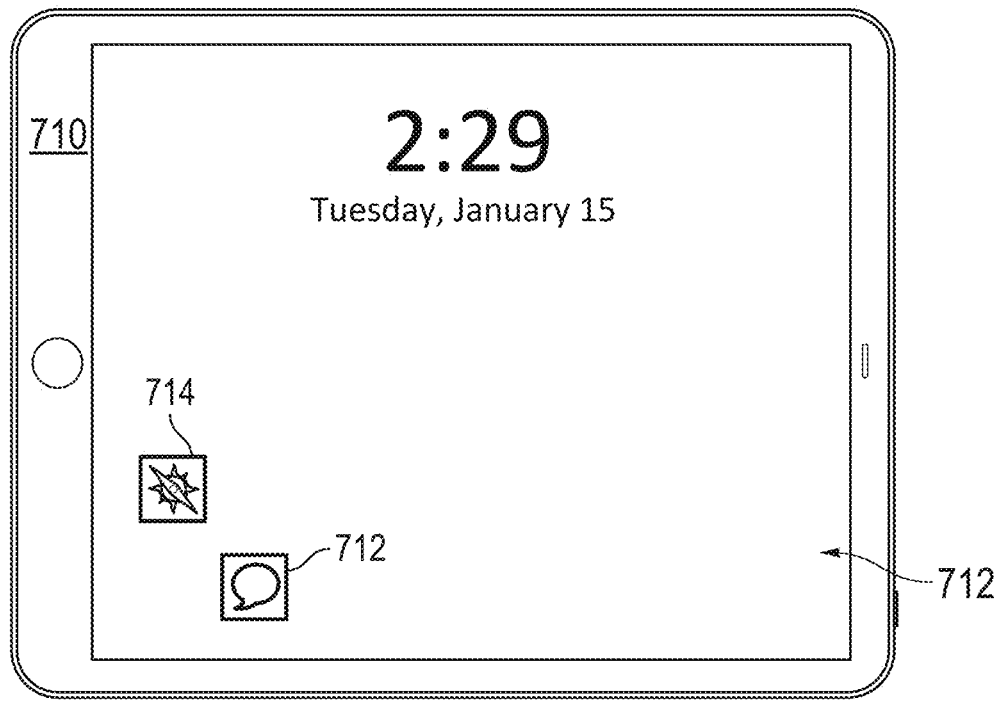
FIG. 7C

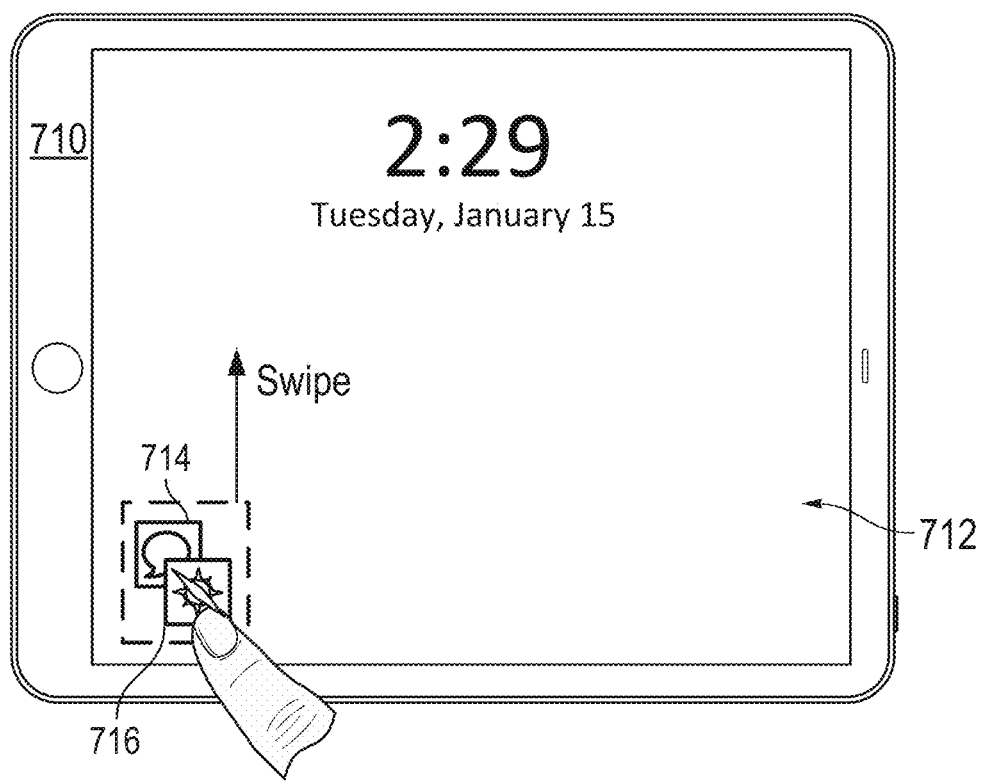
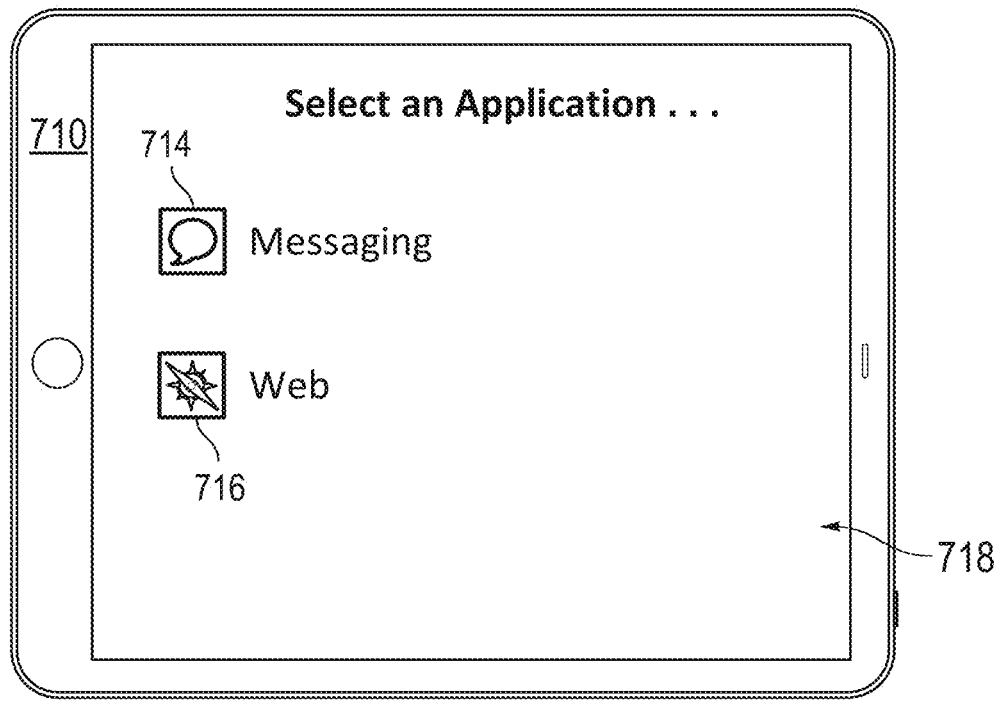
FIG. 7D

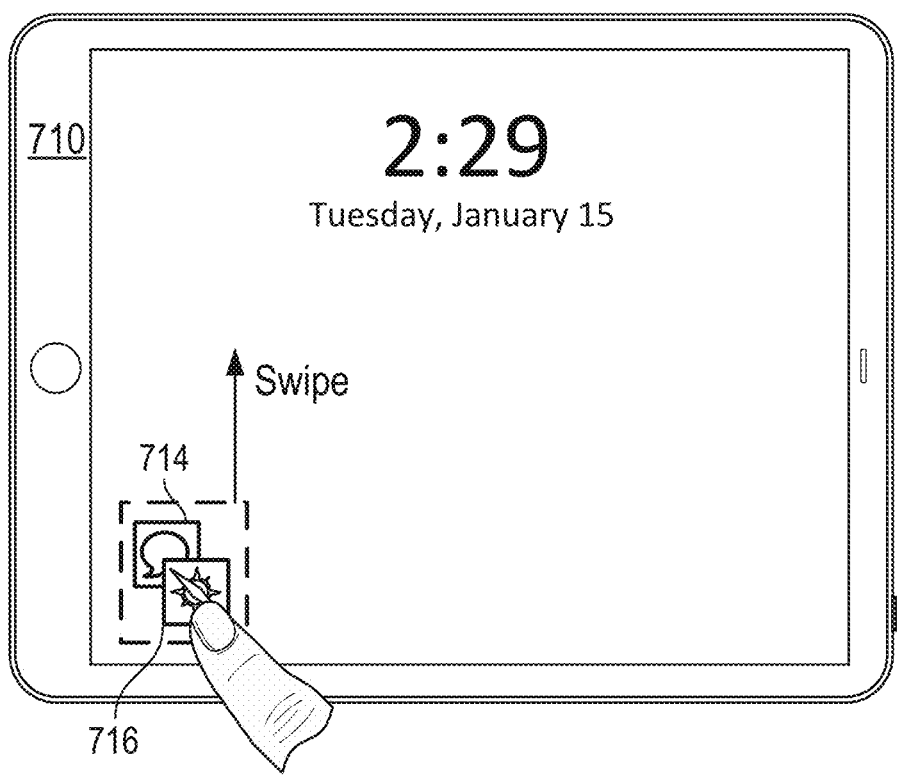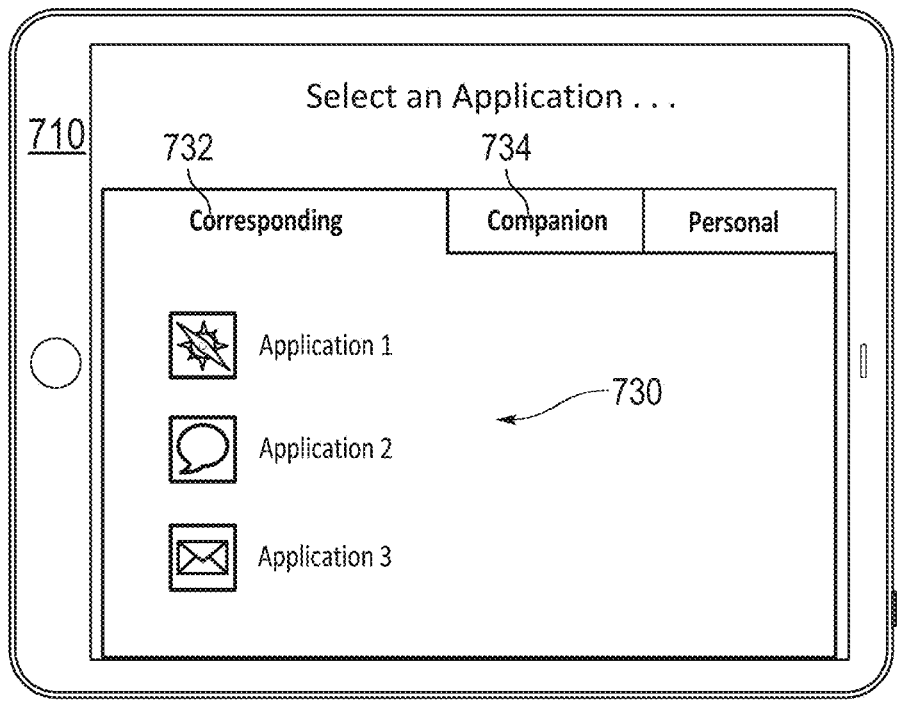
FIG. 7F

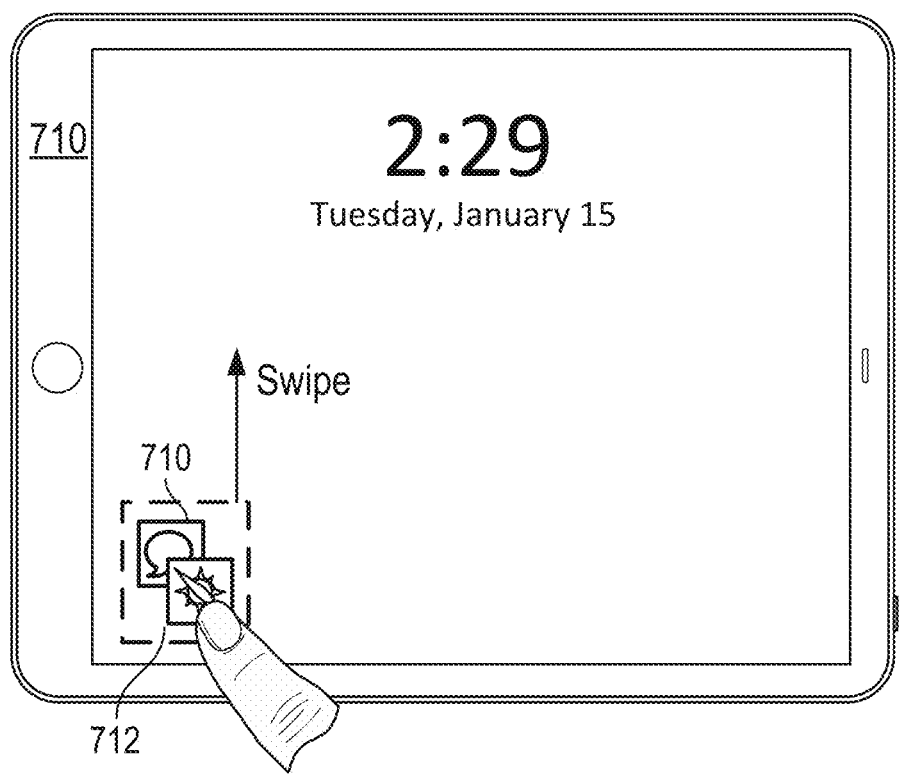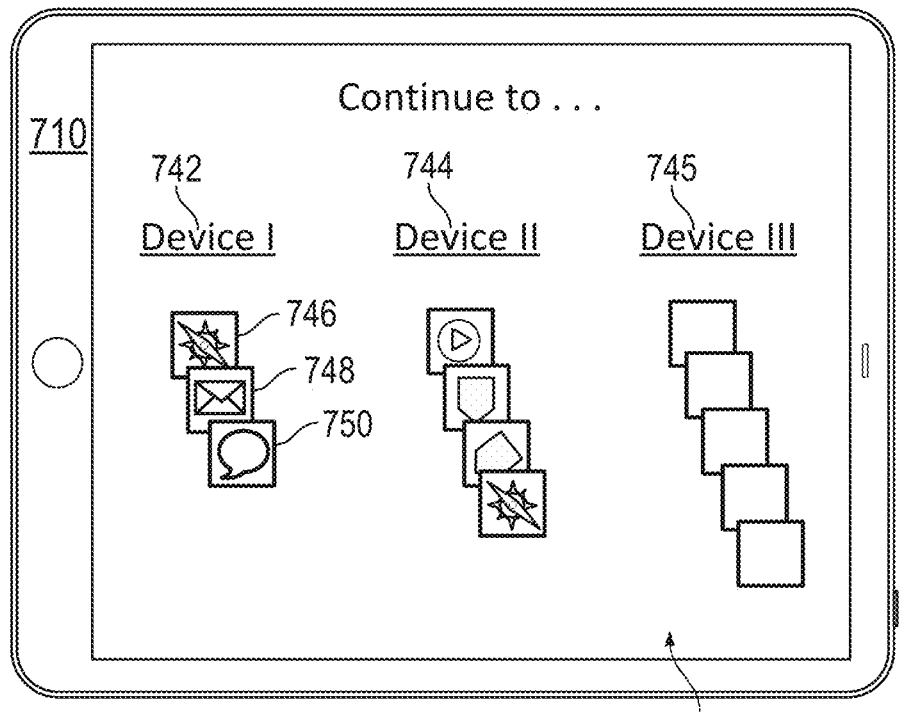
FIG. 7G

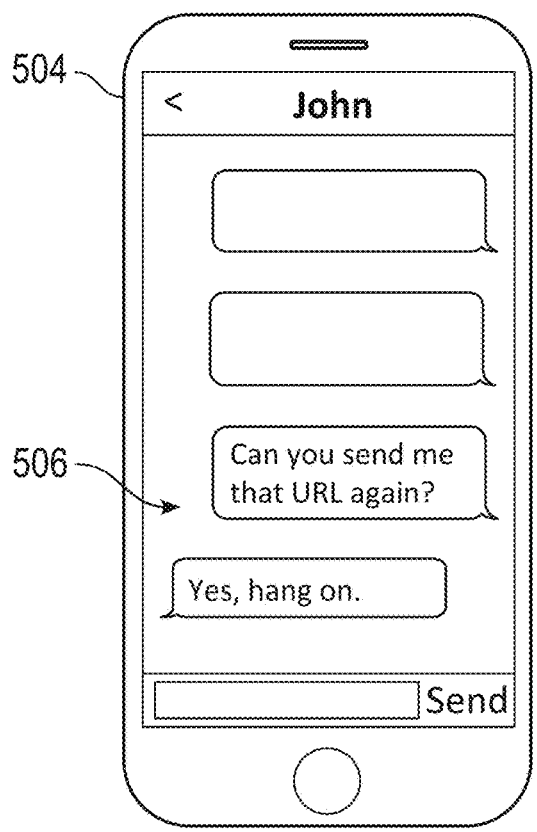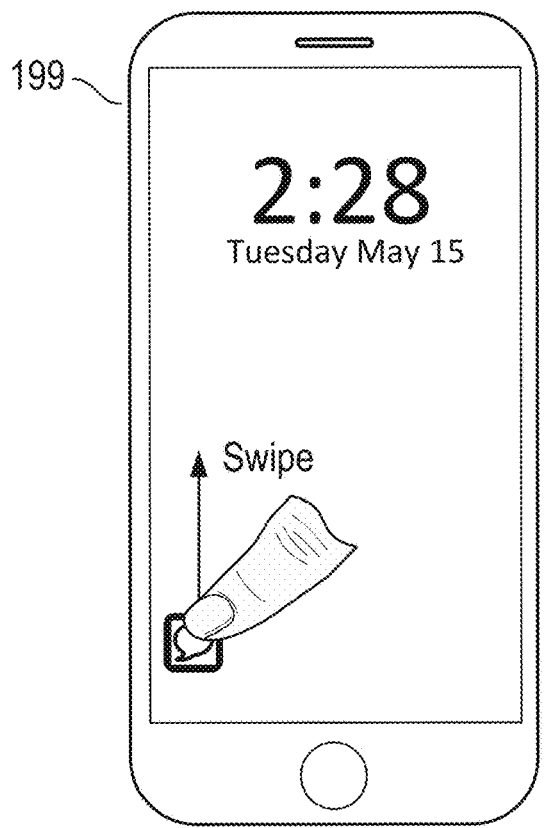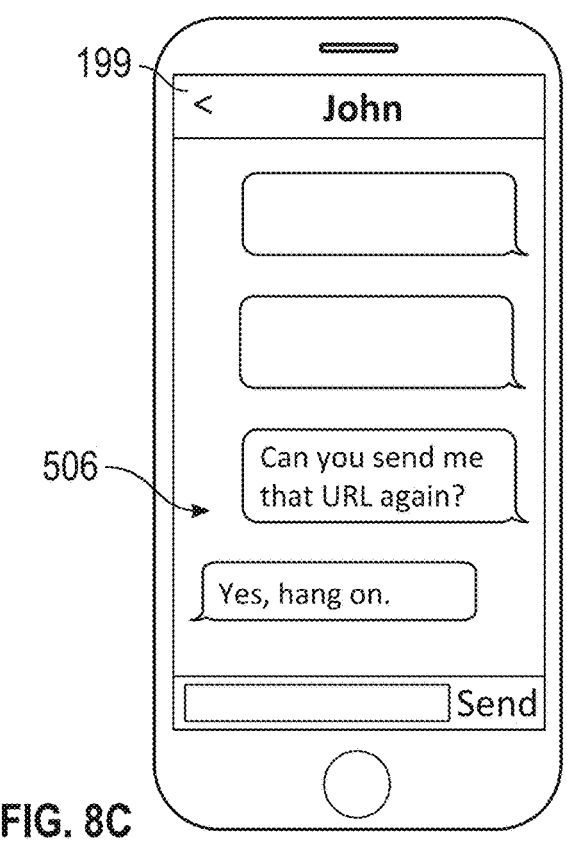
FIG. 8C

900

902

Detect, via wireless communication, an external device

↓

904

Receive from the external device usage information indicating usage of a first application on the external device

- - - - - - - - - - - - - - - - - - - - - - - - - - - - - -

Optionally, receive usage information includes receiving usage statistics on when and how recently the first application as used

↓

906

In response to detecting the external device and receiving the usage information, display an affordance on its screen

- - - - - - - - - - - - - - - - - - - - - - - - - - - - - -

Optionally, determine how long the affordance has been displayed and cease to display the affordance after a predetermined amount of time

↓

908

Detecting user selection of the displayed affordance

↓

910

In response to detecting the user selection, launch a second application, the second application corresponding to the first application

- - - - - - - - - - - - - - - - - - - - - - - - - - - - - -

Optionally, launching the second application includes placing the second application into the same state as the first application

Detect a first external device. The first external device is executing a first application in a particular state

1204

Detect a second external device distinct from the first external device. The second external device is executing a second application in a particular state

1206

Display at least one affordance on a screen of the electronic device based on detecting the first external device and the second external device

1208

Detecting user selection of an affordance of the at least one displayed affordances

1210

In response to detecting the user input, launch a third application on the electronic device. The third application is a version of the first application or the second application

While executing a first application, detect an external device

1304

Display a push affordance on-screen for instructing the external device to launch a second application corresponding to the first application

1306

Detect a user selection of the push affordance

1308

In response to detecting the user selection, send an instruction to the external device, the instruction causing the external device to display an affordance for launching the second application on the external device

1402
Detect an external device.
The external device is executing a first application

↓

1404
Receive, from the external device, a first part of usage information indicating the first application was used on the external device by a user within a time interval

↓

1406
In response to detecting the external device and receiving the first part of usage information, display an affordance on-screen

↓

1408
Detect a first user selection of the displayed affordance

↓

1410
In response to detecting the first user selection:
(i) change the visual appearance of the displayed affordance; and
(ii) obtain, from the external device, a second part of usage information associated with the first application

↓

1412
Detect a (second) user selection on the displayed (changed) affordance

↓

1414
In response to receiving the user selection, launch a second application on the electronic device based on at least the second part of usage information. The second application corresponds to the first application

1502
Receive, from a first external device, first data representing a first plurality of applications that are executing and/or has executed on the first external device

1504
Display a first plurality of affordances representing the first plurality of applications, the plurality of affordances including a first affordance corresponding to a first application of the first external device

1506
Detect user selection of the first affordance

1508
In response to detecting user selection of the first affordance, launch a first application locally. The first local application is a version of the first application

1510
Receive, from a second external device, the second data representing a second plurality of applications that are executing and/or has executed on the second external device

1510
Display a second plurality of affordances representing the second plurality of applications, including a second affordance corresponding to a second application of the second external device

1514
Detect user selection of the second affordance, and in response, launch a second application locally. The second local application is a version of the second application

FIG. 15

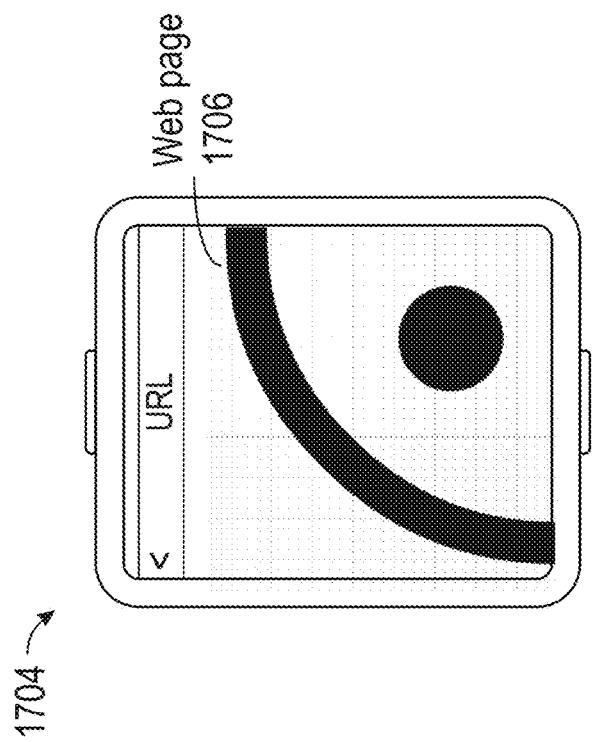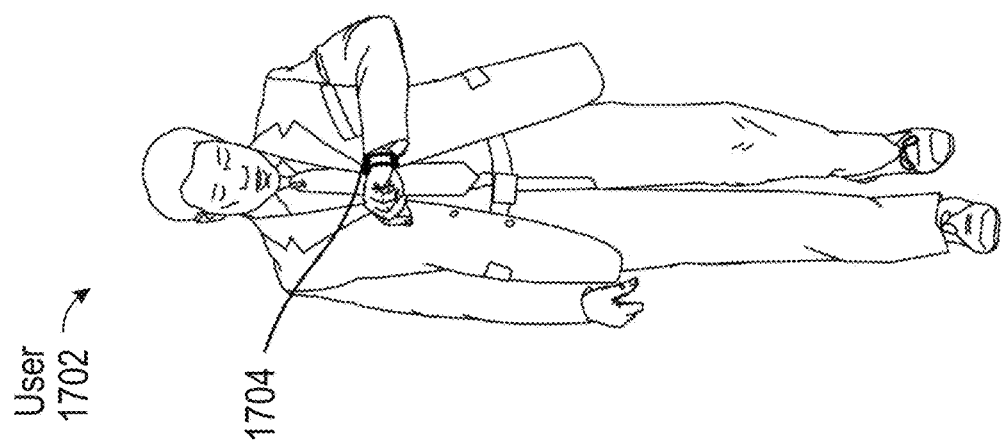
FIG. 17A

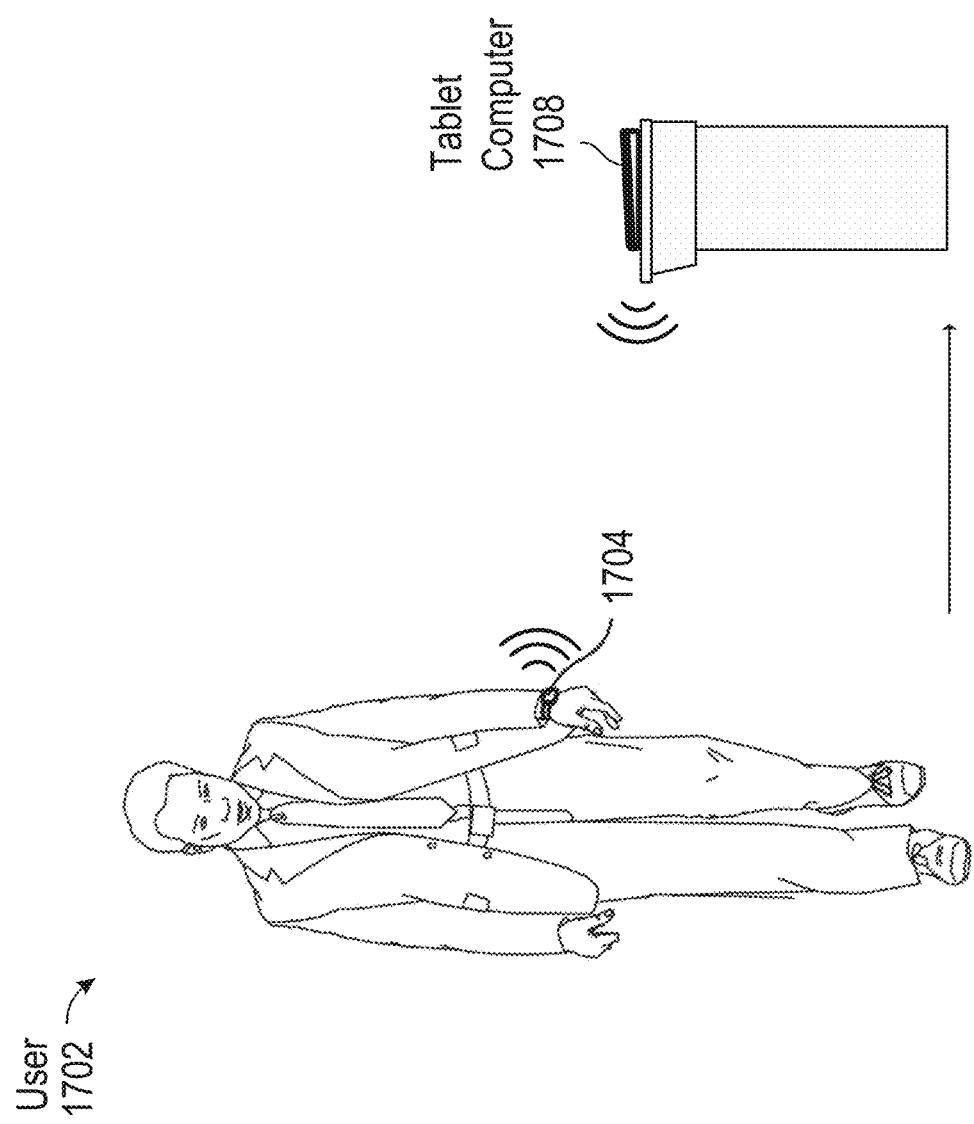

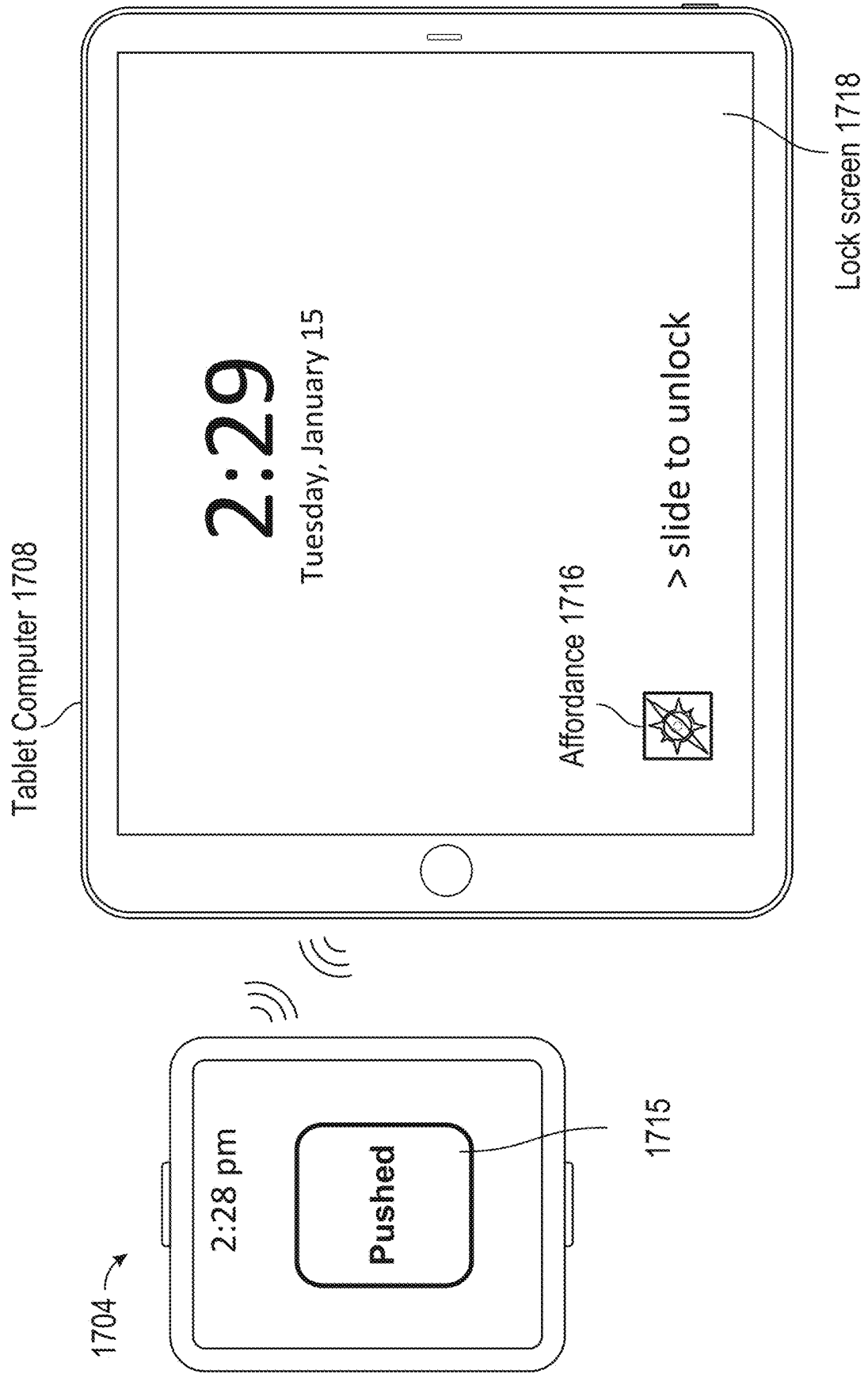

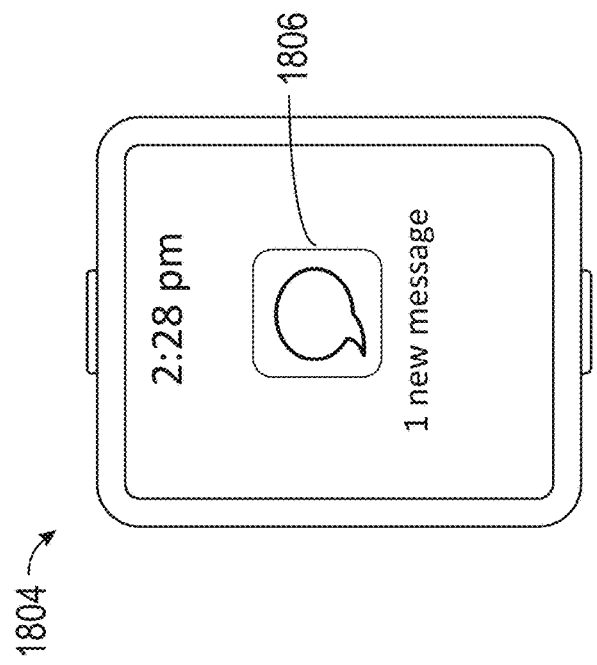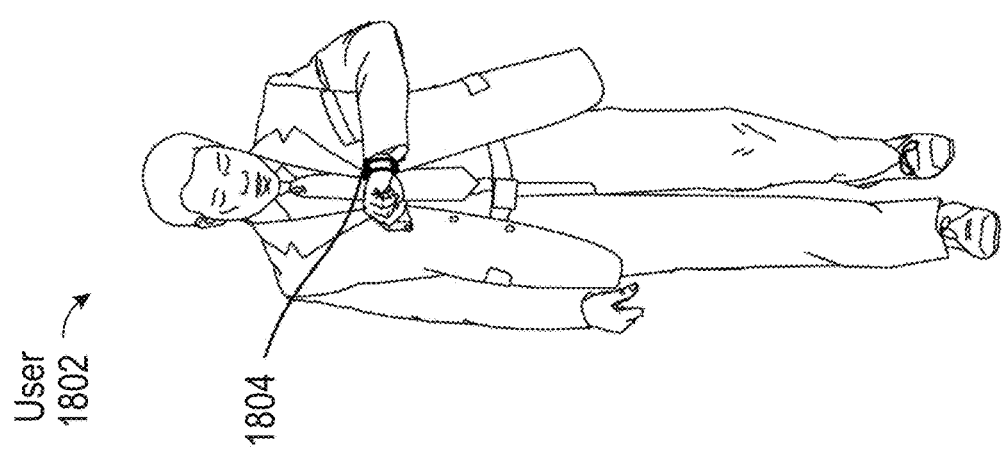
FIG. 18A

2100

2102

While an installed application is not displayed on the touch-sensitive display, obtaining application data for the installed application

2104

Display a messaging indicative of the obtained application data

2106

Detect a contact on the displayed message and a movement of the contact

2108

In response to a determination that the detected movement is substantially in a first direction, send an instruction, via wireless communication, to the external device, wherein the instruction causes the external device to display an affordance for launching a second application on the external device corresponding to the first application.

While an installed application is not displayed on the touch-sensitive display, obtaining application data for the installed application

2204

Display a messaging indicative of the obtained application data

2206

Detect a contact on the displayed message and a movement of the contact

2208

In response to a determination that the detected movement is substantially in a first direction, send an instruction, via wireless communication, to the external device, wherein the instruction causes the external device to display an affordance for launching a second application on the external device corresponding to the first application.

Detect an external device while the electronic device in a user-interface locked state. The external device is executing a first application, the first application in a state

4304

Display for a predetermined amount of time an affordance corresponding to the first application

4306

Detect a contact at a location of the displayed affordance

4308

In response to the contact, launch a second application, the second application corresponding to the first application. The state of the second application corresponds to the state of the first application

Detect an external device. The external device is executing a first application, the first application in a state

4404

Detect two presses of the button

4406

In response to detecting the two presses, display a left affordance, a center affordance, and a right affordance, the left affordance for launching a second application on the electronic device corresponding to the first application, the center affordance representing an application most recently used on the electronic device

4408

Detect a contact on the left affordance

4410

In response to the contact on the left affordance, launch the second application on the electronic device. The state of the second application corresponds to the state of the first application.

Detect an external device. The external device is executing a first application, the first application in a state

4504

Detect a downward swipe on the touch-sensitive display, the downward swipe from the top edge of the touch-sensitive display

4506

In response to the downward swipe: display an affordance for launching a second application on the electronic device, the second application corresponding to the first application

4508

Detects a contact on the affordance

4510

In response to the contact on the affordance, launch the second application on the electronic device. The state of the second application corresponds to the state of the first application.

Detect an external device while the electronic device is in a user-interface locked state. The external device is executing a first application, the first application in a state

4604

Receive a biometric input from the biometric reader

4606

In response to receiving the biometric input: unlock the electronic device

4608

After unlocking, display an affordance corresponding to the first application

4610

Detect a contact on the displayed affordance

4612

In response to detecting the contact, launch a second application, the second application corresponding to the first application. The state of the second application corresponds to the state of the first application

Detect an external device. The external device is executing a first application, the first application in a state

4704

Display a plurality of application icons on the touch-sensitive display

4706

Detect a rightward swipe on the touch-sensitive display, the rightward swipe from the left edge of the touch-sensitive display

4708

In response to the rightward swipe, display an affordance for launching a second application on the electronic device, the second application corresponding to the first application

4710

Detect a contact on the affordance

4712

In response to the contact on the affordance, launch the second application on the electronic device. The state of the second application corresponds to the state of the first application

Detect an external device while the electronic device is in a user-interface locked state. The external device is executing a first application, the first application in a state

4804

Display a password input field and an affordance corresponding to the first application

4806

Receive a password

4808

Detect a mouse event on the displayed affordance

4810

In response to receiving the password and detecting the mouse event, launch a second application, the second application corresponding to the first application. The state of the second application corresponds to the state of the first application

Detect an external device. The external device is executing a first application, the first application in a state

4904

Detects a key press of a first key of the keyboard simultaneously with a key press of a second key of the keyboard

4906

In response to the simultaneous key presses: display a plurality of affordances comprising: affordances identifying a plurality of active applications on the electronic device, and an affordance for launching the second application corresponding to the first application

4908

Detect a sequence of keyboard input including (i) at least one additional key press of the second key (ii) while holding the first key (iii) followed by a release of both the first key and the second key

4910

In response to sequence of keyboard input, launch the second application. The state of the second application corresponds to the state of the first application

Detect an external device. The external device is executing a first application, the first application in a state

5004

Detect a movement of the cursor to a corner of a screen of the electronic device

5006

In response to detecting the movement of the cursor, display a plurality of affordances comprising: affordances identifying a plurality of active applications on the electronic device, and an affordance for launching the second application corresponding to the first application

5008

Detect a sequence of input including (i) movement of the cursor onto the affordance for launching the second application and (ii) a mouse-event on the affordance

5010

In response to detecting the sequence of input, launch the second application. The state of the second application corresponds to the state of the first application

Detect an external device. The external device is executing a first application, the first application in a state

5104

Display, in a portion of the display screen, a plurality of application icons for launching a plurality of applications on the electronic device

5106

Display, in the portion of the display screen, an icon for launching a second application corresponding to the first application

5108

Detect movement of the cursor onto the displayed icon and a mouse-event on the displayed icon

5110

In response, launch the second application. The state of the second application corresponds to the state of the first application

Detect an external device. The external device is executing a first application, the first application in a state

5204

Display a menu bar, the menu bar comprising an icon for launching a second application corresponding to the first application

5206

Detects movement of the cursor onto the displayed icon and a mouse-event on the displayed icon

5208

In response, launch the second application. The state of the second application corresponds to the state of the first application

Detect a voice input from the microphone. The voice input includes a verbal request for information

5304

Detect, via wireless communication, an external device

5306

In response at least in part to detecting the voice input and detecting the external device, send an instruction, via wireless communication, to the external device. The instruction causes the external device to display an affordance for displaying the requested information

FIG. 53

CONTINUITY OF APPLICATIONS ACROSS DEVICES

CROSS-REFERENCE TO RELATED APPLICATIONS

This application is a continuation of U.S. patent application Ser. No. 14/641,298, "CONTINUITY OF APPLICATIONS ACROSS DEVICES," filed Mar. 6, 2015, which claims the benefit of priority of U.S. Provisional Patent Application Ser. No. 62/035,348, "CONTINUITY," filed Aug. 8, 2014; and U.S. Provisional Patent Application Ser. No. 62/006,043, "CONTINUITY," filed May 30, 2014.

This application relates to the following provisional applications: U.S. Patent Application Ser. No. 62/005,781, "ACTIVITY CONTINUATION BETWEEN ELECTRONIC DEVICES," filed May 30, 2014; U.S. Patent Application Ser. No. 62/005,793, "COMPANION APPLICATION FOR ACTIVITY COOPERATION," filed May 30, 2014; U.S. Patent Application Ser. No. 62/005,751, "PREDEFINED WIRELESS PAIRING," filed May 30, 2014; and U.S. Patent Application Ser. No. 62/005,755, "OPERATING-MODE TRANSITIONS BASED ON ADVERTISING INFORMATION," filed May 30, 2014; U.S. Patent Application Ser. No. 62/006,043, "CONTINUITY," filed May 30, 2014; and U.S. Provisional Patent Application Ser. No. 62/035,348, "CONTINUITY," filed Aug. 8, 2014.

This application also relates to the following applications: International Patent Application Serial No. PCT/US2013/040087, entitled "Device, Method, and Graphical User Interface for Moving a User Interface Object Based on an Intensity of a Press Input," filed May 8, 2013; International Patent Application Serial No. PCT/US2013/040072, entitled "Device, Method, and Graphical User Interface for Providing Feedback for Changing Activation States of a User Interface Object," filed May 8, 2013; International Patent Application Serial No. PCT/US2013/040070, entitled "Device, Method, and Graphical User Interface for Providing Tactile Feedback for Operations Performed in a User Interface," filed May 8, 2013; International Patent Application Serial No. PCT/US2013/040067, entitled "Device, Method, and Graphical User Interface for Facilitating User Interaction with Controls in a User Interface," filed May 8, 2013; International Patent Application Serial No. PCT/US2013/040061, entitled "Device, Method, and Graphical User Interface for Displaying User Interface Objects Corresponding to an Application," filed May 8, 2013; International Patent Application Serial No. PCT/US2013/040058, entitled "Device, Method, and Graphical User Interface for Displaying Additional Information in Response to a User Contact," filed May 8, 2013; International Patent Application Serial No. PCT/US2013/040056, entitled "Device, Method, and Graphical User Interface for Scrolling Nested Regions," filed May 8, 2013; International Patent Application Serial No. PCT/US2013/040054, entitled "Device, Method, and Graphical User Interface for Manipulating Framed Graphical Objects," filed May 8, 2013; International Patent Application Serial No. PCT/US2013/069489, entitled "Device, Method, and Graphical User Interface for Switching Between User Interfaces," filed Nov. 11, 2013; International Patent Application Serial No. PCT/US2013/069486, entitled "Device, Method, and Graphical User Interface for Determining Whether to Scroll or Select Content," filed Nov. 11, 2013; International Patent Application Serial No. PCT/US2013/069484, entitled "Device, Method, and Graphical User Interface for Moving a Cursor According to a Change in an Appearance of a Control Icon with Simulated Three-Dimensional Characteristics," filed Nov. 11, 2013; International Patent Application Serial No. PCT/US2013/069483, entitled "Device, Method, and Graphical User Interface for Transitioning Between Touch Input to Display Output Relationships," filed Nov. 11, 2013; International Patent Application Serial No. PCT/US2013/069479, entitled "Device, Method, and Graphical User Interface for Forgoing Generation of Tactile Output for a Multi-Contact Gesture," filed Nov. 11, 2013; International Patent Application Serial No. PCT/US2013/069472, entitled "Device, Method, and Graphical User Interface for Navigating User Interface Hierarchies," filed Nov. 11, 2013; International Patent Application Serial No. PCT/US2013/040108, entitled "Device, Method, and Graphical User Interface for Moving and Dropping a User Interface Object," filed May 8, 2013; International Patent Application Serial No. PCT/US2013/040101, entitled "Device, Method, and Graphical User Interface for Selecting User Interface Objects," filed May 8, 2013; International Patent Application Serial No. PCT/US2013/040098, entitled "Device, Method, and Graphical User Interface for Displaying Content Associated with a Corresponding Affordance," filed May 8, 2013; International Patent Application Serial No. PCT/US2013/040093, entitled "Device, Method, and Graphical User Interface for Transitioning Between Display States in Response to a Gesture," filed May 8, 2013; International Patent Application Serial No. PCT/US2013/040053, entitled "Device, Method, and Graphical User Interface for Selecting Object within a Group of Objects," filed May 8, 2013; U.S. Patent Application Ser. No. 61/778,211, entitled "Device, Method, and Graphical User Interface for Facilitating User Interaction with Controls in a User Interface," filed Mar. 12, 2013; U.S. Patent Application Ser. No. 61/778,191, entitled "Device, Method, and Graphical User Interface for Displaying User Interface Objects Corresponding to an Application," filed Mar. 12, 2013; U.S. Patent Application Ser. No. 61/778,171, entitled "Device, Method, and Graphical User Interface for Displaying Additional Information in Response to a User Contact," filed Mar. 12, 2013; U.S. Patent Application Ser. No. 61/778,179, entitled "Device, Method and Graphical User Interface for Scrolling Nested Regions," filed Mar. 12, 2013; U.S. Patent Application Ser. No. 61/778,156, entitled "Device, Method, and Graphical User Interface for Manipulating Framed Graphical Objects," filed Mar. 12, 2013; U.S. Patent Application Ser. No. 61/778,125, entitled "Device, Method, And Graphical User Interface for Navigating User Interface Hierarchies," filed Mar. 12, 2013; U.S. Patent Application Ser. No. 61/778,092, entitled "Device, Method, and Graphical User Interface for Selecting Object Within a Group of Objects," filed Mar. 12, 2013; U.S. Patent Application Ser. No. 61/778,418, entitled "Device, Method, and Graphical User Interface for Switching Between User Interfaces," filed Mar. 13, 2013; U.S. Patent Application Ser. No. 61/778,416, entitled "Device, Method, and Graphical User Interface for Determining Whether to Scroll or Select Content," filed Mar. 13, 2013; U.S. Patent Application Ser. No. 61/747,278, entitled "Device, Method, and Graphical User Interface for Manipulating User Interface Objects with Visual and/or Haptic Feedback," filed Dec. 29, 2012; U.S. Patent Application Ser. No. 61/778,414, entitled "Device, Method, and Graphical User Interface for Moving and Dropping a User Interface Object," filed Mar. 13, 2013; U.S. Patent Application Ser. No. 61/778,413, entitled "Device, Method, and Graphical User Interface for Selecting User Interface Objects," filed Mar. 13, 2013; U.S. Patent Application Ser. No. 61/778,412, entitled "Device, Method, and Graphical User Interface for Displaying Content Associated with a Corresponding Affordance," filed Mar. 3, 2013; U.S. Patent Application Ser. No. 61/778,373, entitled "Device, Method, and Graphical User Interface for Managing Activation of a Control Based on Contact Intensity," filed Mar. 12, 2013; U.S. Patent Application Ser. No. 61/778,265, entitled "Device, Method, and Graphical User Interface for Transitioning Between Display States in Response to a Gesture," filed Mar. 12, 2013; U.S. Patent Application Ser. No. 61/778,367, entitled "Device, Method, and Graphical User Interface for Moving a User Interface Object Based on an Intensity of a Press Input," filed Mar. 12, 2013; U.S. Patent Application Ser. No. 61/778,363, entitled "Device, Method, and Graphical User Interface for Transitioning Between Touch Input to Display Output Relationships," filed Mar. 12, 2013; U.S. Patent Application Ser. No. 61/778,287, entitled "Device, Method, and Graphical User Interface for Providing Feedback for Changing Activation States of a User Interface Object," filed Mar. 12, 2013; U.S. Patent Application Ser. No. 61/778,284, entitled "Device, Method, and Graphical User Interface for Providing Tactile Feedback for Operations Performed in a User Interface," filed Mar. 12, 2013; U.S. Patent Application Ser. No. 61/778,239, entitled "Device, Method, and Graphical User Interface for Forgoing Generation of Tactile Output for a Multi-Contact Gesture," filed Mar. 12, 2013; U.S. Patent Application Ser. No. 61/688,227, entitled "Device, Method, and Graphical User Interface for Manipulating User Interface Objects with Visual and/or Haptic Feedback," filed May 9, 2012.

This application also relates to the following application: U.S. Utility application Ser. No. 12/987,982, entitled "Intelligent Automated Assistant," filed Jan. 10, 2011.

The content of these applications is hereby incorporated by reference in their entirety.

FIELD

The present disclosure relates generally to computer user interfaces, and more specifically to techniques for permitting a user to transition from use of one device to another, seamlessly.

BACKGROUND

Modern electronic devices can support various software applications. Cellular phones, tablet computers, and laptop computers can each execute messaging programs such as e-mail editors and web browsers. A user who owns multiple electronic devices may elect to use one device over another based on the device's suitability at the moment. For example, while on-the-go, the user may prefer to read e-mail using a cellular phone. A device's suitability can change, however. For example, when an e-mail requires a lengthy reply, the user may prefer to draft the lengthy response using the full-sized keyboard of a laptop computer. To accomplish this transition using conventional techniques, the user may power-up a laptop, launch an e-mail application, find the specific e-mail for which a response is needed, and begin to prepare the response. It would be helpful if the user could transition from use of one device to another, such as transition from reading an e-mail on one device to drafting a reply on another device, in a seamless and cognitively continuous manner.

BRIEF SUMMARY

In some embodiments, a method includes: at an electronic device having a touch-sensitive display, the electronic device in a user-interface locked state: detecting an external device, wherein the external device is executing a first application, the first application in a state; displaying for a predetermined amount of time, on the touch-sensitive display, an affordance corresponding to the first application; detecting a contact on the touch-sensitive display at a location of the displayed affordance; and in response to the contact, launching a second application, the second application corresponding to the first application, wherein the state of the second application corresponds to the state of the first application.

In some embodiments, an electronic device includes: a touch-sensitive display; one or more processors; a memory; and one or more programs, wherein the one or more programs are stored in the memory and configured to be executed by the one or more processors, the one or more programs including instructions for: detecting an external device while the electronic device is in a user-interface locked state, wherein the external device is executing a first application, the first application in a state; displaying for a predetermined amount of time, on the touch-sensitive display, an affordance corresponding to the first application; detecting a contact on the touch-sensitive display at a location of the displayed affordance; and in response to the contact, launching a second application, the second application corresponding to the first application, wherein the state of the second application corresponds to the state of the first application.

In some embodiments, a non-transitory computer readable storage medium storing one or more programs, the one or more programs comprising instructions, which when executed by one or more processors of an electronic device with a touch-sensitive display, cause the device to: detect an external device while the electronic device is in a user-interface locked state, wherein the external device is executing a first application, the first application in a state; display for a predetermined amount of time, on the touch-sensitive display, an affordance corresponding to the first application; detect a contact on the touch-sensitive display at a location of the displayed affordance; and in response to the contact, launch a second application, the second application corresponding to the first application, wherein the state of the second application corresponds to the state of the first application.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7G illustrate exemplary user interfaces for transitioning between electronic devices.

FIGS. 8A-8C illustrate exemplary user interfaces for transitioning between electronic devices.

FIG. 9 is a flow diagram illustrating a process for transitioning between electronic devices.

FIG. 12 is a flow diagram illustrating a process for transitioning between electronic devices.

FIG. 13 is a flow diagram illustrating a process for transitioning between electronic devices.

FIG. 14 is a flow diagram illustrating a process for transitioning between electronic devices.

FIG. 15 is a flow diagram illustrating a process for transitioning between electronic devices.

FIGS. 17A-17E illustrate exemplary user interfaces for transitioning between electronic devices.

FIGS. 18A-18D illustrate exemplary user interfaces for transitioning between electronic devices.

FIG. 21 is a flow diagram illustrating a process for transitioning between electronic devices.

FIG. 22 is a flow diagram illustrating a process for transitioning between electronic devices.

FIG. 43 is a flow diagram illustrating a process for transitioning between electronic devices.

FIG. 44 is a flow diagram illustrating a process for transitioning between electronic devices.

FIG. 45 is a flow diagram illustrating a process for transitioning between electronic devices.

FIG. 46 is a flow diagram illustrating a process for transitioning between electronic devices.

FIG. 47 is a flow diagram illustrating a process for transitioning between electronic devices.

FIG. 48 is a flow diagram illustrating a process for transitioning between electronic devices.

FIG. 49 is a flow diagram illustrating a process for transitioning between electronic devices.

FIG. 50 is a flow diagram illustrating a process for transitioning between electronic devices.

FIG. 51 is a flow diagram illustrating a process for transitioning between electronic devices.

FIG. 52 is a flow diagram illustrating a process for transitioning between electronic devices.

FIG. 53 is a flow diagram illustrating a process for transitioning between electronic devices.

DESCRIPTION OF EMBODIMENTS

Figure 1A:
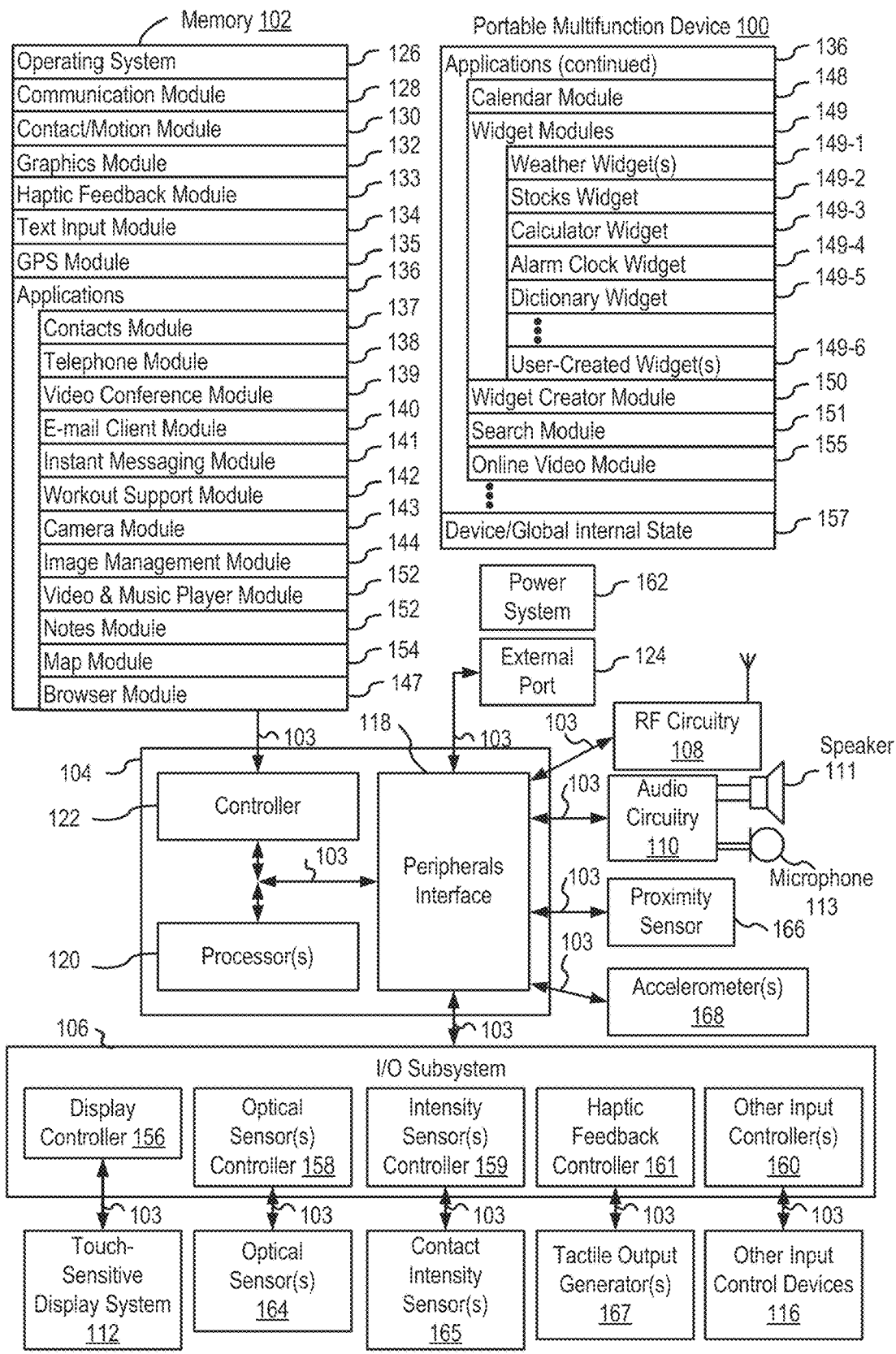
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that permit a user to efficiently transition from the use of one device to another while maintaining an overall sense of continuity. For example, if the user is using one application on a first device, it would be helpful for the second device—to which the user is transitioning—to automatically launch the same application, so that the user may continue without loss of progress. Such techniques can reduce the cognitive burden on a user who switches between uses of multiple computing devices, thereby enhancing productivity. Further, such techniques can reduce processor and battery power otherwise wasted on redundant user inputs.

Below, FIGS. 1A-1B, 2, 3, 4A-4D, 16, and 23-42 provide a description of exemplary devices for performing the techniques for transitioning between computing devices. FIGS. 5A-5L, 6A-6D, 7A-7G, 8A-8C, 17A-17E, 18A-18D, and 19A-19C illustrate exemplary user interfaces for transitioning between computing devices. FIGS. 9-15, 20-22, and 43-53 are flow diagrams illustrating methods of managing event notifications in accordance with some embodiments. The user interfaces in FIGS. 5A-5L, 6A-6D, 7A-7G, 8A-8C, 17A-17E, 18A-18D, and 19A-19C are used to illustrate the processes described below, including the processes in FIGS. 9-15, 20-22, and 43-53.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
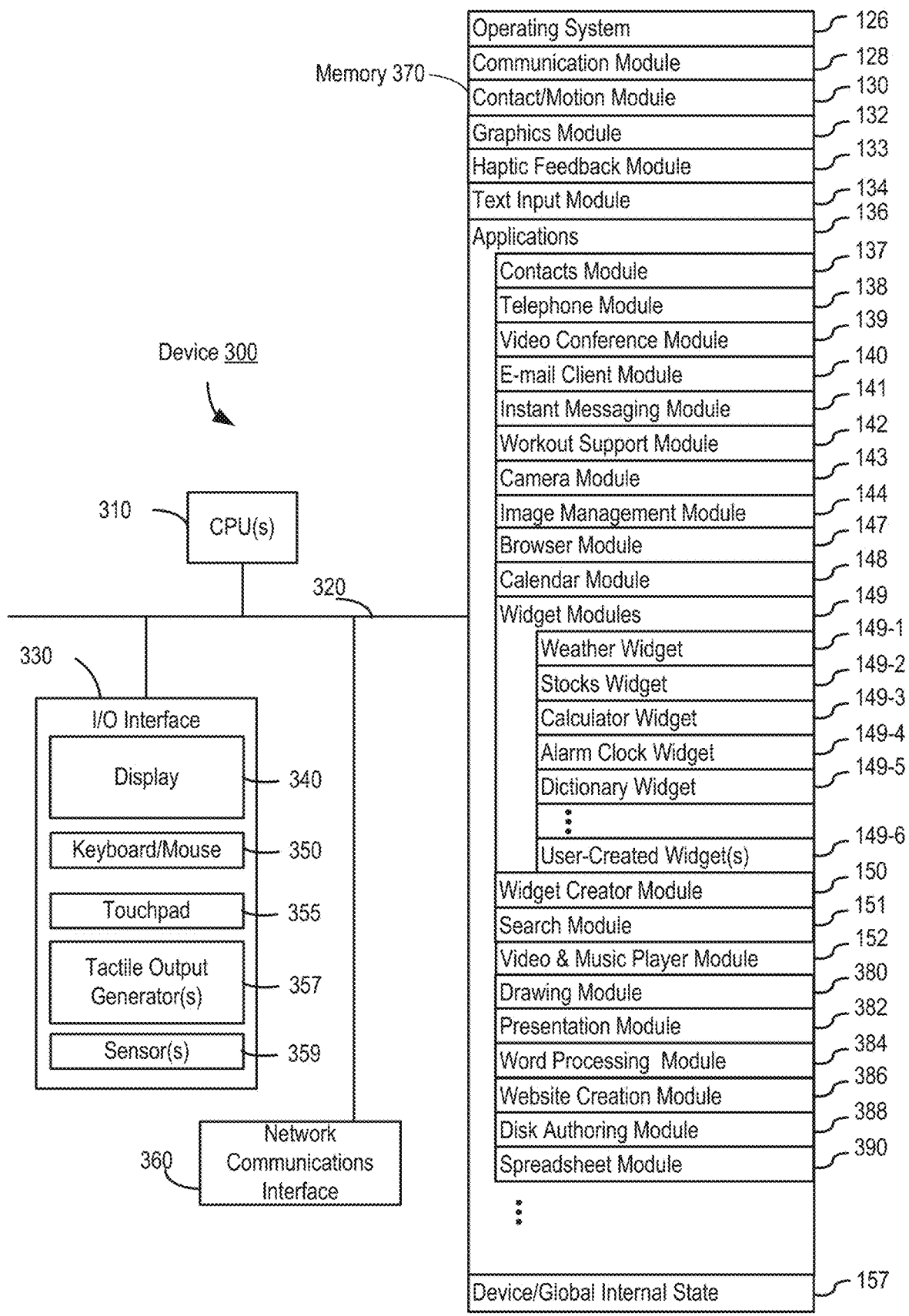
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;

Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MIMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
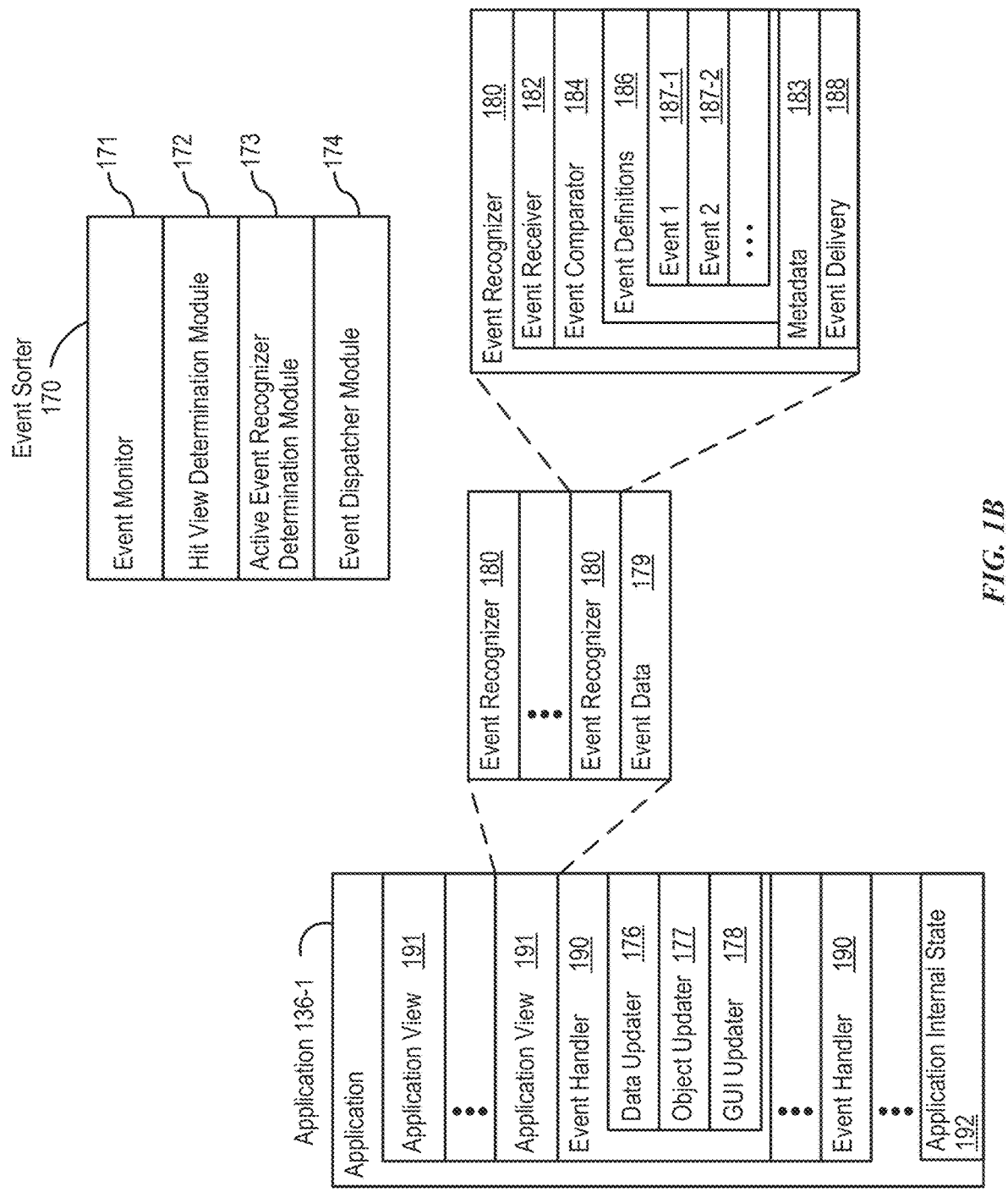
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
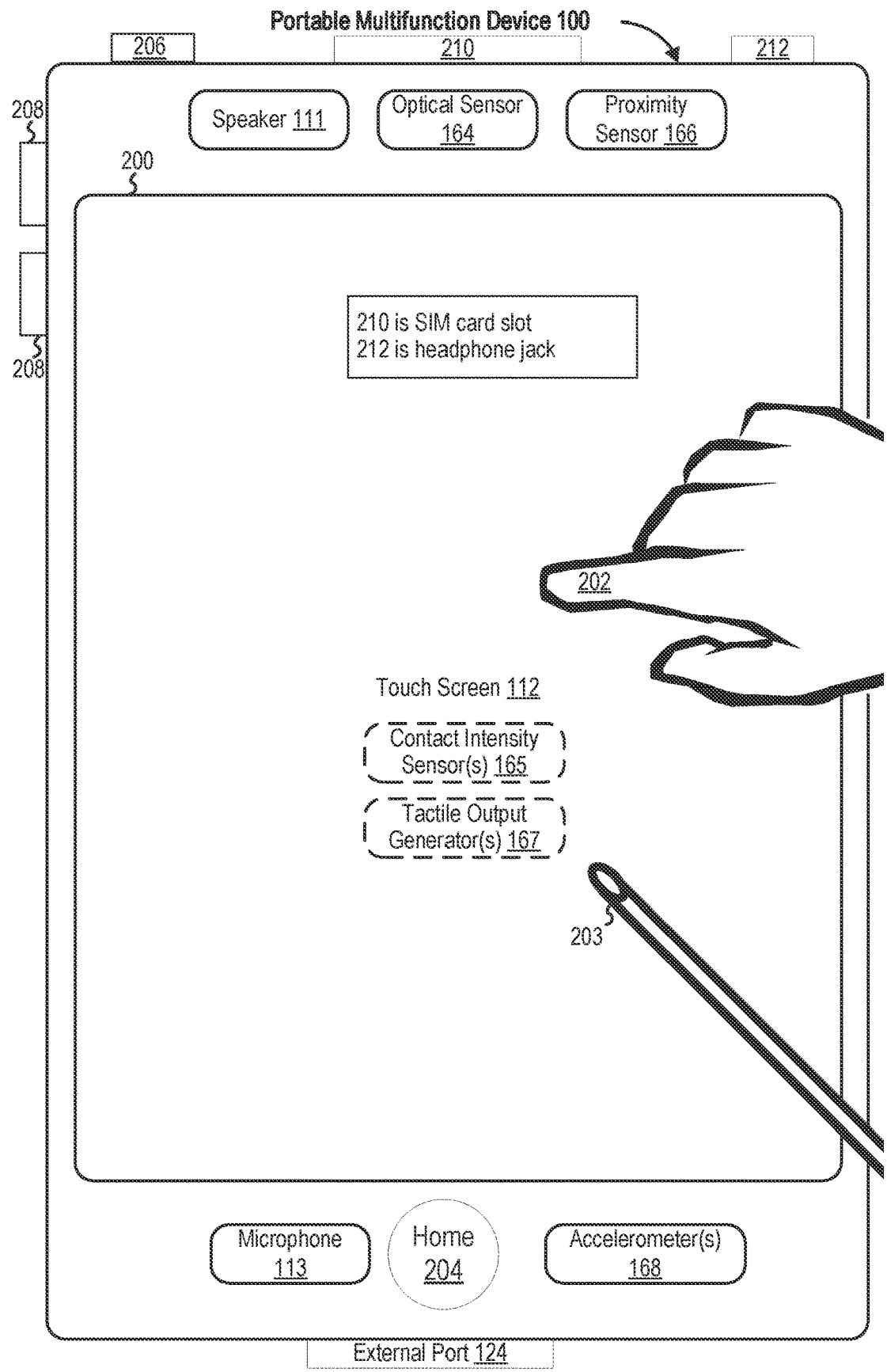
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
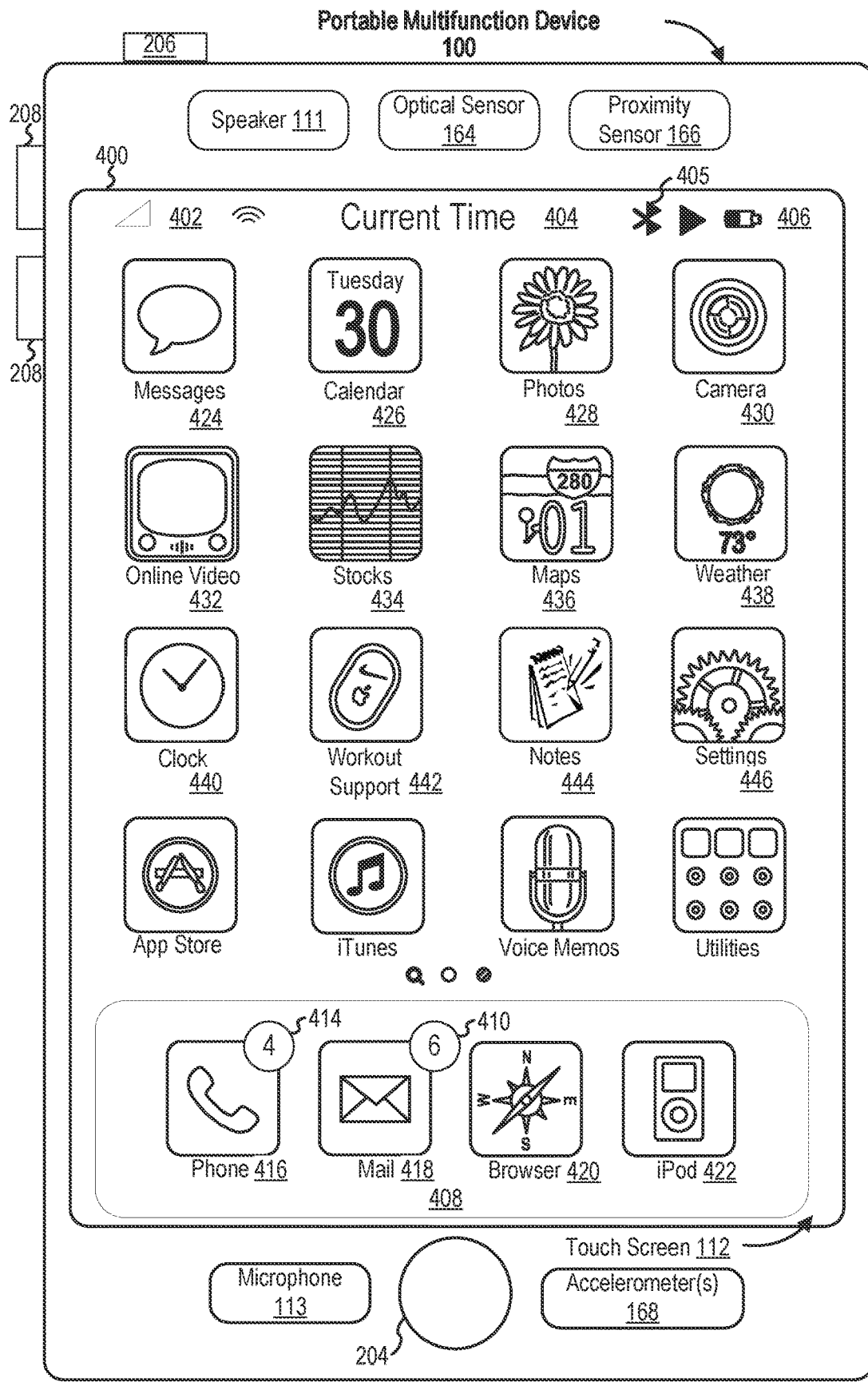
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 4C:
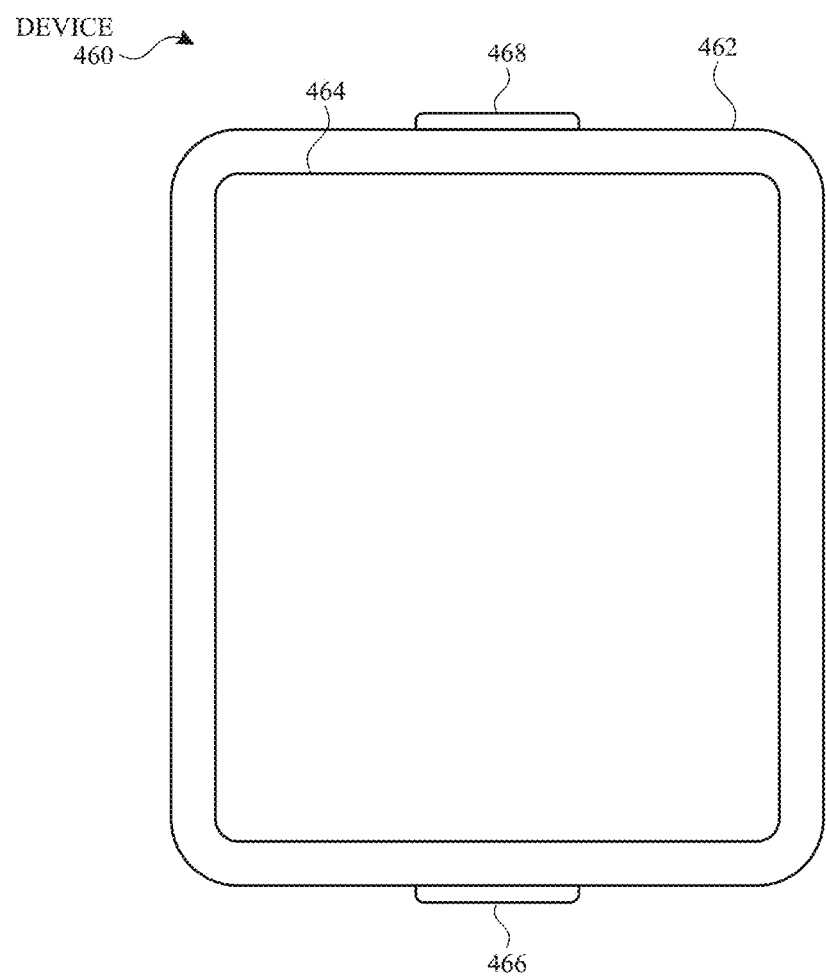
FIG. 4C illustrates a personal electronic device in accordance with some embodiments.

FIG. 4C illustrates exemplary personal electronic device 460. Device 460 includes body 462. In some embodiments, device 460 can include some or all of the features described with respect to devices 100 and 300 (e.g., FIGS. 1A-4B). In some embodiments, device 460 has touch-sensitive display screen 464, hereafter touch screen 464. Alternatively, or in addition to touch screen 464, device 460 has a display and a touch-sensitive surface. As with devices 100 and 300, in some embodiments, touch screen 464 (or the touch-sensitive surface) may have one or more intensity sensors for detecting intensity of contacts (e.g., touches) being applied. The one or more intensity sensors of touch screen 464 (or the touch-sensitive surface) can provide output data that represents the intensity of touches. The user interface of device 460 can respond to touches based on their intensity, meaning that touches of different intensities can invoke different user interface operations on device 460.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 460 has one or more input mechanisms 466 and 468. Input mechanisms 466 and 468, if included, can be physical. Examples of physical input mechanisms include push buttons and rotatable mechanisms. In some embodiments, device 460 has one or more attachment mechanisms. Such attachment mechanisms, if included, can permit attachment of device 460 with, for example, hats, eyewear, earrings, necklaces, shirts, jackets, bracelets, watch straps, chains, trousers, belts, shoes, purses, backpacks, and so forth. These attachment mechanisms may permit device 460 to be worn by a user.

Figure 4D:
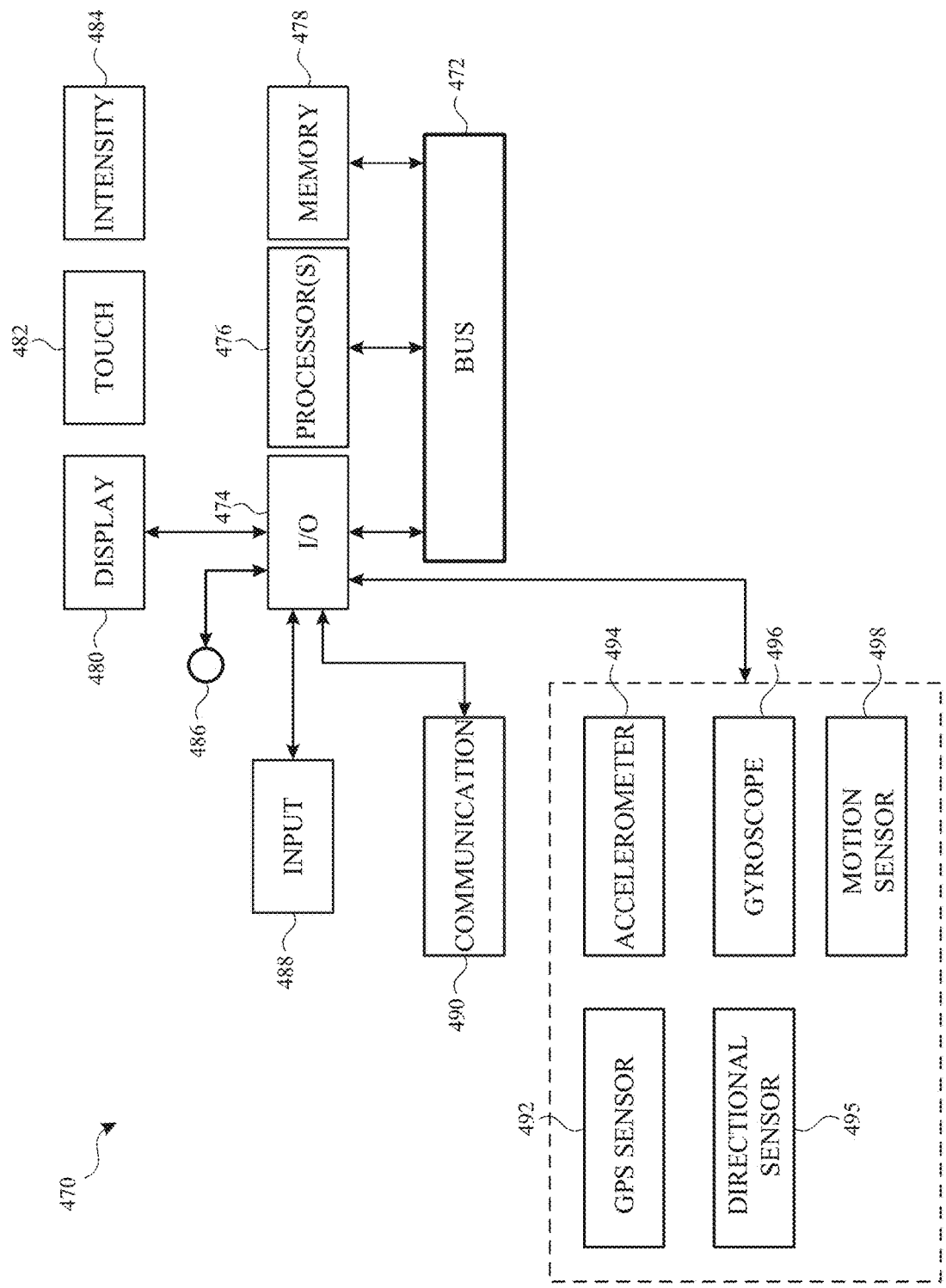
FIG. 4D is a block diagram illustrating a personal electronic device in accordance with some embodiments.

FIG. 4D depicts exemplary personal electronic device 470. In some embodiments, device 470 can include some or all of the components described with respect to FIGS. 1A, 1B, and 3. Device 470 has bus 472 that operatively couples I/O section 474 with one or more computer processors 476 and memory 478. I/O section 474 can be connected to display 480, which can have touch-sensitive component 482 and, optionally, touch-intensity sensitive component 484. In addition, I/O section 474 can be connected with communication unit 490 for receiving application and operating system data, using Wi-Fi, Bluetooth, near field communication (NFC), cellular, and/or other wireless communication techniques. Device 470 can include input mechanisms 486 and/or 488. Input mechanism 486 may be a rotatable input device or a depressible and rotatable input device, for example. Input mechanism 488 may be a button, in some examples.

Input mechanism 488 may be a microphone, in some examples. Personal electronic device 470 can include various sensors, such as GPS sensor 492, accelerometer 494, directional sensor 495 (e.g., compass), gyroscope 496, motion sensor 498, and/or a combination thereof, all of which can be operatively connected to I/O section 474.

Memory 478 of personal electronic device 470 can be a non-transitory computer-readable storage medium, for storing computer-executable instructions, which, when executed by one or more computer processors 476, for example, can cause the computer processors to perform the techniques described above, including processes 900-1500 and 2000-2200 (FIGS. 9-15 and 20-22). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 470 is not limited to the components and configuration of FIG. 4D, but can include other or additional components in multiple configurations.

As used here, the term "affordance" refers to a user-interactive graphical user interface object that may be displayed on the display screen of devices 100, 300, 460 and/or 470 (FIGS. 1, 3, and 4C-D). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, 460, and/or 470) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that may be implemented on a multifunction device with a display and a touch-sensitive surface, such as devices 100, 300, 460, and/or 470, to improve a user's experience in transitioning between different electronic devices. For brevity, the functionalities described herein may be referred to as "continuity" functionalities.

1. Exemplary use of Continuity Functionality

Figure 5C:
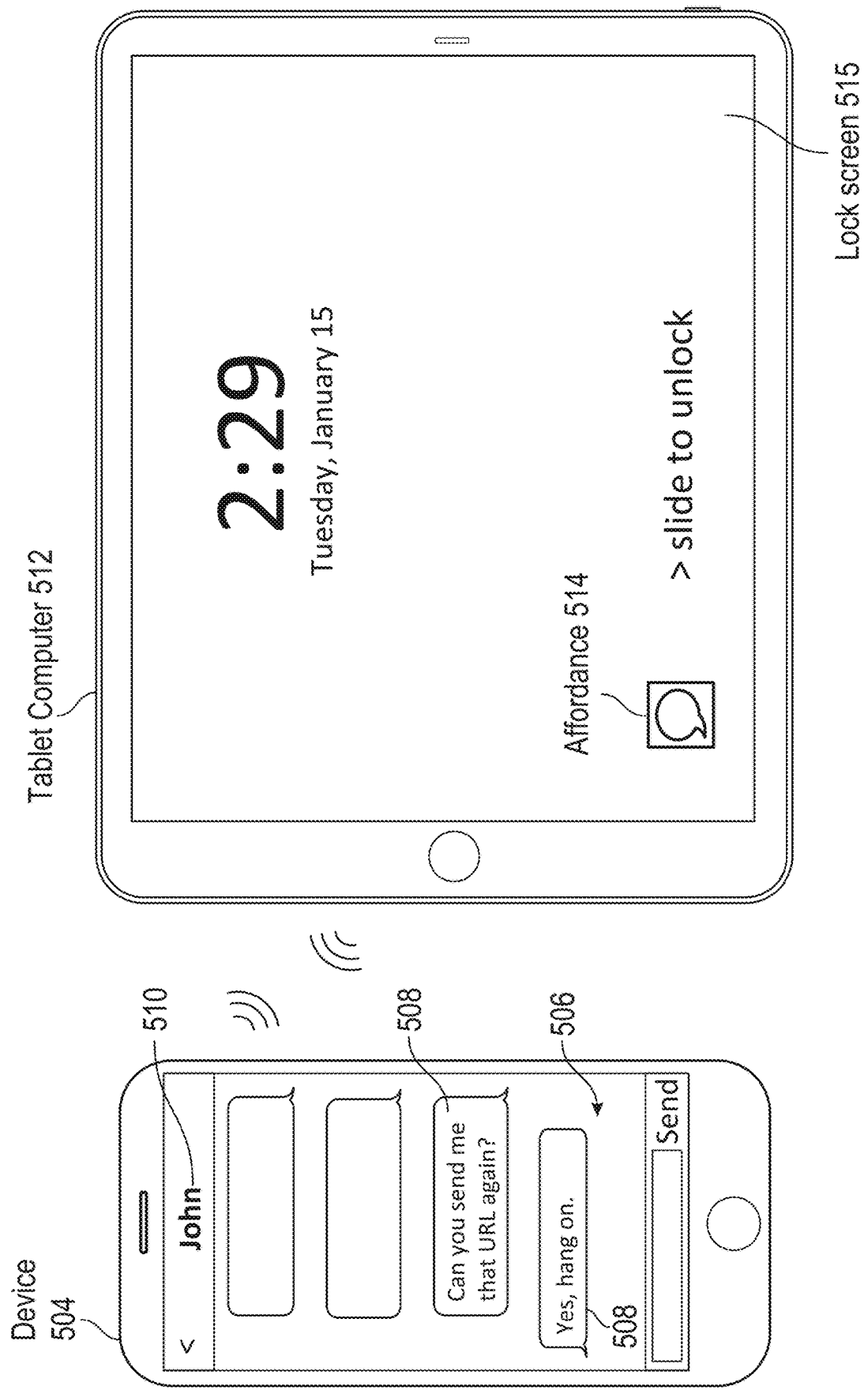
FIGS. 5A-5N illustrate exemplary user interfaces for transitioning between electronic devices.

FIGS. 5A-5D demonstrate an exemplary transition between the use of two different electronic devices using continuity functionalities. In FIG. 5A, user 502 is using electronic device 504. Electronic device 504 may be portable multifunction device 100 in some embodiments. As shown, electronic device 504 is a cellular phone. Cellular phone 504 is displaying user interface screen 506. User interface screen 506 is part of a messaging application that is executing on cellular phone 504. User interface screen 506 shows a message transcript between user 502 and participant 510, named John. The illustrated message transcript includes message bubbles 508 representing a messaging conversation. In the ongoing conversation, John (participant 510) has asked user 504 for a web site URL.

Because cellular phone 504 has a relatively small display screen, looking up the requested web site URL on cellular phone 504 may prove inefficient. Instead, user 504 may wish to find the requested information on an electronic device having a relatively larger display. As shown in FIG. 5B, user 504 approaches tablet computer 512 for this purpose, as tablet computer 512 has a larger screen and is better suited for the task. As user 502, who is holding cellular phone 504, approaches tablet computer 512, the two devices come within wireless communications range of each other and begin wireless communication. Tablet computer 512 may detect the presence of cellular phone 504 via a low-energy wireless protocol. Upon detection, tablet computer 512 may obtain from cellular phone 504 additional information, such as usage information, indicating that a messaging application is active on cellular phone 504.

Turning to FIG. 5C, based on this information, tablet computer 512 displays affordance 514 indicating that is possible for the user to continue his on-going messaging conversation on tablet computer 512. Affordance 514 may be displayed on user-interface locked screen 515. Restated, in response to detecting cellular phone 504, and receiving usage information (regarding the messaging application being used on cellular phone 504), tablet computer 512 displays continuity affordance (e.g., icon) 514 to inform the user that continuity of the messaging application across the devices is possible.

As used here, the term "affordance" refers to a user-interactive graphical user interface object may be displayed on the display screen of device 100, 300, and/or 460 (FIGS. 1, 3, and 4C). For example, an image (e.g., icon), a button, and text (e.g., hyperlink) may each constitute an affordance.

Figure 5D:
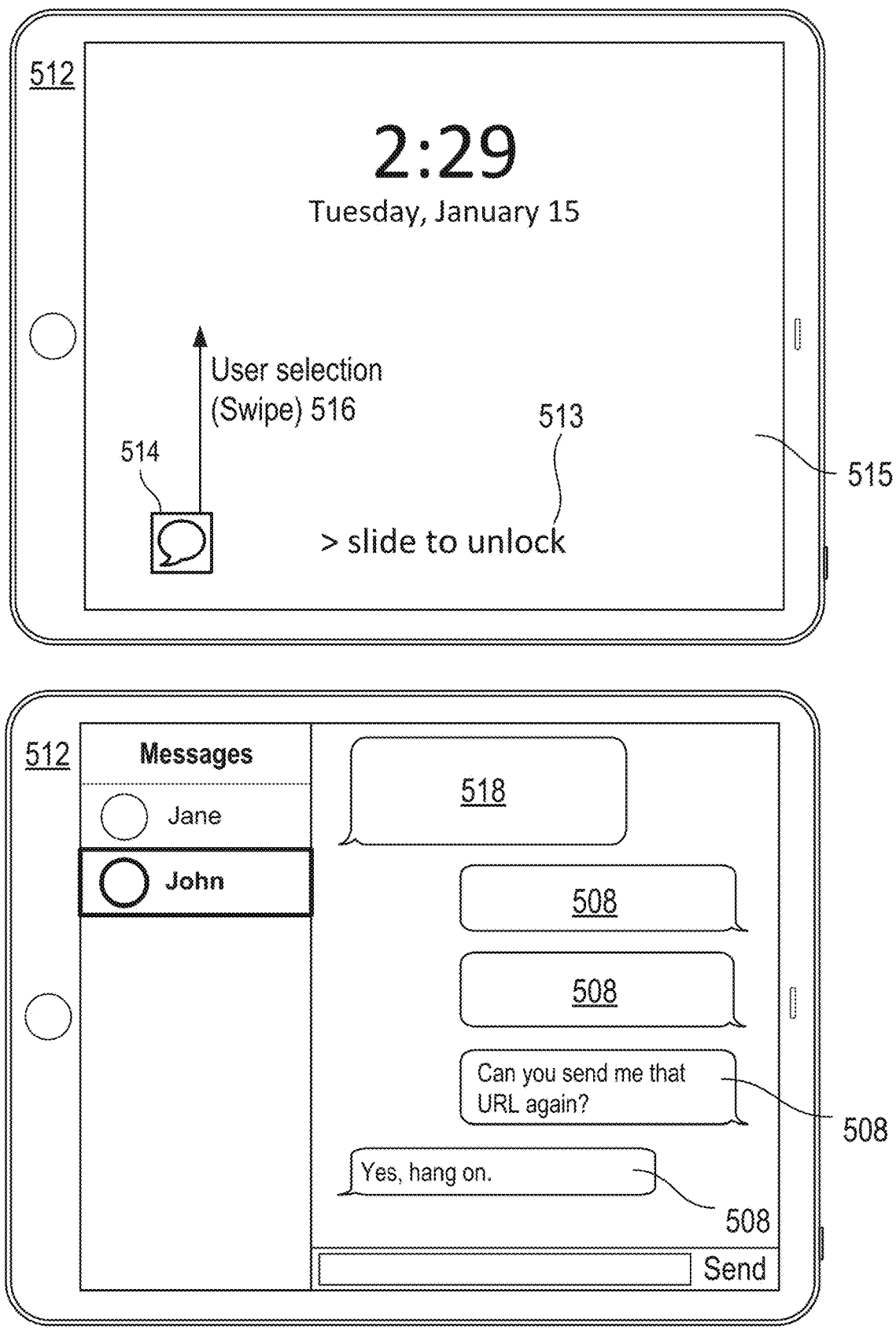

A user may select the displayed continuity affordance to launch a corresponding messaging application. In some embodiments, a user may select a continuity affordance via a touch gesture (e.g., tap, swipe, flick, long touch). In some embodiments, a user may select a continuity affordance via a mouse gesture (e.g., hover, click, double-click, drag). In the example of FIG. 5D, user 502 may swipe continuity affordance 514 upwards (as indicated by arrow 516) to launch the corresponding messaging application on tablet computer 512. That is, in response to a swipe gesture in a particular direction (e.g., up), tablet computer 512 unlocks and launches a messaging application. The messaging application that is launched on tablet computer 512 may be a version of the active messaging application on cellular phone 504. For example, the active messaging application on tablet computer 512 may be Messages for iPad® while the active messaging application on cellular phone 504 may be Messages for iPhone®, both made by Apple Inc. of Cupertino, California.

In addition to launching a corresponding messaging application, tablet computer 512 may also display the same message transcript that is shown on cellular phone 504. Further, because tablet computer 512 has a larger display screen, additional message bubble 518 may be shown (recall only bubbles 508 were shown on cellular phone 504). From here, user 502 may switch to a web browsing application on tablet computer 512 to find the requested URL for participant 510.

Through the above-described continuity techniques, user 502 transitioned from cellular phone 504 to tablet computer 512 without a loss of progress. During the transition, user 502 did not need to find and launch messages application manually. Further, during the transition, user 502 did not need to search for the message transcript involving participant 510 among other message transcripts. Rather, the state of the messaging application survived the transition from cellular phone 504 to tablet computer 512.

U.S. patent application Ser. No. 11/322,549, now U.S. Pat. No. 7,657,849, describes that, in the user-interface lock state (hereinafter the "lock state"), a device such as device 100, 300, or 460 is powered on and operational but ignores most, if not all, user input. That is, the device takes no action in response to user input and/or the device is prevented from performing a predefined set of operations in response to the user input. The predefined set of operations may include navigation between user interfaces and activation or deactivation of a predefined set of functions. The lock state may be used to prevent unintentional or unauthorized use of the device or activation or deactivation of functions on the device. When the device is in the lock state, the device may be said to be locked. In some embodiments, the device in the lock state may respond to a limited set of user inputs, including input that corresponds to an attempt to transition the device to the user-interface unlock state or input that corresponds to powering the device off. In other words, the locked device responds to user input corresponding to attempts to transition the device to the user-interface unlock state or powering the device off, but does not respond to user input corresponding to attempts to navigate between user interfaces. It should be appreciated that even if the device ignores a user input, the device may still provide sensory feedback (such as visual, audio, or vibration feedback) to the user upon detection of the input to indicate that the input will be ignored. A locked device, however, may still respond to a limited class of input. The limited class may include input that is determined by the device to correspond to an attempt to transition the device to the user-interface unlock state, including inputs that invoke continuity features.

In the user-interface unlock state (hereinafter the "unlock state"), the device is in its normal operating state, detecting and responding to user input corresponding to interaction with the user interface. A device that is in the unlock state may be described as an unlocked device. An unlocked device detects and responds to user input for navigating between user interfaces, entry of data and activation or deactivation of functions. In embodiments where the device includes a touch screen, the unlocked device detects and responds to contact corresponding to navigation between user interfaces, entry of data and activation or deactivation of functions through the touch screen.

Figure 5E:
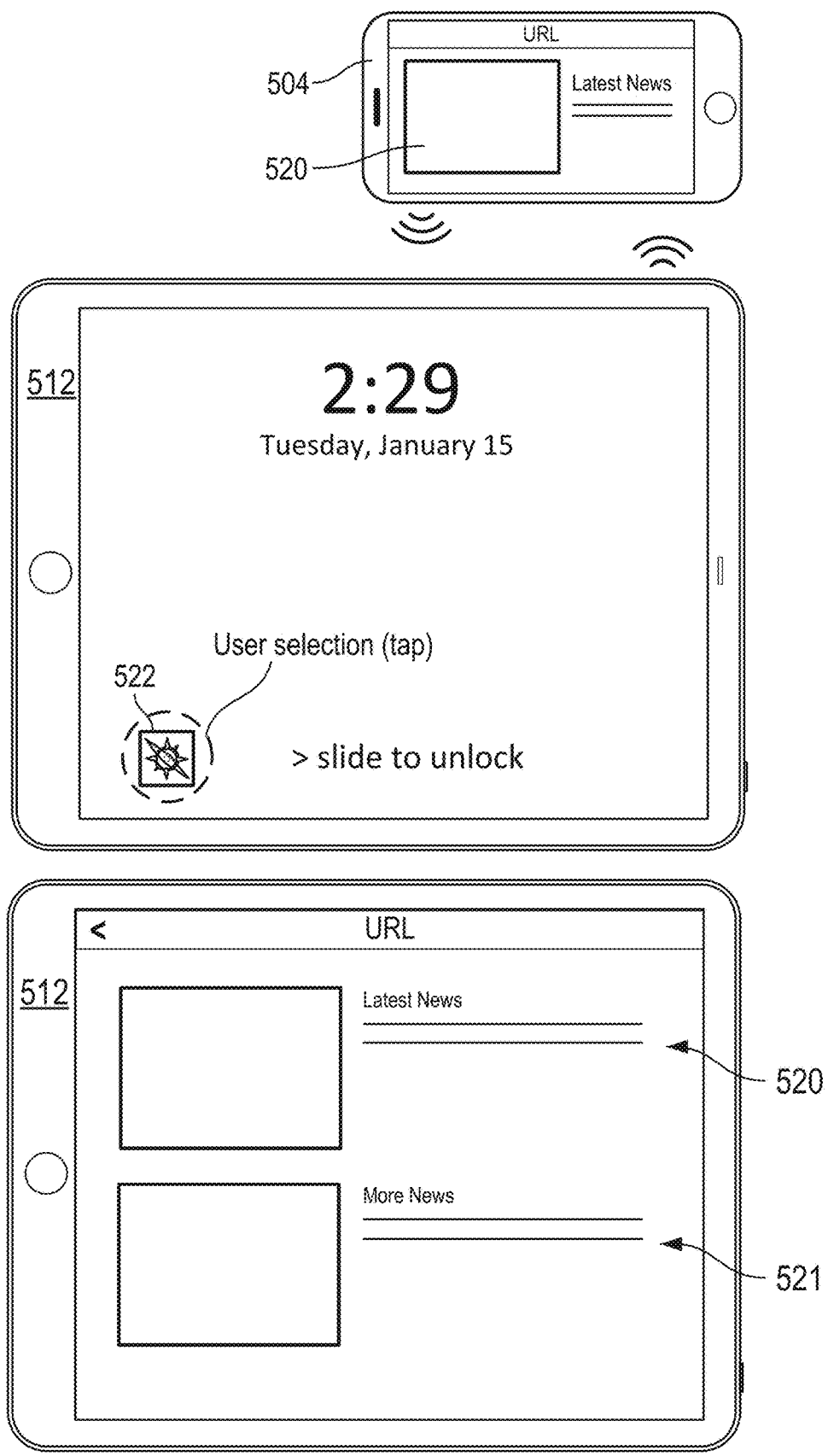

FIG. 5E illustrates another example of continuity between cellular phone 504 and tablet computer 512, but involves a different exemplary application—in this instance a web-browsing application. FIG. 5E demonstrates how continuity functionalities may benefit a user who is working with a lengthy document. As shown, cellular phone 504 is displaying web-page 520 via a web browsing application. Because cellular phone 504 has a relatively small display screen, the user may wish to transition to a larger device, such as tablet computer 512, that is in-range. Because the two devices are in-range, tablet computer 512 may detect the proximity of cellular phone 504 wirelessly and may receive usage information regarding the active web browsing application from cellular phone 504. In response to this detection and the received usage information, tablet computer 512 displays continuity affordance 522. Continuity affordance 522 may include a thumbnail image indicating that the application to be launched is a web browsing application. When the affordance is selected, tablet computer 512 launches its version of the web-browsing application. Further, upon launching the corresponding web browsing application, tablet computer 512 displays the portion of web-page 520 that is displayed on cellular phone 504. Thus, user 502 may continue reading from where he left off. Note that, because tablet computer 512 has a larger display screen, additional portion 521 of web-page 520 may also be displayed for viewing.

In some embodiments, a user selects (e.g., invokes) a continuity affordance by swiping the affordance in a particular direction. In the example of FIG. 5D, an upward swipe is used to invoke continuity affordance 514. When this is the case, in response to a tap on the continuity affordance—which is insufficient for invoking continuity features—the device may bounce the continuity affordance (via visual animation) to indicate to the user that a swipe is necessary to invoke the continuity features. Optionally, the device may display instructional text informing the user that a swipe is necessary. Optionally, device 100 may require the user to swipe the continuity affordance beyond a predetermined threshold distance in order for the swipe to register as a selection. When this is the case, in response to a swipe shorter than the threshold, the device may bounce-back the affordance, thereby suggesting to the user that a longer swipe is necessary to invoke the continuity features. Optionally, the device may display an instructional text informing the user that a longer swipe is necessary to invoke continuity features. Optionally, the device may display the instructional text only after the user has interacted with the affordance a few times but failed to invoke the feature in each attempt. Alternatively, in some embodiments, a user selects a continuity affordance by tapping the affordance. In the example of FIG. 5E, continuity affordance 522 may be selected by a tap.

2. Exemplary User Interfaces for Invoking Continuity Functionality

Figure 5F:
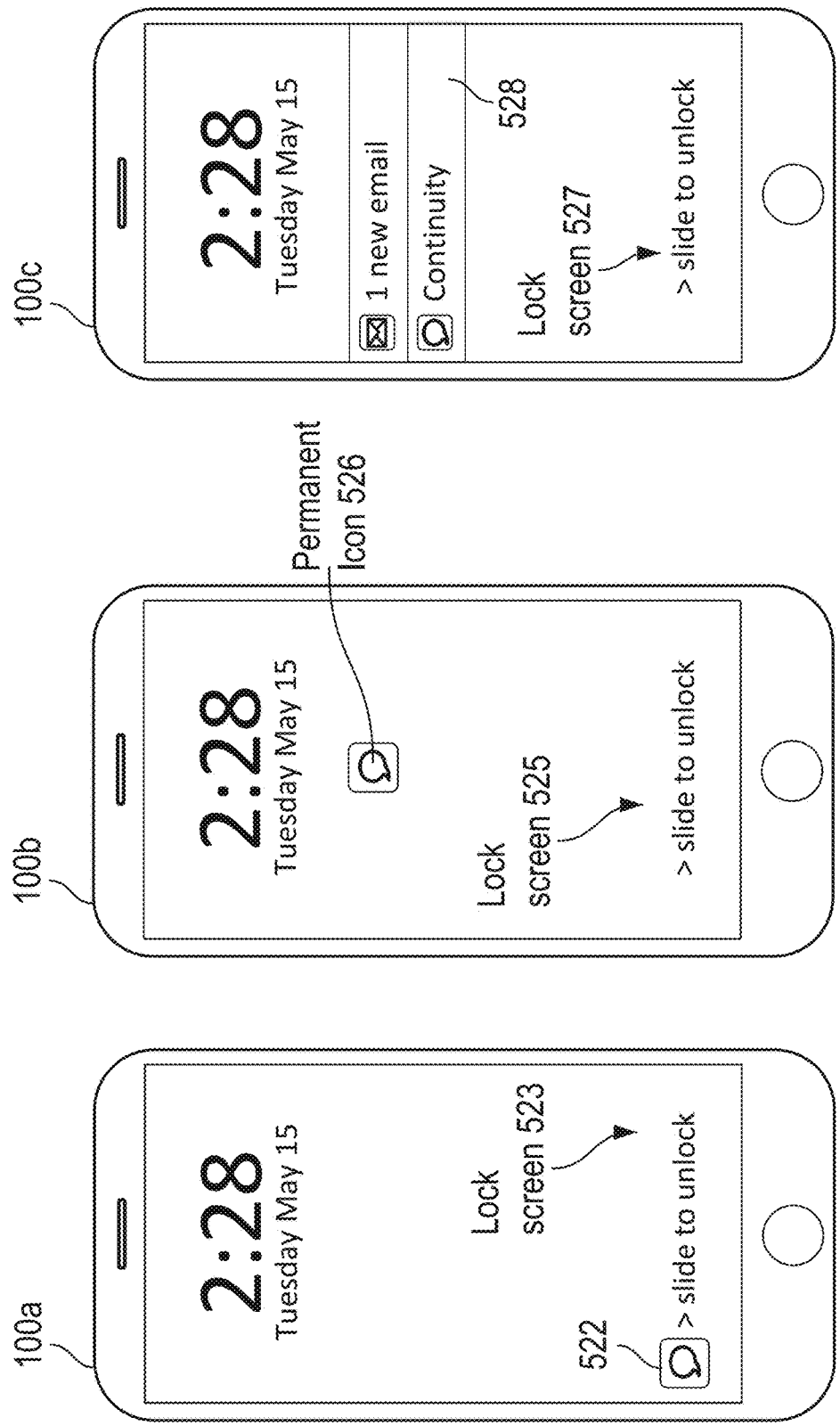

Attention is now directed to additional ways in which affordances for invoking continuity functionalities may be displayed, with reference to FIGS. 5F-5N. As shown in FIG. 5F, in some embodiments, continuity affordance 522 becomes displayed on user interface lock screen 523 when device 100a senses a compatible external device that is in-range and that is transmitting relevant application usage data. (Device 100a may be device 100 in some embodiments.) The display of continuity affordance 522 may be temporary, meaning that continuity affordance 522 may cease to be displayed after some condition. For example, continuity affordance 522 may be removed from display after it has been displayed for a predetermined time (e.g., 8 seconds). As another example, continuity affordance 522 may be removed from display if the compatible external device leaves communications range. Optionally, continuity affordance 522 does not display if the touch-sensitive display of device 100a is powered-on after a predetermined time (e.g., 8 seconds) has elapsed since the compatible external device came within range, even if the device has transmitted relevant application usage data. Optionally, continuity affordance 522 becomes displayed on lock screen 523 only when the compatible external device (or active application thereon) was recently used within a predetermined amount of time (e.g., within the last 8 seconds).

Also as shown in FIG. 5F, in some embodiments, continuity affordance 526 appears permanently on user interface lock screen 525 of device 100b, meaning that the affordance is displayed whenever lock screen 525 is displayed. (Device 100b may be device 100 in some embodiments.) Permanent continuity affordance 526 may take on one visual appearance when a compatible device is nearby and continuity is possible. The affordance may take on another visual appearance when there is no device to transition to, e.g., it may appear disabled. Permanent continuity affordance 526 may be used where it is desirable for continuity features to have an emphasized visual profile.

Also as shown in FIG. 5F, in some embodiments, continuity affordance 526 is displayed on lock screen 527 of device 100c as a message in a queue of other system messages. (Device 100c may be device 100 in some embodiments.) As shown, device 100c may display notification messages notifying a user to incoming messages, phone calls, calendar entries, and the like. Device 100c may organize these notification messages into a queue. In these embodiments, continuity affordance 526 may appear in the same manner to notify the user of the device's capability to launch a corresponding application. This placement may be used where it is desirable for continuity features to have a reduced, limited visual profile.

Figure 5G:
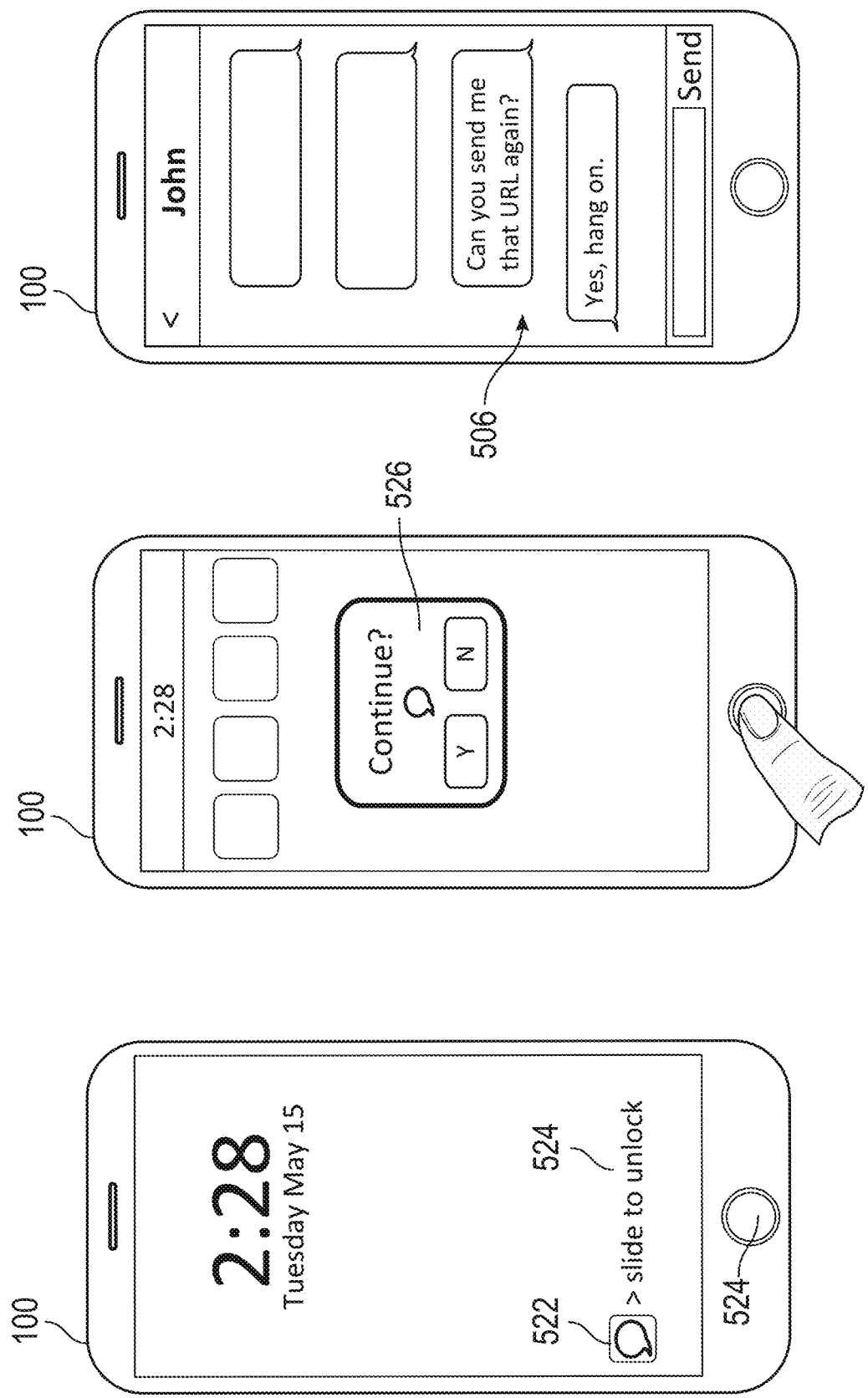

FIG. 5G illustrates the incorporation of continuity features with a biometric reader. Device 100 may have a biometric reader that is used for unlocking the device. In FIG. 5G, device 100 is equipped with a biometric reader in the form of fingerprint reader 534. Device 100 may be configured to unlock when fingerprint reader 534 reads a known fingerprint. When unlocking, if device 100 detects a compatible external device that is in-range and that is transmitting relevant application usage data, device 100 may display dialog 536. Dialog 536 asks the user whether continuity is desired. If the user indicates "yes," device 100 launches a corresponding application using continuity techniques, as discussed above. For example, device 100 may launch a messaging application that corresponds to the messaging application executing on device 504 (FIG. 5A). The launched messaging application may display the message transcript shown in user interface screen 506 (FIG. 5A).

Figure 5H:
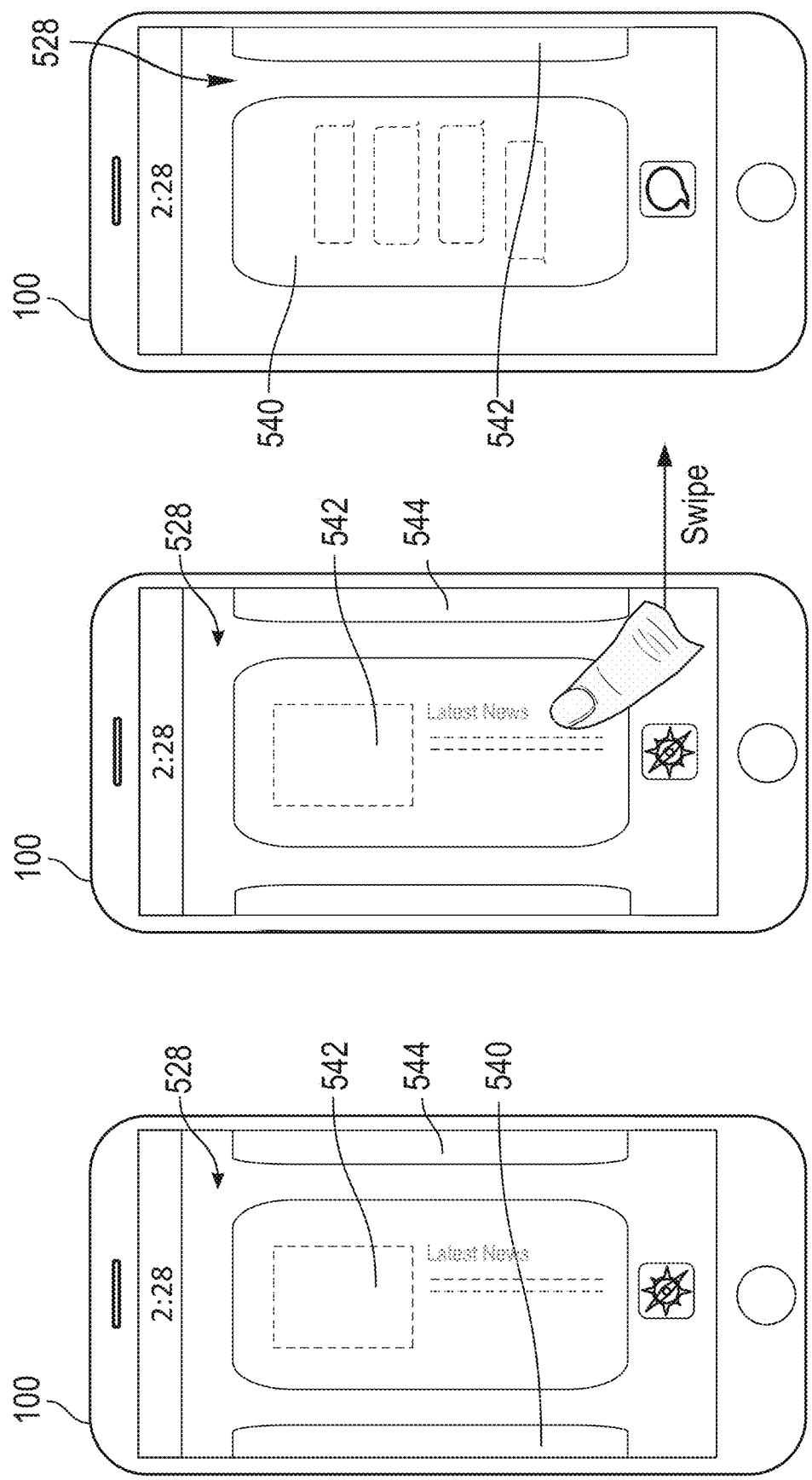

FIG. 5H illustrates the incorporation of continuity features into a multi-tasking user interface screen in some embodiments. As shown, device 100 may display multi-tasking screen 538. Multi-tasking screen 538 may be a user interface for choosing, from among multiple active applications, an application that should become the active application on device 100. For this purpose, multi-tasking screen 538 may include affordances 540, 542, and 544 that correspond to different applications. Affordances 540, 542, and 544 are located near the left side, center, and right side of screen 538, respectively. Center affordance 542 may represent the most-recently active application on device 100. Right affordance 544 may represent a background application running on device 100. A user selection (e.g., tap) of affordance 542 or 544 may make the corresponding application the active application on device 100.

Left-most affordance 540 may be reserved for invoking continuity features. Affordance 540 may be displayed when device 100 detects a compatible external device that is in-range and that is transmitting relevant application usage data. In the illustrated example, a user selection (e.g., tap) of affordance 540 causes device 100 to launch a corresponding application using continuity techniques. For instance, in response to a user selection of affordance 540, device 100 may launch a messaging application that corresponds to the messaging application last used on device 504 (FIG. 5A). The launched messaging application may display the message transcript shown in user interface screen 506 (FIG. 5A).

To facilitate a user's identification of the applications represented by affordances of 540, 542, and 544, each of the affordances may display a thumbnail image of the application. For example, affordance 540 may show a thumbnail image of user interface screen 506 to indicate that the message transcript (e.g., application state) that would be launched in response to the user's selection of the affordance. In addition, to facilitate a user's selection of affordance 540, multi-tasking screen 538 may be scrollable. That is, the use may swipe center affordance 542 rightward to bring affordance 540 to the center of the screen for more convenient selection.

Figure 5I:
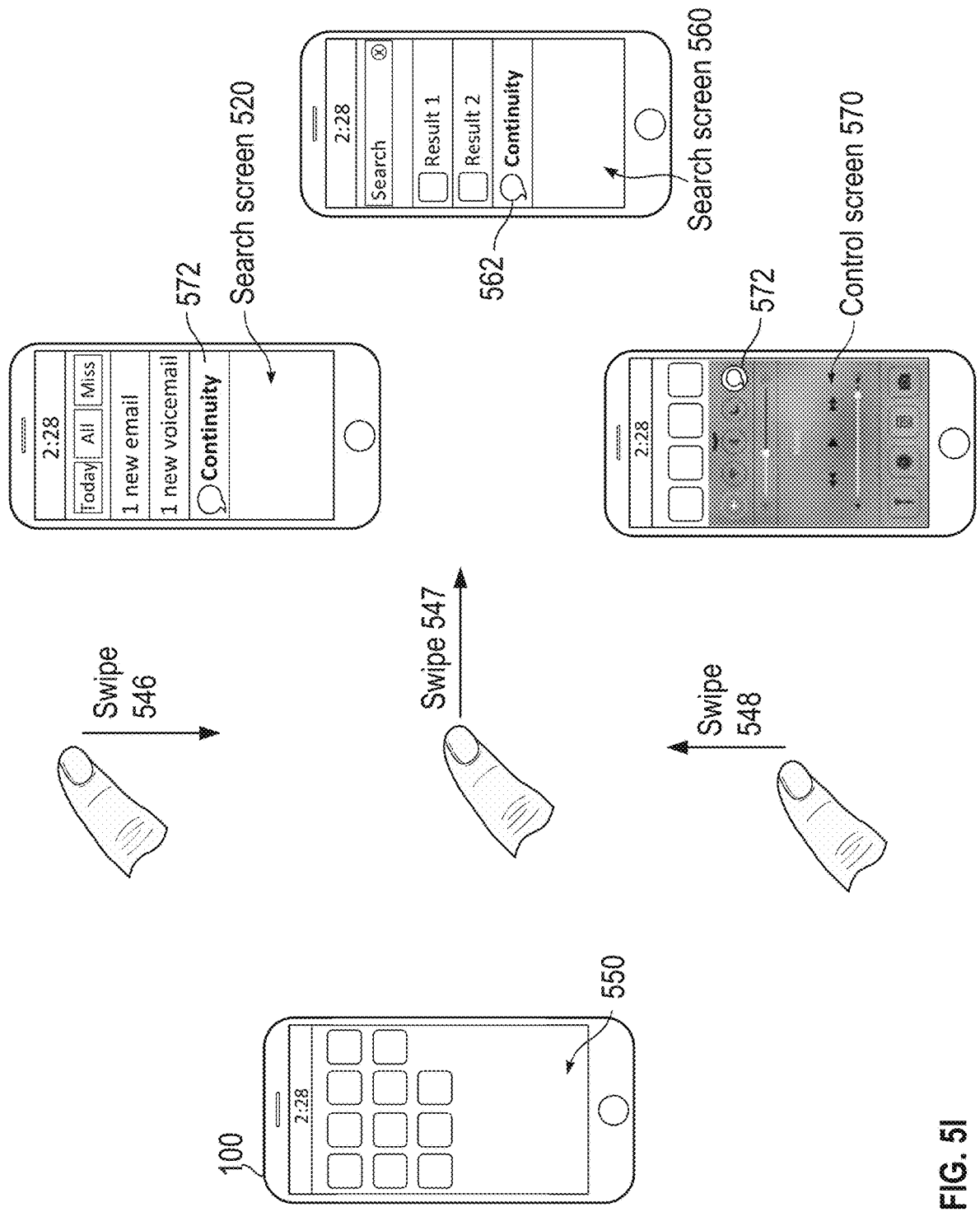

FIG. 5I illustrates the inclusion of continuity features into yet other user interface screens. The operating system of a device like device 100 may provide certain screens that are "pervasive" in the sense that the screens are generally accessible within the operating environment. The incorporation of continuity affordances into one or more of these pervasive screens may promote the accessibility of continuity features throughout the operating environment. As shown in FIG. 5I, while device 100 is displaying a user interface screen 550, a user may swipe downwards from the top edge of screen 550 as indicated by arrow 546 to reveal notifications screen 530. (User interface screen 550 may be an application screen or a "home" screen.) Alternatively, a user may swipe rightwards from the left edge of screen 550 to reveal search screen 560, as indicated by arrow 547. Alternatively, a user may swipe upwards from the bottom edge of screen 550 to reveal control screen 570, as indicated by arrow 548. (As used here, the left, top, and bottom edges lie on a plane that is coplanar with the display surface.)

Notifications screen 530 may display notification messages notifying a user to device activity such as incoming messages, phone calls, calendar entries, and the like. Notifications screen 530 may also include continuity affordance 532 to notify the user of the device's capability to launch an application corresponding to the active application of an in-range external device. A user may select (e.g., tap) continuity affordance 532 to launch a corresponding application on device 100. Search screen 560 may display a search criteria and a set of related search results. The search results may include continuity affordance 562. A user may select (e.g., tap) continuity affordance 562 to launch a corresponding application on device 100. Control screen 570 may have affordances for controlling the operation of device 100, such as switches for toggling airplane mode, wireless communication, cellular communication, peer-to-peer communication, and so forth. In some embodiments, control screen 570 may include continuity affordance 572 for switching on/off continuity features, meaning that a user can select (e.g., tap) continuity affordance 572 to enable/disable continuity features. In some embodiments, control screen 570 includes continuity affordance 572 for launching an application using continuity features, meaning that a user can (e.g., tap) continuity affordance 572 to launch a corresponding application on device 100.

The exact swipe gestures (and more generally, input modalities) used to invoke notifications screen 530, search screen 560, and control screen 570 may vary in different embodiments. For example, in some embodiments notifications screen 530 and control screen 570 may be invoked in opposite fashion than that illustrated by FIG. 5I That is, it is possible for a downward swipe from the top edge (e.g., 546) to invoke control screen 570 and for an upward swipe from the bottom edge (e.g., 548) to invoke notifications screen 530. In yet other embodiments, device 100 may differentiate swipe gestures based on whether a swipe is made from an edge of the touch-sensitive display. That is, it is possible for device 100 to display notifications screen 530 in response to a downward swipe that is from the top edge of the touch-sensitive display, but to display search screen 560 in response to a downward swipe that originates within the perimeter of the touch-sensitive display. The incorporation of continuity affordances into one or more of these pervasive screens can beneficially promote the accessibility of continuity features throughout the operating environment.

Figure 5K:
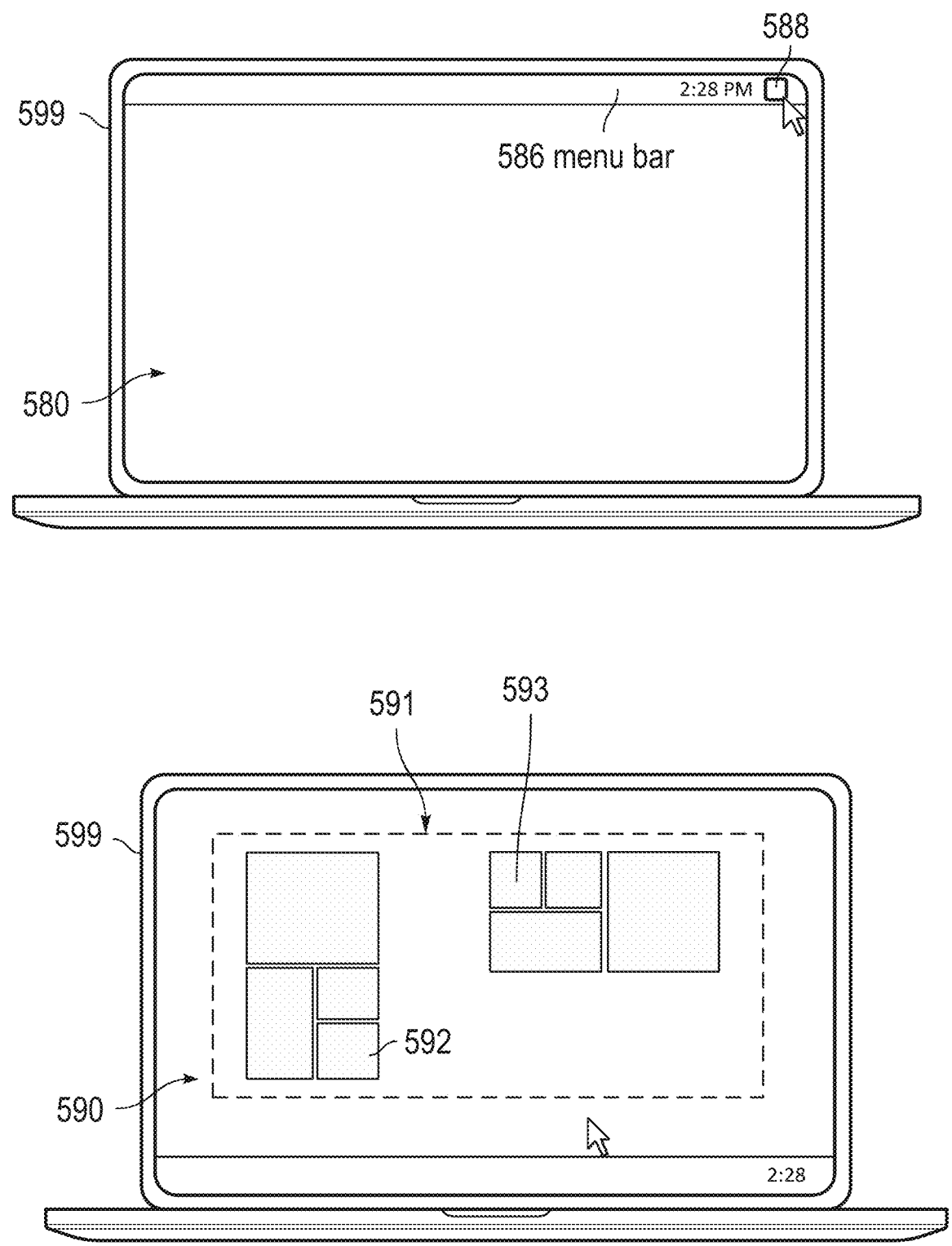
Figure 5L:
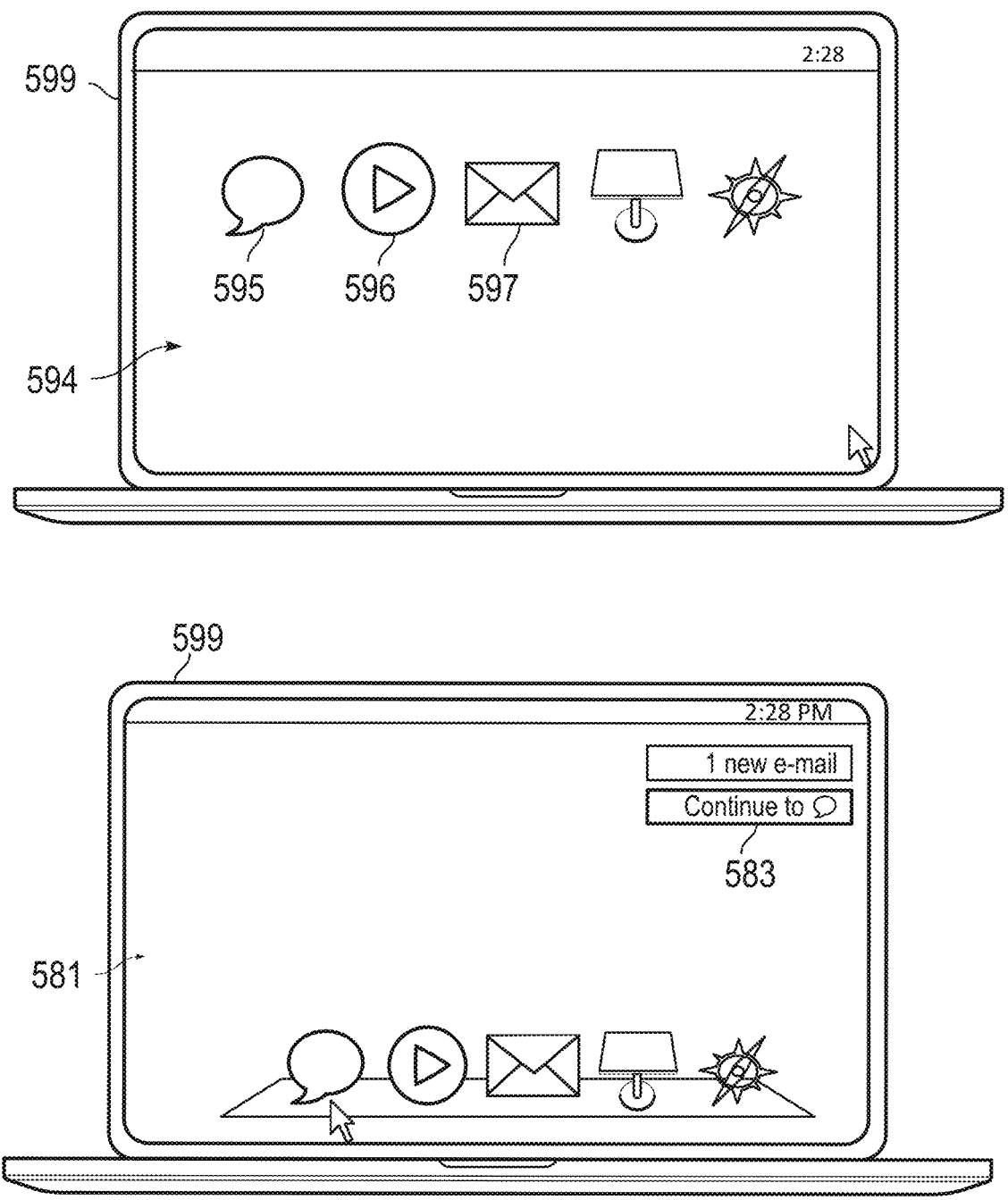

FIGS. 5J-5L illustrates additional placements of continuity affordances in various user interfaces. In FIG. 5J, laptop 599 is in a user-interface locked state and requires the entry of a password to unlock. Laptop 599 may be device 300 in some embodiments. In addition to password entry field 574, lock screen 576 includes continuity affordance 578. In the illustrated example, continuity affordance 578 is located at the top right corner of lock screen 576, where notification messages are also displayed. In some embodiments, a user may invoke continuity features by entering a proper password into password input field 574 and clicking on continuity affordance 578. That is, in response to receiving a valid password and a mouse-event (e.g., click) on continuity affordance 578, device 599 may unlock and launch an application corresponding to an active application of an in-range device. In some embodiments (not illustrated in FIG. 5J), continuity affordance 578 is located in the password input field 574. In some embodiments (not illustrated in FIG. 5J), lock screen 576 includes a thumbnail image indicating the application that would be launched if continuity affordance 578 is invoked. In some embodiments, after unlocking, laptop 599 asks the user for confirmation before launching the corresponding application.

As also shown in FIG. 5J, laptop 599 may be unlocked and may display desktop screen 580. Desktop screen 580 may have dock area 582. Dock area 582 may have icons for launching applications. Dock area 582 may also include continuity affordance 584 for launching an application using continuity functionalities. In some embodiments, continuity affordance 584 permanently resides in area 582. In some embodiments, continuity affordance 584 is inserted into dock area 582 when a compatible device comes within range of laptop 599 and transmits relevant application usage data to laptop 599. Optionally, continuity affordance 584 may bounce as it is inserted into dock area 582 to promote visibility. In some embodiments, when displayed, continuity affordance 584 is the left-most icon on dock area 582. In some embodiments, continuity affordance 584 is removed from area 582 after it has been displayed for a predetermined amount of time (e.g., 8 seconds). In response to a user selection (e.g., tap) of continuity affordance 584, laptop 599 may launch an application based on continuity features, e.g., a different version of the messaging application that is active on cellular phone 504 (FIG. 5A).

An example of dock area 582 is the Dock provided by the Mac OS operating system, made by Apple Inc. of Cupertino, California Dock area 582 may, however, take on other visual forms in different embodiments. For example, dock area 582 may appear as a bar across the bottom or another edge of the screen, to which icons for launching applications can be pinned.

As shown in FIG. 5K, desktop screen 580 displayed by laptop 599 may have menu bar 586. Menu bar 586 may include affordance 588 for launching an application using continuity functionality. In some embodiments, continuity affordance 588 is the right-most icon on menu bar 586. In some embodiments, continuity affordance 588 permanently resides on menu bar 586. In some embodiments, continuity affordance 588 is inserted into menu bar 586 when a compatible device comes within range of laptop 599 and transmits relevant application usage data to laptop 599. Continuity affordance 588 may bounce (e.g., via an animation) as it is inserted into menu bar 586 to promote visibility. In some embodiments, continuity affordance 588 is removed from menu bar 586 after it has been displayed for a predetermined amount of time (e.g., 8 seconds). In response to a user selection (e.g., tap) of continuity affordance 588, laptop 599 may launch an application based on continuity features, e.g., a different version of the messaging application that is active on device 504 (FIG. 5A).

One example of menu bar 586 shown in FIG. 5K is the menu bar called "Finder" in the Mac OS operating system, made by Apple Inc. of Cupertino, California. In different embodiments, menu bar 586 may, however, reside at different on-screen locations, meaning that it may be located away from the top edge of the screen. For example, menu bar 586 may appear as a bar across the bottom edge of the screen, to which a hierarchical menu for starting application programs can be found. In such an implementation, continuity affordance 588 may appear in the lower right area of the screen, for example.

As also illustrated in FIG. 5K, laptop 599 may be unlocked and may display desktop screen 590. Desktop screen 590 may have icon grid 591. Icon grid 591 may have icons for launching applications on laptop 599. For example, icon grid 591 may have icon 592 for launching a web browsing application on device 100. Icon grid 590 may also include continuity affordance 593 for launching an application using continuity functionality. In response to a user selection (e.g., tap) on continuity affordance 593, laptop 599 may launch an application based on continuity features, e.g., a different version of the messaging application that is active on device 504 (FIG. 5A).

As shown in FIG. 5L, laptop 599 may display a task-switching user interface (task-switcher) 594 for switching between different applications that are executing on laptop 599. Task-switcher 594 includes affordances representing active applications. As shown, task-switcher 594 may include affordances 596 representing an application that is active in the foreground of laptop 599. Task-switcher 594 also may include affordances 597 representing background applications on laptop 599. Task-switcher 594 also may include continuity affordance 595 for launching an application using continuity functionality. In some embodiments, continuity affordance 595 is the left-most affordance on task-switcher 594. In some embodiments, continuity affordance 595 is the right-most affordance on task-switcher 594.

In some embodiments, laptop 599 displays task-switcher 594 in response to a command-tab input from the user. In some embodiments, laptop 599 displays task-switcher 594 in response to a keystroke or keystroke combination, such as an alternate-tab input from the user. In some embodiments, laptop 599 displays task-switcher 594 in response to the placement of the mouse cursor at a corner (e.g., lower right) of the screen. A user may select continuity affordance 595 to invoke continuity functionality. In some embodiments, a user may press the tab key repeatedly while holding the command key (or alternate key) to traverse through the displayed affordances to reach continuity affordance 595. In response to each press of the tab key, laptop 599 may highlight (or otherwise visually emphasize) a different affordance in task-switcher 594. When continuity affordance 595 is visually highlighted, the user may release the command key (or alternate key) to select continuity affordance 595. In response to the user selection, laptop 599 may launch an application based on continuity features, e.g., a different version of the messaging application that is active on device 504 (FIG. 5A).

Also as shown in FIG. 5L, laptop 599 may be unlocked and may show desktop screen 581. When laptop 599 receives application usage information from a compatible electronic device that is within communications range, laptop 599 may display notification message 583. A user may select (e.g., click on) notification message 583 to launch an application that corresponds to the active application that is executing on the in-range, compatible electronic device.

Figure 5M:
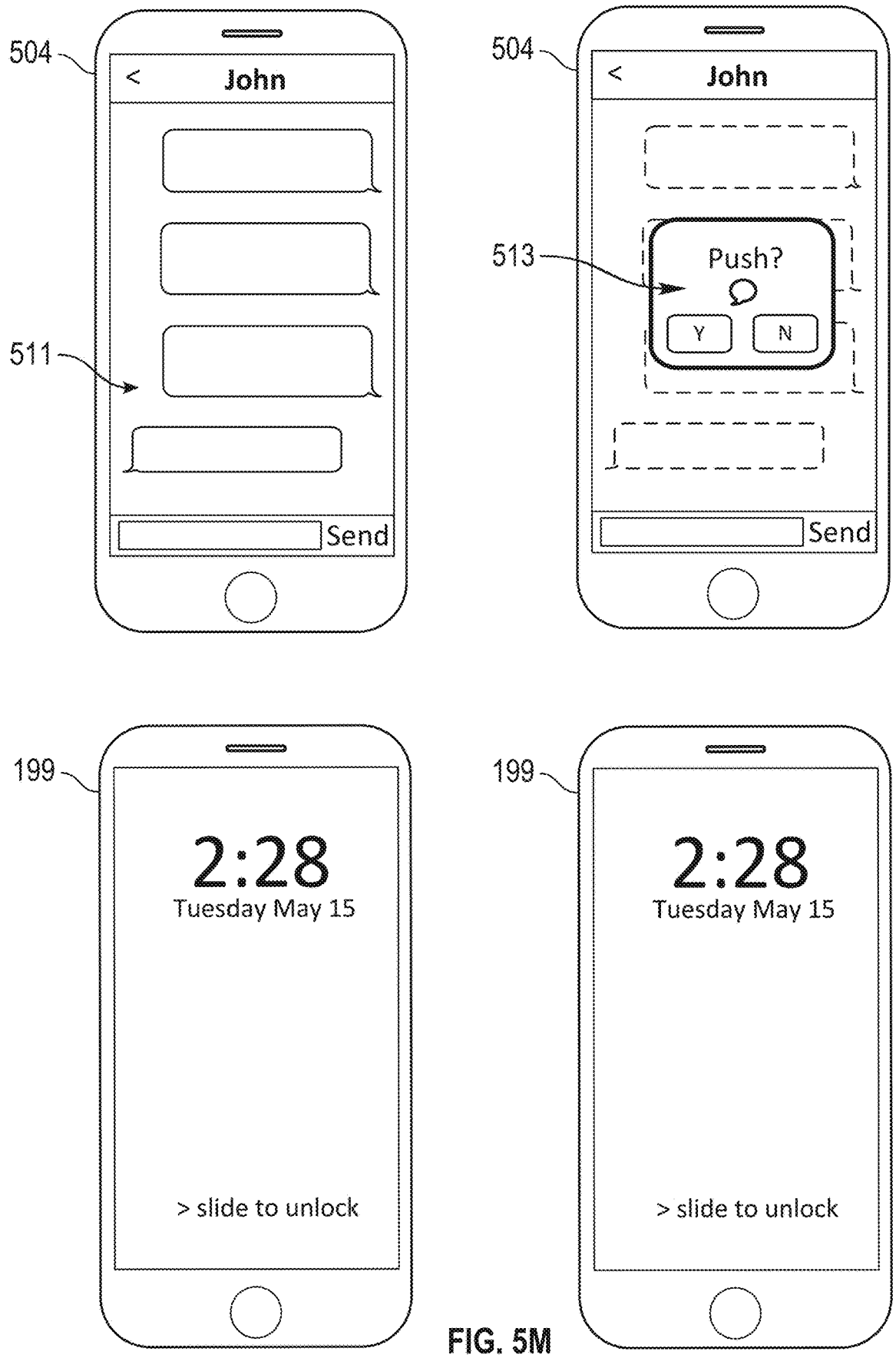
Figure 5N:
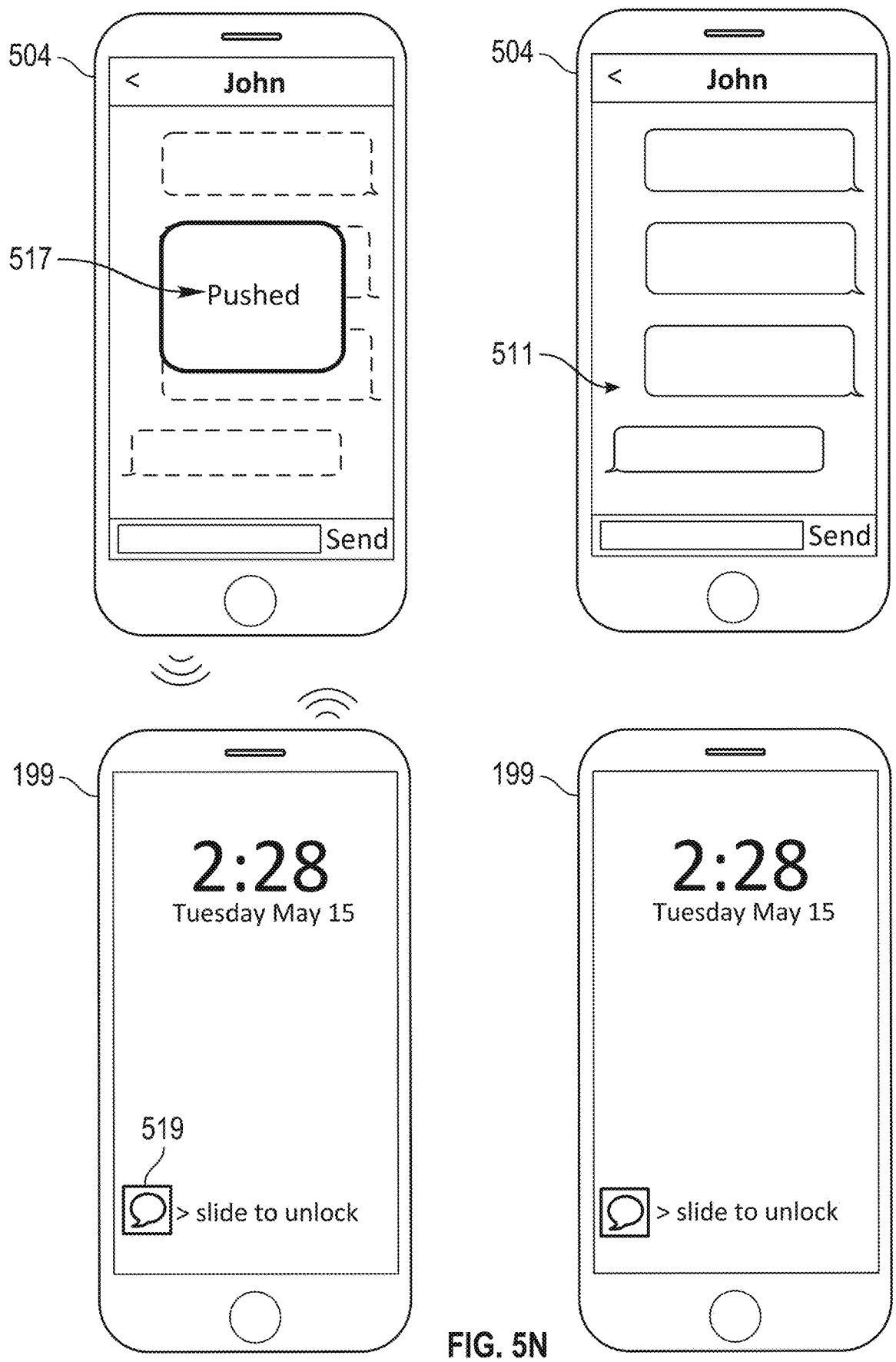

In some embodiments, a device can "push" an application onto another device. FIGS. 5M-5N illustrate exemplary user interfaces illustrating this "push" technique according to some embodiments. As shown in FIG. 5M, cellular phone 504 is executing messaging application 511. In addition, device 199 (which may be device 100 or device 300 in some embodiments) is within communications range of cellular phone 504. Cellular phone 504 may display affordance 513 for pushing messaging application 511 onto device 199. In response to a user selection of "yes" in affordance 513, cellular phone 504 sends information (e.g., instructions) to device 199 identifying messaging application 511. Cellular phone 504 may also send state information regarding messaging application 511, such information identifying the particular the message transcript that is being displayed. As shown in FIG. 5N, in some embodiments, continuity affordance 519 appears on device 199, and may be selected by a user to launch a corresponding messaging application. In some embodiments (not shown), device 199 may automatically launch a corresponding messaging application after it receives the identifying information from cellular phone 504. In some embodiments, a confirmation message 517 is displayed on cellular phone 504 that a push instruction has been sent to device 199.

Figure 17C:
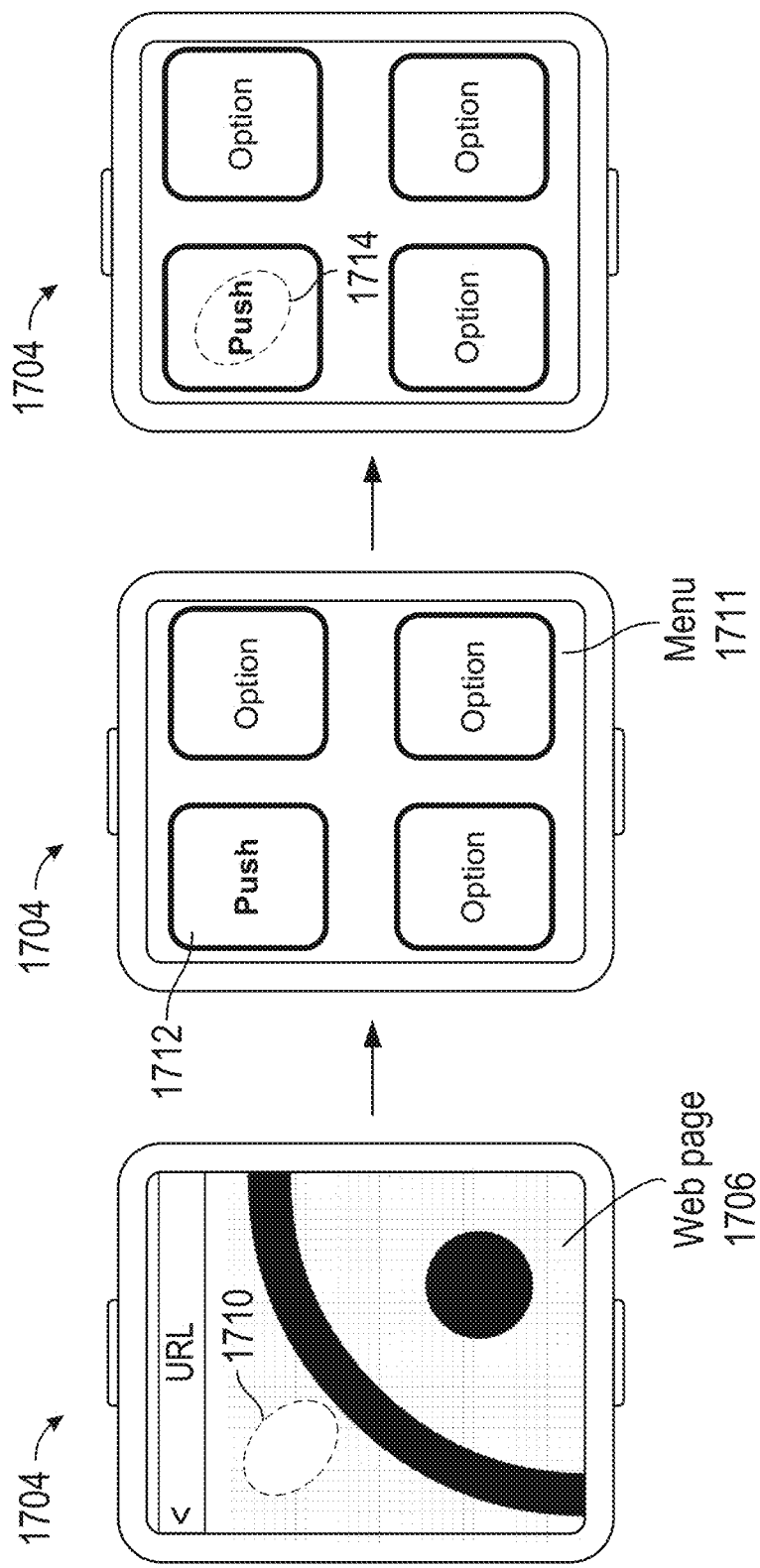

FIGS. 17A-17E depict additional exemplary user interfaces related to the "push" technique according to some embodiments. As shown in FIG. 17A, wearable electronic device 1704, worn by user 1702, may obtain and display web page 1706. Wearable electronic device 1704 may be device 460 (FIG. 4C) in some embodiments. Due to its form-factor, wearable electronic device 1704 may default to displaying a relatively small portion of web page 1706 to improve readability. Sometimes, a user may however wish to see larger portions of the web page.

Attention is now directed how the user may view a larger portion of web page 1706, at a compatible device, in this situation. As shown in FIG. 17B, when user 1702 walks within wireless communication range of tablet computer 1708, device 1704 may communicate with tablet computer 1708 and determine that the two devices are compatible for purposes of continuity. As depicted in FIG. 17C, user 1702 user may touch the touch-sensitive display of wearable electronic device 1704 (as indicated by contact 1710) while web page 1706 is displayed to invoke menu 1711. Menu 1711 may include affordances for invoking different features of device 1704, including affordance 1712 for invoking continuity features between wearable electronic device 1704 and tablet computer 1708.

In some embodiments, wearable electronic device 1704 may require contact 1710 to be a contact on the touch-sensitive display that has a maximum intensity exceeding a threshold intensity. Restated, if the maximum intensity of contact 1710 does not exceed the threshold, device 1704 may invoke another feature, such as a feature to obtain and display another web page, for example if the position of selection 1710 corresponds to a web page hyperlink.

Turning to FIG. 17D with reference to FIG. 17C, when user 1702 selects affordance 1712 (as indicated by contact 1714), wearable electronic device 1704 may send information (e.g., instructions) to tablet computer 1708 identifying the web browsing application that is active in the foreground of wearable electronic 1704. Wearable electronic device 1704 may also send to tablet computer 1708 an indication of the web page that is being displayed, e.g., web page 1706. In some embodiments, confirmation message 1715 is displayed on wearable electronic device 1704 to indicate that a push instruction has been sent to the external device. The external device—tablet computer 1708—may display continuity affordance 1716 upon obtaining the instructions.

Figure 17E:
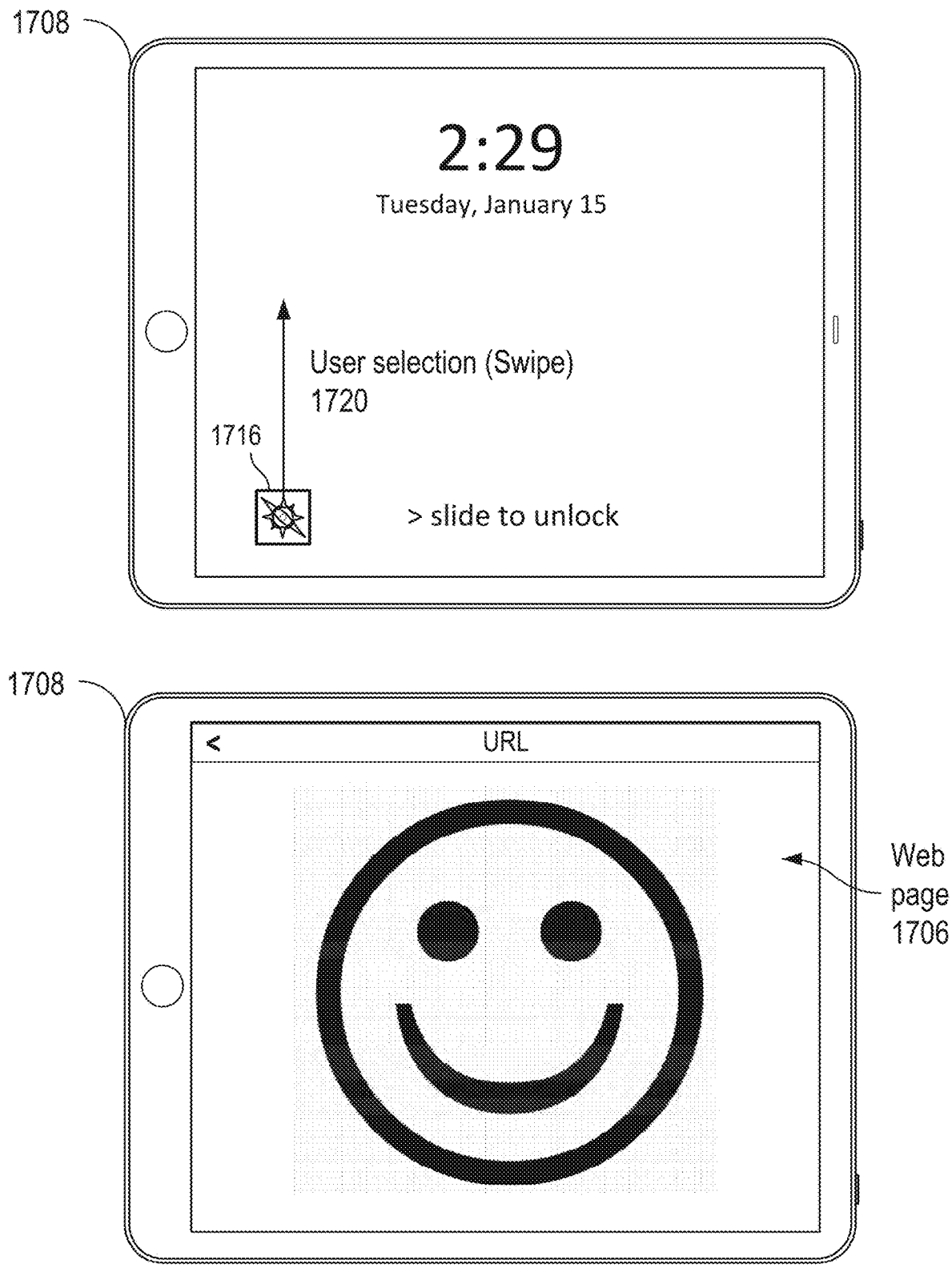

Turning to FIG. 17E, when user 1702 selects affordance 1716, such as by swiping the affordance in the up direction, tablet computer 1708 launches an application that corresponds to the web browser running on wearable electronic device 460. For example, tablet computer 1708 may launch Safari® by Apple Inc. of Cupertino, California Optionally, when launched, the application may display web page 1706. Also optionally, when launched, the application may display web page 1706 such that the (smaller) portion displayed on wearable electronic device 1704 is part of the (larger) portion displayed on tablet computer 1708. Because tablet computer 1708 has a larger display screen than wearable electronic device 460, a larger portion of web page 1706 may be displayed at once.

Figure 18B:
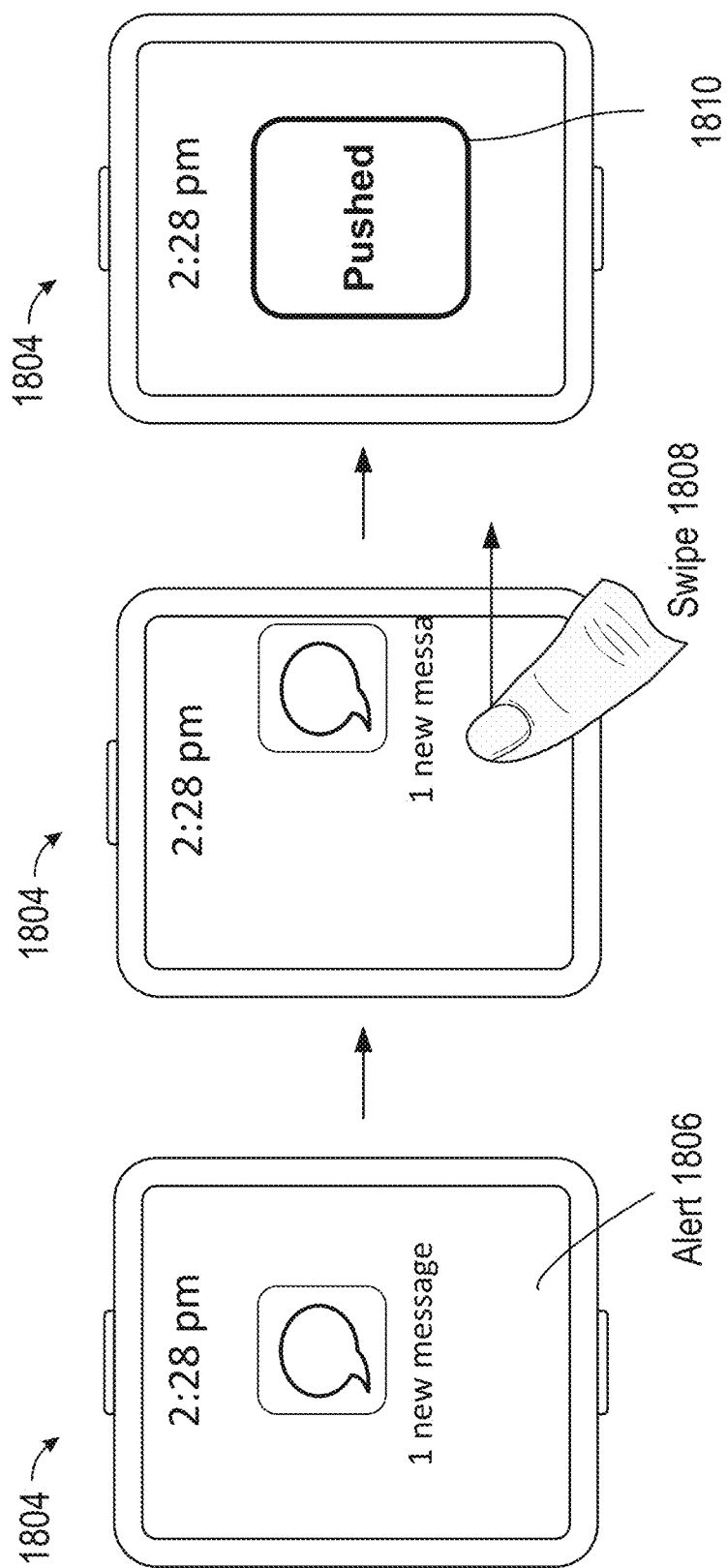

FIGS. 18A-18D depict additional exemplary user interfaces related to the "push" technique according to some embodiments. As shown in FIG. 18A, wearable electronic device 1804, worn by user 1802, may display alert 1806. Wearable electronic device 1804 may be device 460 in some embodiments. Alert 1806 may be a message informing the user of incoming application data. The incoming application data is a message in the illustrated examples. Alerts may be useful in alerting the user to the availability of new application data when the corresponding application for processing the data is not executing in the foreground of the device. While it is possible for user 1802 to view the incoming message on wearable electronic device 1804, sometimes, the user may prefer to view the body of the message on a larger, external computing device.

Figure 18C:
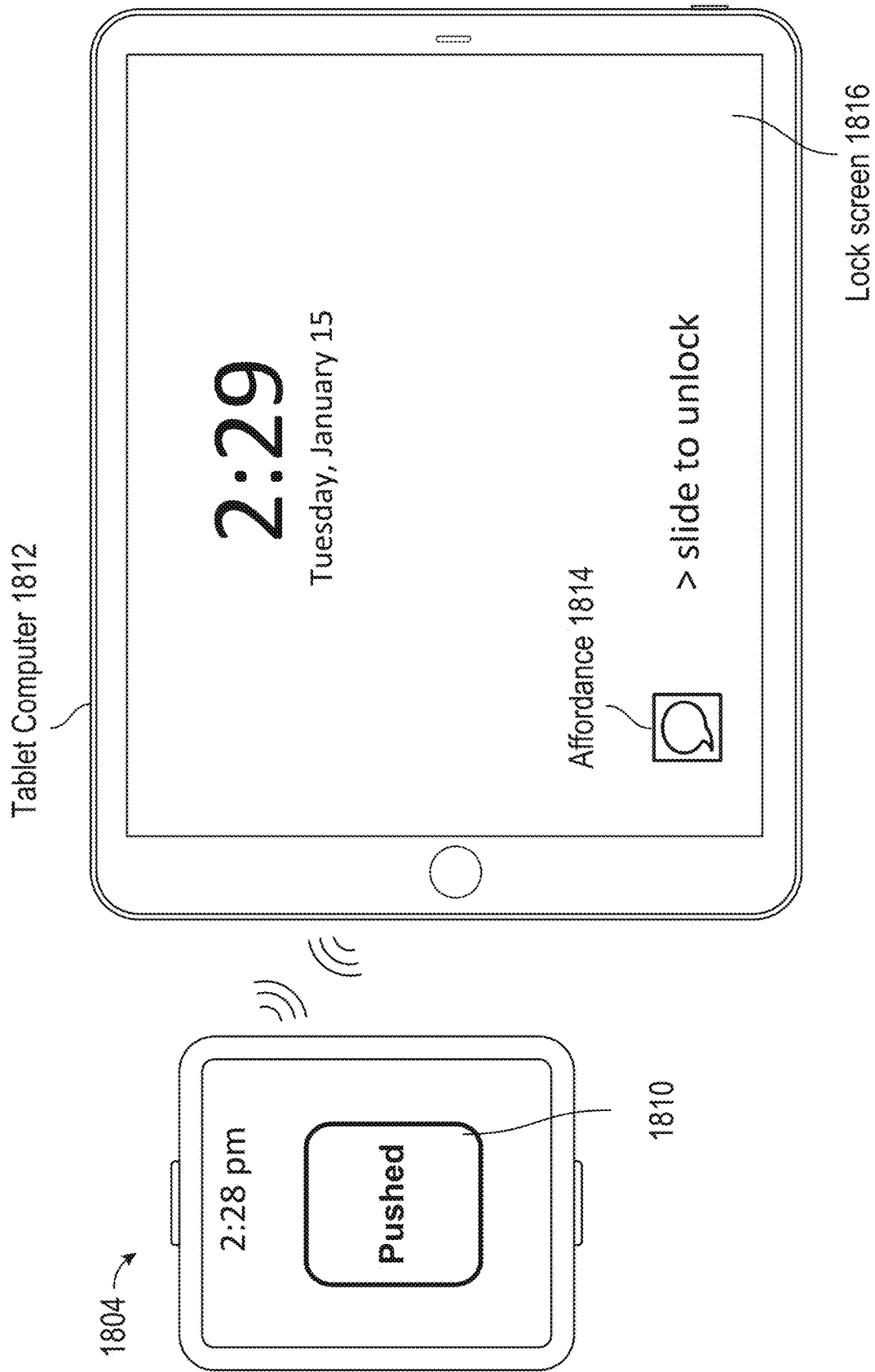
Figure 18D:
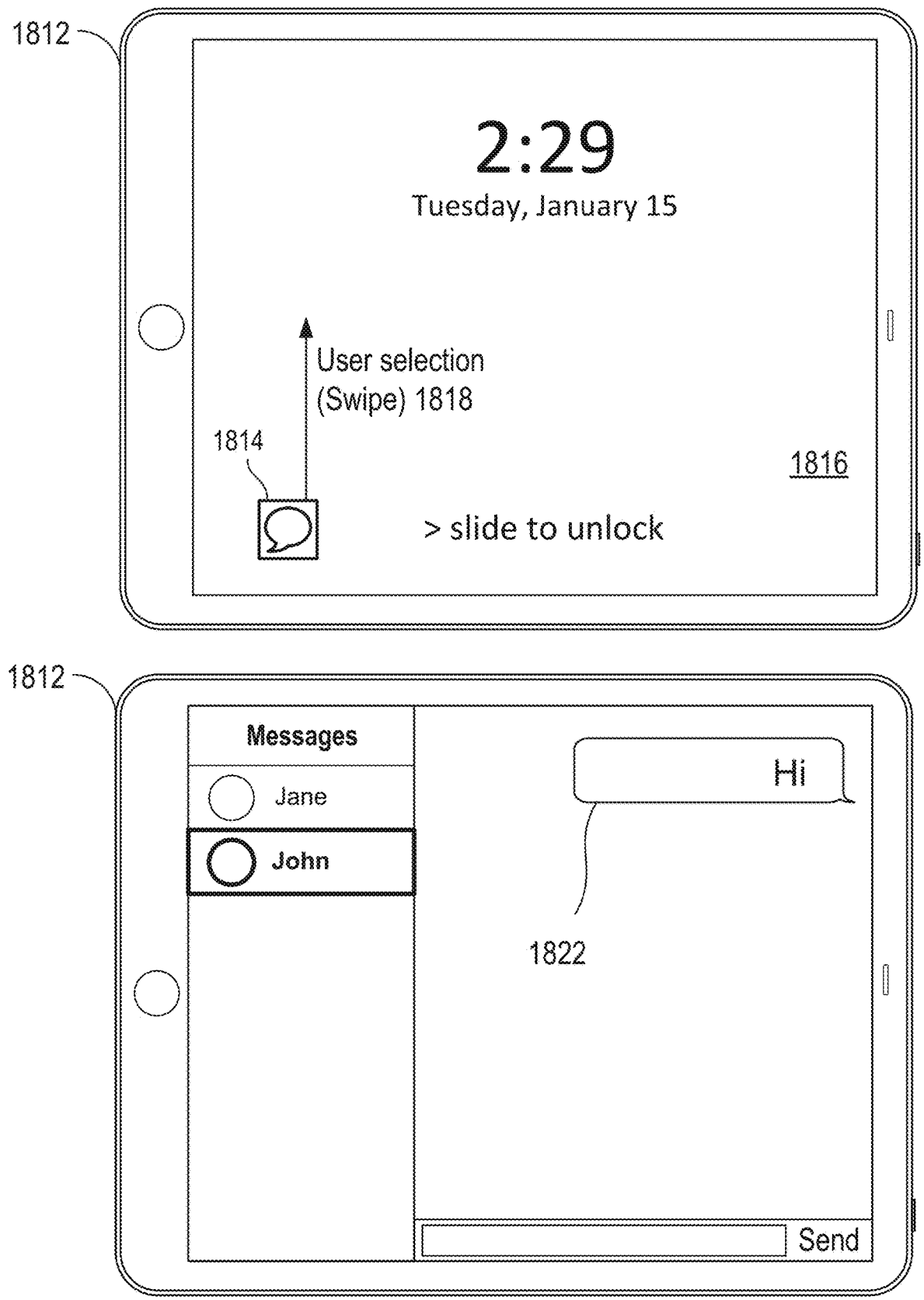

Attention is now directed to how user 1804 may do so. Turning to FIG. 18B, when a compatible external device is available, a user may invoke continuity functionality by touching and sliding alert 1806 in a particular direction, such as to the left or to the right, via touch input 1808. In response, wearable electronic device 1804 may send information (e.g., instructions) to the nearby device that identifies the incoming message. Turning to FIG. 18C, in some embodiments, wearable electronic device 1804 displays confirmation message 1810 to indicate that a push instruction has been sent to an external device. After obtaining the instruction, the external device—tablet computer 1812—may display continuity affordance 1814.

As shown in FIG. 18C, a user may invoke continuity features on tablet computer 1812 by selecting affordance 1814 (e.g., by sliding the affordance upwards). In response to the selection of affordance 1814, device 1812 may launch an application for viewing incoming message 1822 corresponding to alert 1806 (FIG. 18A). When launched, the application displays incoming message 1822 on the screen of tablet computer 1812. Messages® by Apple Inc. of Cupertino, California is an exemplary application that may be launched in this situation to view a copy of incoming message 1822.

It should be understood that device 199 (FIGS. 5M-5N), device 1708 (FIGS. 17A-17E), device 1812 (FIGS. 18A-18D), and/or device 1910 (FIGS. 19A-19C) may display affordances for invoking continuity features in various ways. For example, any one of the exemplary user interfaces for displaying continuity affordances illustrated in FIGS. 5C-5L may be used.

3. Correspondence Between Applications

Figure 6B:
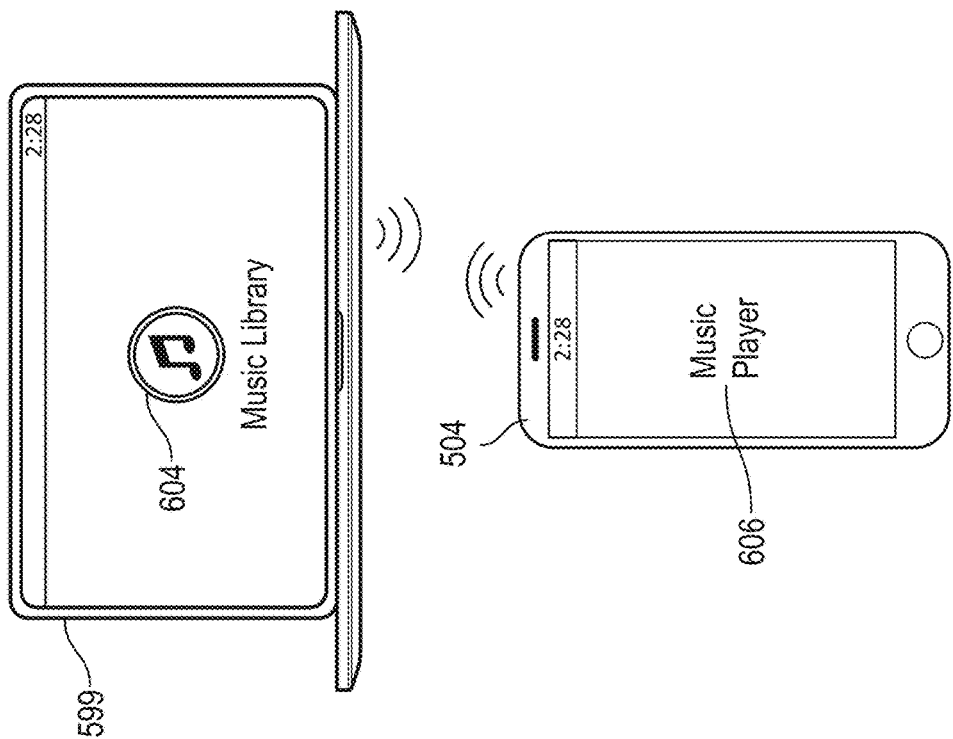
FIGS. 6A-6D illustrate exemplary types of transitions between applications.
Figure 6A:
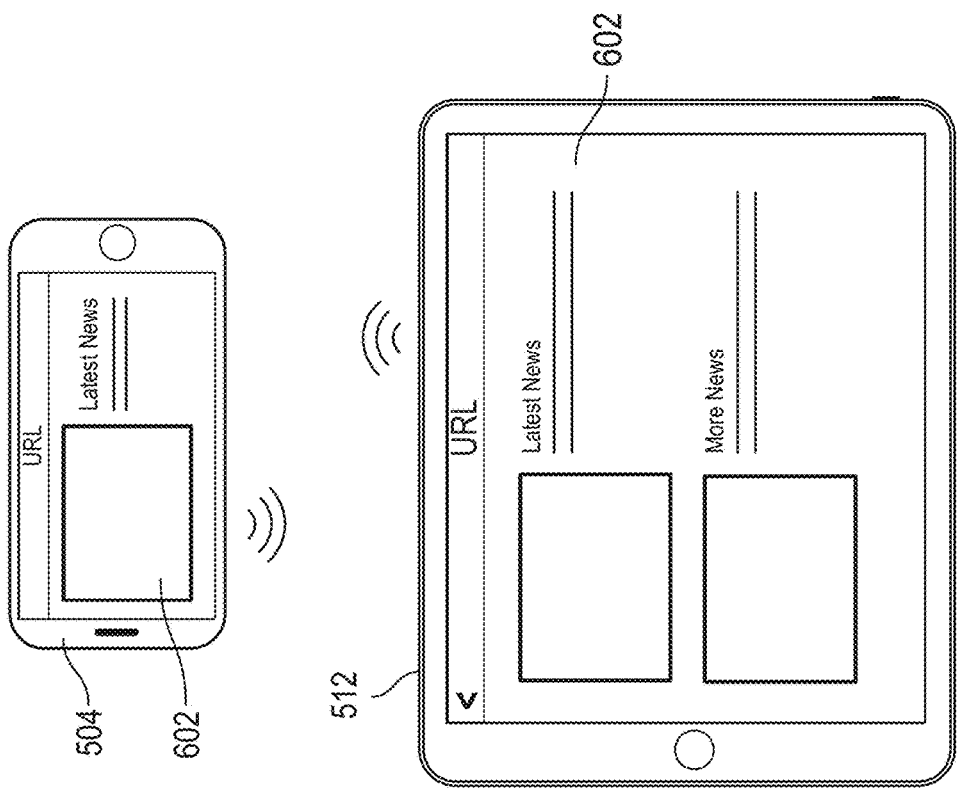

Attention is now directed to correspondence between applications that may be invoked using continuity features, with reference to FIGS. 6A and 6B. FIG. 6A illustrates the use of continuity functionality to launch, on one device, a different version of an application that is executing on another device. As shown in FIG. 6A, cellular phone 504 is executing a web browser application that is displaying web-page 602. Cellular phone 504 is in communications range of tablet computer 512, and transmits application usage data identifying the active web browser application and web-page 602 to tablet computer 512. When a user invokes continuity features on tablet computer 512, the tablet launches its own version of the web browser application showing the same web-page 602. That is, in this example, two applications are considered to be corresponding if they are different versions of the same application. In some embodiments, cellular phone 504 may be executing Safari® for iPhone and tablet computer 512 may be executing Safari for iPad®. In some embodiments, tablet computer 512 may be executing a portable document editor while cellular phone 504 may be executing a portable document viewer.

FIG. 6B illustrates the use of continuity functionality to launch, on one device, an application that is different but related to an application that is executing (or recently executed) on another device. One example of related applications is companion applications. For example, if a music-management application 604 (e.g., iTunes® by Apple Inc. of Cupertino, California) is playing a song on laptop 599 when a user invokes continuity functionality from cellular phone 504, cellular phone 504 may launch a music-player 606 to play the same song. Another example of related applications is an application that controls another. For example, if a music-player application is executing on laptop 599 when continuity is invoked on cellular phone 504, cellular phone 504 may launch a remote control having transport controls for controlling the music-player that is active on laptop 599.

Attention is now directed to continuity of application states. The "state" of an application as used here refers to a mode or a condition of an application. Exemplary application states include the condition of showing a particular screen, a mode or configuration setting in which the application is operating, the condition of displaying a particular location within a navigational hierarchy of the application, the condition of displaying a particular part of or location within a document, and so forth.

Referring back to FIG. 5B, when cellular phone 504 communicates with tablet computer 512, cellular phone 504 may transmit to tablet computer 512 certain usage data. The usage data may indicate the state of an active application on cellular phone 504, such as the messaging application. The receiving tablet computer 512 may use this information to launch a corresponding application in the same application state. For example, if the user is viewing a particular message transcript on cellular phone 504 when continuity is invoked on tablet computer 512, tablet computer 512 may launch a corresponding messaging application and display the same the same messages transcript. If the messages transcript is sufficiently lengthy to require scrolling, tablet computer 512 may display the messages transcript at the same scrolling position based on position information provided by the usage data.

In instances where the active application of cellular phone 504 is presenting information from particular position in a navigational hierarchy of the application (e.g., a particular screen or sub-screen within the application), when continuity is invoked on tablet computer 512, tablet computer 512 may display the same application screen or sub-screen. For instance, if cellular phone 504 is displaying a screen for configuring advanced messaging settings, tablet computer 512 may display the same configuration screen when a user invokes continuity from tablet computer 512. Put another way, display states may also survive continuity.

In instances where the active application of cellular phone 504 is in a particular mode when continuity is invoked on tablet computer 512, tablet computer 512 may launch the corresponding application in the same mode. For instance, if cellular phone 504 is playing a video in (i) landscape orientation, (ii) at a 16:9 aspect ratio, (iii) with audio muted, and (iv) closed captioning enabled when continuity is invoked on tablet computer 512, tablet computer 512 may launch a corresponding video player playing the same video from the same position with settings (i)-(iv).

Figure 6D:
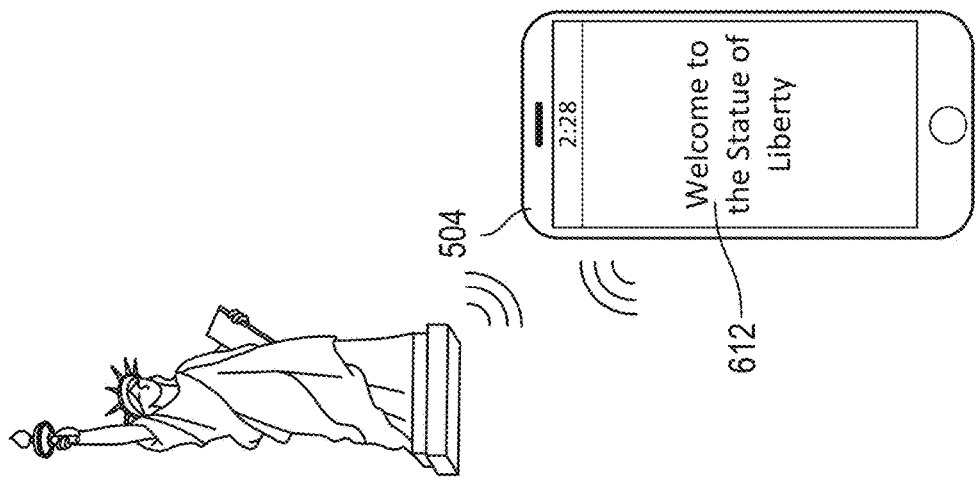
Figure 6C:
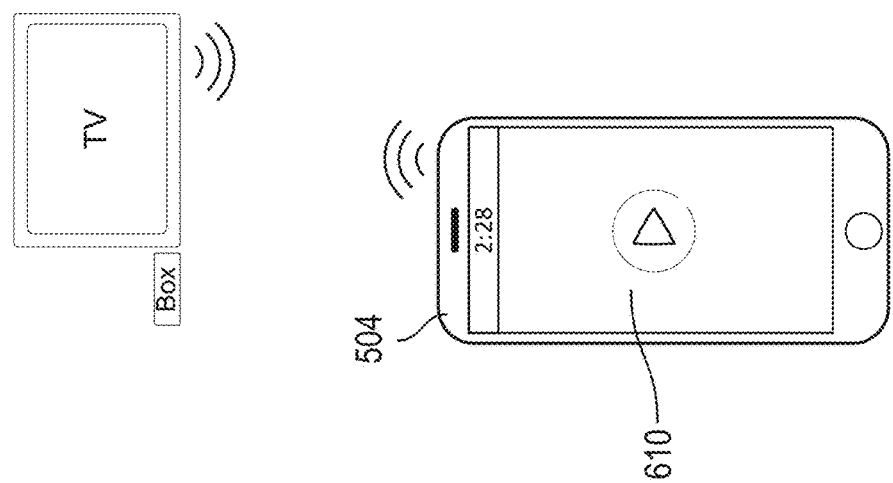

Attention is now directed to using continuity features to invoke applications that are associated with points-of-interests, with reference to FIGS. 6C and 6D. FIG. 6C illustrates the use of continuity functionality to launch an application that is associated with an electronic point-of-interest. For example, the electronic point-of-interest may be a household electronics device, such as a smart-television. The household electronics device may emit a wireless signal that communicates its identity to cellular phone 504. When a user invokes continuity functionality from cellular phone 504, cellular phone 504 may use this information to launch an application for controlling the smart television. The application may be, for instance, a smart-television controller 610. FIG. 6D illustrates the use continuity techniques to launch an application associated with a physical point-of-interest. For example, cellular phone 504 may be within a designated range of a landmark, such as the Statue of Liberty. If continuity functionality is invoked on cellular phone 504 in this situation, cellular phone 504 may launch an application 612 describing the Statue and its history. In some embodiments, physical proximity between cellular phone 504 and the landmark may be determined based on GPS readings from the cellular phone 504 and known coordinates of the landmark (e.g., from a map). In some embodiments, cellular phone 504 can obtain and account for locational broadcasts made on behalf of the landmark, such as signals received from Wi-Fi "beacons" that are broadcasting location information of the landmark.

Sometimes, cellular phone 504 may be within wireless communication range of point-of-interest for which an application is available on the internet, but the application is not yet installed onto cellular phone 504. For example, a user may carry cellular phone 504 into a coffee shop that offers a mobile ordering and/or payment application that has not been previously installed on the cellular phone. In some embodiments, if a user invokes continuity functionality on cellular phone 504 in this situation, cellular phone 504 may display an affordance for downloading and installing the relevant application. In this way, a user may instruct cellular phone 504 to obtain the relevant application by simply selecting (e.g., tapping) the affordance. In some embodiments, if a user invokes continuity functionality on cellular phone 504 in this situation, cellular phone 504 may direct the user to an intermediate source of information for the point-of-interest—such as a web-page—so that the user may make a more informed decision as to whether to install an application associated with the point-of-interest. In these situations, cellular phone 504 may obtain a deep link and display or access the deep link for further user consideration.

Because a many-to-one relationship can exist between available applications and a point-of-interest, cellular phone 504 may consider additional factors in determining what application is most relevant for purposes of continuity. In some embodiments, cellular phone 504 considers the frequency of use of certain applications at a particular point-of-interest to identify the exact application that should be launched. For example, cellular phone 504 may find that a fitness (sometimes called workout) application and a gymnasium membership application are both associated with the user's gym. Device 100 may further determine that the user more frequently accesses the workout application while he is at the gym. In response to this determination, device 100 may launch the workout application when the user invokes continuity functionality on cellular phone 504 upon arrival at the gym.

In some embodiments, cellular phone 504 considers the time of day to identify the exact application that should be launched. For example, cellular phone 504 may find that a train schedule application and a news application are both frequently accessed while a user is waiting at a commuter train stop. Cellular phone 504 may further determine that the user tends to access the news application in the mornings while waiting at the train station. In response to this determination, cellular phone 504 may launch the news application if a user invokes continuity features in the morning upon arrival to the train station.

In some embodiments, cellular phone 504 considers other contextual information to identify the exactly application that should be launched. For example, cellular phone 504 may find that an in-car entertainment application is frequently used when the GPS sensors of the phone indicate that the device is moving at speed, and the RF circuitry of cellular phone 504 indicates that the device is connected to a Bluetooth device named "CAR MEDIA." Thus, when a user invokes continuity functionality on cellular phone 504 in this situation, cellular phone 504 may launch the in-car entertainment application in response.

Additional techniques for determining relationships between applications may be found in the following co-pending provisional applications: U.S. patent application Ser. No. 62/005,781, "ACTIVITY CONTINUATION BETWEEN ELECTRONIC DEVICES," filed May 30, 2014; U.S. patent application Ser. No. 62/005,793, "COMPANION APPLICATION FOR ACTIVITY COOPERATION," filed May 30, 2014; U.S. Patent Application Ser. No. 62/005,751, "PREDEFINED WIRELESS PAIRING," filed May 30, 2014; and U.S. Patent Application Ser. No. 62/005,755, "OPERATING-MODE TRANSITIONS BASED ON ADVERTISING INFORMATION," filed May 30, 2014. The content of these applications is hereby incorporated by reference in their entirety.

Figure 19A:
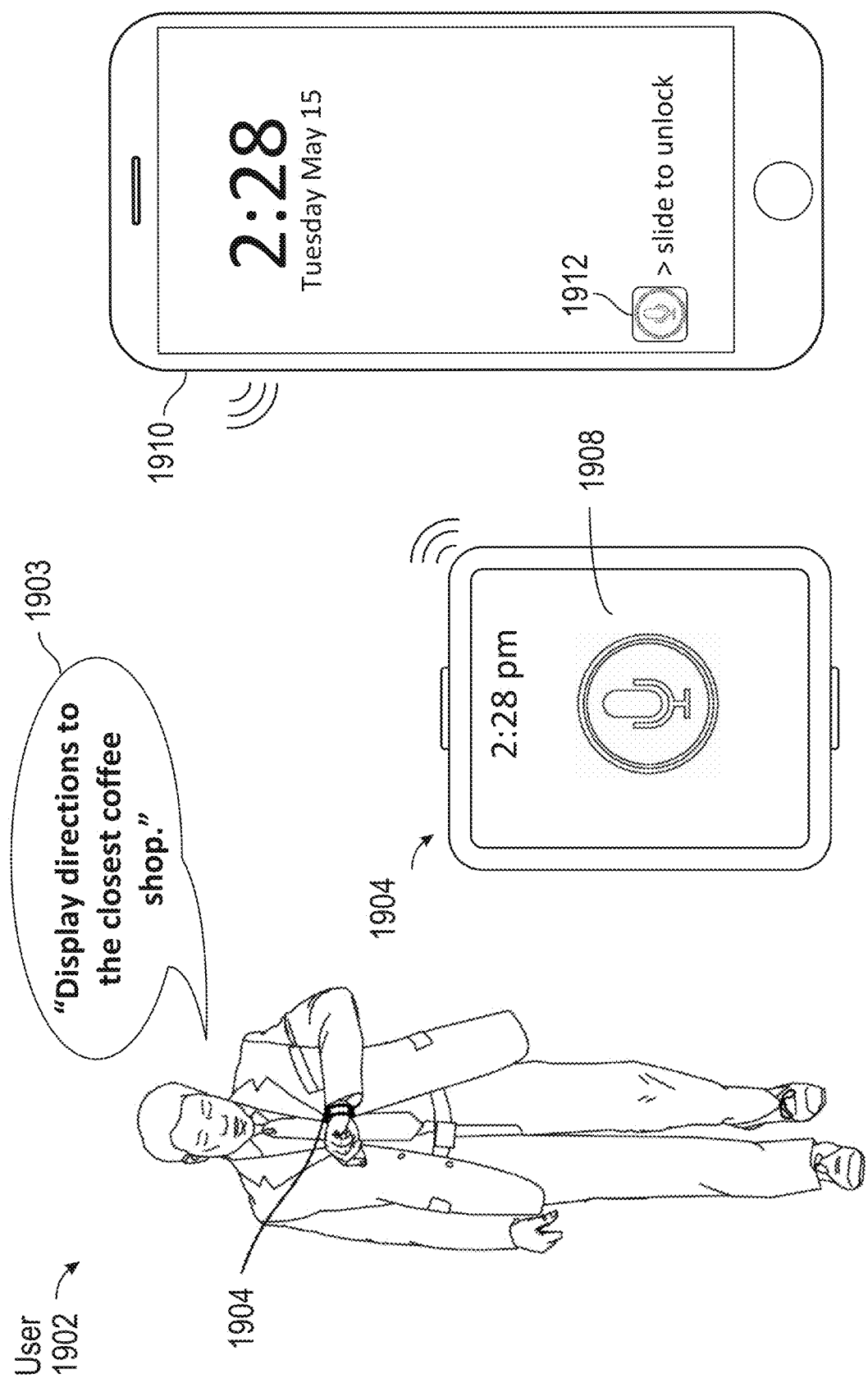
FIGS. 19A-19C illustrate exemplary user interfaces for transitioning between electronic devices.
Figure 19B:
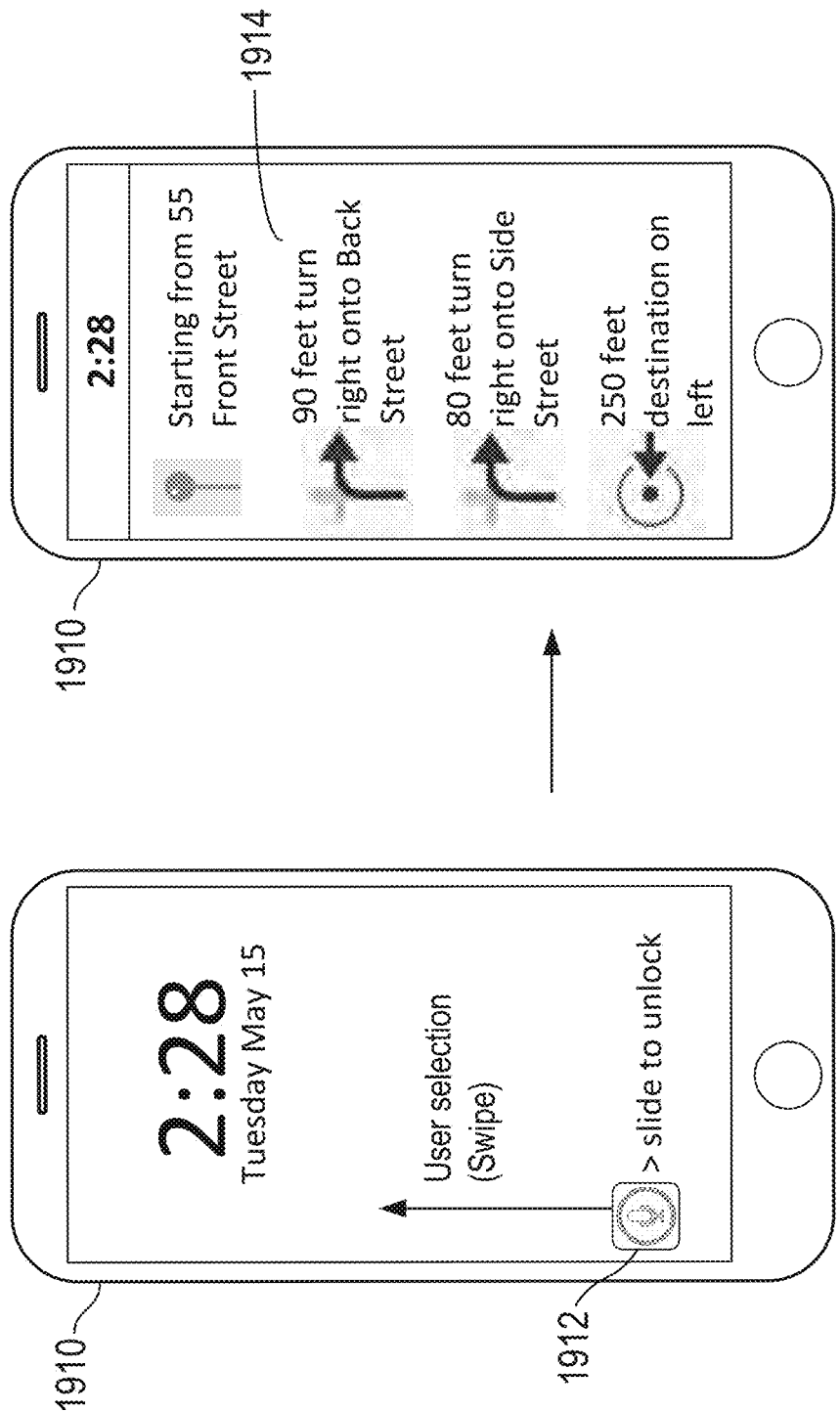
Figure 19C:
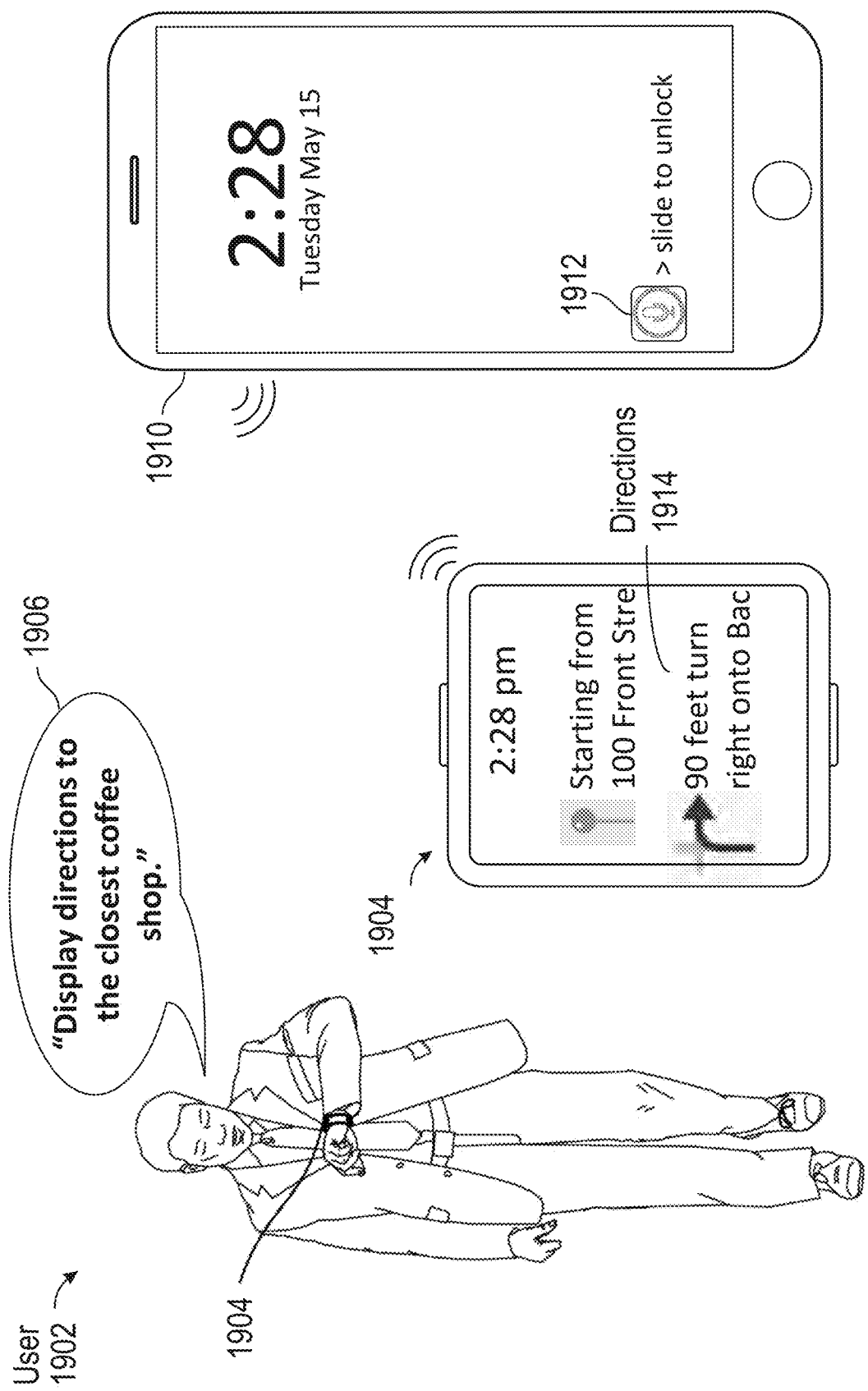

Attention is now directed to using continuity features in combination with voice-based intelligent automated assistant features, with reference to FIGS. 19A-19C. Siri®, made by Apple Inc. of Cupertino, California, is an exemplary intelligent automated assistant. Intelligent automated assistant techniques are also described in, for example, U.S. Utility application Ser. No. 12/987,982 for "Intelligent Automated Assistant," filed Jan. 10, 2011, the entire disclosure of which is incorporated herein by reference.

As shown in FIG. 19A, user 1902 may provide verbal command 1903 to wearable electronic device 1904. Wearable electronic device 1904 may be device 460 (FIG. 4C) in some embodiments. Verbal command 1903 may be a request for directions to a nearby coffee shop. In some embodiments, after receiving verbal command 1903, wearable electronic device 1904 may send information indicative of the verbal command to an external device that is in-range, in this example cellular phone 1910. Cellular phone 1910 maybe device 100 (FIG. 1) in some embodiments.

In response to receiving instructions from wearable electronic device 1902, cellular phone 1910 may display affordance 1912 for invoking continuity features. When a user invokes continuity via affordance 1912 (e.g., by way of a swipe gesture as shown in FIG. 19B), cellular phone 1910 may display information that have been obtained in response to verbal command 1906. In the illustrated example, cellular phone 1910 displays turn-by-turn navigation 1914 to a nearby coffee shop in response to command 1903.

The information sent by wearable electronic device 1904 to external device (cellular phone) 1910 may include data representing verbal command 1906, in some examples. The information sent by device wearable electronic 1904 to external device (cellular phone) 1910 may include data representing a web service for obtaining information responsive to verbal command 1906, in some examples. The information sent by wearable electronic device 1904 to external device (cellular phone) 1910 may include data representing information obtained in response to verbal command 1906, in some examples.

These examples serve to illustrate that while the division of labor between wearable electronic device 1904 and external device 1910 with respect to processing and providing intelligent automated responses may vary between embodiments, each of the embodiments may still permit a user to choose between obtaining intelligent automated responses on one or more of the involved devices at his choosing. It is particularly helpful to a user to be able to query the assistant using a highly portable device (e.g., wearable electronic device 1904) and later decide whether to receive the assistant's response on the same device and/or on a compatible external device (e.g., cellular phone 1910) as one of the two devices may have audio/visual capabilities (e.g., speakers, larger/high-resolution screens) that are be better suited for presenting the resulting response.

As an example, as shown in FIG. 19C, wearable electronic device 1904 may display turn-by-turn directions 1914 after receiving verbal command 1906, in some embodiments. However the amount of information displayed at one time may be limited by the form-factor of wearable electronic device 1904. A more complete view of turn-by-turn directions 1914 may be displayed by cellular phone 1910 if a user elects continuity features on cellular phone 1910, as cellular phone 1910 is equipped with a larger display screen. In this way, a user may conveniently invoke voice assistant functionality through one device and, as desired, use one or both devices to review the information provided by the voice assistant.

4. Disambiguation

Situations may arise in which a device is unable to determine, definitively, what application should be launched based on incoming data, historical data, and/or contextual information. This situation may be provoked by multiple external devices being within range of the device. Consider FIG. 7A, which illustrates a first external device 702 executing a messaging application 704 and a second external device 706 executing a web browsing application 708. A user is interacting with both devices in that he is intermittently texting while web browsing. Both devices are within range of tablet computer 710. Both devices are also wirelessly transmitting usage data regarding applications 704 and 708 to tablet computer 710. In this situation, tablet computer 710 may be unable to determine which of the two applications is actually more relevant to the user.

In some embodiments, tablet computer 710 may identify the more recently used application as the more relevant application for purposes of continuity. That is, if the user last accessed messaging application 704 six seconds ago but last accessed web browser 708 ten seconds ago, when continuity is invoked on tablet computer 710, tablet computer 710 launches a corresponding messaging application because messaging application 704 was more recently by the user. Optionally, tablet computer 710 may display a thumbnail representation of the messaging application in continuity affordance 714 to indicate the application that will be launched.

This treatment, however, may not always be appropriate. For instance, the user may rather focus on web browsing on the larger tablet computer 710. In some embodiments, when faced with this situation, tablet computer 710 may display additional information to permit the user to provide an informed selection of the application to launch. For instance, tablet computer 710 may display more than one continuity affordance on lock screen 712 to indicate the availability of multiple applications to continue from. As shown in FIG. 7B, tablet computer 710 may show affordances 714 and 716 to signal the need for user selection between the two.

Figure 7A:
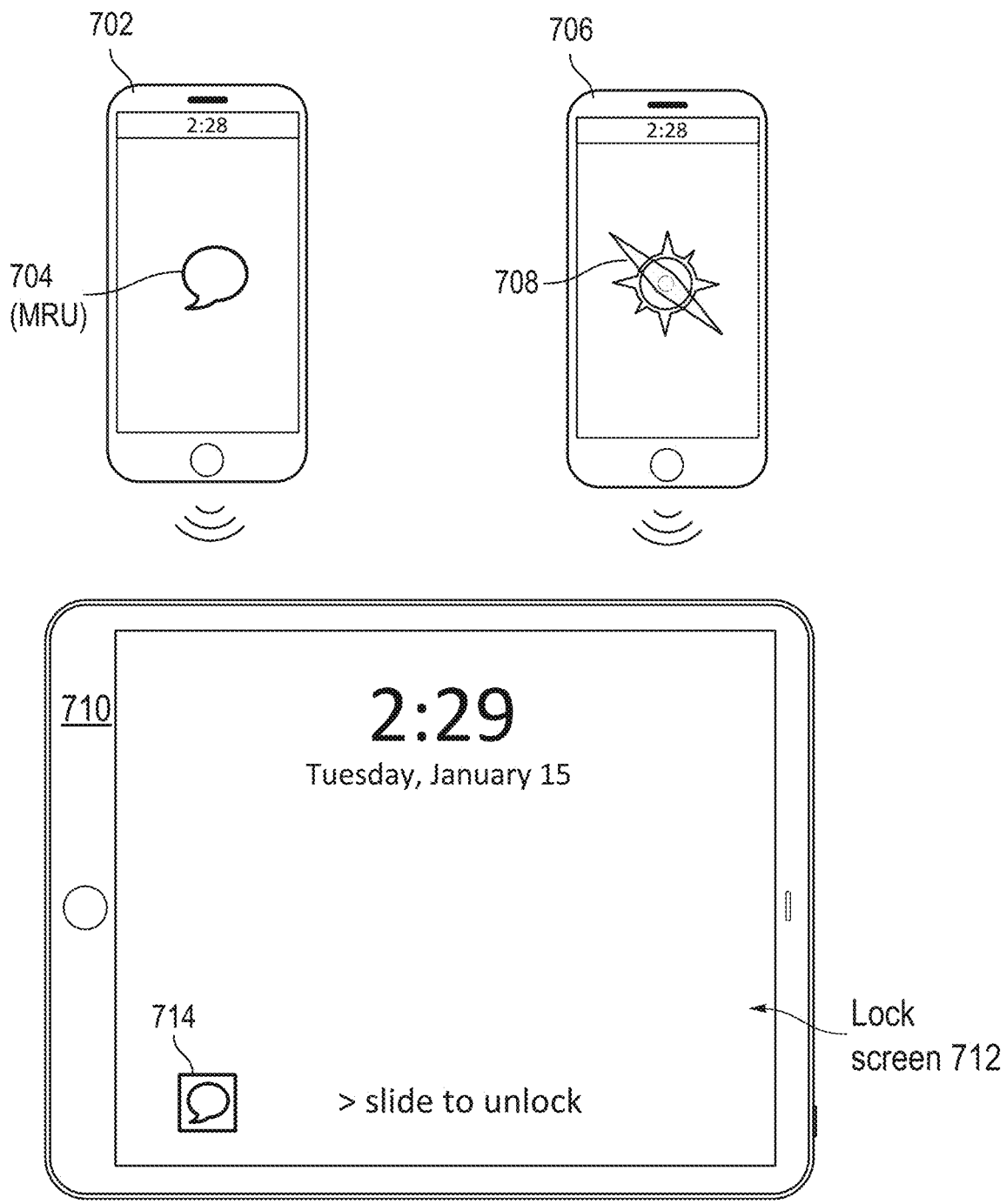
Figure 7B:
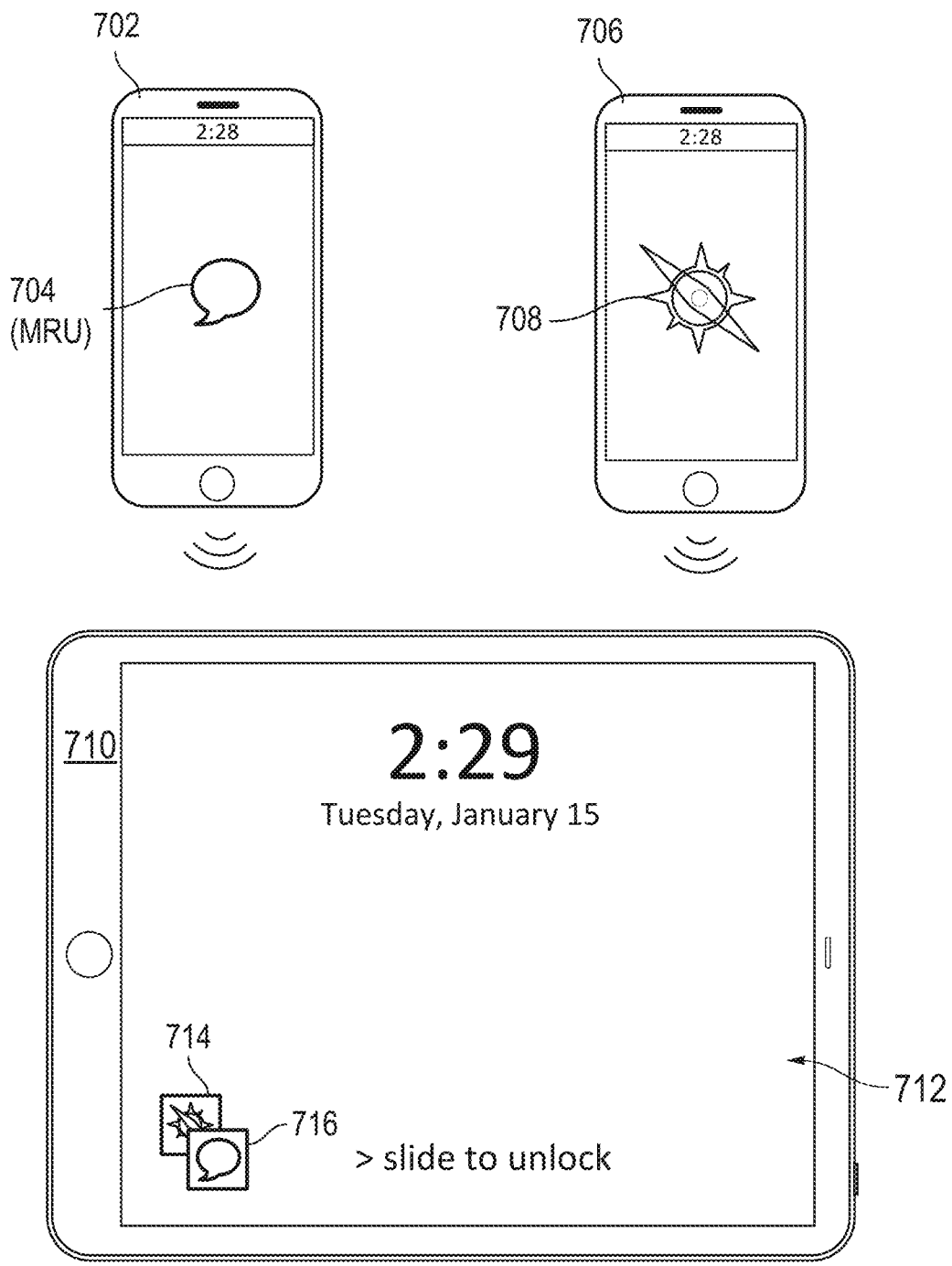
Figure 7E:
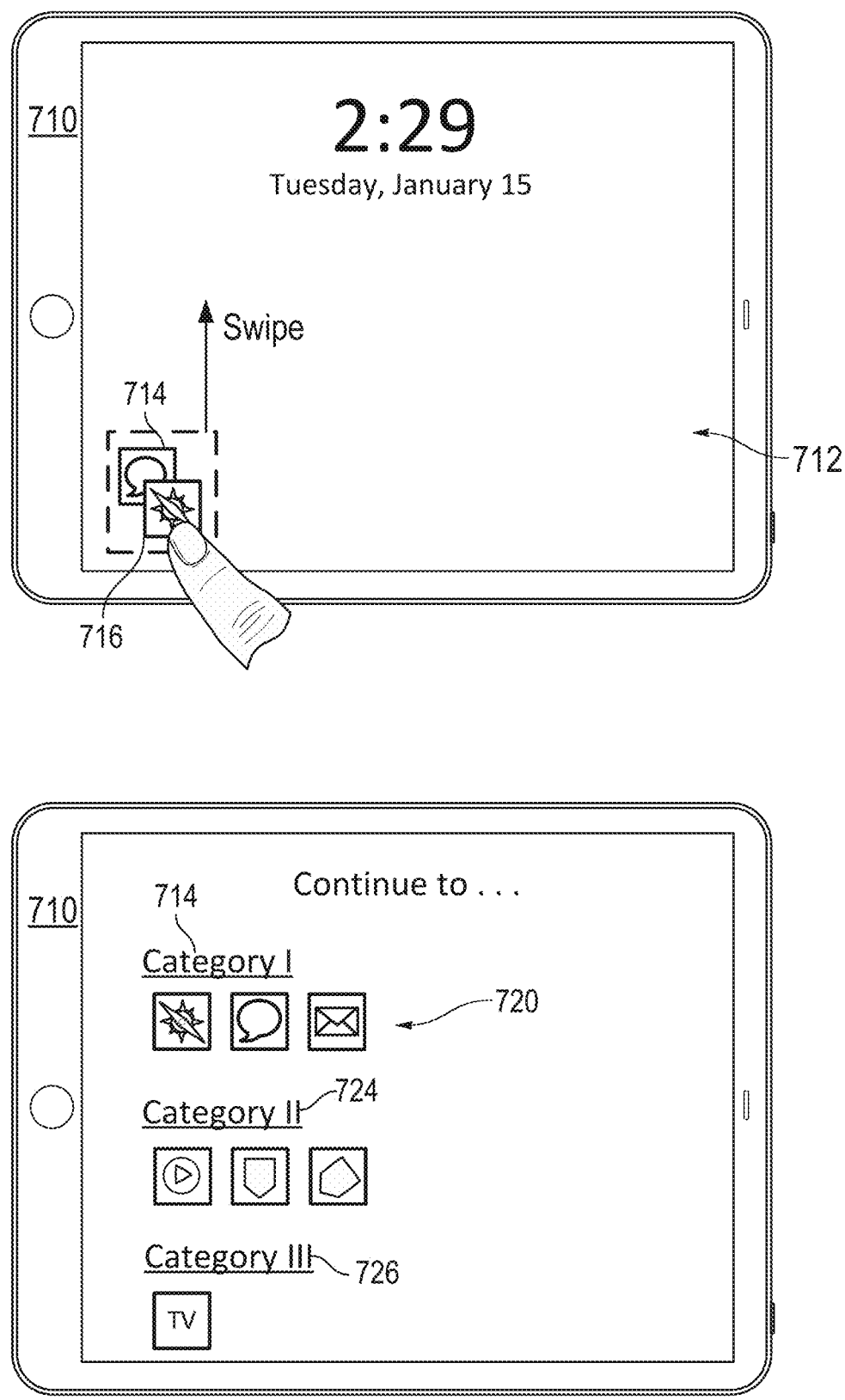

FIGS. 7C-7E illustrate how tablet computer 710 may respond to a selection (e.g., tap) of the group of affordances 714 and 716. In some embodiments, as shown in FIG. 7C, when tablet computer 710 receives a user input (e.g., tap) at the group of affordances, tablet computer 710 visually ungroups the affordances and translates the affordances on-screen so that they are appropriately spaced for individual selection using a touch object. The ungrouping may involve visually translating affordances 714 and 716 from their grouped position to their ungrouped positions. In response to a user selection (e.g., swipe or tap) of continuity affordance 714, tablet computer 710 may launch a messaging application corresponding to that of device 702. In response to a user selection of continuity affordance 716, tablet computer 710 may launch a web browsing application corresponding to that of device 706.

In some embodiments, as shown in FIG. 7D, tablet computer 710 displays disambiguation screen 718 when a user selects continuity affordance 714 or 716. Disambiguation screen 718 may display 22 may display continuity affordance 714 or 716 for individual selection. In response to a user selection (e.g., swipe or tap) of continuity affordance 714, tablet computer 710 may launch a messaging application corresponding to that of device 702. In response to a user selection of continuity affordance 716, tablet computer 710 may launch a web browsing application corresponding to that of device 706.

In some embodiments, as shown in FIG. 7E, tablet computer 710 displays disambiguation screen 720. Disambiguation screen 720 may organize, by categories, the applications that are available for launching through continuity functionality. The categorization of applications may be based on the relationship between the available applications, and those applications executing on external devices. For example, corresponding applications that are different versions of applications executing on external devices may be placed under one category 722, while related (e.g., companion) applications may be placed under another category 724. In addition, applications that are displayed due to the device's proximity to a point-of-interest may be displayed as yet another category of applications 726.

In some embodiments, as shown in FIG. 7F, tablet computer 710 displays disambiguation screen 730. Disambiguation screen 730 may organize, into tabbed lists, the applications that are available for launching through continuity functionality. The separation of applications across tabs may be based on the relationship between the available applications and those that are executing on external devices. Tab headings may identify the relationship. Affordances for launching applications within each category (tab) are displayed when the tab to which they belong is selected. For example, affordances for invoking corresponding applications are displayed under tab 732, while affordances for invoking related (e.g., companion) applications are displayed under tab 734.

In some embodiments, as shown in FIG. 7G, tablet computer 710 displays disambiguation screen 740. Disambiguation screen 740 may list applications corresponding to each compatible external device that is within communications range. As shown, disambiguation screen 740 includes heading 742 representing a first external device (e.g., 702 in FIG. 7A). Disambiguation screen 740 also includes heading 744 representing a second external device (e.g., 706 in FIG. 7A). Disambiguation screen 740 also includes heading 745 representing a third external device. Tablet computer 710 also displays, under each heading, affordances representing applications that correspond to those executing (and/or has executed) on the respective external device.

As shown in FIG. 7G, affordances 746, 748, and 750 represent corresponding versions of three applications that are executing (and/or have executed) on external device 702. Optionally, the ordering of affordances 746, 748, and 750 may reflect how recently each application was used by the user relative to one another. Likewise, affordances listed together with heading 744 represent corresponding versions of applications that are executing (and/or have executed) on external device 706. Screen 740 may be scrollable in the one direction (e.g., horizontal) to reveal additional external devices. Screen 740 may be scrollable in another direction (e.g., vertical) to more application affordances.

In some embodiments, disambiguation screen 740 may include a "favorites" heading (not shown). Tablet computer 710 may display, under this "favorites" heading, affordances showing applications that have been designated by a user as favorites. In some embodiments, tablet computer 710 may organize this information into tabbed lists (not shown). Such a tabbed list may appear similar to the tabbed list illustrated in FIG. 7F, meaning that applications corresponding to each external device may be displayed under a tab.

It is noted that when an application is launched in the manner described with respect to FIGS. 7A-7G, device 710 may place the continuing application into the same application state as the corresponding application on the external device, as discussed above.

Notably, the user interfaces described by FIGS. 7A-7G provide users with powerful ways of cataloging their application use across multiple electronics devices, and to transition between uses of those applications seamlessly. Consider, for example, a situation in which one user owns a compatible cellular phone, tablet computer, and laptop computer. A user interface screen modeled after disambiguation screen 740 (FIG. 7G) would provide a particularly powerful way for the user to transition between the different devices, depending on which device is best suited to a particular task, by presenting the user with the universe of possible open (and optionally closed) applications to continue from.

5. Improved Wireless Communication Techniques

In some embodiments, wireless communication, for purposes of continuity functionality, occur over a peer-to-peer wireless communication protocol such as Bluetooth and/or Bluetooth Low Energy (BTLE). In some embodiments, wireless communication for purposes of continuity functionality utilizes more than one wireless communication protocol. For example, WiFi may be used in addition to BTLE. In these embodiments, an initial communication between two devices may occur over a lower powered protocol, such as BTLE, even if the protocol yields a slower data transfer speed. Subsequent communications may occur over a secondary network that is relatively faster, such as WiFi.

As an example, a laptop computer may obtain, over BTLE, usage information indicating that an in-range iPhone® is being used to draft an e-mail message. When a user invokes e-mail continuity on the laptop computer, the two devices may communicate over WiFi to transmit application data including portions of the draft e-mail and accompany attachments, so that the user may continue drafting on the laptop without a loss of progress. Through this bifurcated approach, devices may poll for other compatible devices that are in-range without placing unduly power requirements on the devices' power systems. The reduced power consumption rates may also permit more frequent polling rates. At the same time, a faster channel is reserved for data intensive communications such as the communication of application data and/or application state information.

In some embodiments, usage information that is transmitted over the slower communication protocol includes device authentication information. The authentication information may include a token or other identifier that is calculated (e.g., hashed) at least in part based on a user ID. In some examples, the user ID is an e-mail address. In some embodiments, the user ID is an iCloud ID offered by Apple Inc. of Cupertino, California, which may be in turn be associated with an e-mail address. Two compatible devices may decide to permit or deny the use of continuity functionalities based on (at least in part) whether the devices are associated with the same user ID. In this way, privacy between devices owned by different (but physically proximate) users can be maintained, meaning that continuity between different users' devices can be prevented (or permitted) as desired.

In some embodiments, a device may further conserve power by permitting a user to designate how much continuity information should be automatically obtained from a compatible device that is within wireless communication range. In these embodiments, the device may receive, over a lower-powered peer-to-peer communication protocol, initial information identifying one or more compatible devices. In response to detecting the external devices and the initial information, the device may display a continuity affordance that informs the user as to the potential availability of continuity features. However, the displayed continuity affordance may have a visual appearance indicating that continuity features have not been fully enabled. In particular, the device may refrain from obtaining additional usage and/or application data information from the compatible devices until the device receives a user's instruction to do so. The user may do so by selecting (e.g., tapping) on the displayed affordance. In response to the user selection, the device may obtain additional usage and/or application data information that would permit the device to launch a corresponding application in a proper application state. In addition, the device may update the visual appearance of the affordance to indicate that continuity with the compatible device is now enabled and may thus be invoked from the device (e.g., by a swipe).

Figure 8A:
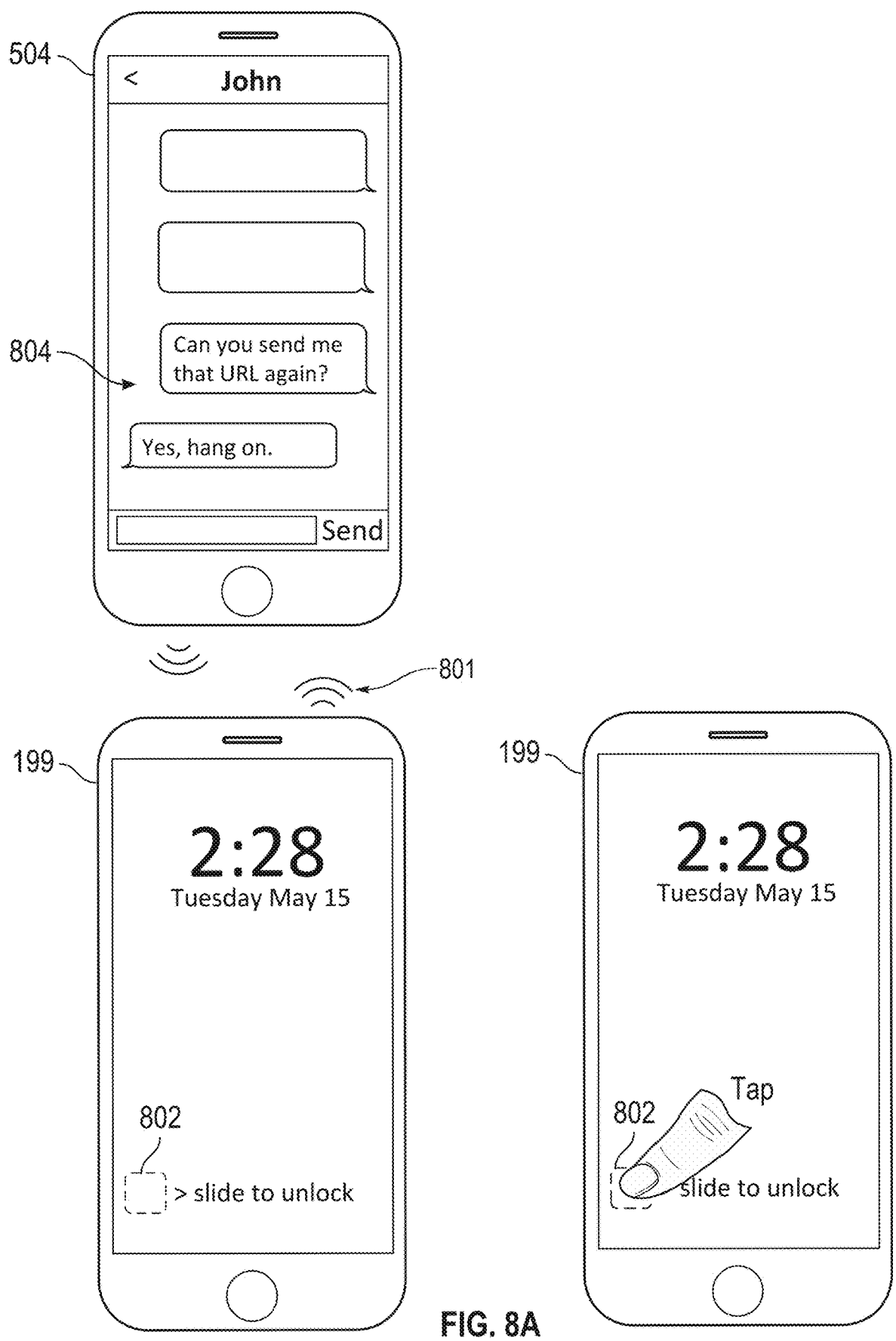
Figure 8B:
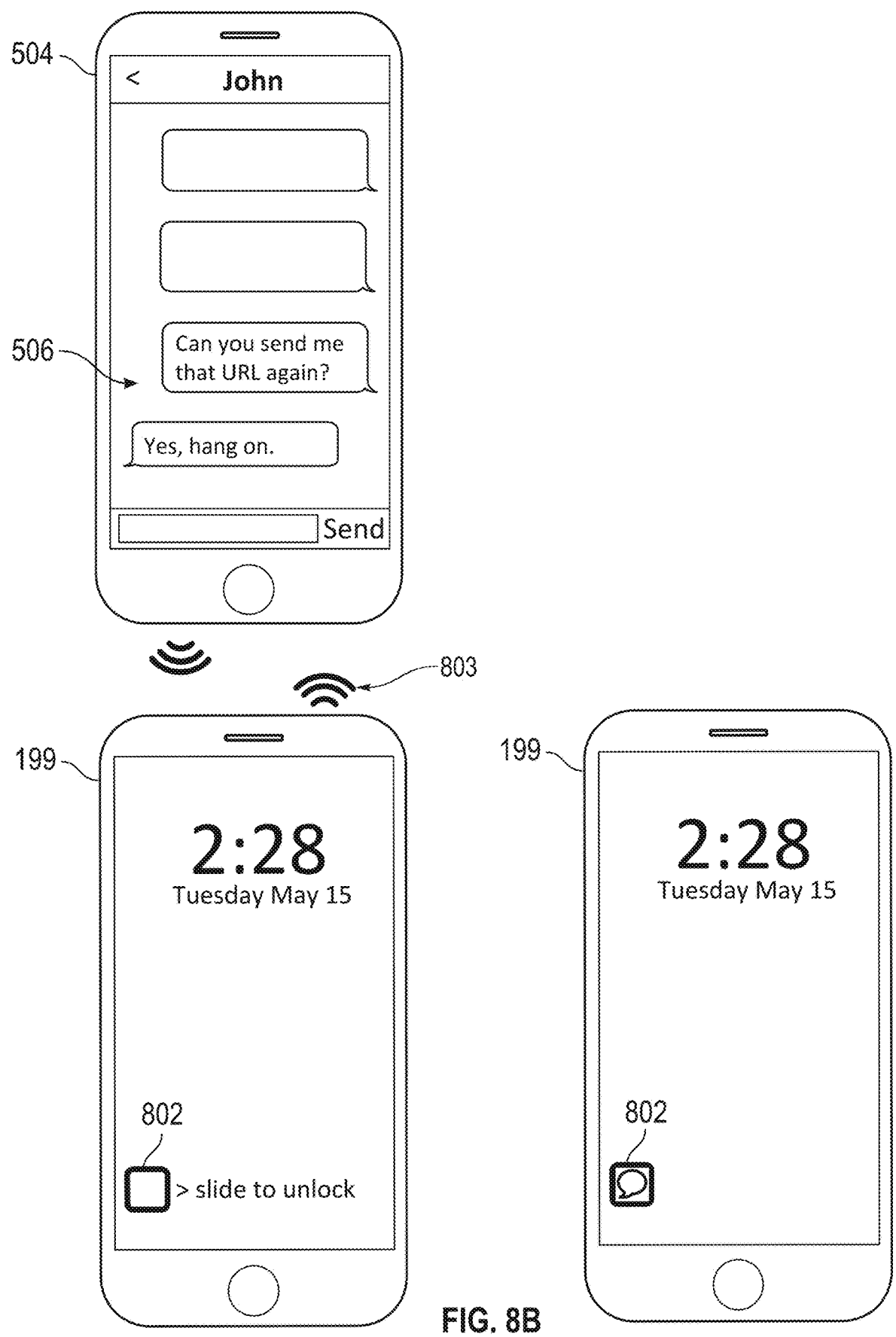

This power conservation technique is illustrated in FIGS. 8A-8C. In FIG. 8A, device 504 and device 199 are within communications range and are compatible for purposes of continuity. While the two devices are in range, device 199 initially receives a first portion of usage information from device 504 indicating its presence and support for continuity functionality. This initial communication 801 may occur over a low powered communication protocol such as BTLE. In response to receiving this first portion of usage information, device 199 displays continuity affordance 802 having a disabled appearance. A user may select (e.g., tap) affordance 802 to enable further communication 803 between the devices for purposes of continuity. Turning to FIG. 8B, in response to the user selection of affordance 802, device 199 obtains an additional, second portion of usage information from device 504. The additional usage information may indicate, among other things, the use of messaging application 804 on device 504, as well as the state of messaging application 804. Also, device 199 may change the visual appearance of affordance 802 so that it appears enabled. Optionally, device 199 may include a thumbnail image indicative of application 804 with affordance 802. As shown in FIG. 8C, a user may then swipe or otherwise activate affordance 802 to launch a corresponding application on device 199.

FIG. 9 is a flow diagram illustrating process 900 for transitioning between two electronic devices. Process 900 may be performed at an electronic device with a display and a touch-sensitive surface, like device 100 (FIG. 1), device 300 (FIG. 3), device 460 (FIG. 4C), and device 470 (FIG. 4D). At block 902, the device detects, via wireless communication, an external device. The external device is executing or has executed a first application. At block 904, the device receives from the external device usage information indicating usage of the first application on the external device. Optionally, the usage information includes usage statistics on when and how recently the first application as used. Optionally, the usage information indicates the state of the first application. At block 906, in response to detecting the external device and receiving the usage information, the device displays an affordance on its screen. Optionally, at block 906, the device may determine how long the affordance has been displayed and cease to display the affordance after a predetermined amount of time. At block 908, the device receives input data representing user selection of the displayed affordance. At block 910, in response to receiving the input data, the device launches a second application on the electronic device, the second application corresponding to the first application. In some embodiments, the second application may correspond to the first application in that the second application is a different version of the first application. In some embodiments, the second application may correspond to the first application in that both applications have at least one application feature in common. For example, both applications may be able to view a particular type of presentation file. In some embodiments, the second application may correspond to the first application in that the second application is a companion to the first and/or the second application provides features for controlling the operation of the first application. Optionally, when the device launches the second application, the device also places the second application into the same application state as the first application.

In some embodiments (e.g., touchscreen embodiments), the device that is performing process 900 has a touch screen display and a touch-sensitive surface is on the display. In some embodiments (e.g., non-touchscreen embodiments), the device has a display separate from the touch-sensitive surface. Thus, the appearance of continuity affordance 514 displayed at block 908 may be different. For example, in touchscreen embodiments, the displayed affordance may look like those illustrated in FIGS. 5C-5I, FIGS. 7A-7G, and/or FIGS. 8A-8C. In non-touchscreen embodiments, the displayed affordance may look like those illustrated in FIGS. 5J-5L. The exact user input that the device is responsive to during block 910 may also be different. For example, in touchscreen embodiments, the displayed affordances may be responsive to touch input using a touch object, such as a tap, a long-duration touch, a flick, a swipe, or another applicable touch gesture. In non-touchscreen embodiments, the displayed affordances may be responsive to mouse events generated using a mouse or equivalent input device, such as a click, double click, drag, and so forth. Combinations of the embodiments are possible. For example, a touchscreen device can be responsive to an external wireless mouse, thus devices in the touchscreen embodiments can also be responsive to mouse and mouse cursor input techniques. Likewise, a non-touchscreen device can be responsive to a touch-sensitive surface (e.g., touchpad), thus devices of the non-touchscreen embodiments can also be responsive to touch input. Put another way, it is entirely possible for a tablet computer to display one of screens illustrated in FIGS. 5J-5L and to launch an application using continuity functionality in response to a wireless keyboard/mouse input. Likewise, it is entirely possible for a laptop computer to also have a touch-sensitive display and therefore be able to provide the screens illustrated in FIGS. 5C-5I, FIGS. 7A-7G, and/or FIGS. 8A-8C and respond to both keyboard, mouse, and touch input. Other combinations are also possible.

FIG. 43 is a flow diagram illustrating process 4300 for transitioning between two electronic devices. Process 4300 may be performed at an electronic device with a touch-sensitive display, like device 100 (FIG. 1), device 300 (FIG. 3), device 460 (FIG. 4C), and device 470 (FIG. 4D). At block 4302, the electronic device detects an external device while the electronic device in a user-interface locked state. The external device is executing a first application, the first application in a state. At block 4304, the device displays for a predetermined amount of time an affordance corresponding to the first application. At block 4306, the device detects a contact on the touch-sensitive display at a location of the displayed affordance. At block 4308, the device, in response to the contact, launches a second application, the second application corresponding to the first application. The state of the second application corresponds to the state of the first application.

FIG. 44 is a flow diagram illustrating process 4400 for transitioning between two electronic devices. Process 4400 may be performed at an electronic device with a touch-sensitive display and a button, like device 100 (FIG. 1), device 300 (FIG. 3), device 460 (FIG. 4C), and device 470 (FIG. 4D). At block 4402, the electronic device detects an external device. The external device is executing a first application, the first application in a state. At block 4404, the electronic device detects two presses of the button. At block 4406, the electronic device, in response to detecting the two presses, displays a left affordance, a center affordance, and a right affordance, the left affordance for launching a second application on the electronic device corresponding to the first application, the center affordance representing an application most recently used on the electronic device. At block 4408, the electronic device detects a contact on the left affordance. At block 4410, the electronic device, in response to the contact on the left affordance, launches the second application on the electronic device. The state of the second application corresponds to the state of the first application.

FIG. 45 is a flow diagram illustrating process 4500 for transitioning between two electronic devices. Process 4500 may be performed at an electronic device with a touch-sensitive display, like device 100 (FIG. 1), device 300 (FIG. 3), device 460 (FIG. 4C), and device 470 (FIG. 4D). At block 4502, the device detects an external device. The external device is executing a first application, the first application in a state. At block 4504, the electronic device detects a downward swipe on the touch-sensitive display, the downward swipe from the top edge of the touch-sensitive display. At block 4506, the electronic device, in response to the downward swipe: displays an affordance for launching a second application on the electronic device, the second application corresponding to the first application. At block 4508, the electronic device detects a contact on the affordance. At block 4510, the electronic device, in response to the contact on the affordance, launches the second application on the electronic device. The state of the second application corresponds to the state of the first application.

FIG. 46 is a flow diagram illustrating process 4600 for transitioning between two electronic devices. Process 4600 may be performed at an electronic device with a touch-sensitive display and a biometric reader, like device 100 (FIG. 1), device 300 (FIG. 3), device 460 (FIG. 4C), and device 470 (FIG. 4D). At block 4602, the electronic device detects an external device while the electronic device is in a user-interface locked state. The external device is executing a first application, the first application in a state. At block 4604, the electronic device receives a biometric input from the biometric reader. At block 4606, the electronic device, in response to receiving the biometric input: unlocks the electronic device. At block 4608, the electronic device, after unlocking, displays an affordance corresponding to the first application. At block 4610, the electronic device detects a contact on the displayed affordance. At block 4612, the electronic device, in response to detecting the contact, launches a second application, the second application corresponding to the first application. The state of the second application corresponds to the state of the first application.

FIG. 47 is a flow diagram illustrating process 4700 for transitioning between two electronic devices. Process 4700 may be performed at an electronic device with a touch-sensitive display, like device 100 (FIG. 1), device 300 (FIG. 3), device 460 (FIG. 4C), and device 470 (FIG. 4D). At block 4702, the device detects an external device. The external device is executing a first application, the first application in a state. At block 4704, the electronic device displays a plurality of application icons on the touch-sensitive display. At block 4706, the electronic device detects a rightward swipe on the touch-sensitive display, the rightward swipe from the left edge of the touch-sensitive display. At block 4708, the electronic device, in response to the rightward swipe, displays an affordance for launching a second application on the electronic device, the second application corresponding to the first application. At block 4710, the electronic device detects a contact on the affordance. At block 4712, the electronic device, in response to the contact on the affordance, launches the second application on the electronic device. The state of the second application corresponds to the state of the first application.

FIG. 48 is a flow diagram illustrating process 4800 for transitioning between two electronic devices. Process 4800 may be performed at an electronic device with an input device for controlling a user interface cursor, like device 100 (FIG. 1), device 300 (FIG. 3), device 460 (FIG. 4C), and device 470 (FIG. 4D). At block 4802, the electronic device detects an external device while the electronic device is in a user-interface locked state. The external device is executing a first application, the first application in a state. At block 4804, the electronic device displays a password input field and an affordance corresponding to the first application. At block 4806, the electronic device receives a password. At block 4808, the electronic device detects a mouse event on the displayed affordance. At block 4810, the electronic device, in response to receiving the password and detecting the mouse event, launches a second application, the second application corresponding to the first application. The state of the second application corresponds to the state of the first application.

FIG. 49 is a flow diagram illustrating process 4900 for transitioning between two electronic devices. Process 4900 may be performed at an electronic device with a keyboard, like device 100 (FIG. 1), device 300 (FIG. 3), device 460 (FIG. 4C), and device 470 (FIG. 4D). At block 4902, the electronic device detects an external device, wherein the external device is executing a first application, the first application in a state. At block 4904, the electronic device detects a key press of a first key of the keyboard simultaneously with a key press of a second key of the keyboard. At block 4906, the electronic device, in response to the simultaneous key presses: displays a plurality of affordances comprising: affordances identifying a plurality of active applications on the electronic device, and an affordance for launching the second application corresponding to the first application. At block 4908, the electronic device detects a sequence of keyboard input including (i) at least one additional key press of the second key (ii) while holding the first key (iii) followed by a release of both the first key and the second key. At block 4910, the electronic device, in response to sequence of keyboard input, launches the second application. The state of the second application corresponds to the state of the first application.

FIG. 50 is a flow diagram illustrating process 5000 for transitioning between two electronic devices. Process 5000 may be performed at an electronic device with an input device for controlling a user interface cursor, like device 100 (FIG. 1), device 300 (FIG. 3), device 460 (FIG. 4C), and device 470 (FIG. 4D). At block 5002, the electronic device detects an external device. The external device is executing a first application, the first application in a state. At block 5004, the electronic device detects a movement of the cursor to a corner of a screen of the electronic device. At block 5006, the electronic device, in response to detecting the movement of the cursor, displays a plurality of affordances comprising: affordances identifying a plurality of active applications on the electronic device, and an affordance for launching the second application corresponding to the first application. At block 5008, the electronic device detects a sequence of input including (i) movement of the cursor onto the affordance for launching the second application and (ii) a mouse-event on the affordance. At block 5010, the electronic device, in response to detecting the sequence of input, launches the second application. The state of the second application corresponds to the state of the first application.

FIG. 51 is a flow diagram illustrating process 5100 for transitioning between two electronic devices. Process 5100 may be performed at an electronic device with a display screen and an input device for controlling a user interface cursor, like device 100 (FIG. 1), device 300 (FIG. 3), device 460 (FIG. 4C), and device 470 (FIG. 4D). At block 5102, the electronic device detects an external device. The external device is executing a first application, the first application in a state. At block 5104, the electronic device displays, in a portion of the display screen, a plurality of application icons for launching a plurality of applications on the electronic device. At block 5106, the electronic device displays, in the portion of the display screen, an icon for launching a second application corresponding to the first application. At block 5108, the electronic device detects movement of the cursor onto the displayed icon and a mouse-event on the displayed icon. At block 5110, the electronic device, in response, launches the second application. The state of the second application corresponds to the state of the first application.

FIG. 52 is a flow diagram illustrating process 5200 for transitioning between two electronic devices. Process 5200 may be performed at an electronic device with an input device for controlling a user interface cursor, like device 100 (FIG. 1), device 300 (FIG. 3), device 460 (FIG. 4C), and device 470 (FIG. 4D). At block 5202, the electronic device detects an external device. The external device is executing a first application, the first application in a state. At block 5204, the electronic device displays a menu bar, the menu bar comprising an icon for launching a second application corresponding to the first application. At block 5206, the electronic device detects movement of the cursor onto the displayed icon and a mouse-event on the displayed icon. At block 5208, the electronic device, in response, launches the second application. The state of the second application corresponds to the state of the first application.

Figure 10:
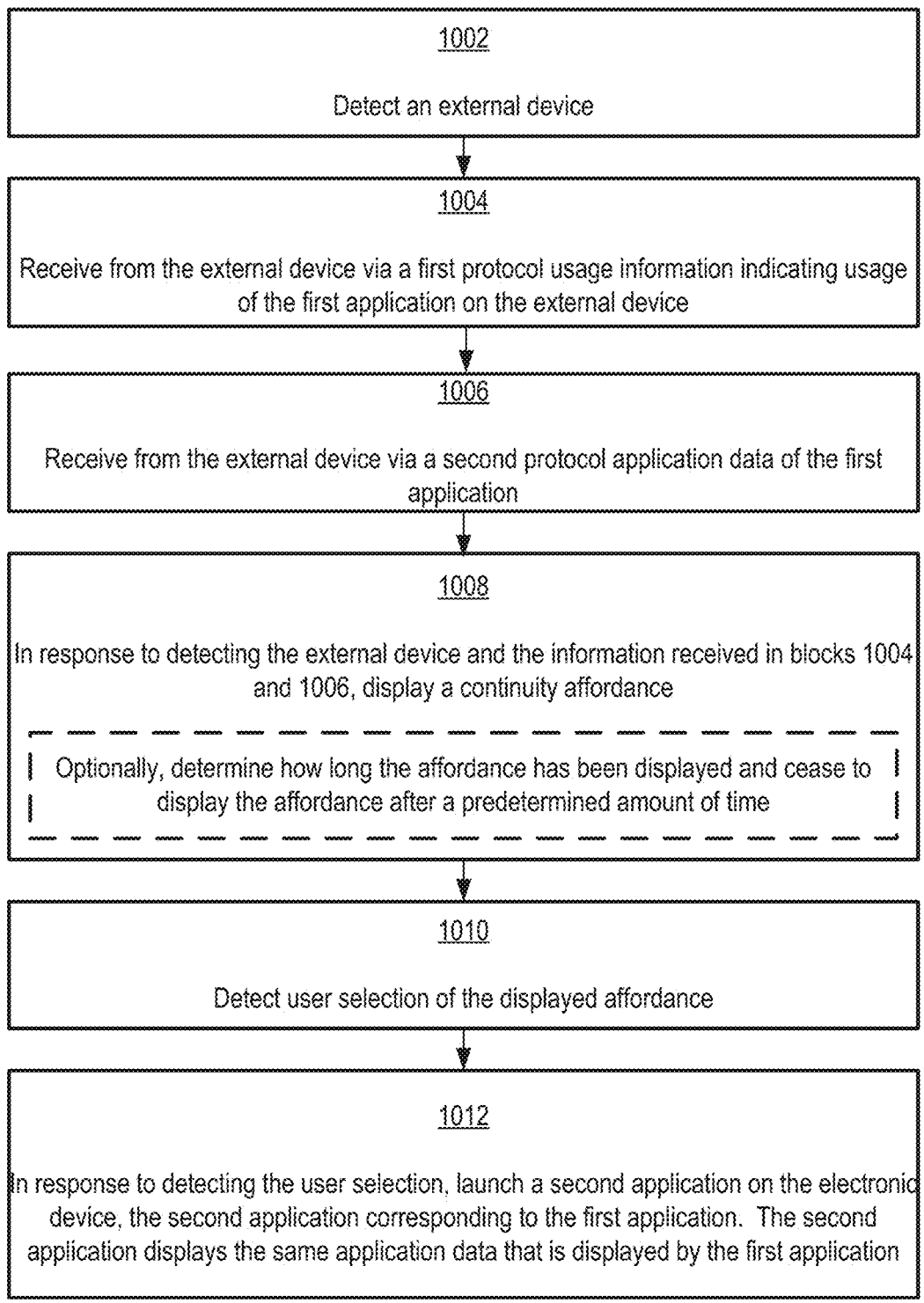
FIG. 10 is a flow diagram illustrating a process for transitioning between electronic devices.

FIG. 10 is a flow diagram illustrating process 1000 of transitioning between two electronic devices. Process 1000 may be performed at an electronic device with a display and a touch-sensitive surface, like device 100 (FIG. 1), device 300 (FIG. 3), and device 460 (FIG. 4C). At block 1002, the device detects, via wireless communication, an external device. The external device is executing or has executed a first application. At block 1004, the device receives from the external device usage information indicating usage of the first application on the external device. This usage information may be received using a first wireless communication protocol. At block 1006, the device receives from the external device application data of the first application. This usage information may be received using a second wireless communication protocol different from the first. At block 1008, in response to detecting the external device and the information received in blocks 1004 and 1006, the device displays a continuity affordance. Optionally, at block 1008, the device may determine how long the affordance has been displayed and cease to display the affordance after a predetermined amount of time. At block 1010, the device receives input data representing user selection of the displayed affordance. At block 1012, in response to receiving the input data, the device launches a second application on the electronic device, the second application corresponding to the first application. When the device launches the second application, the device also causes the second application to display the same application data that is displayed by the first application.

In some embodiments, the usage information received at block 1004 is received over a lower-powered wireless communication protocol and the information received at block 1006 is received over a higher-powered wireless communication protocol. The lower-powered wireless communication protocol may have a lower bandwidth and/or slower data transfer rate, meaning that the lower-powered wireless communication protocol has a lower data transfer capacity. In some embodiments, the lower-powered wireless communication protocol is a peer-to-peer protocol and the higher-powered wireless communication protocol is a local-area-network protocol. In some embodiments, the lower-powered wireless communication protocol is the Bluetooth or Bluetooth Low Energy protocol, and the higher-powered wireless communication protocol is a IEEE 802.11x WiFi protocol.

The division of labor between communications under the first and second wireless communication protocols may vary. Restated, if the device needs to receive a certain universe of information in order to provide continuity functionalities, how much of that universe of information is transmitted over the first, as opposed to the second wireless communication protocol may vary between embodiments and/or may vary within particular embodiments based on factors such as remaining batter life on the device. In some embodiments, device authentication information is transmitted over the first wireless communication protocol. In some embodiments, device-identifying information, is transmitted over the first wireless communication protocol, while application data, such as the contents of a draft e-mail, is transmitted over the second wireless communication protocol. Device-identifying information may be a Bluetooth token, a user ID such as an Apple iCloud® ID, or an e-mail address, for example.

Further details regarding the transfer of information in support of continuity functionality may be found in the following co-pending provisional applications: U.S. Patent Application Ser. No. 62/005,781, "ACTIVITY CONTINUATION BETWEEN ELECTRONIC DEVICES," filed May 30, 2014; U.S. Patent Application Ser. No. 62/005,793, "COMPANION APPLICATION FOR ACTIVITY COOPERATION," filed May 30, 2014; U.S. Patent Application Ser. No. 62/005,751, "PREDEFINED WIRELESS PAIRING," filed May 30, 2014; and U.S. Patent Application Ser. No. 62/005,755, "OPERATING-MODE TRANSITIONS BASED ON ADVERTISING INFORMATION," filed May 30, 2014. The content of these applications is hereby incorporated by reference in their entirety.

Figure 11:
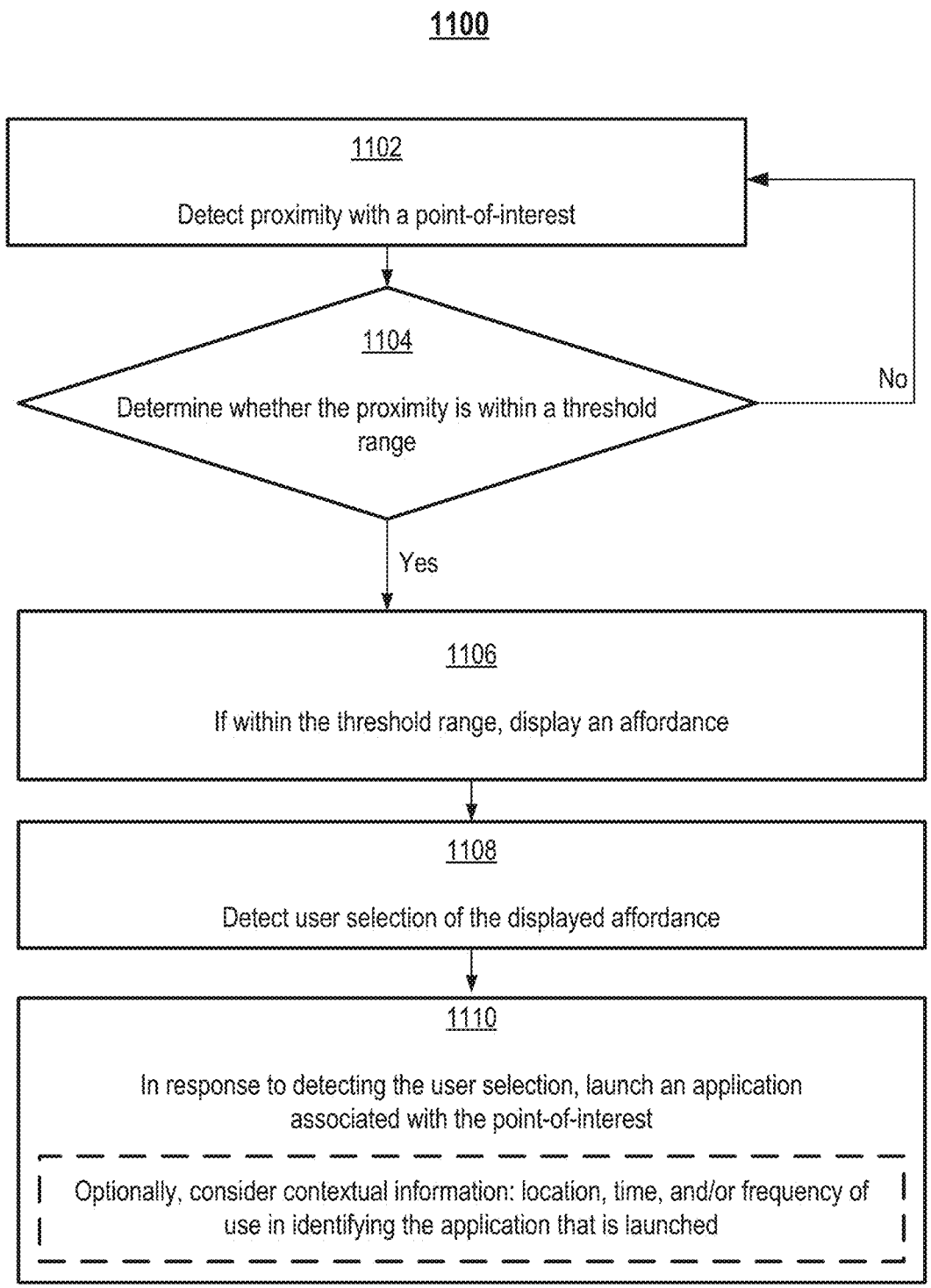
FIG. 11 is a flow diagram illustrating a process for transitioning between electronic devices.

FIG. 11 is a flow diagram illustrating process 1100 for transitioning between two electronic devices. Process 1100 may be performed at an electronic device with a display and a touch-sensitive surface, like device 100 (FIG. 1), device 300 (FIG. 3), device 460 (FIG. 4C). At block 1102, the device detects proximity between itself and a point-of-interest. At block 1104, the device determines whether the proximity is within a threshold range. At block 1106, in accordance with the determination that the proximity is within the threshold range, the device displays an affordance on a screen. At block 1108, the device receives input data representing selection of the displayed affordance. At block 1110, in response to receiving the input data, the device launches an application on the electronic device associated with the point-of-interest.

In some embodiments, the device is locked at block 1102 and unlocks at block 1110. The point-of-interest may be electronic or may be a physical landmark having electronic devices that identify its location. When the point-of-interest is an electronic device, at block 1110, the device may launch an application for controlling the electronic point-of-interest. For example, if the point-of-interest is a smart television, at block 1110, a remote control application for the television may be launched. When the point-of-interest is a physical landmark, at block 1110, the device may launch an application that is related to the landmark. For example, the device may launch, at block 1110, a tourist pamphlet for the landmark.

Optionally, at block 1110, device 100 may consider other factors in determining what application to launch. As discussed above, device 100 may consider contextual information such as time and frequency of access in determining what application to launch. Also, as discussed above, device 100 may find that the desired application is not yet installed. In these instances, device 100 may proceed to block 1112 to download, install, and launch the application. Alternatively, device 100 may display additional information for the user to determine if a particular application should be installed.

FIG. 12 is a flow diagram illustrating process 1200 for selecting an application to launch when multiple applications are available for purposes of continuity. Process 1200 may be performed at an electronic device with a display and a touch-sensitive surface, like device 100 (FIG. 1), device 300 (FIG. 3), and/or device 460 (FIG. 4C). At block 1202, the device detects via wireless communication, a first external device. The first external device may be executing a first application. The first application may have a particular state. At block 1204, the device detects, via wireless communication, a second external device distinct from the first external device. The second external device is executing a second application. The second application may have a particular state. At block 1206, the device displays at least one affordance on a screen of the electronic device based on detecting the first external device and the second external device. The displayed affordances may have the visual appearance of, for example, the user interface screens shown in FIGS. 7A-7G. At block 1208, the device receives input data representing user selection of an affordance of the at least one displayed affordances. Possible inputs include those described above, including those discussed with reference to process 900 (FIG. 9). At block 1210, in response to receiving the input data, the device launches a third application on the electronic device. The third application may be a version of the first application or the second application.

FIG. 13 is a flow diagram illustrating process 1300 for transitioning between two electronic devices. Process 1300 may be performed at an electronic device with a display and a touch-sensitive surface, like device 100 (FIG. 1), device 300 (FIG. 3), and/or device 460 (FIG. 4C). At block 1302, the device, which is executing a first application, detects an external device via wireless communication. At block 1304, the device displays a push affordance on-screen for instructing the external device to launch a second application corresponding to the first application. At block 1306, the device detects a user selection of the push affordance. At block 1308, in response to detecting the user selection, the device sends an instruction to the external device, causing the external device to display an affordance for launching the second application on the external device.

FIG. 14 is a flow diagram illustrating process 1400 for transitioning between two electronic devices. Process 1400 may be performed at an electronic device with a display and a touch-sensitive surface, like device 100 (FIG. 1), device 300 (FIG. 3), and/or device 460 (FIG. 4C). At block 1402, the device detects via wireless communication an external device. The external device is executing a first application. At block 1404, the device receives, from the external device, a first part of usage information indicating the first application was used on the external device by a user within a time interval. At block 1406, in response to detecting the external device and receiving the first part of usage information, the device displays an affordance on a screen of the electronic device. At block 1408, the device detects a user selection of the displayed affordance. At block 1410, in response to detecting the user selection, the device: (i) changes the visual appearance of the displayed affordance; and (ii) obtains, from the external device, a second part of usage information associated with the first application. At block 1412, the device detects a user input on the changed affordance. At block 1414, in response to receiving the user input, the device launches a second application on the electronic device based on at least the second part of usage information. The second application corresponds to the first application.

FIG. 15 is a flow diagram illustrating process 1500 for transitioning between multiple electronic devices. Process 1500 may be performed at an electronic device with a display and a touch-sensitive surface, like device 100 (FIG. 1), device 300 (FIG. 3), and/or device 460 (FIG. 4C). At block 1502, the device receives, via wireless communication from a first external device, first data representing a first plurality of applications that are executing and/or has executed on the first external device. At block 1504, the device displays a first plurality of affordances representing the first plurality of applications, the plurality of affordances including a first affordance corresponding to a first application of the first external device. At block 1506, the device detects user selection of the first affordance. At block 1508, in response to detecting user selection of the first affordance, the device launches a first local application on the electronic device. The first local application is a version of the first application.

In addition to receiving information from a first external device, a local device that is performing process 1500 may receiver information from a second external device. Optionally, process 1500 may include block 1510, during which the device receives via wireless communication from a second external device, the second data representing a second plurality of applications that are executing and/or has executed on the second external device. Further, at block 1512, the device may display a second plurality of affordances representing the second plurality of applications, including a second affordance corresponding to a second application of the second external device. Further still, at block 1514, the device may detect user selection of the second affordance, and in response, launch a second local application on the electronic device, wherein the local application is a version of the second application.

It should be noted that, in some embodiments, the first and second plurality of affordances, which represent the applications of the first and second external devices, may be displayed together on the same screen. This user interface may have the visual appearance of screen 740 in FIG. 7G, for example. From this screen, a user may identify the various applications that are running on nearby devices. Also, from this screen, a user may choose to continue his work on the local device by invoking a corresponding application on the local device. In this way, process 1500 provide powerful ways of cataloging a user's application use across multiple electronics devices, and permitting the user to transition from use of one device to another seamlessly. Consider, for example, a situation in which one user owns a compatible cellular phone, tablet computer, and laptop computer. A device performing process 1500 to display disambiguation screen 740 (FIG. 7G) would allow the user to easily transition between the different devices onto the local device, which may be more suitable for the task at hand.

Figure 20:
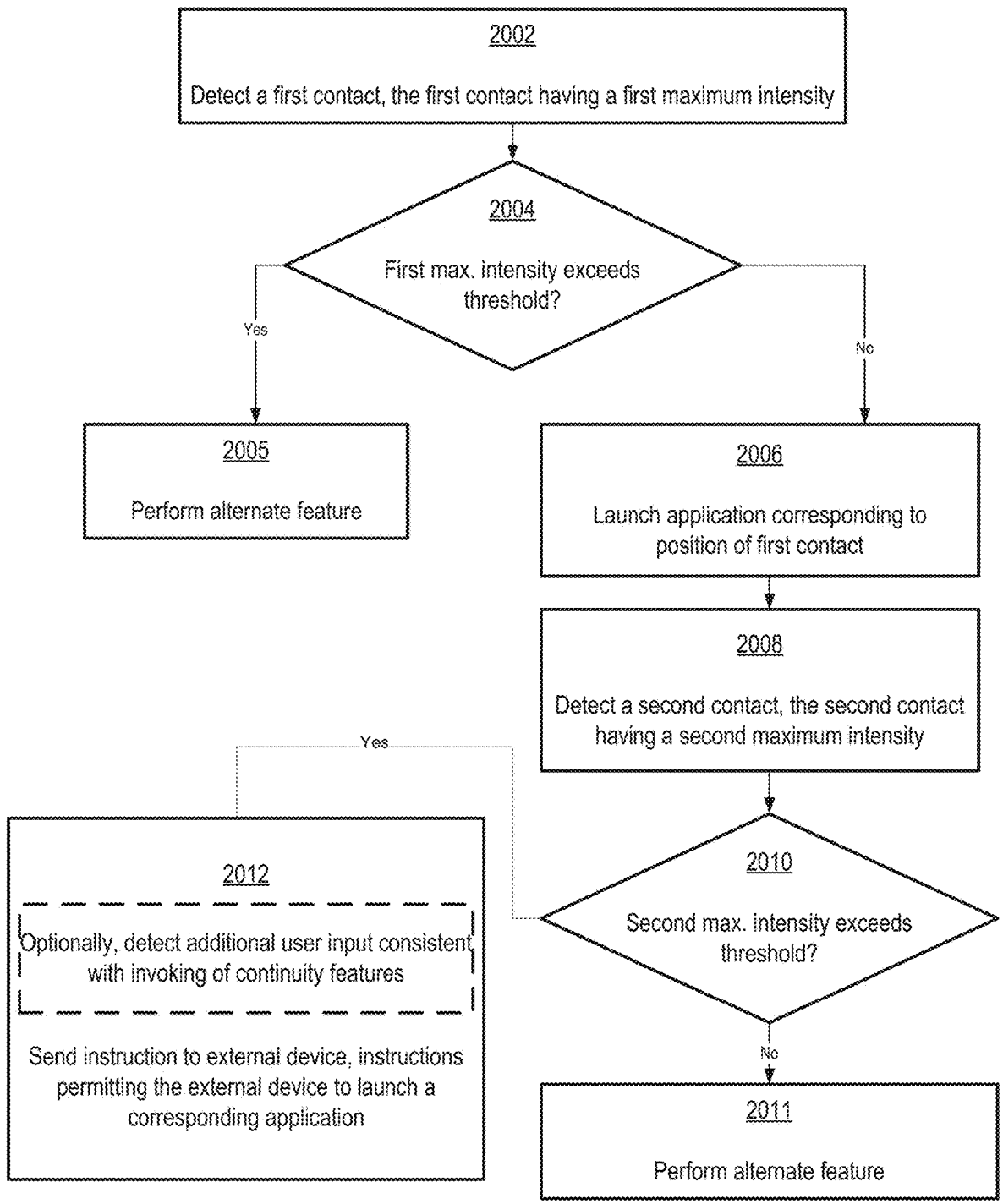
FIG. 20 is a flow diagram illustrating a process for transitioning between electronic devices.

FIG. 20 is a flow diagram illustrating process 2000 for transitioning between two electronic devices. In some embodiments, process 2000 may be performed at an electronic device with a display and a touch-sensitive surface that is capable of detecting intensity of touch contacts. In some embodiments, process 2000 may be performed at an electronic with a display and a touch-sensitive surface that is able to determine a substitute (proxy) for the force or pressure of a contact on the touch-sensitive surface. Exemplary devices that may perform process 2000 include devices 100, 300, and 460 (FIGS. 1, 3, and 4C).

At block 2002, a first touch contact is detected on the touch-sensitive display. The first contact has a first maximum intensity. The position of first contact on the touchscreen may correspond to an icon for launching an application on the device. At block 2004, a determination is made as to whether the first maximum intensity exceeds a threshold intensity. If the first maximum intensity is below the threshold intensity, processing continues to block 2006 where the corresponding application is launched. If the first maximum intensity is above the threshold intensity, processing proceeds to block 2005 where a feature other than launching the corresponding application is performed. For example, in some embodiments, a context-sensitive menu is displayed.

At block 2008, a second contact may be detected on the touch-sensitive display, the second contact having a second maximum intensity. At block 2010, a determination is made as to whether the second maximum intensity exceeds a threshold intensity. If the second maximum intensity is above the threshold intensity, processing continues to block 2012 where an instruction may be sent, via wireless communication, to an external device. The instruction may cause the external device to display an affordance for launching a second application on the external device corresponding to the first application. In some embodiments, the second contact and the sending of the instruction is separated by one or more intervening steps. For example, the user may be required to select an additional affordance (e.g., on-screen icon) after the second contact in order for the instruction to be sent. The additional affordance may be labeled in a way to indicate to the user that he is about to "push" information from one electronic device to another. If the second maximum intensity is below the threshold intensity, processing proceeds to block 2011 where a feature other than sending the instruction launching the second application is performed. For example, in some embodiments, a feature of the first application may be invoked.

FIG. 21 is a flow diagram illustrating process 2100 for transitioning between two electronic devices. In some embodiments, process 2100 may be performed at an electronic device with a display and a touch-sensitive surface, such as devices 100, 300, and 460 (FIGS. 1, 3, and 4C). An application may be installed and be executable on the device. At block 2102, while the installed application is not displayed (e.g., while the application is not active in the foreground), application data for the installed application may be obtained. At block 2104, an alert indicative of the obtained application data may be displayed. For example, the installed application may be Messages®, made by Apple Inc. of Cupertino, California; the obtained application data may be an incoming text message; and the alert may include text notifying the user of the incoming text message. At block 2106, a swipe of the alert may be detected. At block 2108, responsive to a determination that the detected movement is substantially in a first direction, an instruction may be sent via wireless communication to the external device. The instruction may provide information for the external device to display an affordance for launching a second application on the external device that corresponds to the first application. The instruction may instruct the external device to display the affordance. As used here, an "alert" may consistent of graphical user interface objects in the form of text and images.

FIG. 22 is a flow diagram illustrating process 2200 for transitioning between two electronic devices. In some embodiments, process 2200 may be performed at an electronic device with a display and a microphone, such as devices 100, 300, and 460 (FIGS. 1, 3, and 4C). The electronic device may have an intelligent automated assistant that is responsive to voice input received via microphone. At block 2202, voice input may be detected. The voice input may include a verbal request for information. At block 2204, an external device that is within wireless communications range may be detected. At block 2206, responsive at least in part to detecting the voice input and detecting the external device, an instruction may be sent via wireless communication to the external device. The instruction may provide information for the external device to display an affordance for displaying the requested information. The instruction may instruct the external device to display the affordance.

FIG. 53 is a flow diagram illustrating process 5300 for transitioning between two electronic devices. Process 5300 may be performed at an electronic device with a touch-sensitive display and a microphone, like device 100 (FIG. 1), device 300 (FIG. 3), device 460 (FIG. 4C), and device 470 (FIG. 4D). At block 5302, the electronic device detects a voice input from the microphone. The voice input includes a verbal request for information. At block 5304, the electronic device detects, via wireless communication, an external device. At block 5306, the electronic device, in response at least in part to detecting the voice input and detecting the external device, sends an instruction, via wireless communication, to the external device. The instruction causes the external device to display an affordance for displaying the requested information.

It should be understood that the particular order in which the operations in FIGS. 9-15 and 20-22 have been described is exemplary and not intended to indicate that the described order is the only order in which the operations could be performed. One of ordinary skill in the art would recognize various ways to reorder the operations described herein. For brevity, these details are not repeated here. Additionally, it should be noted that aspects of processes 900-1500 (FIGS. 9-15) and processes 2000-2200 (FIGS. 20-22) may be incorporated with one another. For example, process 900 describes the receiving of input in both touchscreen and non-touchscreen equipped devices. Touchscreen and non-touchscreen devices may be used to perform one or more of processes 1000-1500 and 2000-2200 (FIGS. 10-15 and 20-22). Thus, the input techniques described with respect to process 900 may be relevant to processes 1000-1500 and 2000-2200. For brevity, the permutations of user input techniques are not repeated.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, 3, 4C, and 4D) are all included within the scope of protection of the invention.

Figure 16:
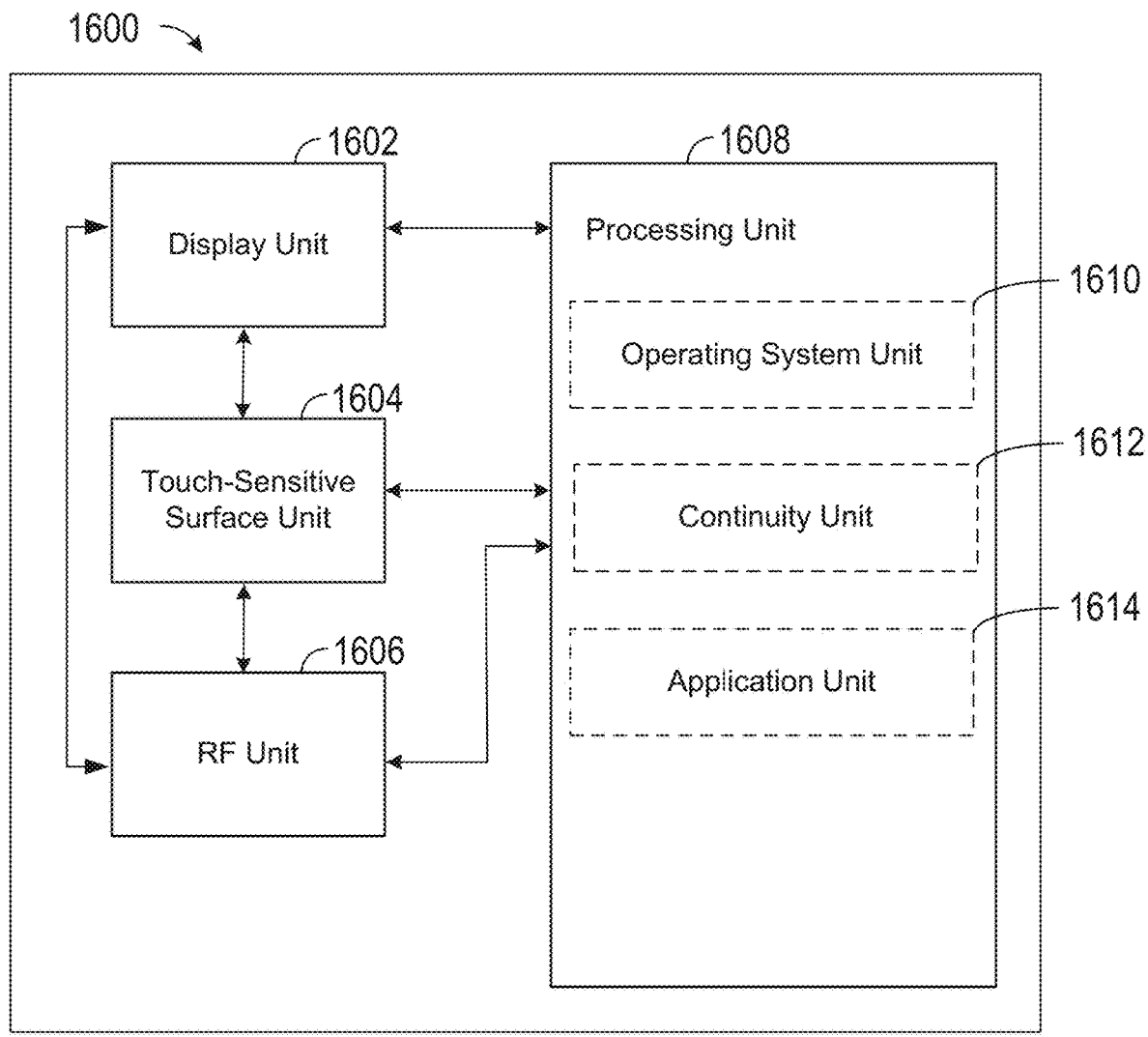
FIG. 16 is a functional block diagram of an electronic device in accordance with some embodiments.

FIG. 16 shows exemplary functional blocks of an electronic device 1600 that, in some embodiments, perform the features described above. As shown in FIG. 16, an electronic device 1600 includes a display unit 1602 configured to display graphical objects; a touch-sensitive surface unit 1604 configured to receive user gestures; one or more RF units 1606 configured to detect and communicate with external electronic devices; and a processing unit 1608 coupled to display unit 1602, touch-sensitive surface unit 1604, and RF units 1606. In some embodiments, processing unit 1608 is configured to support an operating system 1610 running one or more applications 1612. In some embodiments, processing unit 1608 is configured to receive data, from RF unit 1606, representing an external device that is within wireless communications range, display a graphical user interface affordance on touch-sensitive surface unit 1604. In some embodiments, continuity unit 1610 is configured to parse the received data and determine a corresponding application to launch on device 1 600, as well as an application state. In some embodiments, continuity unit 1610 is also configured to parse the received data and determine an application state so that the corresponding application may be launched under that state. Application unit 1612 may be configured to launch the corresponding application in the desired state.

The functional blocks of the device 1600 are, optionally, implemented by hardware, software, or a combination of hardware and software to carry out the principles of the various described examples. It is understood by persons of skill in the art that the functional blocks described in FIG. 16 are, optionally, combined or separated into sub-blocks to implement the principles of the various described examples. Therefore, the description herein optionally supports any possible combination or separation or further definition of the functional blocks described herein.

Figure 23:
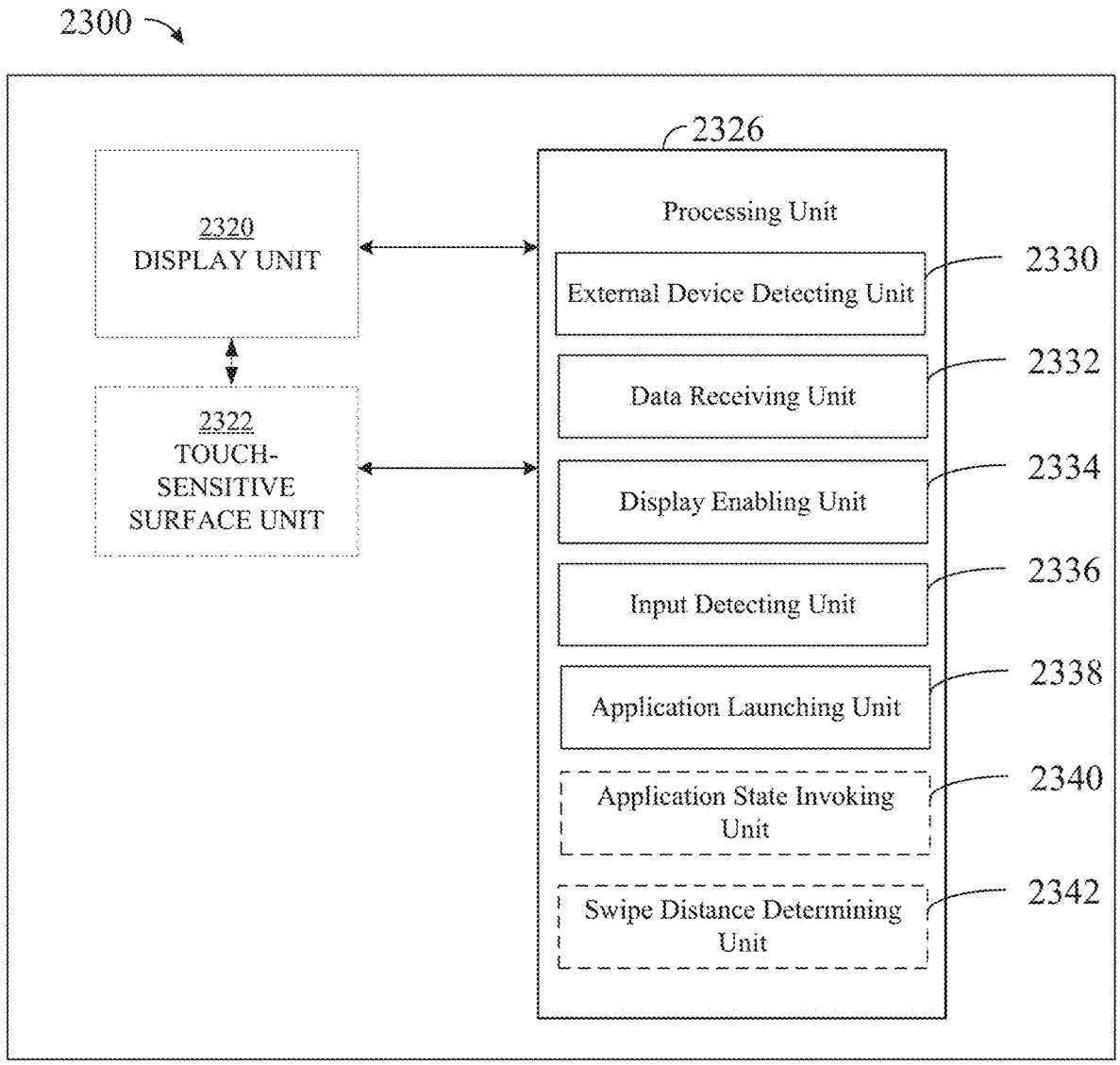
FIG. 23 is a functional block diagram of an electronic device configured to display a user interface in accordance with some embodiments.

In accordance with some embodiments, FIG. 23 shows an exemplary functional block diagram of an electronic device 2300 configured in accordance with the principles of the various described embodiments. In accordance with some embodiments, the functional blocks of electronic device 2300 are configured to perform the techniques described above. The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

As shown in FIG. 23, an electronic device 2300 includes display unit 2320, and optional touch-sensitive surface unit 2322, coupled to processing unit 2326. Touch sensitive surface unit 2322 is optionally combined with display unit 2320 to form a touch screen display. In some embodiments, processing unit 2326 includes an external device detecting unit 2330, a data receiving unit 2332, a display enabling unit 2334, an input detecting unit 2336, and an application launching unit 2338. Optionally, processing unit 2326 also includes application state invoking unit 2340 and swipe distance determining unit 2342.

Processing unit 2326 configured to: detect (e.g., with external device detecting unit 2330), via wireless communication, an external device, wherein the external device is executing or has executed a first application; receive (e.g., with data receiving unit 2332), from the external device, usage information indicating usage of the first application on the external device; in response to detecting the external device and receiving the usage information, enable (e.g., with display enabling unit 2334) display of an affordance on a screen (e.g., display unit 2320) of electronic device 2300; detect (e.g., with input detecting unit 2336) user selection of the displayed affordance; and in response to detecting the user selection, launch (e.g., with application launching unit 2338) a second application on electronic device 2300, the second application corresponding to the first application.

In some embodiments, processing unit 2326 is further configured to: cease (e.g., with display enabling unit 2334) to display the affordance after a predetermined amount of time.

In some embodiments, the first application was used on the external device within a predetermined amount of time prior to the current time.

In some embodiments, the first application and the second application have at least one application feature in common.

In some embodiments, the usage information indicates a state of the first application, and launching the second application comprises invoking (e.g., with application state invoking unit 2340) the state in the second application on electronic device 2300.

In some embodiments, the state of the first application corresponds to a user interface screen of the first application.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 2326 is further configured to: receive (e.g., with data receiving unit 2332), by electronic device 2300, application data of the first application; and enable (e.g., with display enabling unit 2334) display of the application data via the second application.

In some embodiments, the application data represents a portion of a message displayed by the first application, and processing unit 2326 is further configured to: enable (e.g., with display enabling unit 2334) display of the portion of the message in the second application.

In some embodiments, the application data represents a portion of a web-page, and processing unit 2326 is further configured to: enable (e.g., with display enabling unit 2334) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 2334) display of an affordance for invoking, wirelessly from the second application executing on electronic device 2300, an application feature of the first application executing on the external device.

In some embodiments, electronic device 2300 comprises touch-sensitive display unit 2320, and the user selection of the displayed affordance is a swipe from the displayed affordance.

In some embodiments, processing unit 2326 is further configured to: determine (e.g., with swipe distance determining unit 2342) whether a distance of the swipe exceeds a threshold distance; and launch (e.g., with application launching unit 2338) the second application only if it is determined that the distance of the swipe exceeds the threshold distance.

In some embodiments, processing unit 2326 is further configured to: in accordance with a determination that the distance of the swipe does not exceed the threshold distance, bounce (e.g., with display enabling unit 2334) the displayed affordance.

In some embodiments, display unit 2320 and touch-sensitive surface 2322 form a touch screen display, and user selection of the displayed affordance is a tap on the displayed affordance, and processing unit 2326 is further configured to: in response to detecting the tap, launch (e.g., with application launching unit 2338) a second application on electronic device 2300, the second application corresponding to the first application.

In some embodiments, display unit 2320 and touch-sensitive surface 2322 form a touch screen display, the user selection of the displayed affordance is a tap on the displayed affordance, and processing unit 2326 is configure to, in response to detecting the tap, bounce (e.g., with display enabling unit 2334) the displayed affordance to indicate how to launch the application; and launch (e.g., with application launching unit 2338) the second application only if a swipe of the displayed affordance is detected.

In some embodiments, processing unit 2326 is further configured to: in response to detecting the tap, enable (e.g., with display enabling unit 2334) display of instruction text informing the user to swipe the displayed affordance.

In some embodiments, electronic device 2300 is a laptop or desktop computer.

In some embodiments, electronic device 2300 is a tablet computer.

In some embodiments, electronic device 2300 is a phone.

In some embodiments, the external device is a laptop or desktop computer.

In some embodiments, the external device is a tablet computer.

In some embodiments, the external device is a phone.

The operations described above with reference to FIG. 9 are, optionally, implemented by components depicted in FIGS. 1A-1B or FIG. 23. For example, detecting operation 902, receiving operation 904, and displaying operation 906 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 24:
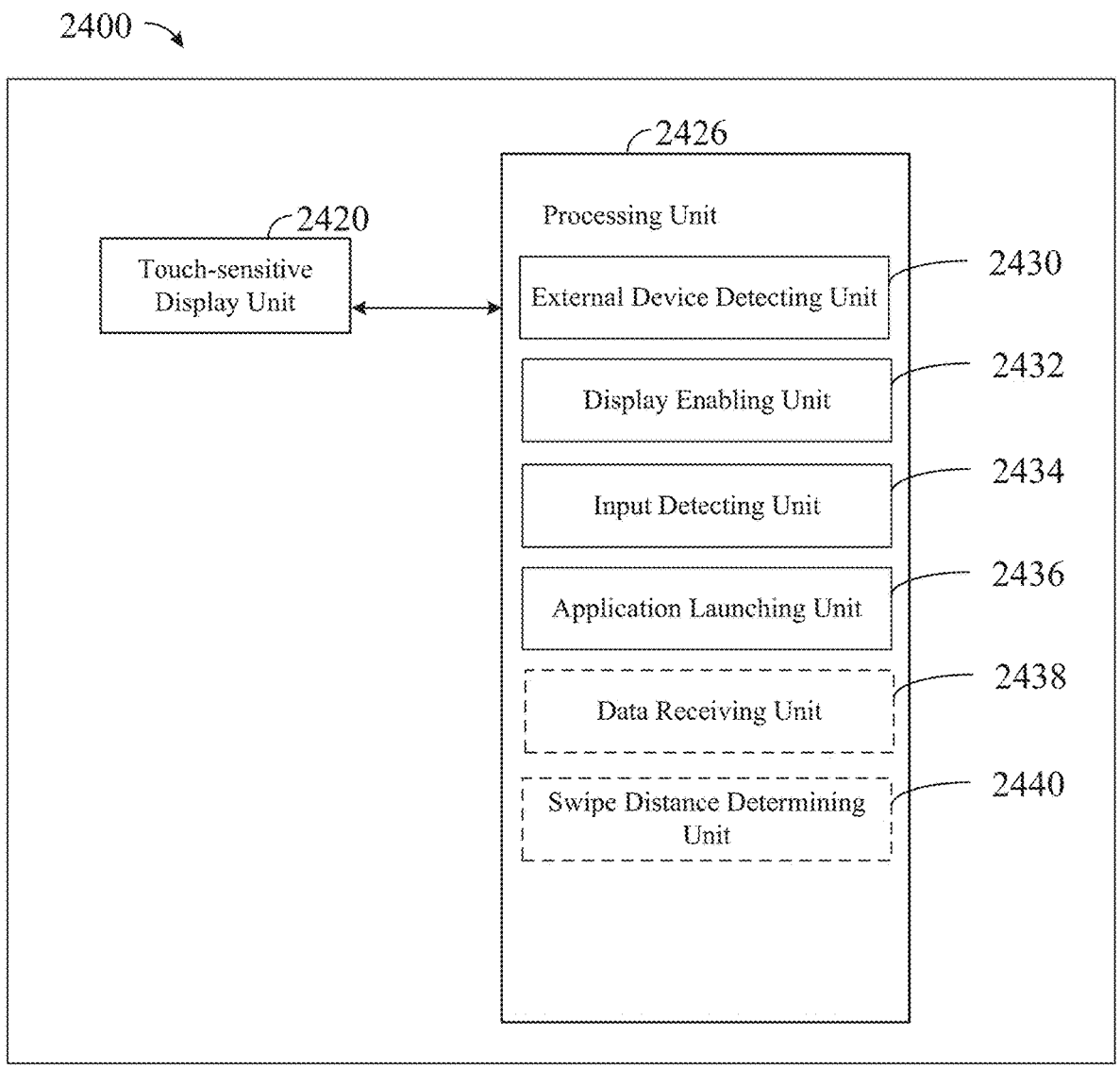
FIG. 24 is a functional block diagram of an electronic device configured to display a user interface in accordance with some embodiments.

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 includes a touch-sensitive display unit 2420 and a processing unit 2426 coupled to touch-sensitive display unit 2420. In some embodiments, processing unit 2426 includes an external device detecting unit 2430, a display enabling unit 2432, an input detecting unit 2434, and an application launching unit 2436. Optionally, processing unit 2426 also includes a data receiving unit 2438 and a swipe distance determining unit 2440.

As shown in FIG. 24, an electronic device 2400 includes a touch-sensitive display unit 2420, and a processing unit 2426 coupled to touch-sensitive display unit 2420. In some embodiments, processing unit 2426 includes an external device detecting unit 2430, a display enabling unit 2432, an input detecting unit 2434, and an application launching unit 2436. Optionally, processing unit 2426 also includes a data receiving unit 2438 and a swipe distance determining unit 2440.

Processing unit 2426 is configured to: detect (e.g., with external device detecting unit 2430) an external device while electronic device 2400 is in a user-interface locked state, wherein the external device is executing a first application, the first application in a state; enable (e.g., with display enabling unit 2432) display for a predetermined amount of time, on touch-sensitive display unit 2420, an affordance corresponding to the first application; detect (e.g., with input detecting unit 2434) a contact on touch-sensitive display unit 2420 at a location of the displayed affordance; and in response to the contact, launch (e.g., with application launching unit 2436) a second application, the second application corresponding to the first application, wherein the state of the second application corresponds to the state of the first application.

In some embodiments, the contact is a tap on the displayed affordance, and processing unit 2426 is further configured to: in response to detecting the tap, launch (e.g., with application launching unit 2436) the second application.

In some embodiments, the contact is a tap on the displayed affordance, and processing unit 2426 is further configured to: in response to detecting the tap: bounce (e.g., with display enabling unit 2432) the affordance; and not launch the second application.

In some embodiments, the contact is a swipe from the displayed affordance, and processing unit 2426 is further configured to: in response to detecting the swipe, launch (e.g., with application launching unit 2436) the second application.

In some embodiments, processing unit 2426 is further configured to: determine (e.g., with swipe distance determining unit 2440) whether a distance of the swipe exceeds a threshold distance; and launch (e.g., with application launching unit 2436) the second application from the locked state only if it is determined that the distance of the swipe exceeds the threshold distance.

In some embodiments, processing unit 2426 is further configured to: in accordance with a determination that the distance of the swipe does not exceed the threshold distance, bounce (e.g., with display enabling unit 2432) the affordance.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 2426 is further configured to: receive (e.g., with data receiving unit 2438), by electronic device 2400, application data of the first application; and enable (e.g., with display enabling unit 2432) display of the application data via the second application.

In some embodiments, the application data represents a portion of a message displayed by the first application, and processing unit 2426 is further configured to: enable (e.g., with display enabling unit 2432) display of the portion of the message in the second application.

In some embodiments, the application data represents a portion of a web-page, and processing unit 2426 is further configured to: enable (e.g., with display enabling unit 2432) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 2432) display of an affordance for invoking, wirelessly from the second application executing on electronic device 2400, an application feature of the first application executing on the external device.

In some embodiments, electronic device 2400 is a laptop or desktop computer.

In some embodiments, electronic device 2400 is a tablet computer.

In some embodiments, electronic device 2400 is a phone.

In some embodiments, the external device is a laptop or desktop computer.

In some embodiments, the external device is a tablet computer.

In some embodiments, the external device is a phone.

The operations described above with reference to FIG. 43 are, optionally, implemented by components depicted in FIGS. 1A-1B or FIG. 24. For example, external device detecting operation 4302, displaying operation 4304, and input detecting operation 4306 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
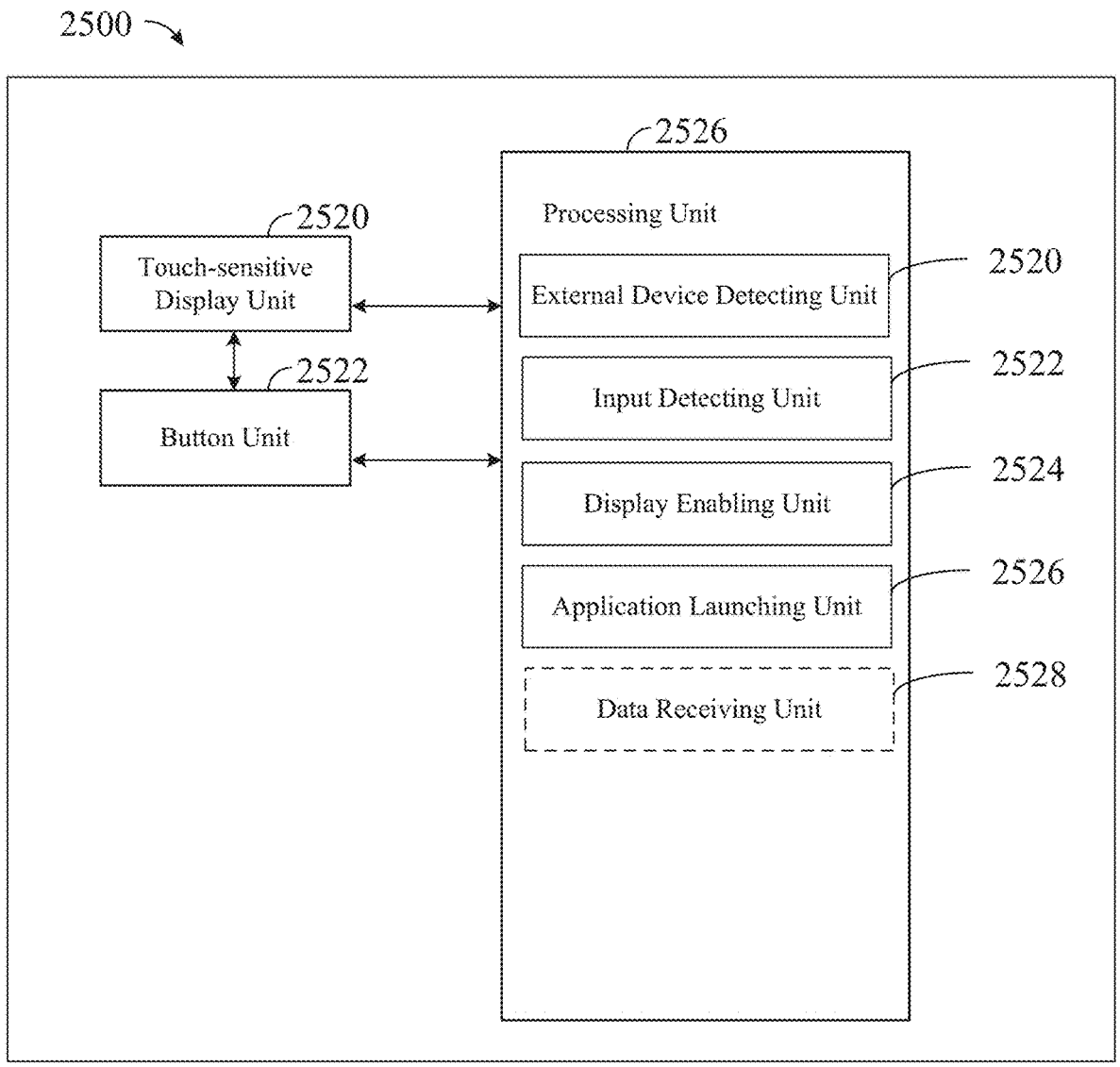
FIG. 25 is a functional block diagram of an electronic device configured to display a user interface in accordance with some embodiments.

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes a touch-sensitive display unit 2520, a button unit 2522, and a processing unit 2526 coupled to touch-sensitive display unit 2520 and button unit 2522. In some embodiments, processing unit 2526 includes an external device detecting unit 2530, a display enabling unit 2534, an input detecting unit 2532, and an application launching unit 2536. Optionally, processing unit 2526 also includes a data receiving unit 2538.

Processing unit 2526 is configured to: detect (e.g., with external device detecting unit 2530) an external device, wherein the external device is executing a first application, the first application in a state; detect (e.g., with input detecting unit 2532) two presses of the button; in response to detecting the two presses: enable (e.g., with display enabling unit 2534) display of a left affordance, a center affordance, and a right affordance, the left affordance for launching a second application on electronic device 2500 corresponding to the first application, the center affordance representing an application most recently used on electronic device 2500; detect (e.g., with input detecting unit 2532) a contact on the left affordance; and in response to the contact on the left affordance, launch (e.g., with application launching unit 2536) the second application on electronic device 2500, wherein the state of the second application corresponds to the state of the first application.

In some embodiments, enabling display of the left affordance comprises enabling (e.g., with display enabling unit 2534) display of a thumbnail image indicating the state of the first application.

In some embodiments, the right affordance represents a third application executing on electronic device 2500.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 2526 is further configured to: receive (e.g., with data receiving unit 2538), by electronic device 2500, application data of the first application; and enable (e.g., with display enabling unit 2534) display of the application data via the second application.

In some embodiments, the application data represents a portion of a message displayed by the first application, and processing unit 2526 is further configured to: enable (e.g., with display enabling unit 2534) display of the portion of the message in the second application.

In some embodiments, the application data represents a portion of a web-page, and processing unit 2526 is further configured to: enable (e.g., with display enabling unit 2534) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 2534) display of an affordance for invoking, wirelessly from the second application executing on electronic device 2500, an application feature of the first application executing on the external device.

In some embodiments, electronic device 2500 is a laptop or desktop computer.

In some embodiments, electronic device 2500 is a tablet computer.

In some embodiments, electronic device 2500 is a phone.

In some embodiments, the external device is a laptop or desktop computer.

In some embodiments, the external device is a tablet computer.

In some embodiments, the external device is a phone.

The operations described above with reference to FIG. 44 are, optionally, implemented by components depicted in FIGS. 1A-1B or FIG. 25. For example, external device detecting operation 4402, button press detecting operation 4404, and displaying operation 4406 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
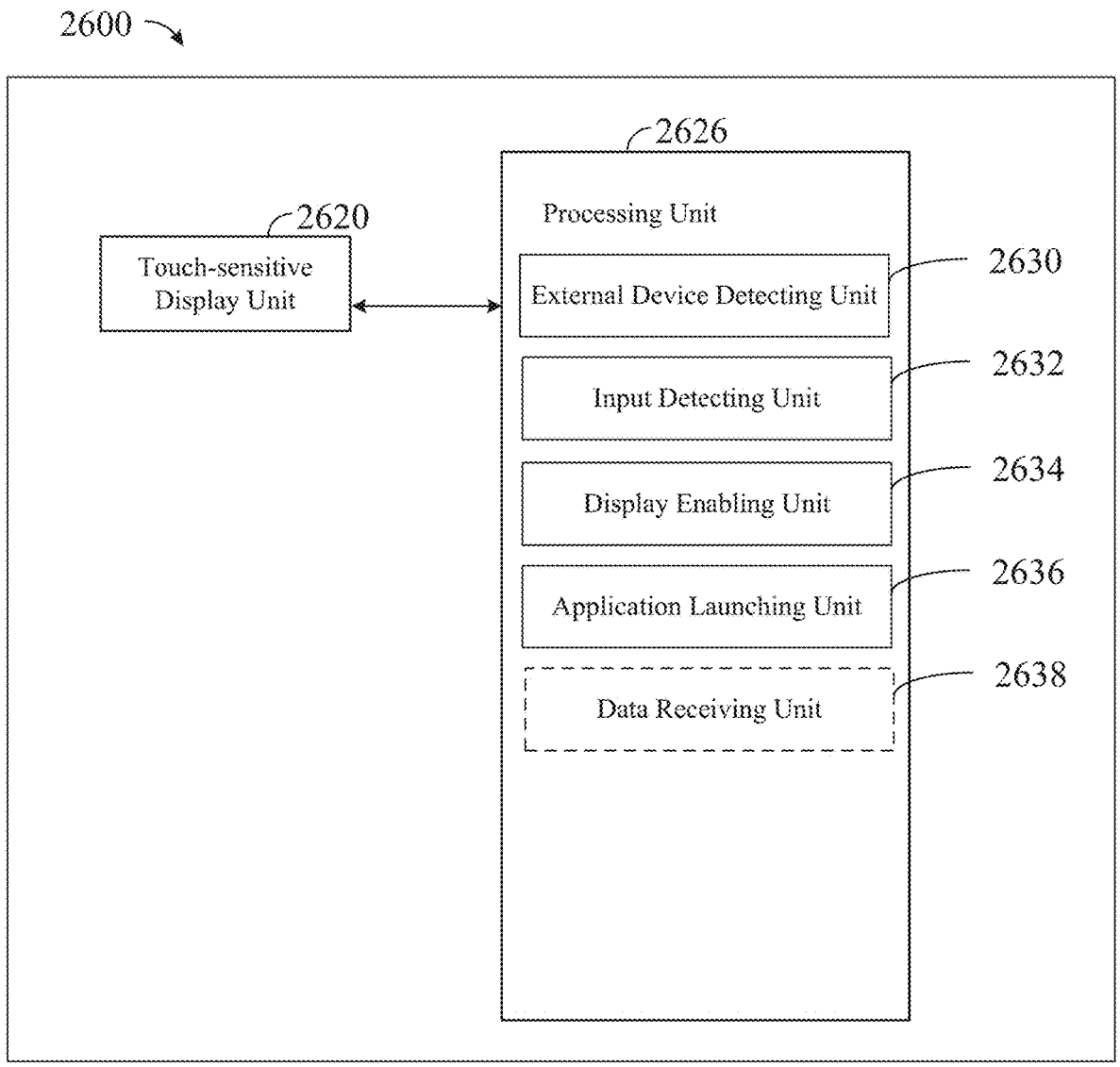
FIG. 26 is a functional block diagram of an electronic device configured to display a user interface in accordance with some embodiments.

In accordance with some embodiments, FIG. 26 shows an exemplary functional block diagram of an electronic device 2600 configured in accordance with the principles of the various described embodiments. In accordance with some embodiments, the functional blocks of electronic device 2600 are configured to perform the techniques described above. The functional blocks of the device 2600 are, optionally, implemented by hardware, software, or a combination of hardware and software to carry out the principles of the various described examples. It is understood by persons of skill in the art that the functional blocks described in FIG. 26 are, optionally, combined or separated into sub-blocks to implement the principles of the various described examples. Therefore, the description herein optionally supports any possible combination or separation or further definition of the functional blocks described herein.

As shown in FIG. 26, an electronic device 2600 includes a touch-sensitive display unit 2620 and a processing unit 2626 coupled to touch-sensitive display unit 2620. In some embodiments, processing unit 2626 includes an external device detecting unit 2630, a display enabling unit 2634, an input detecting unit 2632, and an application launching unit 2636. Optionally, processing unit 2626 also includes a data receiving unit 2638.

Processing unit 2626 is configured to: detect (e.g., with external device detecting unit 2630) an external device, wherein the external device is executing a first application, the first application in a state; detect (e.g., with input detecting unit 2632) a downward swipe on touch-sensitive display unit 2620, the downward swipe from the top edge of touch-sensitive display unit 2620; in response to the downward swipe: enable (e.g., with display enabling unit 2634) display of an affordance for launching a second application on electronic device 2600, the second application corresponding to the first application; detect (e.g., with input detecting unit 2632) a contact on the affordance; and in response to the contact on the affordance, launch (e.g., with application launching unit 2636) the second application on electronic device 2600, wherein the state of the second application corresponds to the state of the first application.

In some embodiments, enabling display of the affordance comprises enabling (e.g., with display enabling unit 2634) display of a thumbnail image identifying the first application.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 2626 is further configured to: receive (e.g., with data receiving unit 2638), by electronic device 2600, application data of the first application; and enable (e.g., with display enabling unit 2634) display of the application data via the second application.

In some embodiments, the application data represents a portion of a message displayed by the first application, and processing unit 2626 is further configured to: enable (e.g., with display enabling unit 2634) display of the portion of the message in the second application.

In some embodiments, the application data represents a portion of a web-page, and processing unit 2626 is further configured to: enable (e.g., with display enabling unit 2634) display of the portion of the web-page via the second application.

In some embodiments, at least one application feature is accessible only from one of the first application and the second application.

In some embodiments, the first application performs at least one application feature, and launching the second application comprises: enabling display of an affordance for invoking, wirelessly from the second application executing on electronic device 2600, an application feature of the first application executing on the external device.

In some embodiments, electronic device 2600 is a laptop or desktop computer.

In some embodiments, electronic device 2600 is a tablet computer.

In some embodiments, electronic device 2600 is a phone.

In some embodiments, the external device is a laptop or desktop computer.

In some embodiments, the external device is a tablet computer.

In some embodiments, the external device is a phone.

The operations described above with reference to FIG. 45 are, optionally, implemented by components depicted in FIGS. 1A-1B or FIG. 26. For example, external device detecting operation 4502, swipe detecting operation 4504, and displaying operation 4506 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 27:
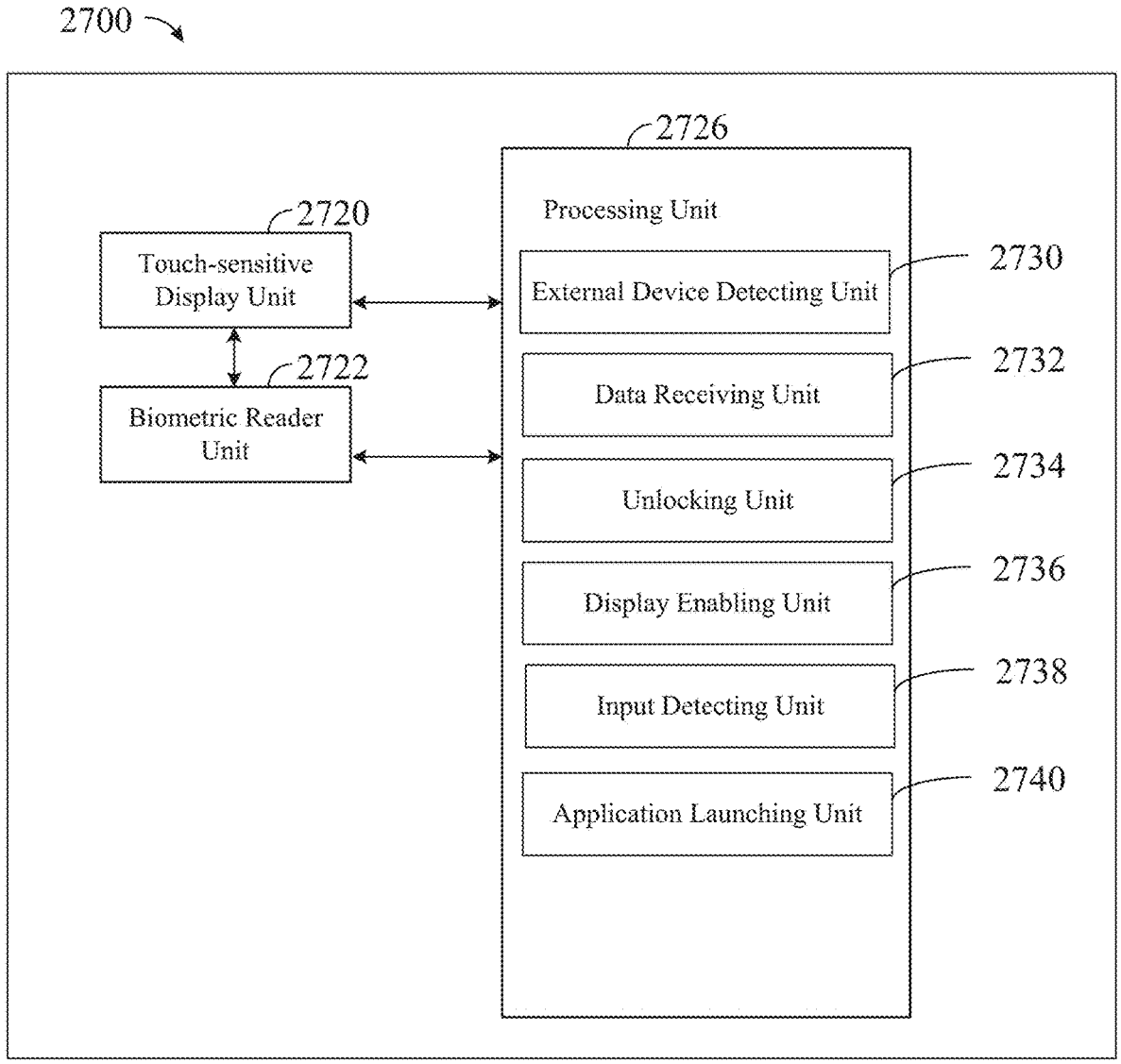
FIG. 27 is a functional block diagram of an electronic device configured to display a user interface in accordance with some embodiments.

In accordance with some embodiments, FIG. 27 shows an exemplary functional block diagram of an electronic device 2700 configured in accordance with the principles of the various described embodiments. In accordance with some embodiments, the functional blocks of electronic device 2700 are configured to perform the techniques described above. The functional blocks of the device 2700 are, optionally, implemented by hardware, software, or a combination of hardware and software to carry out the principles of the various described examples. It is understood by persons of skill in the art that the functional blocks described in FIG. 27 are, optionally, combined or separated into sub-blocks to implement the principles of the various described examples. Therefore, the description herein optionally supports any possible combination or separation or further definition of the functional blocks described herein.

As shown in FIG. 27, an electronic device 2700 includes a touch-sensitive display unit 2720, a biometric reader unit 2722, and a processing unit 2726 coupled to touch-sensitive display unit 2720 and biometric reader unit 2722. In some embodiments, processing unit 2726 includes an external device detecting unit 2730, a data receiving unit 2732, an unlocking unit 2734, a display enabling unit 2736, an input detecting unit 2738, and an application launching unit 2740.

Processing unit 2726 is configured to: detect (e.g., with external device detecting unit 2730) an external device while electronic device 2700 is in a user-interface locked state, wherein the external device is executing a first application, the first application in a state; receive (e.g., with data receiving unit 2732) a biometric input from biometric reader unit 2722; in response to receiving the biometric input: unlock (e.g., with unlocking unit 2734) electronic device 2700; after unlocking, enable (e.g., with display enabling unit 2736) display of an affordance corresponding to the first application; detect (e.g., with input detecting unit 2738) a contact on the displayed affordance; and in response to detecting the contact, launch (e.g., with application launching unit 2740) a second application, the second application corresponding to the first application, wherein the state of the second application corresponds to the state of the first application.

In some embodiments, biometric reader unit 2722 is a fingerprint reader.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 2726 is further configured to: receive (e.g., with data receiving unit 2732), by electronic device 2700, application data of the first application; and enable (e.g., with display enabling unit 2736) display of the application data via the second application.

In some embodiments, the application data represents a portion of a message displayed by the first application, and processing unit 2726 is further configured to: enable (e.g., with display enabling unit 2736) display of the portion of the message in the second application.

In some embodiments, the application data represents a portion of a web-page, and processing unit 2726 is further configured to: enable (e.g., with display enabling unit 2736) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 2736) display of an affordance for invoking, wirelessly from the second application executing on electronic device 2700, an application feature of the first application executing on the external device.

In some embodiments, electronic device 2700 is a laptop or desktop computer.

In some embodiments, electronic device 2700 is a tablet computer.

In some embodiments, electronic device 2700 is a phone.

In some embodiments, the external device is a laptop or desktop computer.

In some embodiments, the external device is a tablet computer.

In some embodiments, the external device is a phone.

The operations described above with reference to FIG. 46 are, optionally, implemented by components depicted in FIGS. 1A-1B or FIG. 27. For example, external device detecting operation 4602, biometric input receiving operation 4604, and unlocking operation 4606 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 28:
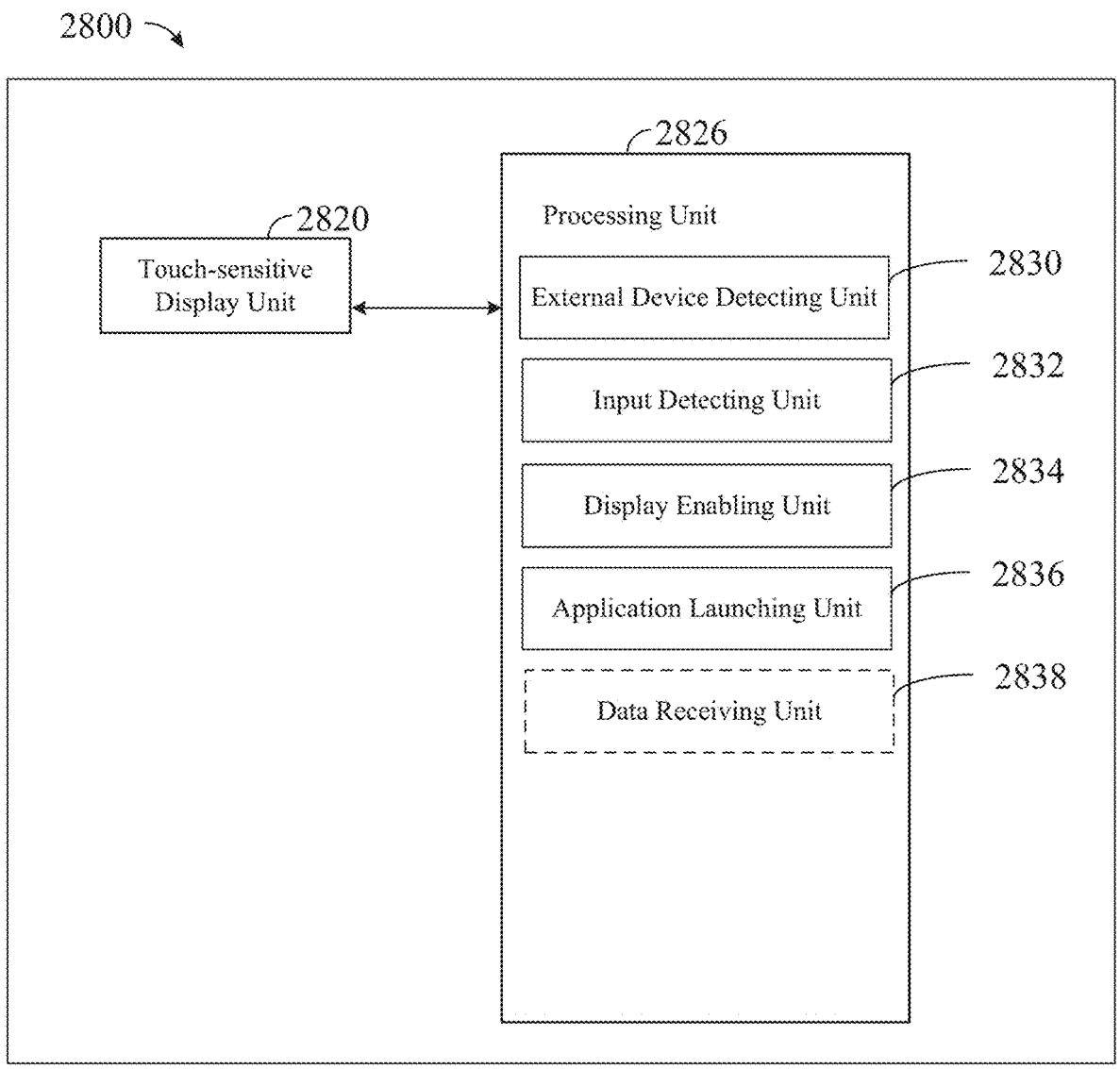
FIG. 28 is a functional block diagram of an electronic device configured to display a user interface in accordance with some embodiments.

In accordance with some embodiments, FIG. 28 shows an exemplary functional block diagram of an electronic device 2800 configured in accordance with the principles of the various described embodiments. In accordance with some embodiments, the functional blocks of electronic device 2800 are configured to perform the techniques described above. The functional blocks of the device 2800 are, optionally, implemented by hardware, software, or a combination of hardware and software to carry out the principles of the various described examples. It is understood by persons of skill in the art that the functional blocks described in FIG. 28 are, optionally, combined or separated into sub-blocks to implement the principles of the various described examples. Therefore, the description herein optionally supports any possible combination or separation or further definition of the functional blocks described herein.

As shown in FIG. 28, an electronic device 2800 includes a touch-sensitive display unit 2820 and a processing unit 2826 coupled to touch-sensitive display unit 2820. In some embodiments, processing unit 2826 includes an external device detecting unit 2830, a display enabling unit 2834, an input detecting unit 2832, and an application launching unit 2836. Optionally, processing unit 2826 also includes a data receiving unit 2838.

Processing unit 2826 is configured to: detect (e.g., with external device detecting unit 2830) an external device, wherein the external device is executing a first application, the first application in a state; enable (e.g., with display enabling unit 2834) display of a plurality of application icons on touch-sensitive display unit 2820; detect (e.g., with input detecting unit 2832) a rightward swipe on the touch-sensitive display unit, the rightward swipe from the left edge of touch-sensitive display unit 2820; in response to the rightward swipe: enable (e.g., with display enabling unit 2834) display of an affordance for launching a second application on electronic device 2800, the second application corresponding to the first application; detect (e.g., with input detecting unit 2832) a contact on the affordance; and in response to the contact on the affordance, launch (e.g., with application launching unit 2836) the second application on electronic device 2800, wherein the state of the second application corresponds to the state of the first application.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 2836 is further configured to: receive (e.g., with data receiving unit 2838), by electronic device 2800, application data of the first application; and enable (e.g., with display enabling unit 2834) display of the application data via the second application.

In some embodiments, the application data represents a portion of a message displayed by the first application, and processing unit 2826 is further configured to: enable (e.g., with display enabling unit 2834) display of the portion of the message in the second application.

In some embodiments, the application data represents a portion of a web-page, and processing unit 2826 is further configured to: enable (e.g., with display enabling unit 2834) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 2834) display of an affordance for invoking, wirelessly from the second application executing on electronic device 2800, an application feature of the first application executing on the external device.

In some embodiments, electronic device 2800 is a laptop or desktop computer.

In some embodiments, electronic device 2800 is a tablet computer.

In some embodiments, electronic device 2800 is a phone.

In some embodiments, the external device is a laptop or desktop computer.

In some embodiments, the external device is a tablet computer.

In some embodiments, the external device is a phone.

The operations described above with reference to FIG. 47 are, optionally, implemented by components depicted in FIGS. 1A-1B or FIG. 28. For example, external device detecting operation 4702, displaying operation 4704, and swipe detecting operation 4706 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 29:
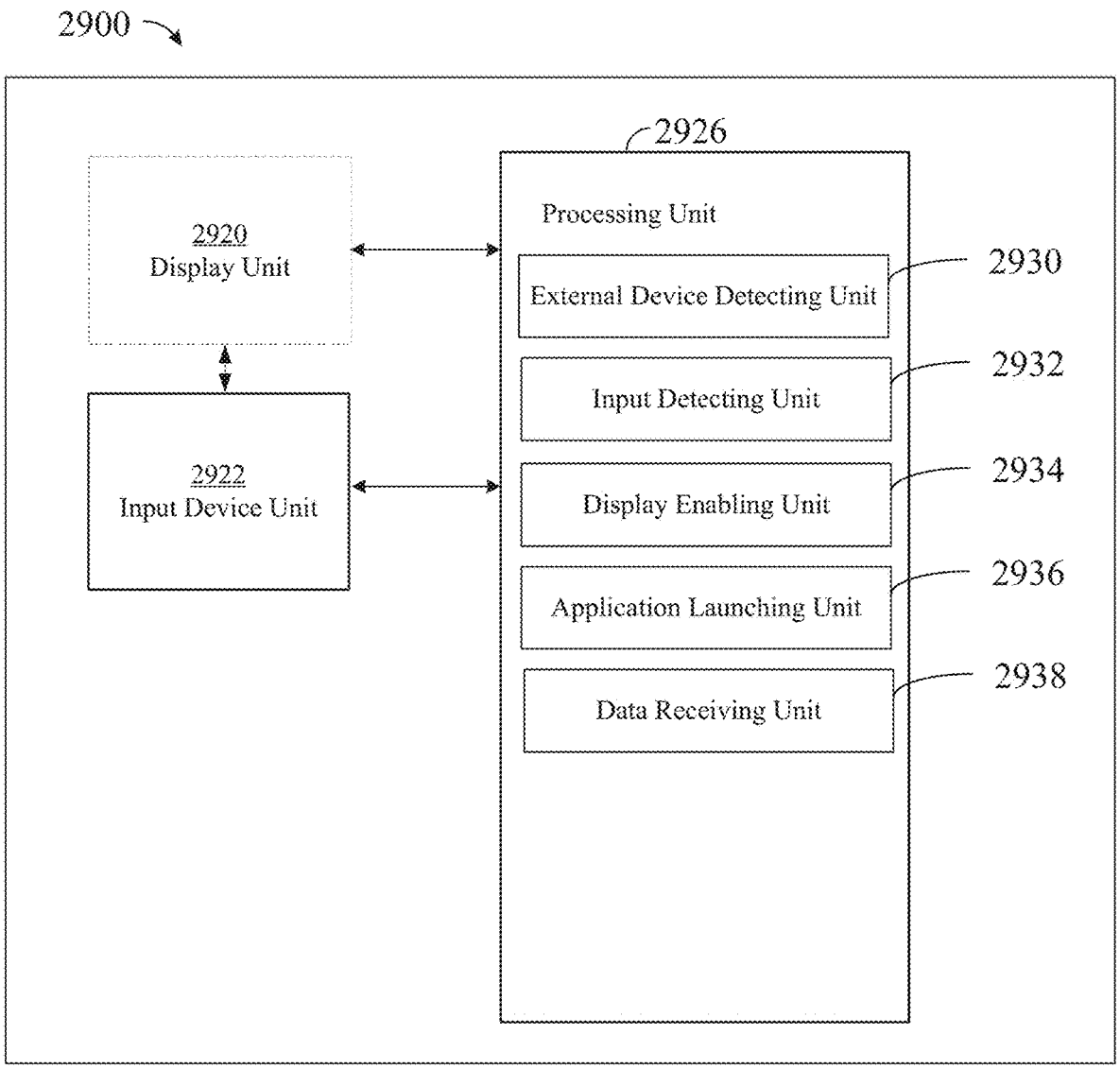
FIG. 29 is a functional block diagram of an electronic device configured to display a user interface in accordance with some embodiments.

In accordance with some embodiments, FIG. 29 shows an exemplary functional block diagram of an electronic device 2900 configured in accordance with the principles of the various described embodiments. In accordance with some embodiments, the functional blocks of electronic device 2900 are configured to perform the techniques described above. The functional blocks of the device 2900 are, optionally, implemented by hardware, software, or a combination of hardware and software to carry out the principles of the various described examples. It is understood by persons of skill in the art that the functional blocks described in FIG. 29 are, optionally, combined or separated into sub-blocks to implement the principles of the various described examples. Therefore, the description herein optionally supports any possible combination or separation or further definition of the functional blocks described herein.

As shown in FIG. 29, an electronic device 2900 includes optional display unit 2920, input device unit 2922 for providing user input, and a processing unit 2926 coupled to input device unit 2920, and optionally to display unit 2920. In some embodiments, processing unit 2926 includes an external device detecting unit 2930, a display enabling unit 2934, an input detecting unit 2932, an application launching unit 2936, and a data receiving unit 2938.

Processing unit 2926 is configured to: detect (e.g., with external device detecting unit 2930) an external device while electronic device 2900 is in a user-interface locked state, wherein the external device is executing a first application, the first application in a state; enable (e.g., with display enabling unit 2934) display of a password input field and an affordance corresponding to the first application (e.g., with display unit 2920); receive (e.g., with input detecting unit 2932 and/or input device unit 2922) a password; detect (e.g., with input detecting unit 2932) a mouse event on the displayed affordance; and in response to receiving the password and detecting the mouse event, launch (e.g., with application launching unit 2936) a second application, the second application corresponding to the first application, wherein the state of the second application corresponds to the state of the first application.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 2926 is further configured to: receive (e.g., with data receiving unit 2938) application data of the first application; and enable (e.g., with display enabling unit 2934) display of the application data via the second application (e.g., with display unit 2920).

In some embodiments, the application data represents a portion of a message displayed by the first application, and processing unit 2926 is further configured to: enable (e.g., with display enabling unit 2934) display of the portion of the message in the second application.

In some embodiments, the application data represents a portion of a web-page, and processing unit 2926 is further configured to: enable (e.g., with display enabling unit 2934) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 2934) display of an affordance for invoking, wirelessly from the second application executing on electronic device 2900, an application feature of the first application executing on the external device.

In some embodiments, electronic device 2900 is a laptop or desktop computer.

In some embodiments, electronic device 2900 is a tablet computer.

In some embodiments, electronic device 2900 is a phone.

In some embodiments, the external device is a laptop or desktop computer.

In some embodiments, the external device is a tablet computer.

In some embodiments, the external device is a phone.

The operations described above with reference to FIG. 48 are, optionally, implemented by components depicted in FIGS. 1A-1B or FIG. 29. For example, external device detecting operation 4802, displaying operation 4804, and password receiving operation 4806 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 30:
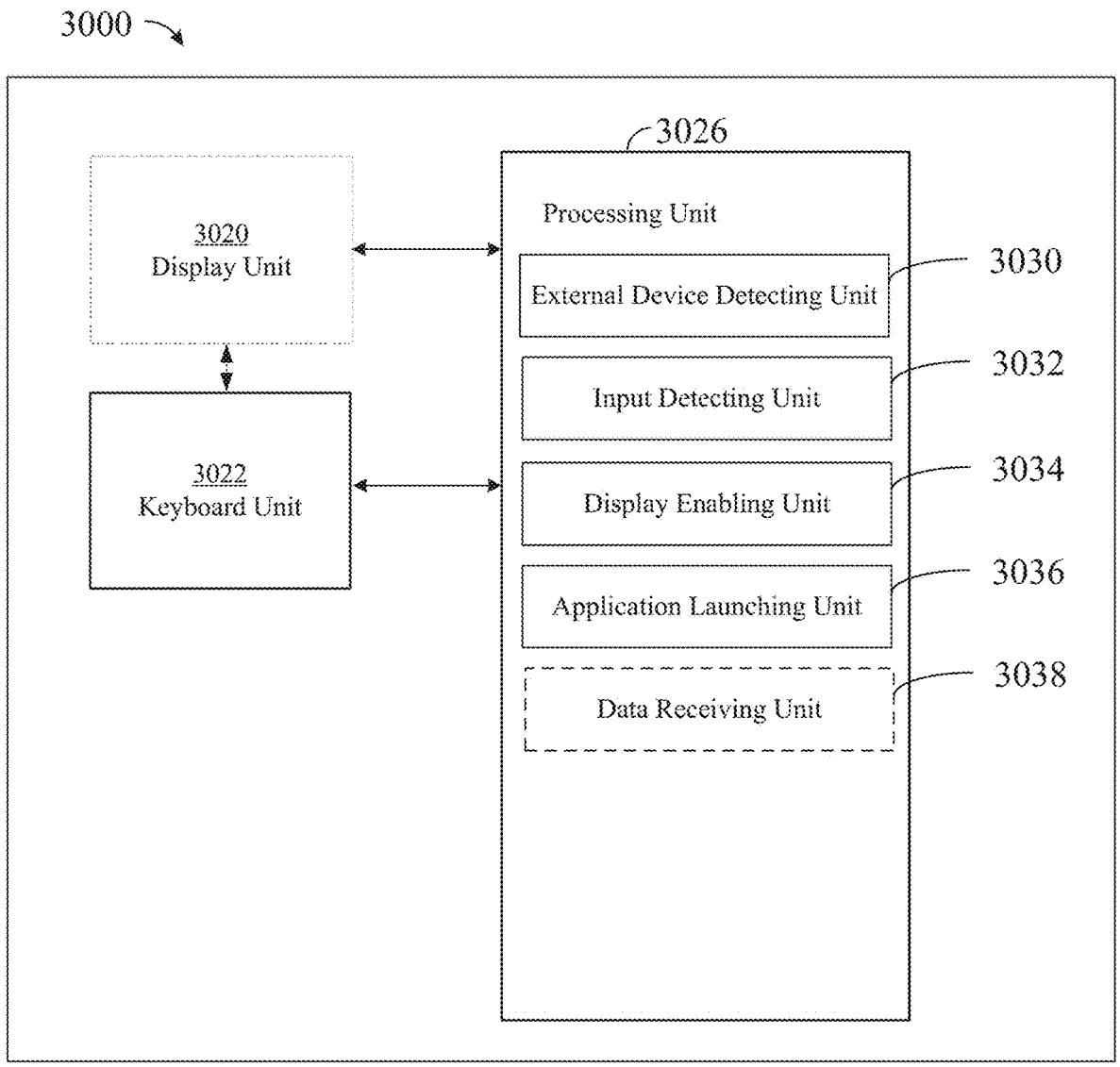
FIG. 30 is a functional block diagram of an electronic device configured to display a user interface in accordance with some embodiments.

In accordance with some embodiments, FIG. 30 shows an exemplary functional block diagram of an electronic device 3000 configured in accordance with the principles of the various described embodiments. In accordance with some embodiments, the functional blocks of electronic device 3000 are configured to perform the techniques described above. The functional blocks of the device 3000 are, optionally, implemented by hardware, software, or a combination of hardware and software to carry out the principles of the various described examples. It is understood by persons of skill in the art that the functional blocks described in FIG. 30 are, optionally, combined or separated into sub-blocks to implement the principles of the various described examples. Therefore, the description herein optionally supports any possible combination or separation or further definition of the functional blocks described herein.

As shown in FIG. 30, an electronic device 3000 includes optional display unit 3020, a keyboard unit 3022, and a processing unit 3026 coupled to keyboard unit 3020 and optionally to display unit 3020. In some embodiments, processing unit 3026 includes an external device detecting unit 3030, a display enabling unit 3034, an input detecting unit 3032, and an application launching unit 3036. Optionally, processing unit 3026 also includes a data receiving unit 3038.

Processing unit 3026 is configured to: detect (e.g., with external device detecting unit 3030) an external device, wherein the external device is executing a first application, the first application in a state; detect (e.g., with input detecting unit 3032) a key press of a first key of keyboard unit 3022 simultaneously with a key press of a second key of the keyboard unit; in response to the simultaneous key presses: enable (e.g., with display enabling unit 3034) display of a plurality of affordances (e.g., with display unit 3020) comprising: affordances identifying a plurality of active applications on electronic device 3000, and an affordance for launching the second application corresponding to the first application; detect (e.g., with input detecting unit 3032) a sequence of keyboard input including (i) at least one additional key press of the second key (ii) while holding the first key (iii) followed by a release of both the first key and the second key; in response to sequence of keyboard input, launch (e.g., with application launching unit 3036) the second application, wherein the state of the second application corresponds to the state of the first application.

In some embodiments, enabling display of the plurality of affordances includes visually highlighting (e.g., with display enabling unit 3034) one of the affordances, and processing unit 3026 is further configured to: while detecting the sequence of keyboard input, highlight (e.g., with display enabling unit 3034) a different affordance of the plurality of affordances in response to a key press of the second key while the first key is held.

In some embodiments, processing unit 3026 is further configured to: launch (e.g., with application launching unit 3036) the second application in response to the sequence of keyboard input only if the affordance for launching the second application is highlighted when the first key and the second key are released.

In some embodiments, the first key is a control key and the second key is the tab key.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 3026 is further configured to: receive (e.g., with data receiving unit 3038), by electronic device 3000, application data of the first application; and enable (e.g., with display enabling unit 3034) display of the application data via the second application.

In some embodiments, the application data represents a portion of a message displayed by the first application, and processing unit 3026 is further configured to: enable (e.g., with display enabling unit 3034) display of the portion of the message in the second application.

In some embodiments, the application data represents a portion of a web-page, and processing unit 3026 is further configured to: enable (e.g., with display enabling unit 3034) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 3034) display of an affordance for invoking, wirelessly from the second application executing on electronic device 3000, an application feature of the first application executing on the external device.

In some embodiments, electronic device 3000 is a laptop or desktop computer.

In some embodiments, electronic device 3000 is a tablet computer.

In some embodiments, electronic device 3000 is a phone.

In some embodiments, the external device is a laptop or desktop computer.

In some embodiments, the external device is a tablet computer.

In some embodiments, the external device is a phone.

The operations described above with reference to FIG. 49 are, optionally, implemented by components depicted in FIGS. 1A-1B or FIG. 30. For example, external device detecting operation 4902, key press detecting operation 4904, and displaying operation 4906 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 31:
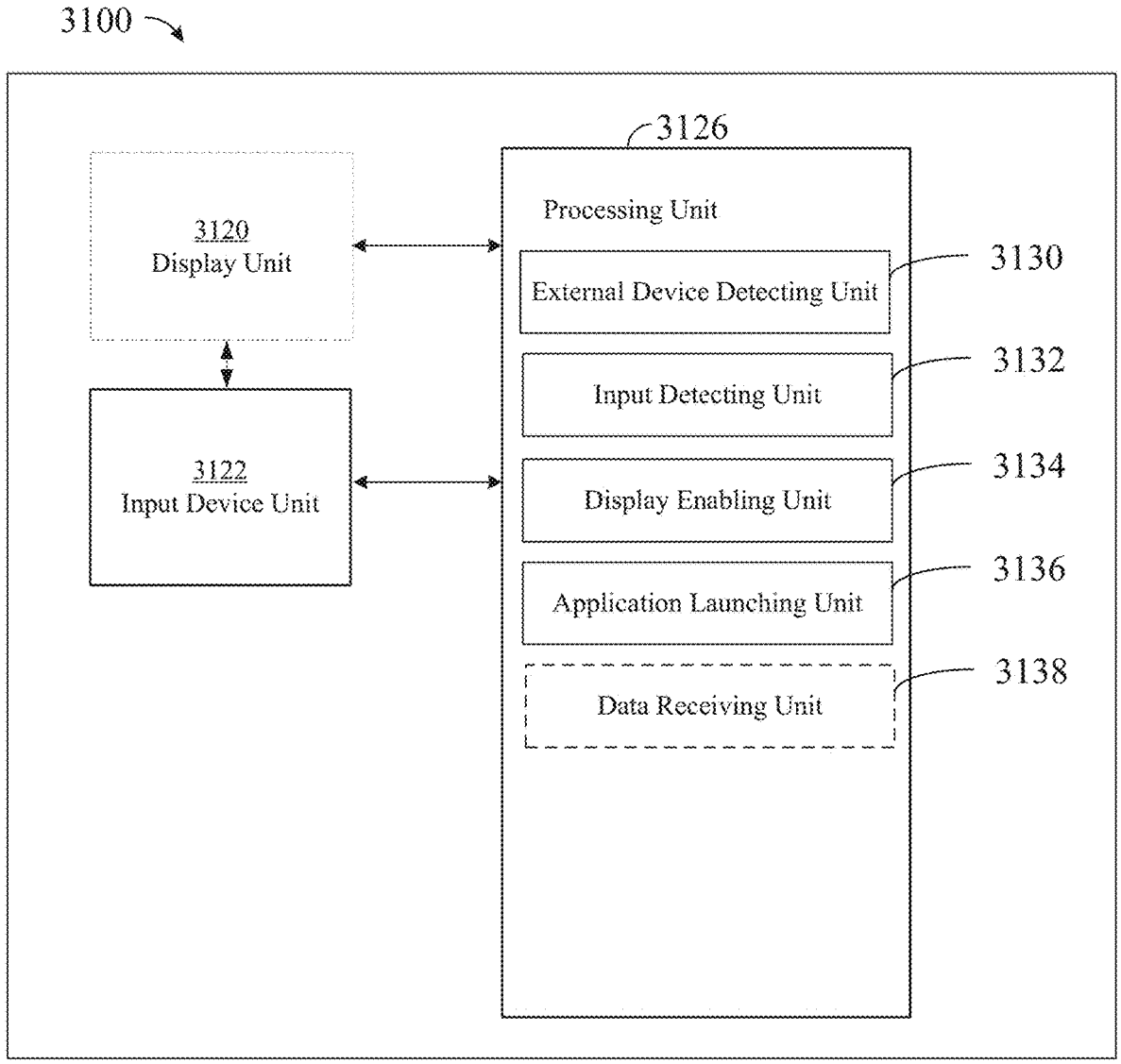
FIG. 31 is a functional block diagram of an electronic device configured to display a user interface in accordance with some embodiments.

In accordance with some embodiments, FIG. 31 shows an exemplary functional block diagram of an electronic device 3100 configured in accordance with the principles of the various described embodiments. In accordance with some embodiments, the functional blocks of electronic device 3100 are configured to perform the techniques described above. The functional blocks of the device 3100 are, optionally, implemented by hardware, software, or a combination of hardware and software to carry out the principles of the various described examples. It is understood by persons of skill in the art that the functional blocks described in FIG. 31 are, optionally, combined or separated into sub-blocks to implement the principles of the various described examples. Therefore, the description herein optionally supports any possible combination or separation or further definition of the functional blocks described herein.

As shown in FIG. 31, an electronic device 3100 includes optional display unit 3120, input device unit 3122 for providing user interface input, and a processing unit 3126 coupled to input device unit 3122 and optionally to display unit 3120. In some embodiments, processing unit 3126 includes an external device detecting unit 3130, a display enabling unit 3134, an input detecting unit 3132, and an application launching unit 3136. Optionally, processing unit 3126 also includes a data receiving unit 3138.

Processing unit 3126 is configured to: detect (e.g., with external device detecting unit 3130) an external device, wherein the external device is executing a first application, the first application in a state; detect (e.g., with input detecting unit 3132) a movement of the cursor (e.g., with input device unit 3122) to a corner of a screen (e.g., display unit 3120) of electronic device 3100; in response to detecting the movement of the cursor: enable (e.g., with display enabling unit 3134) display of a plurality of affordances comprising: affordances identifying a plurality of active applications on electronic device 3100, and an affordance for launching the second application corresponding to the first application; detect (e.g., with input detecting unit 3132) a sequence of input including (i) movement of the cursor onto the affordance for launching the second application and (ii) a mouse-event on the affordance; and in response to detecting the sequence of input, launch (e.g., with application launching unit 3136) the second application, wherein the state of the second application corresponds to the state of the first application.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 3126 is further configured to: receive (e.g., with data receiving unit 3138), by electronic device 3100, application data of the first application; and enable (e.g., with display enabling unit 3134) display of the application data via the second application.

In some embodiments, the application data represents a portion of a message displayed by the first application, and processing unit 3126 is further configured to: enable (e.g., with display enabling unit 3134) display of the portion of the message in the second application.

In some embodiments, the application data represents a portion of a web-page, and processing unit 3126 is further configured to: enable (e.g., with display enabling unit 3134) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 3134) display of an affordance for invoking, wirelessly from the second application executing on electronic device 3100, an application feature of the first application executing on the external device.

In some embodiments, electronic device 3100 is a laptop or desktop computer.

In some embodiments, electronic device 3100 is a tablet computer.

In some embodiments, electronic device 3100 is a phone.

In some embodiments, the external device is a laptop or desktop computer.

In some embodiments, the external device is a tablet computer.

In some embodiments, the external device is a phone.

The operations described above with reference to FIG. 50 are, optionally, implemented by components depicted in FIGS. 1A-1B or FIG. 31. For example, external device detecting operation 5002, movement detecting operation 5004, and displaying operation 5006 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 32:
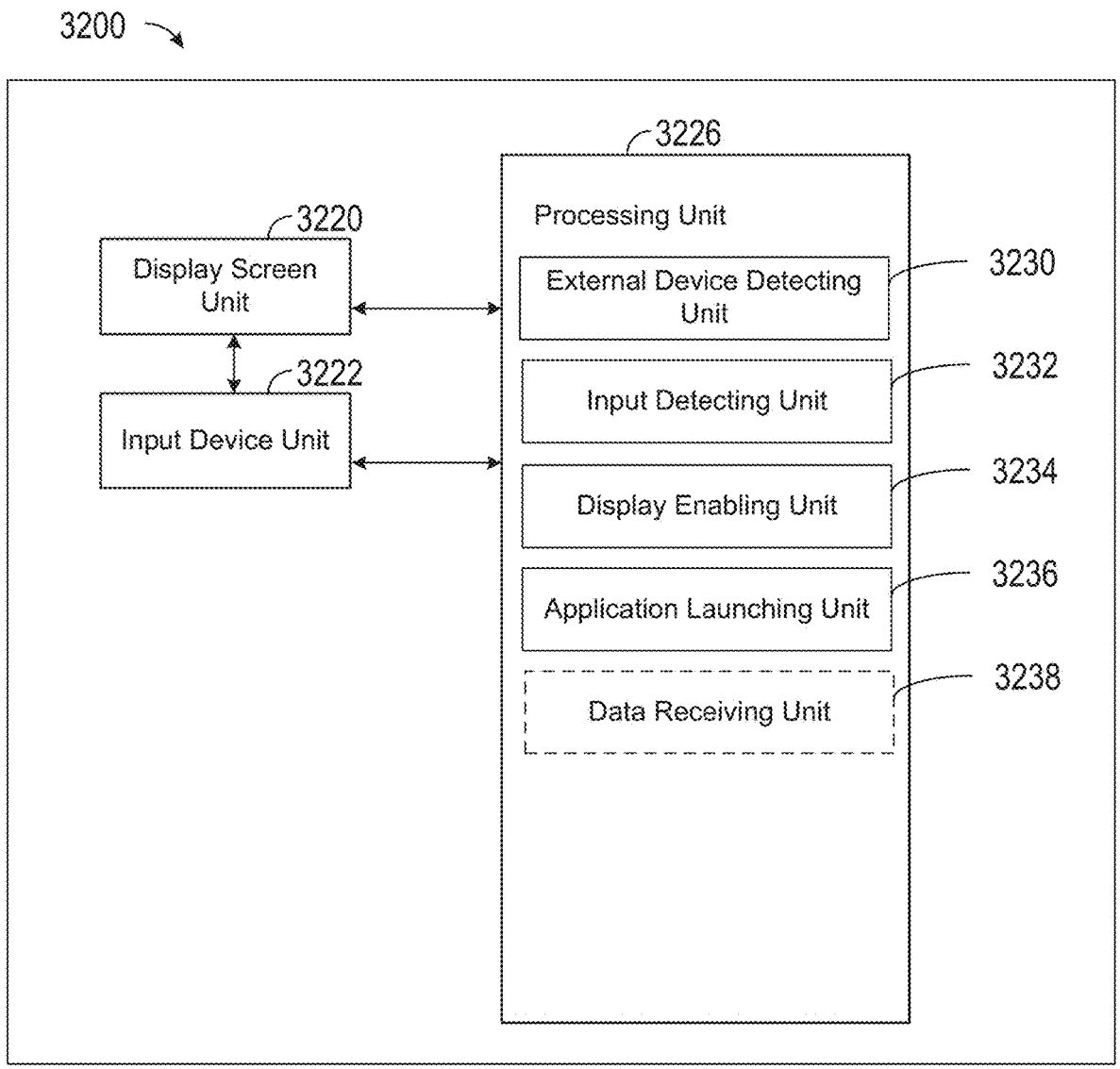
FIG. 32 is a functional block diagram of an electronic device configured to display a user interface in accordance with some embodiments.

In accordance with some embodiments, FIG. 32 shows an exemplary functional block diagram of an electronic device 3200 configured in accordance with the principles of the various described embodiments. In accordance with some embodiments, the functional blocks of electronic device 3200 are configured to perform the techniques described above. The functional blocks of the device 3200 are, optionally, implemented by hardware, software, or a combination of hardware and software to carry out the principles of the various described examples. It is understood by persons of skill in the art that the functional blocks described in FIG. 32 are, optionally, combined or separated into sub-blocks to implement the principles of the various described examples. Therefore, the description herein optionally supports any possible combination or separation or further definition of the functional blocks described herein.

As shown in FIG. 32, an electronic device 3200 includes a display screen unit 3220, an input device unit 3222 for controlling a user interface cursor, and a processing unit 3226 coupled to display screen unit 3220 and input device unit 3222. In some embodiments, processing unit 3226 includes an external device detecting unit 3230, a display enabling unit 3234, an input detecting unit 3232, and an application launching unit 3236. Optionally, processing unit 3226 also includes a data receiving unit 3238.

Processing unit 3226 is configured to: detect (e.g., with external device detecting unit 3230) an external device, wherein the external device is executing a first application, the first application in a state; enable (e.g., with display enabling unit 3234) display, in a portion of display screen unit 3220, of a plurality of application icons for launching a plurality of applications on electronic device 3200; enable (e.g., with display enabling unit 3234) display, in the portion of display screen unit 3220, of an icon for launching a second application corresponding to the first application; detect (e.g., with input detecting unit 3232) movement of the cursor onto the displayed icon and a mouse-event on the displayed icon; and in response: launch (e.g., with application launching unit 3236) the second application, wherein the state of the second application corresponds to the state of the first application.

In some embodiments, the plurality of application icons and the icon for launching the second application are arranged horizontally across the portion of display screen unit 3220.

In some embodiments, the affordance for launching the second application corresponding to the first application is the left-most affordance of the dock.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 3226 is further configured to: receive (e.g., with data receiving unit 3238), by electronic device 3200, application data of the first application; and enable (e.g., with display enabling unit 3234) display of the application data via the second application.

In some embodiments, the application data represents a portion of a message displayed by the first application, and processing unit 3226 is further configured to: enable (e.g., with display enabling unit 3234) display of the portion of the message in the second application.

In some embodiments, the application data represents a portion of a web-page, and processing unit 3226 is further configured to: enable (e.g., with display enabling unit 3234) display of the portion of the web-page via the second application.

In some embodiments, at least one application feature is accessible only from one of the first application and the second application.

In some embodiments, the first application performs at least one application feature, and launching the second application comprises: enabling (display enabling unit 3234) display of an affordance for invoking, wirelessly from the second application executing on electronic device 3200, an application feature of the first application executing on the external device.

In some embodiments, electronic device 3200 is a laptop or desktop computer.

In some embodiments, electronic device 3200 is a tablet computer.

In some embodiments, electronic device 3200 is a phone.

In some embodiments, the external device is a laptop or desktop computer.

In some embodiments, the external device is a tablet computer.

In some embodiments, the external device is a phone.

The operations described above with reference to FIG. 51 are, optionally, implemented by components depicted in FIGS. 1A-1B or FIG. 32. For example, external device detecting operation 5102 and displaying operation 5104 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 33:
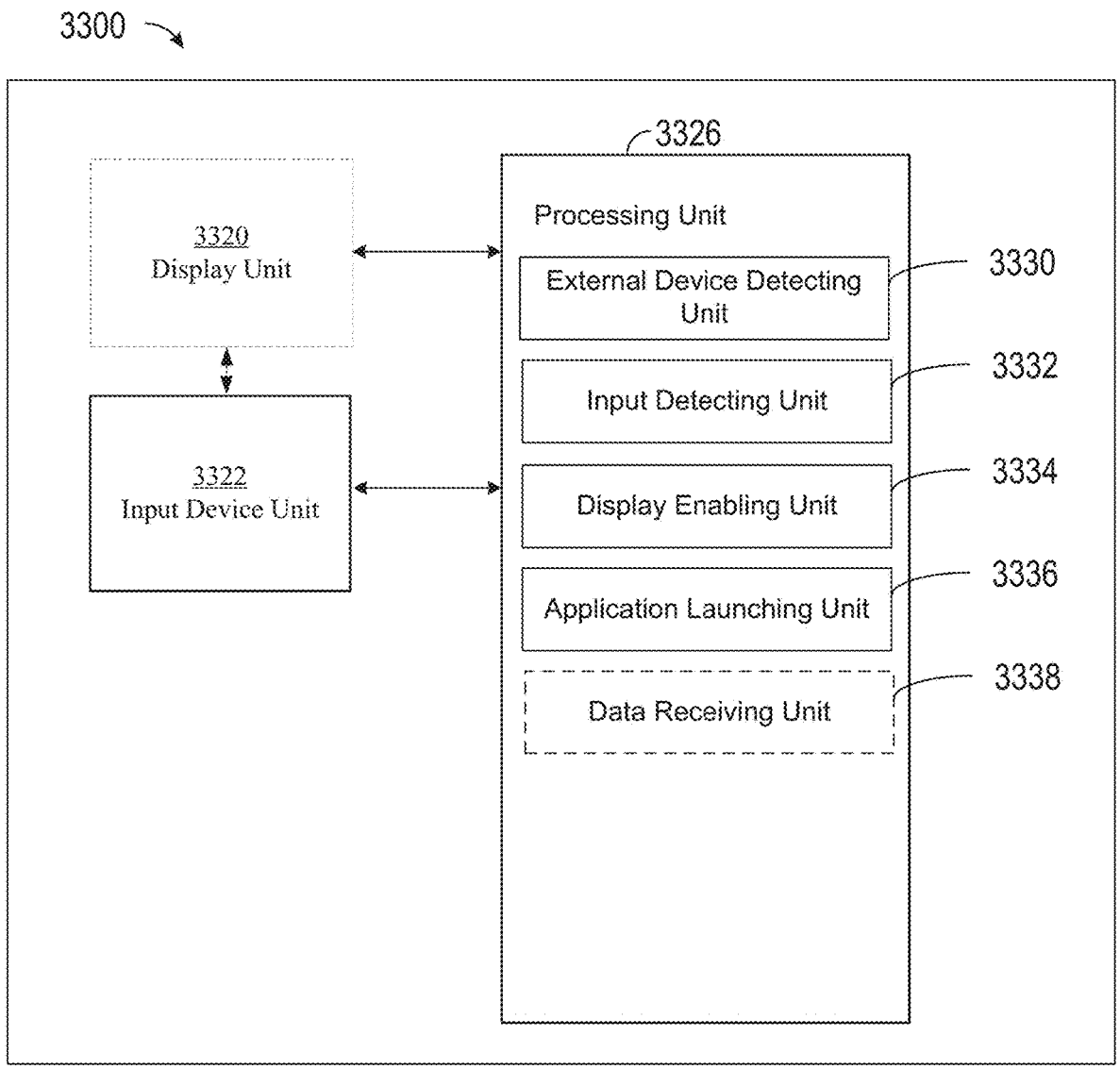
FIG. 33 is a functional block diagram of an electronic device configured to display a user interface in accordance with some embodiments.

In accordance with some embodiments, FIG. 33 shows an exemplary functional block diagram of an electronic device 3300 configured in accordance with the principles of the various described embodiments. In accordance with some embodiments, the functional blocks of electronic device 3300 are configured to perform the techniques described above. The functional blocks of the device 3300 are, optionally, implemented by hardware, software, or a combination of hardware and software to carry out the principles of the various described examples. It is understood by persons of skill in the art that the functional blocks described in FIG. 33 are, optionally, combined or separated into sub-blocks to implement the principles of the various described examples. Therefore, the description herein optionally supports any possible combination or separation or further definition of the functional blocks described herein.

As shown in FIG. 33, an electronic device 3300 includes optional display unit 3320, input device unit 3322 for controlling a user interface cursor, and a processing unit 3326 coupled to input device unit 3322 and optionally to display unit 3320. In some embodiments, processing unit 3326 includes an external device detecting unit 3330, a display enabling unit 3334, an input detecting unit 3332, and an application launching unit 3336. Optionally, processing unit 3326 also includes a data receiving unit 3338.

Processing unit 3326 is configured to: detect (e.g., with external device detecting unit 3330) an external device, the external device executing a first application, the first application in a state; enable (e.g., with display enabling unit 3334) display of a menu bar (e.g., with display unit 3320), the menu bar comprising an icon for launching a second application corresponding to the first application; detect (e.g., with input detecting unit 3332) movement of the cursor (e.g., with input device unit 3322) onto the displayed icon and a mouse-event on the displayed icon; and in response: launch (e.g., with application launching unit 3336) the second application, wherein the state of the second application corresponds to the state of the first application.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 3326 is further configured to: receive (e.g., with data receiving unit 3338), by electronic device 3300, application data of the first application; and enable (e.g., with display enabling unit 3334) display of the application data via the second application.

In some embodiments, the application data represents a portion of a message displayed by the first application, and processing unit 3326 is further configured to: enable (e.g., with display enabling unit 3334) display of the portion of the message in the second application.

In some embodiments, the application data represents a portion of a web-page, and processing unit 3326 is further configured to: enable (e.g., with display enabling unit 3334) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 3334) display of an affordance for invoking, wirelessly from the second application executing on electronic device 3300, an application feature of the first application executing on the external device.

In some embodiments, electronic device 3300 is a laptop or desktop computer.

In some embodiments, electronic device 3300 is a tablet computer.

In some embodiments, electronic device 3300 is a phone.

In some embodiments, the external device is a laptop or desktop computer.

In some embodiments, the external device is a tablet computer.

In some embodiments, the external device is a phone.

The operations described above with reference to FIG. 52 are, optionally, implemented by components depicted in FIGS. 1A-1B or FIG. 33. For example, external device detecting operation 5202, displaying operation 5204, and movement detecting operation 5206 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 34:
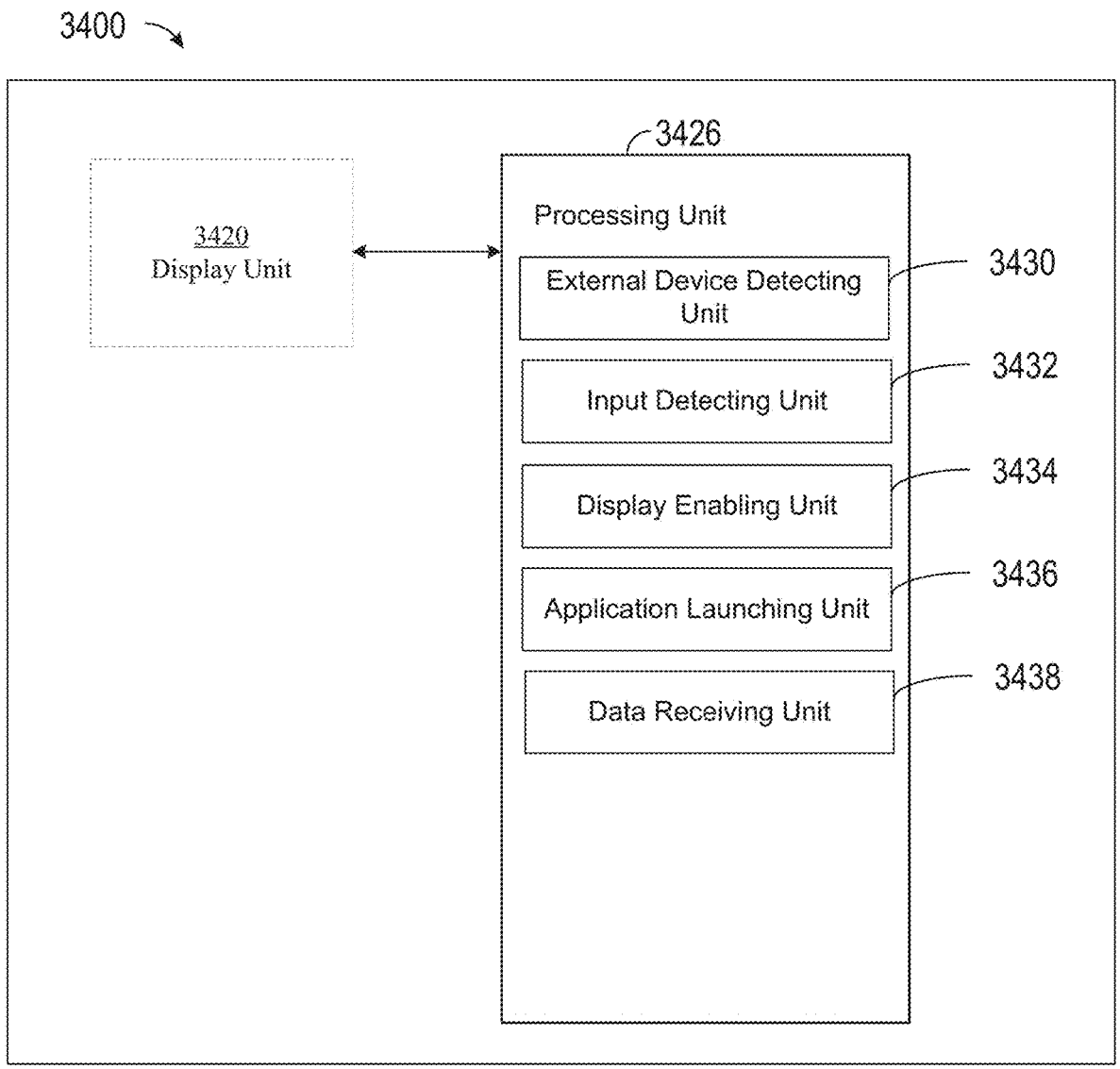
FIG. 34 is a functional block diagram of an electronic device configured to display a user interface in accordance with some embodiments.

In accordance with some embodiments, FIG. 34 shows an exemplary functional block diagram of an electronic device 3400 configured in accordance with the principles of the various described embodiments. In accordance with some embodiments, the functional blocks of electronic device 3400 are configured to perform the techniques described above. The functional blocks of the device 3400 are, optionally, implemented by hardware, software, or a combination of hardware and software to carry out the principles of the various described examples. It is understood by persons of skill in the art that the functional blocks described in FIG. 34 are, optionally, combined or separated into sub-blocks to implement the principles of the various described examples. Therefore, the description herein optionally supports any possible combination or separation or further definition of the functional blocks described herein.

As shown in FIG. 34, an electronic device 3400 includes processing unit 3426 optionally coupled to display unit 3420. In some embodiments, processing unit 3426 includes an external device detecting unit 3430, a display enabling unit 3434, an input detecting unit 3432, an application launching unit 3436, and a data receiving unit 3438.

Processing unit 3426 is configured to: detect (e.g., with external device detecting unit 3430), via a first communication protocol, an external device, wherein the external device is executing or has executed a first application; receive (e.g., with data receiving unit), from the external device, usage information indicating usage of the first application on the external device; in response to detecting the external device and receiving the usage information, enable (e.g., with display enabling unit 3434) display of an affordance on a screen (e.g., display unit 3420) of electronic device 3400; receive (e.g., with data receiving unit), via a second communication protocol, application data of the first application from the external device, the second communication protocol different from the first communication protocol; detect (e.g., with input detecting unit 3432) a user selection of the displayed affordance; and in response to receiving the input data: launch (e.g., with application launching unit 3436) a second application on electronic device 3400, the second application corresponding to the first application; and enable (e.g., with display enabling unit 3434) display of the application data in the second application.

In some embodiments, the first communication protocol and the second communication protocol are different wireless protocols, and the second wireless communication protocol has a greater data transfer capacity than the first communication protocol.

In some embodiments, detecting the external device via the first communication protocol comprises: detecting (e.g., with input detecting unit 3432), via a peer-to-peer wireless communication protocol, the external device.

In some embodiments, detecting the external device via a first communication protocol comprises: detecting (e.g., with input detecting unit 3432), via a Bluetooth low energy (BTLE) wireless communication protocol, the external device.

In some embodiments, receiving the application data via a second communication protocol comprises: receiving (e.g., with data receiving unit 3438), via WiFi, the application data associated with the first application.

In some embodiments, the usage information includes identification data based on an e-mail address, and processing unit 3426 is further configured to: enable (e.g., with display enabling unit 3434) display of the affordance only if electronic device 3400 is associated with the same e-mail address.

The operations described above with reference to FIG. 10 are, optionally, implemented by components depicted in FIGS. 1A-1B or FIG. 34. For example, detecting operation 1002, receiving operation and displaying operation 1008 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 35:
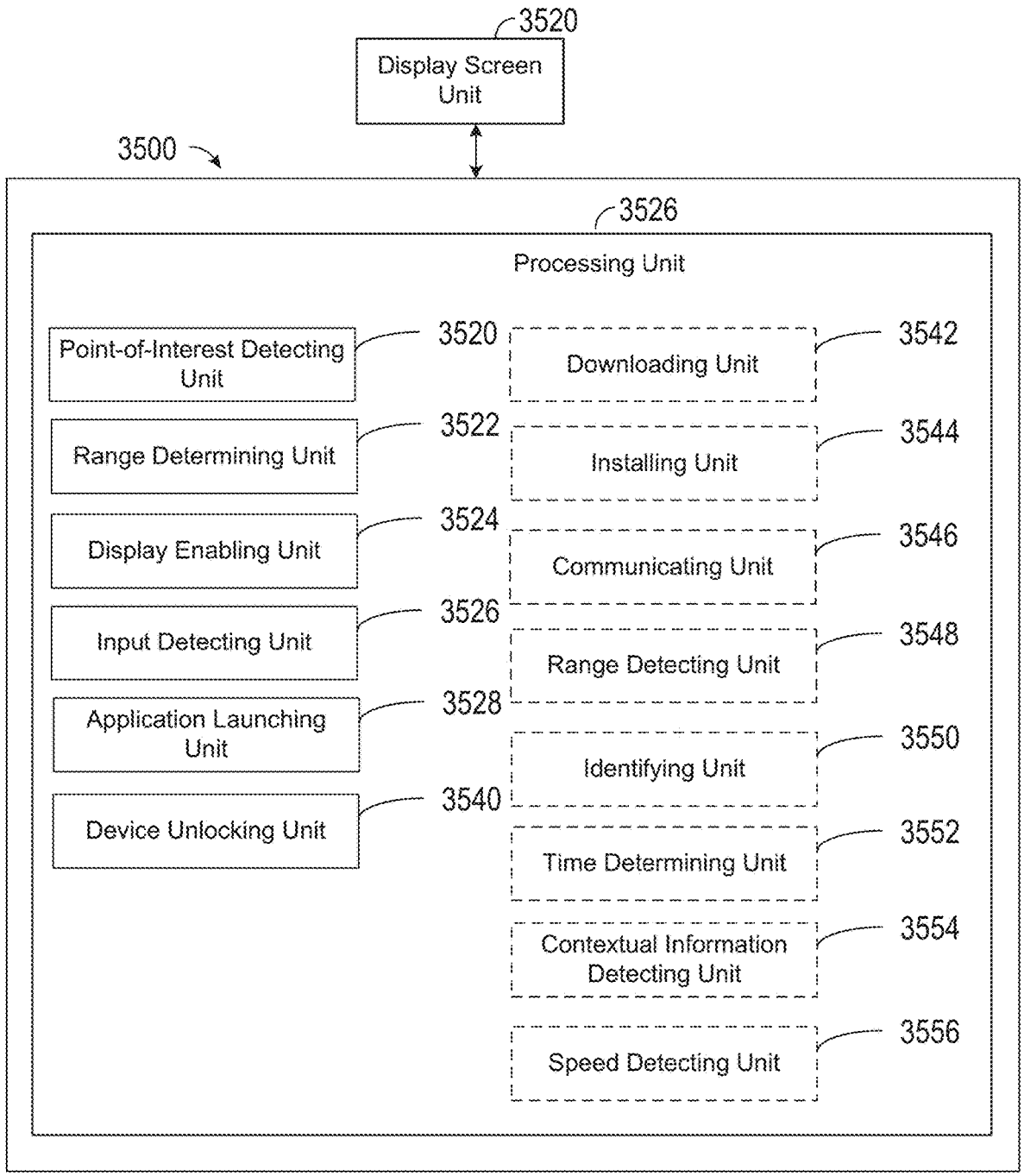
FIG. 35 is a functional block diagram of an electronic device configured to display a user interface in accordance with some embodiments.

In accordance with some embodiments, FIG. 35 shows an exemplary functional block diagram of an electronic device 3500 configured in accordance with the principles of the various described embodiments. In accordance with some embodiments, the functional blocks of electronic device 3500 are configured to perform the techniques described above. The functional blocks of the device 3500 are, optionally, implemented by hardware, software, or a combination of hardware and software to carry out the principles of the various described examples. It is understood by persons of skill in the art that the functional blocks described in FIG. 35 are, optionally, combined or separated into sub-blocks to implement the principles of the various described examples. Therefore, the description herein optionally supports any possible combination or separation or further definition of the functional blocks described herein.

As shown in FIG. 35, an electronic device 3500 includes a display screen unit 3520 and a processing unit 3526 coupled to display screen unit 3520. In some embodiments, processing unit 3526 includes a point-of-interest detecting unit 3530, a range determining unit 3532, a display enabling unit 3534, an input detecting unit 3536, an application launching unit 3638, and a device unlocking unit 3540. Optionally, processing unit 3526 also includes a downloading unit 3542, an installing unit 3544, a communicating unit 3546, a range detecting unit 3548, an identifying unit 3550, a time determining unit 3552, a contextual information detecting unit 3554, and a speed detecting unit 3556.

Processing unit 3526 is configured to: detect (e.g., with point-of-interest detecting unit 3530) a point-of-interest while electronic device 3500 is in a user-interface locked state; determine (e.g., with range determining unit 3532) whether the point-of-interest is within a threshold range; in accordance with the determination that the proximity is within the threshold range, enable (e.g., with display enabling unit 3534) display of an affordance on a screen of electronic device 3500; detect (e.g., with input detecting unit 3536) user selection of the displayed affordance; and in response to detecting the user selection, unlock (e.g., with device unlocking unit 3540) electronic device 3500 and launch (e.g., with application launching unit 3538) an application on electronic device 3500 associated with the point-of-interest.

In some embodiments, the point-of-interest is a landmark; and launching the application comprises: enabling (e.g., with display enabling unit 3534) display of information identifying the landmark on display screen unit 3520 of electronic device 3500.

In some embodiments, the point-of-interest is a landmark; and launching the application comprises: enabling (e.g., with display enabling unit 3534) display of an installation affordance for installing an application associated with the landmark; in response to a user selection of the installation affordance: downloading (e.g., with downloading unit 3542) the application; installing (e.g., with installing unit 3544) the application; and launching (e.g., with application launching unit 3538) the application.

In some embodiments, the point-of-interest is a landmark; and launching the application comprises: launching (e.g., with application launching unit 3538) a web browser and enabling (e.g., with display enabling unit 3534) display of a web-page for accessing an application associated with the landmark.

In some embodiments, determining whether the point-of-interest is within a threshold range comprises: communicating (e.g., with communicating unit 3546), by electronic device 3500 with an external device representing the point-of-interest, over a peer-to-peer wireless communication protocol.

In some embodiments, determining whether the point-of-interest is within a threshold range comprises: communicating (e.g., with communicating unit 3546), by electronic device 3500 with an external device representing the point-of-interest, over a Bluetooth low energy (BTLE) wireless communication protocol.

In some embodiments, determining whether the point-of-interest is within a threshold range comprises: communicating (e.g., with communicating unit 3546), by electronic device 3500 with the external device representing the point-of-interest, over a WiFi wireless communication protocol.

In some embodiments, determining whether the point-of-interest is within a threshold range comprises: detecting (e.g., with range detecting unit 3548), using a location sensor, that electronic device 3500 is within a designated range of the landmark.

In some embodiments, enabling display of the affordance on display screen unit 3520 of electronic device 3500 further comprises: identifying (e.g., identifying unit 3550) a target application that is frequently launched on electronic device 3500 while electronic device 3500 is within the threshold range of the point-of-interest; and enabling (e.g., with display enabling unit 3534) display of an affordance for launching the target application.

In some embodiments, enabling display of the affordance on the screen of electronic device 3500 further comprises: determining (e.g., with time determining unit 3552) a current time; and identifying (e.g., with identifying unit 3550) a target application that is frequently used on electronic device 3500 while electronic device 3500 is within the threshold range of the point-of-interest at the current time; and enabling (e.g., with display enabling unit 3534) display of an affordance for launching the target application.

In some embodiments, processing unit 3526 is further configured to: detect (e.g., with contextual information detecting unit 3554) contextual information regarding electronic device 3500, and enabling display of the affordance on the screen of electronic device 3500 further comprises: identifying (e.g., with identifying unit 3550) a target application based on the contextual information; and enabling (e.g., with display enabling unit 3534) display of an affordance for launching the target application.

In some embodiments, detecting contextual information comprises detecting (e.g., with speed detecting unit 3556) a speed of movement of electronic device 3500, and enabling display of the affordance on the screen of electronic device 3500 further comprises: identifying (e.g., with identifying unit 3550) a target application based on the detected speed; and enabling (e.g., with display enabling unit 3534) display of an affordance for launching the target application.

The operations described above with reference to FIG. 11 are, optionally, implemented by components depicted in FIGS. 1A-1B or FIG. 35. For example, proximity detecting operation 1102, proximity determining operation 1104, and displaying operation 1106 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 36:
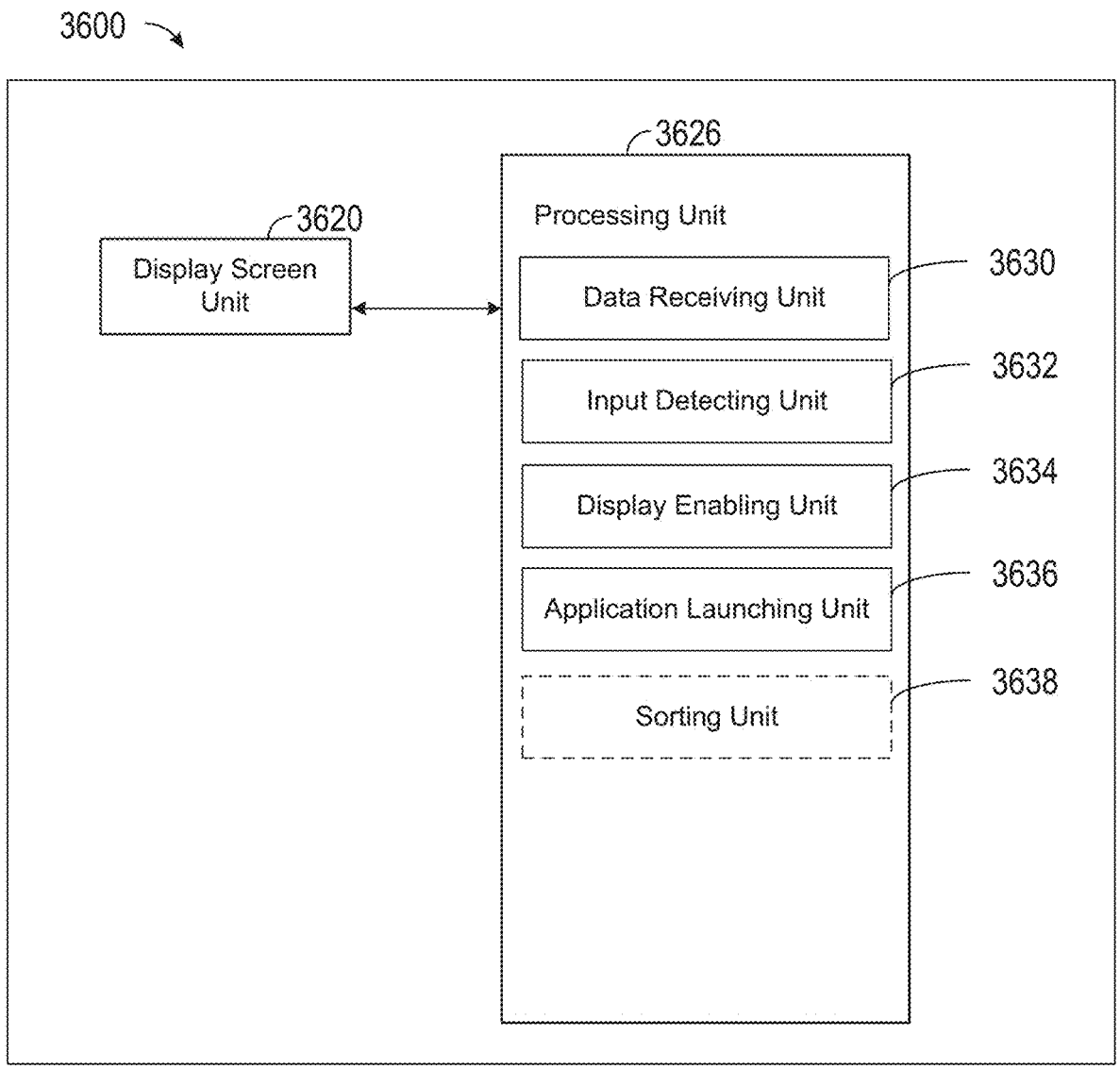
FIG. 36 is a functional block diagram of an electronic device configured to display a user interface in accordance with some embodiments.

In accordance with some embodiments, FIG. 36 shows an exemplary functional block diagram of an electronic device 3600 configured in accordance with the principles of the various described embodiments. In accordance with some embodiments, the functional blocks of electronic device 3600 are configured to perform the techniques described above. The functional blocks of the device 3600 are, optionally, implemented by hardware, software, or a combination of hardware and software to carry out the principles of the various described examples. It is understood by persons of skill in the art that the functional blocks described in FIG. 36 are, optionally, combined or separated into sub-blocks to implement the principles of the various described examples. Therefore, the description herein optionally supports any possible combination or separation or further definition of the functional blocks described herein.

As shown in FIG. 36, an electronic device 3600 includes a display screen unit 3620 and a processing unit 3626 coupled to display screen unit 3620. In some embodiments, processing unit 3626 includes a data receiving unit 3630, a display enabling unit 3634, an input detecting unit 3632, and an application launching unit 3636. Optionally, processing unit 3626 also includes a sorting unit 3638.

Processing unit 3626 is configured to: receive (e.g., with data receiving unit 3630), from a first external device, first data representing a first plurality of applications that are executing and/or has executed on the first external device; based on the received first data: enable (e.g., with display enabling unit 3634) display of a first plurality of affordances representing the first plurality of applications, the plurality of affordances including a first affordance corresponding to a first application of the first external device; detect (e.g., with input detecting unit 3632) user selection of the first affordance; and in response to detecting user selection of the first affordance, launch (e.g., with application launching unit 3636) a first local application on electronic device 3600, wherein the first local application is a version of the first application.

In some embodiments, processing unit 3620 is further configured to: receive (e.g., with data receiving unit 3630), from a second external device, second data representing a second plurality of applications that are executing and/or has executed on the second external device; enable (e.g., with display enabling unit 3634) display of a second plurality of affordances representing the second plurality of applications, including a second affordance corresponding to a second application of the second external device; detect (e.g., with input detecting unit 3632) user selection of the second affordance, and in response, launch (e.g., with application launching unit 3636) a second local application on electronic device 3600, wherein the second local application is a version of the second application.

In some embodiments, enabling display of the first and second plurality of affordances comprises enabling (e.g., with display enabling unit 3634) display of the first and second plurality of affordances simultaneously on display screen unit 3620 of electronic device 3600.

In some embodiments, enabling display of the first plurality of affordances includes sorting (e.g., with sorting unit 3638) the first plurality of affordances based on how recently each application corresponding to the first plurality of affordances was last used on the first external device.

In some embodiments, enabling display of the second plurality of affordances includes sorting (e.g., with sorting unit 3638) the second plurality of affordances based on how recently each application corresponding to the second plurality of affordances was last used on the second external device.

In some embodiments, processing unit 3620 is further configured to: enable (e.g., with display enabling unit 3634) display of, simultaneously with at least one of the first and second pluralities of affordances, a plurality of favorite affordances representing a plurality of user-designated applications installed on electronic device 3600; detect (e.g., with input detecting unit 3632) user selection of a favorite affordance of the plurality of favorite affordances, and in response: launch (e.g., with application launching unit 3636) the corresponding application on electronic device 3600.

The operations described above with reference to FIG. 15 are, optionally, implemented by components depicted in FIGS. 1A-1B or FIG. 36. For example, receiving operation 1502, displaying operation 1504, and detecting operation 1506 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 37:
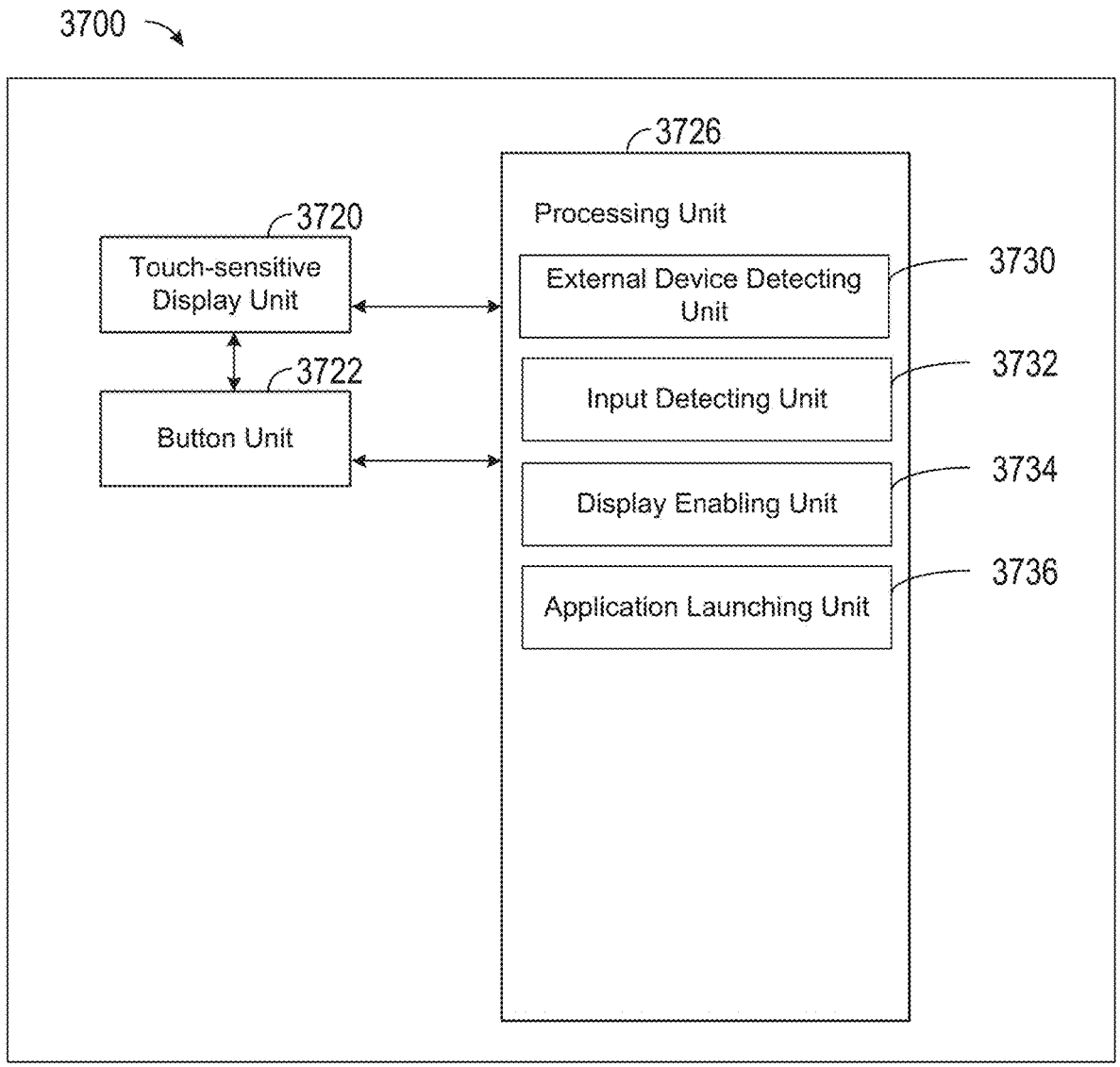
FIG. 37 is a functional block diagram of an electronic device configured to display a user interface in accordance with some embodiments.

In accordance with some embodiments, FIG. 37 shows an exemplary functional block diagram of an electronic device 3700 configured in accordance with the principles of the various described embodiments. In accordance with some embodiments, the functional blocks of electronic device 3700 are configured to perform the techniques described above. The functional blocks of the device 3700 are, optionally, implemented by hardware, software, or a combination of hardware and software to carry out the principles of the various described examples. It is understood by persons of skill in the art that the functional blocks described in FIG. 37 are, optionally, combined or separated into sub-blocks to implement the principles of the various described examples. Therefore, the description herein optionally supports any possible combination or separation or further definition of the functional blocks described herein.

As shown in FIG. 37, an electronic device 3700 includes a touch-sensitive display unit 3720, a button unit 3722, and a processing unit 3726 coupled to touch-sensitive display unit 3720 and button unit 3722. In some embodiments, processing unit 3726 includes an external device detecting unit 3730, a display enabling unit 3734, an input detecting unit 3732, and an application launching unit 3736.

Processing unit 3726 is configured to: detect (e.g., with external device detecting unit 3730) a first external device, wherein the first external device is executing or has executed a first application; detect (e.g., with external device detecting unit 3730) a second external device distinct from the first external device, wherein the second external device is executing or has executed a second application; enable (e.g., with display enabling unit 3734) display of at least one affordance on a screen of electronic device 3700 based on detecting the first external device and the second external device; detect (e.g., with input detecting unit 3732) user selection of an affordance of the at least one displayed affordances; and in response to detecting the user selection, launch (e.g., with application launching unit 3736) a third application on electronic device 3700, wherein the third application is a version of the first application or the second application.

In some embodiments, the first application was more recently used than the second application, and processing unit 3726 is further configured to: in response to detecting the user selection, launch (e.g., with application launching unit 3736) a third application on electronic device 3700, wherein the third application is a version of the first application.

In some embodiments, enabling display of the at least one affordance comprises enabling (e.g., with display enabling unit 3734) display of a first affordance representing the first application and a second affordance representing the second application, wherein the user selection is a selection of the first affordance or the second affordance. Processing unit 3726 is further configured to: in accordance with a determination that the user selected the first affordance, launch (e.g., with application launching unit 3736) a version of the first application; and in accordance with a determination that the user selected the second affordance, launch (e.g., with application launching unit 3736) a version of the second application.

The operations described above with reference to FIG. 12 are, optionally, implemented by components depicted in FIGS. 1A-1B or FIG. 37. For example, external device detecting operation 1202, displaying operation 1206, and user selection detecting operation 1208 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 38:
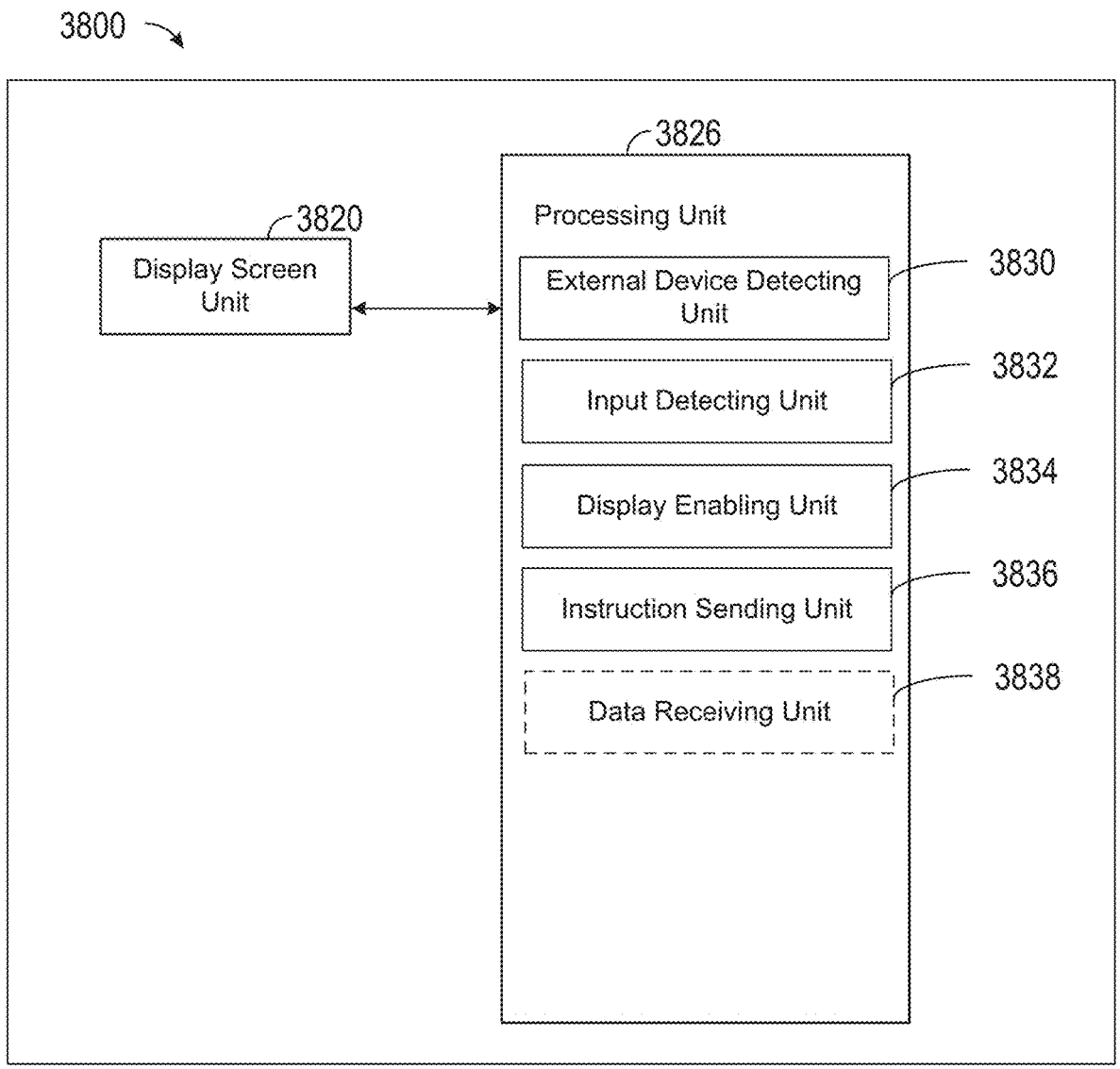
FIG. 38 is a functional block diagram of an electronic device configured to display a user interface in accordance with some embodiments.

In accordance with some embodiments, FIG. 38 shows an exemplary functional block diagram of an electronic device 3800 configured in accordance with the principles of the various described embodiments. In accordance with some embodiments, the functional blocks of electronic device 3800 are configured to perform the techniques described above. The functional blocks of the device 3800 are, optionally, implemented by hardware, software, or a combination of hardware and software to carry out the principles of the various described examples. It is understood by persons of skill in the art that the functional blocks described in FIG. 38 are, optionally, combined or separated into sub-blocks to implement the principles of the various described examples. Therefore, the description herein optionally supports any possible combination or separation or further definition of the functional blocks described herein.

As shown in FIG. 38, an electronic device 3800 includes a display screen unit 3820 and a processing unit 3826 coupled to display screen unit 3820. In some embodiments, processing unit 3826 includes an external device detecting unit 3830, a display enabling unit 3834, an input detecting unit 3832, and an application launching unit 3836. Optionally, processing unit 3826 also includes a data receiving unit 3838.

Processing unit 3826 is configured to: detect (e.g., with external device detecting unit 3830), via wireless communication, an external device, wherein electronic device 3800 is executing a first application; enable (e.g., with display enabling unit 3834) display of a push affordance on display screen unit 3820 for instructing the external device to launch a second application corresponding to the first application; detect (e.g., with input detecting unit 3832) user selection of the push affordance; and in response to detecting the user selection, send (e.g., with instruction sending unit 3836) an instruction to the external device, wherein the instruction causes the external device to display an affordance for launching the second application on the external device.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 3826 is further configured to: receive (e.g., with data receiving unit 3838), by electronic device 3800, application data of the first application; and enable (e.g., with display enabling unit 3834) display of the application data via the second application.

In some embodiments, the application data represents a portion of a message displayed by the first application, and processing unit 3826 is further configured to: enable (e.g., with display enabling unit 3834) display of the portion of the message in the second application.

In some embodiments, the application data represents a portion of a web-page, and processing unit 3826 is further configured to: enable (e.g., with display enabling unit 3834) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 3834) display of an affordance for invoking, wirelessly from the second application executing on electronic device 3800, an application feature of the first application executing on the external device.

In some embodiments, electronic device 3800 is a laptop or desktop computer.

In some embodiments, electronic device 3800 is a tablet computer.

In some embodiments, electronic device 3800 is a phone.

In some embodiments, the external device is a laptop or desktop computer.

In some embodiments, the external device is a tablet computer.

In some embodiments, the external device is a phone.

The operations described above with reference to FIG. 13 are, optionally, implemented by components depicted in FIGS. 1A-1B or FIG. 38. For example, external device detecting operation 1302, displaying operation 1304, and user selection detecting operation 1306 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 39:
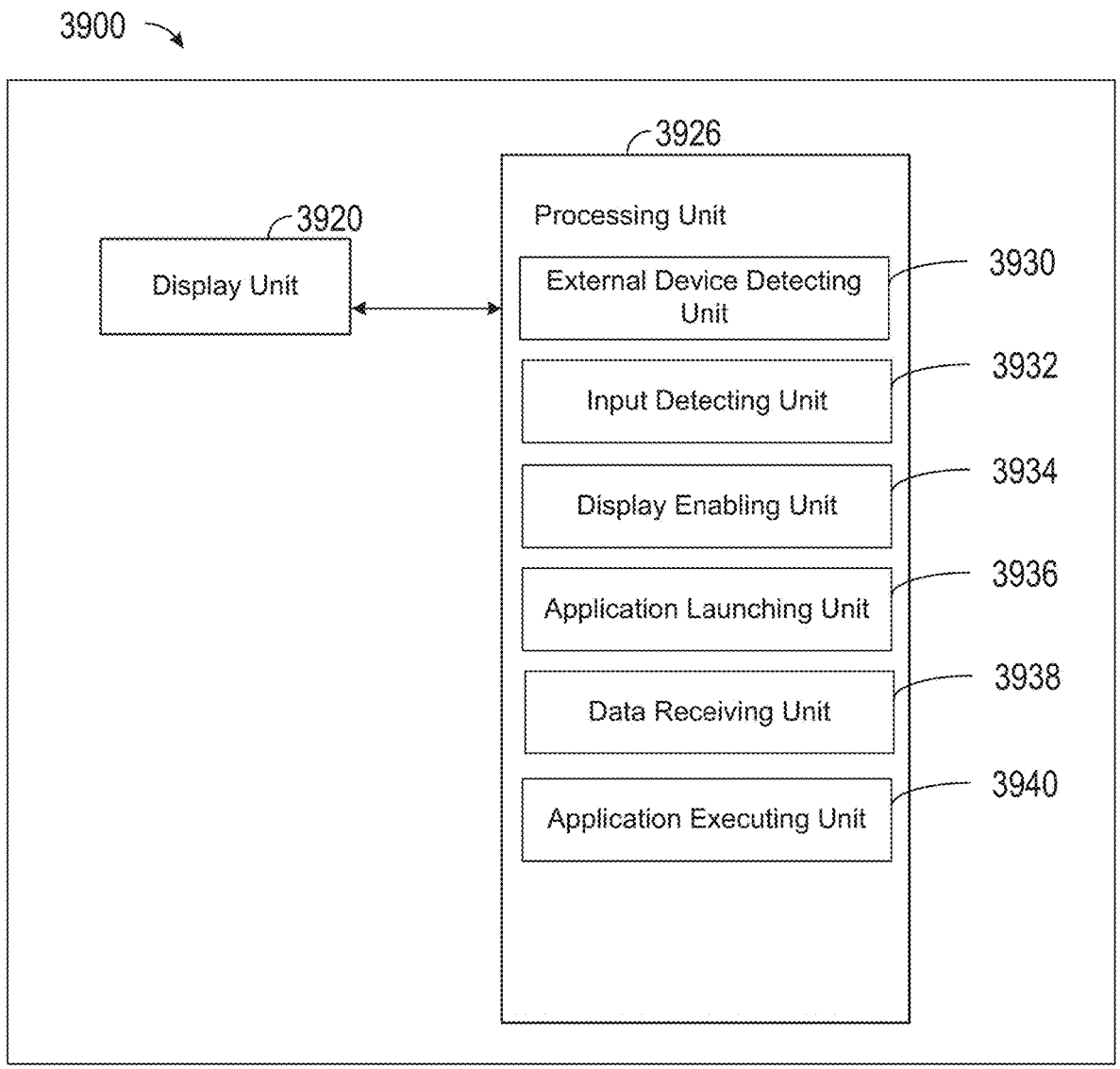
FIG. 39 is a functional block diagram of an electronic device configured to display a user interface in accordance with some embodiments.

In accordance with some embodiments, FIG. 39 shows an exemplary functional block diagram of an electronic device 3900 configured in accordance with the principles of the various described embodiments. In accordance with some embodiments, the functional blocks of electronic device 3900 are configured to perform the techniques described above. The functional blocks of the device 3900 are, optionally, implemented by hardware, software, or a combination of hardware and software to carry out the principles of the various described examples. It is understood by persons of skill in the art that the functional blocks described in FIG. 39 are, optionally, combined or separated into sub-blocks to implement the principles of the various described examples. Therefore, the description herein optionally supports any possible combination or separation or further definition of the functional blocks described herein.

As shown in FIG. 39, an electronic device 3900 includes a display unit 3920 and a processing unit 3926 coupled to screen unit 3920. In some embodiments, processing unit 3926 includes an external device detecting unit 3930, a display enabling unit 3934, an input detecting unit 3932, an application launching unit 3936, a data receiving unit 3938 and an application executing unit 3940.

Processing unit 3926 is configured to: execute (e.g., with application executing unit 3940) a first application; detect (e.g., with external device detecting unit 3930) an external device; receive (e.g., with data receiving unit 3938), from the external device, a first part of usage information indicating the first application was used on the external device by a user within a predetermined amount of time prior to the current time; in response to detecting the external device and receiving the first part of usage information, enable (e.g., with display enabling unit 3934) display of an affordance on display unit 3920 of electronic device 3900; detect (e.g., with input detecting unit 3932) a first user selection of the displayed affordance; in response to detecting the first user selection: change (e.g., with display enabling unit 3934) the visual appearance of the displayed affordance; and obtain (e.g., with data receiving unit 3938), from the external device, a second part of usage information associated with the first application. Processing unit 3926 is further configured to: detect (e.g., with input detecting unit 3932) a second user selection of the displayed affordance; and in response to detecting the second user selection: launch (e.g., with application launching unit 3936) a second application on electronic device 3900 based on at least the second part of usage information, the second application corresponding to the first application.

In some embodiments, processing unit 3926 is further configured to: obtain (e.g., with data receiving unit 3938), from the external device, the second part of usage information only after detecting the first user selection of the displayed affordance.

In some embodiments, the first user selection is a tap and the second user input is a swipe.

In some embodiments, the first application was used on the external device within a predetermined amount of time prior to the current time.

In some embodiments, the first application and the second application have at least one application feature in common.

In some embodiments, the state of the first application corresponds to a position in a navigation hierarchy of the first application.

In some embodiments, the state of the first application corresponds to a location in a document displayed in the first application.

In some embodiments, the state of the first application corresponds to whether a feature of the first application is active.

In some embodiments, the first application and the second application are versions of the same application.

In some embodiments, processing unit 3926 is further configured to: receive (e.g., with data receiving unit 3938), by electronic device 3900, application data of the first application; and enable (e.g., with display enabling unit 3934) display of the application data via the second application.

In some embodiments, the application data represents a portion of a message displayed by the first application, and processing unit 3926 is further configured to: enable (e.g., with display enabling unit 3934) display of the portion of the message in the second application.

In some embodiments, the application data represents a portion of a web-page, and processing unit 3926 is further configured to: enable (e.g., with display enabling unit 3934) display of the portion of the web-page via the second application.

In some embodiments, at least one application feature is accessible only from one of the first application and the second application.

In some embodiments, the first application performs at least one application feature, and launching the second application comprises: enabling (e.g., with display enabling unit 3934) display of an affordance for invoking, wirelessly from the second application executing on electronic device 3900, an application feature of the first application executing on the external device.

In some embodiments, electronic device 3900 is a laptop or desktop computer.

In some embodiments, electronic device 3900 is a tablet computer.

In some embodiments, electronic device 3900 is a phone.

In some embodiments, the external device is a laptop or desktop computer.

In some embodiments, the external device is a tablet computer.

In some embodiments, the external device is a phone.

The operations described above with reference to FIG. 14 are, optionally, implemented by components depicted in FIGS. 1A-1B or FIG. 39. For example, external device detecting operation 1402, receiving operation 1404, and displaying operation 1406 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 40:
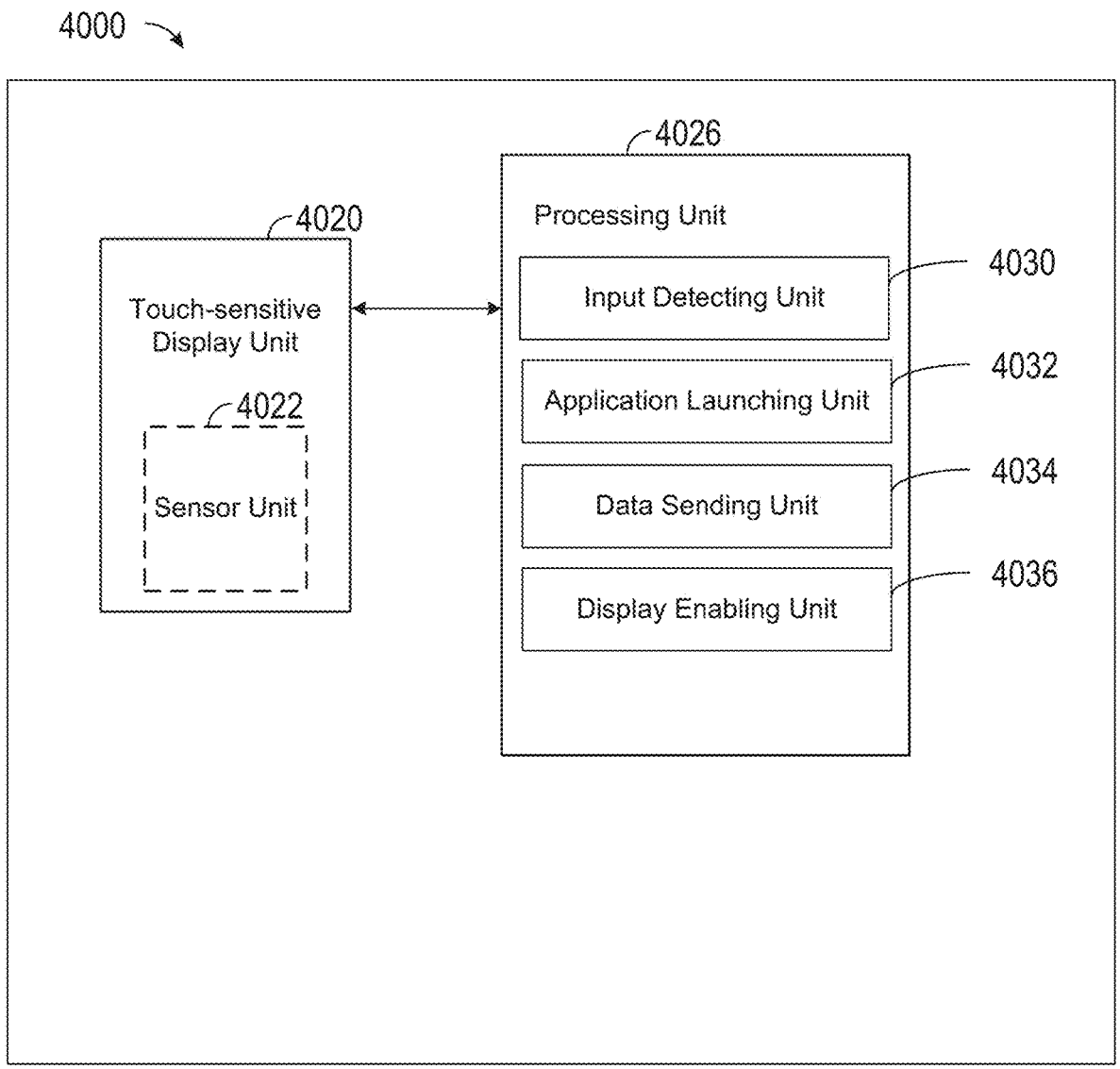
FIG. 40 is a functional block diagram of an electronic device configured to display a user interface in accordance with some embodiments.

In accordance with some embodiments, FIG. 40 shows an exemplary functional block diagram of an electronic device 4000 configured in accordance with the principles of the various described embodiments. In accordance with some embodiments, the functional blocks of electronic device 4000 are configured to perform the techniques described above. The functional blocks of the device 4000 are, optionally, implemented by hardware, software, or a combination of hardware and software to carry out the principles of the various described examples. It is understood by persons of skill in the art that the functional blocks described in FIG. 40 are, optionally, combined or separated into sub-blocks to implement the principles of the various described examples. Therefore, the description herein optionally supports any possible combination or separation or further definition of the functional blocks described herein.

As shown in FIG. 40, an electronic device 4000 includes a touch-sensitive display unit 4020 and a processing unit 4026 coupled to touch-sensitive display unit 4020. Optionally, touch-sensitive display unit 4020 comprises one or more sensor units 4022 configured to detect the intensity of contacts with touch-sensitive display unit 4020. In some embodiments, processing unit 4026 includes an input detecting unit 4030, an application launching unit 4032, a data sending unit 4034, and a display enabling unit 4036.

Processing unit 4026 is configured to: detect (e.g., with input detecting unit 4030 and sensor unit 4022) a first contact on touch-sensitive display unit 4020, the first contact having a first maximum intensity; in response to a determination that the first maximum intensity is below a threshold intensity: launch (e.g., with application launching unit 4032) a first application; detect (e.g., with input detecting unit 4030) a second contact on touch-sensitive display unit 4020, the second contact having a second maximum intensity; and in response at least in part to a determination that the second maximum intensity is above the threshold intensity: send (e.g., with data sending unit 4034) an instruction, via wireless communication, to an external device, wherein the instruction causes the external device to display an affordance for launching a second application on the external device corresponding to the first application.

In some embodiments, processing unit 4026 is further configured to: in response to a determination that the second maximum intensity is above the threshold intensity, enable (e.g., with display enabling unit 4036) display of an affordance for instructing the external device to launch the second application; detect (e.g., with input detecting unit 4030) a user selection of the affordance; and send (e.g., with data sending unit 4034) the instruction in response to detecting the user selection of the affordance.

In some embodiments, detecting the second contact on touch-sensitive display unit 4020 comprises detecting (e.g., with input detecting unit 4030) the second contact on touch-sensitive display unit 4020 while the first application is displayed in the foreground of touch-sensitive display unit 4020.

In some embodiments, the first application and the second application have at least one application feature in common.

In some embodiments, the instruction comprises an indication of a state of the first application, for invoking the state in the second application when the second application is launched.

In some embodiments, the state of the first application corresponds to a user interface screen of the first application.

In some embodiments, the state of the first application corresponds to a position in a navigation hierarchy of the first application.

In some embodiments, the state of the first application corresponds to a location in a document displayed in the first application.

In some embodiments, the state of the first application identifies whether a feature of the first application is active.

In some embodiments, the first application and the second application are versions of the same application.

In some embodiments, processing unit 4026 is further configured to: send (e.g., with data sending unit 4034), by electronic device 4000, application data of the first application to the external device, wherein at least a portion of the application data is displayed by the second application when the second application is launched.

In some embodiments, the application data represents at least a portion of a message displayed by the first application.

In some embodiments, the application data represents at least a portion of a web-page displayed by the first application.

In some embodiments, at least one application feature is accessible only from one of the first application and the second application.

In some embodiments, electronic device 4000 is a wearable electronic device.

The operations described above with reference to FIG. 20 are, optionally, implemented by components depicted in FIGS. 1A-1B or FIG. 40. For example, detecting operation 2002 and launching operation 2006 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 41:
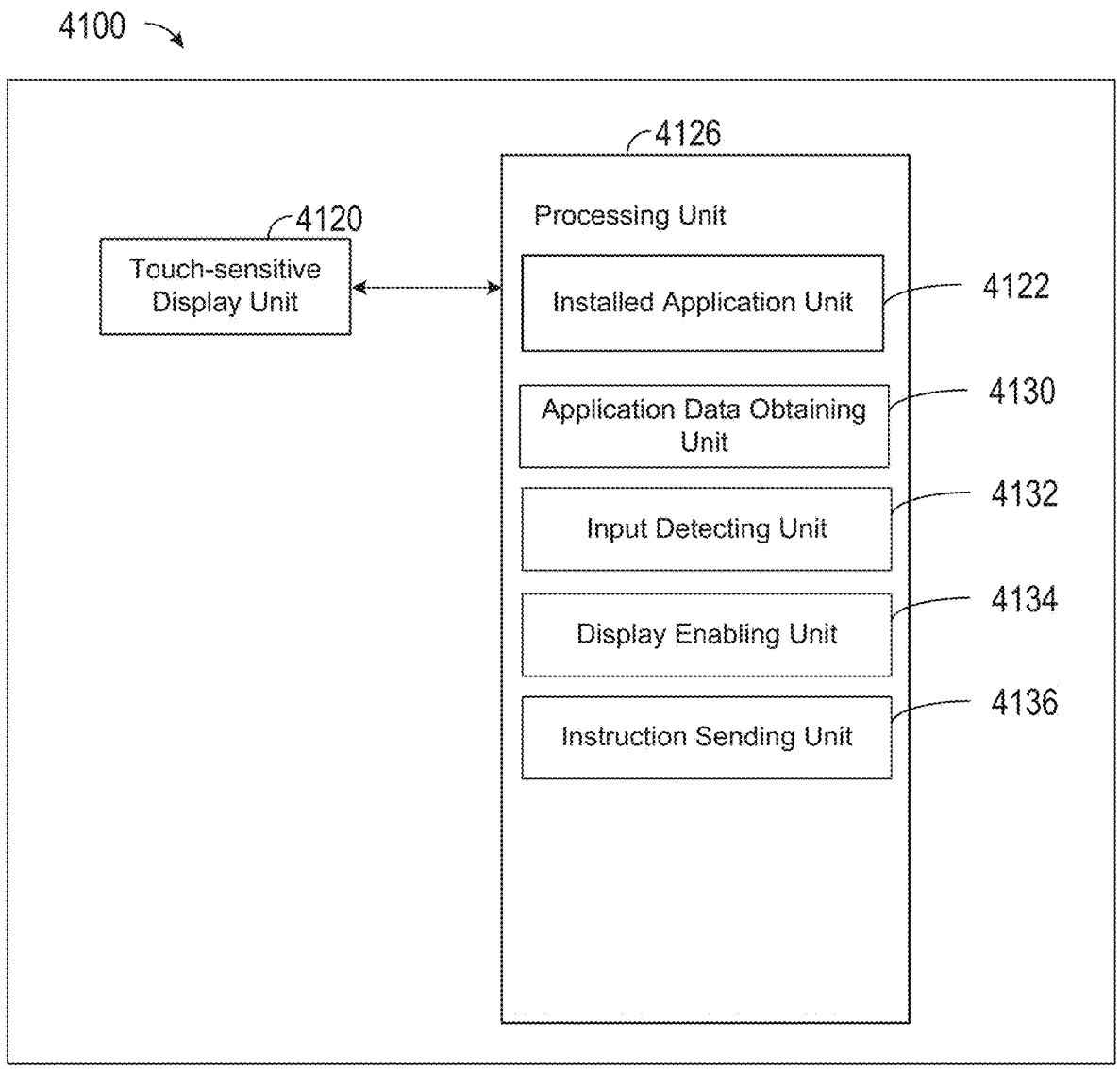
FIG. 41 is a functional block diagram of an electronic device configured to display a user interface in accordance with some embodiments.

In accordance with some embodiments, FIG. 41 shows an exemplary functional block diagram of an electronic device 4100 configured in accordance with the principles of the various described embodiments. In accordance with some embodiments, the functional blocks of electronic device 4100 are configured to perform the techniques described above. The functional blocks of the device 4100 are, optionally, implemented by hardware, software, or a combination of hardware and software to carry out the principles of the various described examples. It is understood by persons of skill in the art that the functional blocks described in FIG. 41 are, optionally, combined or separated into sub-blocks to implement the principles of the various described examples. Therefore, the description herein optionally supports any possible combination or separation or further definition of the functional blocks described herein.

As shown in FIG. 41, an electronic device 4100 includes a touch-sensitive display unit 4120 coupled to a processing unit 4126 In some embodiments, processing unit 4126 includes an installed application unit 4122, application data obtaining unit 4130, an input detecting unit 4132, a display enabling unit 4134, and an instruction sending unit 4136.

Processing unit 4126 is configured to: while an installed application is not displayed on touch-sensitive display unit 4120, obtain (e.g., with application data obtaining unit 4130) application data for installed application unit 4122; enable (e.g., with display enabling unit 4134) display of a message indicative of the obtained application data; detect (e.g., with input detecting unit 4132) a contact on the displayed message and a movement of the contact; in response to a determination that the detected movement is substantially in a first direction, send (e.g., with instruction sending unit 4136) an instruction, via wireless communication, to the external device, wherein the instruction causes the external device to display an affordance for launching a second application on the external device corresponding to the first application.

In some embodiments, processing unit 4126 is further configured to: in response to a determination that the detected movement is substantially in a second direction opposite the first direction, launch installed application (e.g., with installed application unit 4122) and enable (e.g., with display enabling unit 4134) display of the application data within the launched application on electronic device 4100.

In some embodiments, the first application and the second application have at least one application feature in common.

In some embodiments, the instruction comprises an indication of a state of the first application, for invoking the state in the second application when the second application is launched.

In some embodiments, the state of the first application corresponds to a user interface screen of the first application.

In some embodiments, the state of the first application corresponds to a position in a navigation hierarchy of the first application.

In some embodiments, the state of the first application corresponds to a location in a document displayed in the first application.

In some embodiments, the state of the first application identifies whether a feature of the first application is active.

In some embodiments, the first application and the second application are versions of the same application.

In some embodiments, processing unit 4126 is further configured to: send (e.g., with instruction sending unit 4136), by electronic device 4100, application data of the first application to the external device, wherein at least a portion of the application data is displayed by the second application when the second application is launched.

In some embodiments, the application data represents at least a portion of a message displayed by the first application.

In some embodiments, the application data represents at least a portion of a web-page displayed by the first application.

In some embodiments, at least one application feature is accessible only from one of the first application and the second application.

In some embodiments, electronic device 4100 is a wearable electronic device.

The operations described above with reference to FIG. 21 are, optionally, implemented by components depicted in FIGS. 1A-1B or FIG. 41. For example, obtaining operation 2102, displaying operation 2104, and detecting operation 2106 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 42:
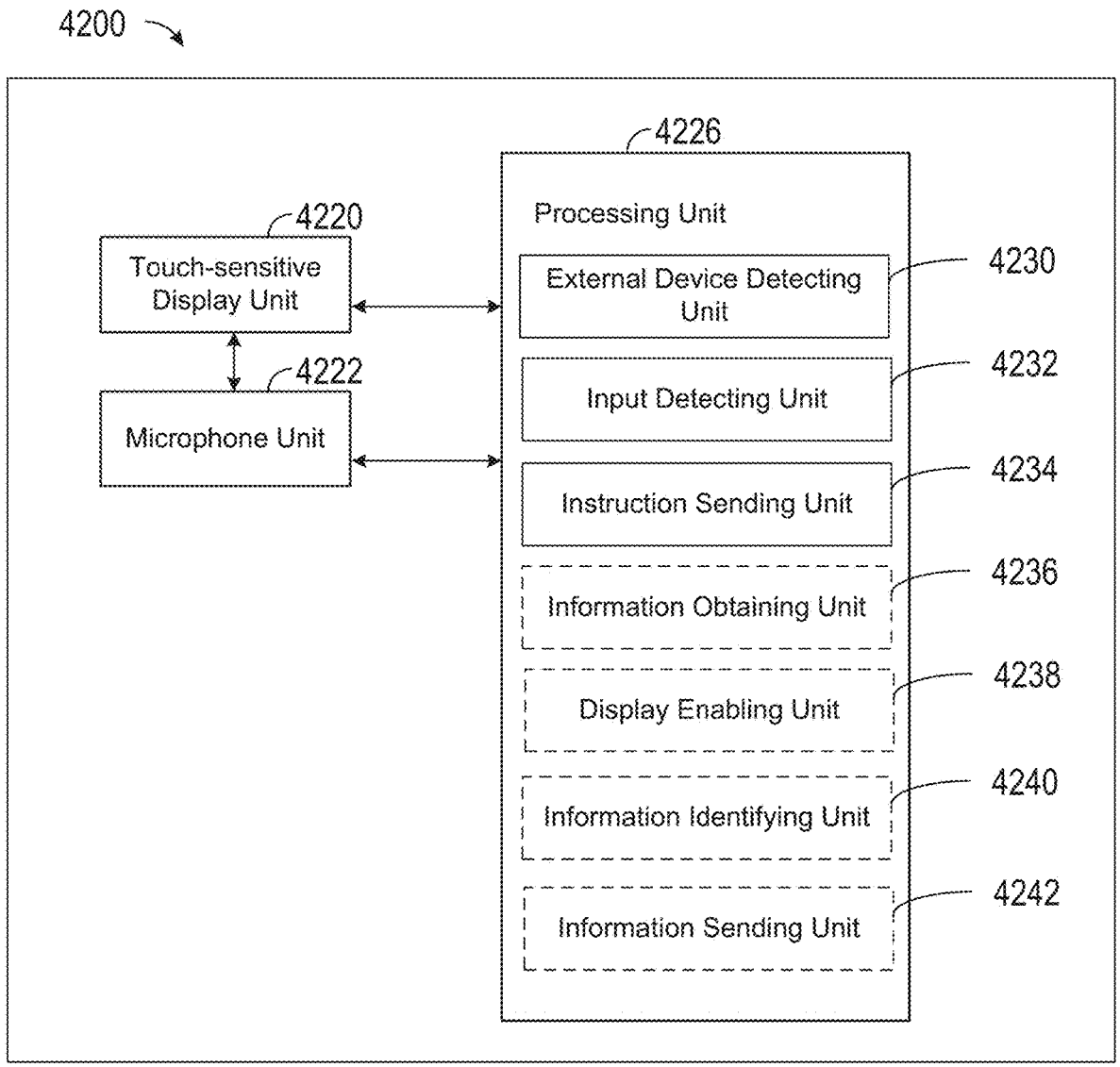
FIG. 42 is a functional block diagram of an electronic device configured to display a user interface in accordance with some embodiments.

In accordance with some embodiments, FIG. 42 shows an exemplary functional block diagram of an electronic device 4200 configured in accordance with the principles of the various described embodiments. In accordance with some embodiments, the functional blocks of electronic device 4200 are configured to perform the techniques described above. The functional blocks of the device 4200 are, optionally, implemented by hardware, software, or a combination of hardware and software to carry out the principles of the various described examples. It is understood by persons of skill in the art that the functional blocks described in FIG. 42 are, optionally, combined or separated into sub-blocks to implement the principles of the various described examples. Therefore, the description herein optionally supports any possible combination or separation or further definition of the functional blocks described herein.

As shown in FIG. 42, an electronic device 4200 includes a touch-sensitive display unit 4220, a microphone unit 4222, and a processing unit 4226 coupled to touch-sensitive display unit 4220 and microphone unit 4222. In some embodiments, processing unit 4226 includes an external device detecting unit 4230, an input detecting unit 4232, and an instruction sending unit 4234. Optionally, processing unit 4226 also includes an information obtaining unit 4236, a display enabling unit 4238, an information identifying unit 4240, and an information sending unit 4242.

Processing unit 4226 is configured to: detect (e.g., with input detecting unit 4232) a voice input from microphone unit, wherein the voice input includes a verbal request for information; detect (e.g., with external device detecting unit 4230), via wireless communication, an external device; and in response at least in part to detecting the voice input and detecting the external device, send (e.g., with instruction sending unit 4234) an instruction, via wireless communication, to the external device, wherein the instruction causes the external device to display an affordance for displaying the requested information.

In some embodiments, processing unit 4226 is further configured to: in response to detecting the voice input: obtain (e.g., with information obtaining unit 4236) the requested information from a web service; and enable (e.g., with display enabling unit 4238) display of the obtained information.

In some embodiments, processing unit 4226 is further configured to: while enabling display of the obtained information, enable (e.g., with display enabling unit 4238) display of an affordance that, when activated, causes the instructions to be sent to the external device; detect (e.g., with input detecting unit 4232) a user selection of the affordance; and send (e.g., with instruction sending unit 4234) the instruction in response at least in part to detecting the user selection of the affordance.

In some embodiments, electronic device 4200 has a first audio/visual capability, and the external device has a different second audio/visual capability. Processing unit 4226 is further configured to: at electronic device 4200, enable (e.g., with display enabling unit 4238) display of a first version of the requested information, the first version adapted for display within the first audio/visual capability of electronic device 4200, wherein the external device, when displaying the requested information, displays a second version of the requested information utilizing the second audio/visual capability of the external device, the second version visually and/or aurally different from the first version.

In some embodiments, a difference between the improved audio/visual capability and the reduced audio/visual capability relates to the availability of an application for displaying the requested information on only one of the external device and electronic device 4200.

In some embodiments, a difference between the improved audio/visual capability and the reduced audio/visual capability relates to the availability of a speaker for playing-back the requested information on only one of the eternal device and electronic device 4200.

In some embodiments, electronic device 4200 is a wearable electronic device.

In some embodiments, sending the instruction to the external device comprises: identifying (e.g., with information identifying unit 4240), to the external device, the requested information.

In some embodiments, sending the instructions to the external device comprises: identifying (e.g., with information identifying unit 4240), to the external device, a web service providing the requested information.

In some embodiments, sending the instructions to the external device comprises: obtaining (e.g., with information obtaining unit 4236), by electronic device 4200, the requested information from a web service; and sending (e.g., with information sending unit 4242), to the external device, at least a portion of the obtained information.

The operations described above with reference to FIG. 53 are, optionally, implemented by components depicted in FIGS. 1A-1B or FIG. 42. For example, input detecting operation 5202, external device detecting operation 5204, and sending operation 5206 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:
1. An electronic device, comprising:
a display;
one or more processors;
a memory; and
one or more programs, wherein the one or more programs are stored in the memory and configured to be executed by the one or more processors, the one or more programs including instructions for:
 detecting an external device, wherein the external device is executing an external application, the external application in a first state;
 receiving a first user input;
 in response to receiving the first user input:
  displaying, on the display, a first affordance and a second affordance, wherein the first affordance corresponds to a first recently opened application, and wherein the second affordance corresponds to a second recently opened application, the second recently opened application being different from the first recently opened application; and
  displaying, on the display, a third affordance corresponding to a respective local application and the external application, wherein:
   in accordance with a determination that a first external application has executed on the external device more recently than a second external application has executed on the external device, the third affordance corresponds to a first local application; and
   in accordance with a determination that the second external application has executed on the external device more recently than the first external application has executed on the external device, the third affordance corresponds to a second local application;
 receiving a second user input; and
 in response to receiving the second user input:
  in accordance with a determination that the second user input corresponds to the first affordance, launching the first recently opened application;
  in accordance with a determination that the second user input corresponds to the second affordance, launching the second recently opened application;
  in accordance with a determination that the second user input corresponds to the third affordance and that the third affordance corresponds to the first local application, launching the first local application in a second state corresponding to the first state; and
  in accordance with a determination that the second user input corresponds to the third affordance and that the third affordance corresponds to the second local application, launching the second local application in a third state corresponding to the first state.

2. The electronic device of claim 1, wherein displaying the third affordance comprises displaying a thumbnail image indicating the external application.

3. The electronic device of claim 1, wherein the respective local application and the external application have at least one application feature in common.

4. The electronic device of claim 1, wherein the first state of the external application corresponds to a position in a navigation hierarchy of the external application.

5. The electronic device of claim 1, wherein the first state of the external application corresponds to a location in a document displayed in the external application.

6. The electronic device of claim 1, wherein the first state of the external application corresponds to whether a feature of the external application is active.

7. The electronic device of claim 1, wherein the respective local application and the external application are versions of the same application.

8. The electronic device of claim 1, the one or more programs including instructions for:
receiving, by the electronic device, application data of the external application; and
displaying the application data via the respective local application.

9. The electronic device of claim 8, wherein the application data represents a portion of a message displayed by the external application, and wherein the one or more programs include instructions for:
displaying the portion of the message in the respective local application.

10. The electronic device of claim 8, wherein the application data represents a portion of a web-page, and wherein the one or more programs include instructions for:
displaying the portion of the web-page via the respective local application.

11. The electronic device of claim 1, wherein at least one application feature is accessible only from one of the external application and the respective local application.

12. The electronic device of claim 1, wherein the external application performs at least one application feature, and wherein launching the respective local application comprises:
displaying an affordance for invoking, wirelessly from the respective local application executing on the electronic device, an application feature of the external application executing on the external device.

13. The electronic device of claim 1, wherein the electronic device is a laptop or desktop computer.

14. The electronic device of claim 1, wherein the electronic device is a tablet computer.

15. The electronic device of claim 1, wherein the electronic device is a phone.

16. The electronic device of claim 1, wherein the external device is a laptop or desktop computer.

17. The electronic device of claim 1, wherein the external device is a tablet computer.

18. The electronic device of claim 1, wherein the external device is a phone.

19. A non-transitory computer-readable storage medium storing one or more programs configured to be executed by one or more processors of an electronic device with a display, the one or more programs including instructions for:
detecting an external device, wherein the external device is executing an external application, the external application in a first state;
receiving a first user input;
in response to receiving the first user input:
displaying, on the display, a first affordance and a second affordance, wherein the first affordance corresponds to a first recently opened application, and wherein the second affordance corresponds to a second recently opened application, the second recently opened application being different from the first recently opened application; and
displaying, on the display, a third affordance corresponding to a respective local application and the external application, wherein:
in accordance with a determination that a first external application has executed on the external device more recently than a second external application has executed on the external device, the third affordance corresponds to a first local application; and
in accordance with a determination that the second external application has executed on the external device more recently than the first external application has executed on the external device, the third affordance corresponds to a second local application;
receiving a second user input; and
in response to receiving the second user input:
in accordance with a determination that the second user input corresponds to the first affordance, launching the first recently opened application;
in accordance with a determination that the second user input corresponds to the second affordance, launching the second recently opened application;
in accordance with a determination that the second user input corresponds to the third affordance and that the third affordance corresponds to the first local application, launching the first local application in a second state corresponding to the first state; and
in accordance with a determination that the second user input corresponds to the third affordance and that the third affordance corresponds to the second local application, launching the second local application in a third state corresponding to the first state.

20. The non-transitory computer-readable storage medium of claim 19, wherein displaying the third affordance comprises displaying a thumbnail image indicating the external application.

21. The non-transitory computer-readable storage medium of claim 19, wherein the respective local application and the external application have at least one application feature in common.

22. The non-transitory computer-readable storage medium of claim 19, wherein the first state of the external application corresponds to a position in a navigation hierarchy of the external application.

23. The non-transitory computer-readable storage medium of claim 19, wherein the first state of the external application corresponds to a location in a document displayed in the external application.

24. The non-transitory computer-readable storage medium of claim 19, wherein the first state of the external application corresponds to whether a feature of the external application is active.

25. The non-transitory computer-readable storage medium of claim 19, wherein the respective local application and the external application are versions of the same application.

26. The non-transitory computer-readable storage medium of claim 19, the one or more programs including instructions for:
receiving, by the electronic device, application data of the external application; and
displaying the application data via the respective local application.

27. The non-transitory computer-readable storage medium of claim 26, wherein the application data represents a portion of a message displayed by the external application, and wherein the one or more programs include instructions for:
  displaying the portion of the message in the respective local application.

28. The non-transitory computer-readable storage medium of claim 26, wherein the application data represents a portion of a web-page, and wherein the one or more programs include instructions for:
  displaying the portion of the web-page via the respective local application.

29. The non-transitory computer-readable storage medium of claim 19, wherein at least one application feature is accessible only from one of the external application and the respective local application.

30. The non-transitory computer-readable storage medium of claim 19, wherein the external application performs at least one application feature, and wherein launching the respective local application comprises:
  displaying an affordance for invoking, wirelessly from the respective local application executing on the electronic device, an application feature of the external application executing on the external device.

31. The non-transitory computer-readable storage medium of claim 19, wherein the electronic device is a laptop or desktop computer.

32. The non-transitory computer-readable storage medium of claim 19, wherein the electronic device is a tablet computer.

33. The non-transitory computer-readable storage medium of claim 19, wherein the electronic device is a phone.

34. The non-transitory computer-readable storage medium of claim 19, wherein the external device is a laptop or desktop computer.

35. The non-transitory computer-readable storage medium of claim 19, wherein the external device is a tablet computer.

36. The non-transitory computer-readable storage medium of claim 19, wherein the external device is a phone.

37. A method, comprising:
  at an electronic device having a display:
    detecting an external device, wherein the external device is executing an external application, the external application in a first state;
    receiving a first user input;
    in response to receiving the first user input:
      displaying, on the display, a first affordance and a second affordance, wherein the first affordance corresponds to a first recently opened application, and wherein the second affordance corresponds to a second recently opened application, the second recently opened application being different from the first recently opened application; and
      displaying, on the display, a third affordance corresponding to a respective local application and the external application, wherein:
        in accordance with a determination that a first external application has executed on the external device more recently than a second external application has executed on the external device, the third affordance corresponds to a first local application; and
        in accordance with a determination that the second external application has executed on the external device more recently than the first external application has executed on the external device, the third affordance corresponds to a second local application;
    receiving a second user input; and
    in response to receiving the second user input:
      in accordance with a determination that the second user input corresponds to the first affordance, launching the first recently opened application;
      in accordance with a determination that the second user input corresponds to the second affordance, launching the second recently opened application;
      in accordance with a determination that the second user input corresponds to the third affordance and that the third affordance corresponds to the first local application, launching the first local application in a second state corresponding to the first state; and
      in accordance with a determination that the second user input corresponds to the third affordance and that the third affordance corresponds to the second local application, launching the second local application in a third state corresponding to the first state.

38. The method of claim 37, wherein displaying the third affordance comprises displaying a thumbnail image indicating the external application.

39. The method of claim 37, wherein the respective local application and the external application have at least one application feature in common.

40. The method of claim 37, wherein the first state of the external application corresponds to a position in a navigation hierarchy of the external application.

41. The method of claim 37, wherein the first state of the external application corresponds to a location in a document displayed in the external application.

42. The method of claim 37, wherein the first state of the external application corresponds to whether a feature of the external application is active.

43. The method of claim 37, wherein the respective local application and the external application are versions of the same application.

44. The method of claim 37, further comprising:
  receiving, by the electronic device, application data of the external application; and
  displaying the application data via the respective local application.

45. The method of claim 44, wherein the application data represents a portion of a message displayed by the external application, the method further comprising:
  displaying the portion of the message in the respective local application.

46. The method of claim 44, wherein the application data represents a portion of a web-page, the method further comprising:
  displaying the portion of the web-page via the respective local application.

47. The method of claim 37, wherein at least one application feature is accessible only from one of the external application and the respective local application.

48. The method of claim 37, wherein the external application performs at least one application feature, and wherein launching the respective local application comprises:
  displaying an affordance for invoking, wirelessly from the respective local application executing on the electronic device, an application feature of the external application executing on the external device.

49. The method of claim 37, wherein the electronic device is a laptop or desktop computer.

50. The method of claim 37, wherein the electronic device is a tablet computer.

51. The method of claim 37, wherein the electronic device is a phone.

52. The method of claim 37, wherein the external device is a laptop or desktop computer.

53. The method of claim 37, wherein the external device is a tablet computer.

54. The method of claim 37, wherein the external device is a phone.

\* \* \* \* \*